(12) United States Patent
Pastrana Vicente et al.

(10) Patent No.: US 12,164,739 B2
(45) Date of Patent: Dec. 10, 2024

(54) METHODS FOR INTERACTING WITH VIRTUAL CONTROLS AND/OR AN AFFORDANCE FOR MOVING VIRTUAL OBJECTS IN VIRTUAL ENVIRONMENTS

(71) Applicant: Apple Inc., Cupertino, CA (US)

(72) Inventors: Israel Pastrana Vicente, Spring, TX (US); Jonathan R. Dascola, San Francisco, CA (US); Wesley M. Holder, Union City, CA (US); Pol Pla I Conesa, San Francisco, CA (US); Alexis Henri Palangie, Palo Alto, CA (US); Aaron Mackay Burns, Sunnyvale, CA (US); William A. Sorrentino, III, Mill Valley, CA (US); Stephen O. Lemay, Palo Alto, CA (US); Christopher D. McKenzie, Burlingame, CA (US); Shih-Sang Chiu, San Francisco, CA (US); Benjamin Hunter Boesel, Jackson, WY (US); Jonathan Ravasz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/448,875

(22) Filed: Sep. 25, 2021

(65) Prior Publication Data

US 2022/0121344 A1 Apr. 21, 2022

Related U.S. Application Data

(60) Provisional application No. 63/261,555, filed on Sep. 23, 2021, provisional application No. 63/083,802, filed on Sep. 25, 2020.

(51) Int. Cl.
*G06F 3/04815* (2022.01)
*G06F 3/01* (2006.01)
*G06F 3/0484* (2022.01)

(52) U.S. Cl.
CPC .......... *G06F 3/04815* (2013.01); *G06F 3/013* (2013.01); *G06F 3/017* (2013.01); *G06F 3/0484* (2013.01); *G06F 2203/0381* (2013.01)

(58) Field of Classification Search
None
See application file for complete search history.

(56) References Cited

U.S. PATENT DOCUMENTS

| 1,173,824 A | 2/1916 | Mckee |
| 5,515,488 A | 5/1996 | Hoppe et al. |

(Continued)

FOREIGN PATENT DOCUMENTS

| CA | 3033344 A1 | 2/2018 |
| CN | 104714771 A | 6/2015 |

(Continued)

OTHER PUBLICATIONS

International Search Report received for PCT Patent Application No. PCT/US2021/071595, mailed on Mar. 17, 2022, 7 pages.

(Continued)

*Primary Examiner* — Parul H Gupta
(74) *Attorney, Agent, or Firm* — Kubota & Basol LLP

(57) ABSTRACT

In some embodiments, an electronic device enhances interactions with virtual objects in a three-dimensional environment. In some embodiments, an electronic device enhances interactions with selectable user interface elements. In some embodiments, an electronic device enhances interactions with slider user interface elements. In some embodiments, an electronic device moves virtual objects in a three-dimensional environment and facilitates accessing actions associated with virtual objects.

57 Claims, 75 Drawing Sheets

(56) References Cited

U.S. PATENT DOCUMENTS

| | | |
|---|---|---|
| 5,524,195 A | 6/1996 | Clanton et al. |
| 5,610,828 A | 3/1997 | Kodosky et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,108,004 A | 8/2000 | Medl |
| 6,112,015 A | 8/2000 | Planas et al. |
| 6,154,559 A | 11/2000 | Beardsley |
| 6,323,846 B1 | 11/2001 | Westerman et al. |
| 6,456,296 B1 | 9/2002 | Cataudella et al. |
| 6,570,557 B1 | 5/2003 | Westerman et al. |
| 6,584,465 B1 | 6/2003 | Zhu et al. |
| 6,677,932 B1 | 1/2004 | Westerman |
| 6,756,997 B1 | 6/2004 | Ward et al. |
| 7,035,903 B1 | 4/2006 | Baldonado |
| 7,137,074 B1 | 11/2006 | Newton et al. |
| 7,230,629 B2 | 6/2007 | Reynolds et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 8,793,620 B2 | 7/2014 | Stafford |
| 8,803,873 B2 | 8/2014 | Yoo et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,185,062 B1 | 11/2015 | Yang et al. |
| 9,201,500 B2 | 12/2015 | Srinivasan et al. |
| 9,256,785 B2 | 2/2016 | Qvarfordt |
| 9,348,458 B2 | 5/2016 | Hotelling et al. |
| 9,400,559 B2 | 7/2016 | Latta et al. |
| 9,448,635 B2 | 9/2016 | Macdougall et al. |
| 9,465,479 B2 | 10/2016 | Cho et al. |
| 9,526,127 B1 | 12/2016 | Taubman et al. |
| 9,563,331 B2 | 2/2017 | Poulos et al. |
| 9,575,559 B2 | 2/2017 | Andrysco |
| 9,681,112 B2 | 6/2017 | Son |
| 9,684,372 B2 | 6/2017 | Xun et al. |
| 9,734,402 B2 | 8/2017 | Jang et al. |
| 9,778,814 B2 | 10/2017 | Ambrus et al. |
| 9,851,866 B2 | 12/2017 | Goossens et al. |
| 9,886,087 B1 | 2/2018 | Wald et al. |
| 9,933,833 B2 | 4/2018 | Tu et al. |
| 9,933,937 B2 | 4/2018 | Lemay et al. |
| 9,934,614 B2 | 4/2018 | Ramsby et al. |
| 10,049,460 B2 | 8/2018 | Romano et al. |
| 10,203,764 B2 | 2/2019 | Katz et al. |
| 10,307,671 B2 | 6/2019 | Barney et al. |
| 10,353,532 B1 | 7/2019 | Holz et al. |
| 10,394,320 B2 | 8/2019 | George-Svahn et al. |
| 10,534,439 B2 | 1/2020 | Raffa et al. |
| 10,664,048 B2 | 5/2020 | Cieplinski et al. |
| 10,664,050 B2 | 5/2020 | Alcaide et al. |
| 10,699,488 B1 | 6/2020 | Terrano |
| 10,732,721 B1 | 8/2020 | Clements |
| 10,754,434 B2 | 8/2020 | Hall et al. |
| 10,768,693 B2 | 9/2020 | Powderly et al. |
| 10,861,242 B2 | 12/2020 | Lacey et al. |
| 10,890,967 B2 | 1/2021 | Stellmach et al. |
| 10,956,724 B1 | 3/2021 | Terrano |
| 10,983,663 B2 | 4/2021 | Iglesias |
| 11,055,920 B1 | 7/2021 | Bramwell et al. |
| 11,112,875 B1 | 9/2021 | Zhou et al. |
| 11,199,898 B2 | 12/2021 | Blume et al. |
| 11,200,742 B1 | 12/2021 | Post et al. |
| 11,294,472 B2 | 4/2022 | Tang et al. |
| 11,294,475 B1 | 4/2022 | Pinchon et al. |
| 11,340,756 B2 | 5/2022 | Faulkner et al. |
| 11,348,300 B2 | 5/2022 | Zimmermann et al. |
| 11,461,973 B2 | 10/2022 | Pinchon |
| 11,573,363 B2 | 2/2023 | Zou et al. |
| 11,574,452 B2 | 2/2023 | Berliner et al. |
| 11,720,171 B2 | 8/2023 | Pastrana Vicente et al. |
| 11,726,577 B2 | 8/2023 | Katz |
| 11,733,824 B2 | 8/2023 | Iskandar et al. |
| 11,762,457 B1 | 9/2023 | Ikkai et al. |
| 2001/0047250 A1 | 11/2001 | Schuller et al. |
| 2002/0015024 A1 | 2/2002 | Westerman et al. |
| 2002/0044152 A1 | 4/2002 | Abbott et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0243926 A1 | 12/2004 | Trenbeath et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0190059 A1 | 9/2005 | Wehrenberg |
| 2005/0198143 A1 | 9/2005 | Moody et al. |
| 2006/0017692 A1 | 1/2006 | Wehrenberg et al. |
| 2006/0033724 A1 | 2/2006 | Chaudhri et al. |
| 2006/0080702 A1 | 4/2006 | Diez et al. |
| 2006/0197753 A1 | 9/2006 | Hotelling |
| 2006/0283214 A1 | 12/2006 | Donadon et al. |
| 2008/0211771 A1 | 9/2008 | Richardson |
| 2009/0064035 A1 | 3/2009 | Shibata et al. |
| 2009/0231356 A1 | 9/2009 | Barnes et al. |
| 2010/0097375 A1 | 4/2010 | Tadaishi et al. |
| 2010/0150526 A1 | 6/2010 | Rose et al. |
| 2010/0188503 A1 | 7/2010 | Tsai et al. |
| 2011/0018895 A1 | 1/2011 | Buzyn et al. |
| 2011/0018896 A1 | 1/2011 | Buzyn et al. |
| 2011/0216060 A1 | 9/2011 | Weising et al. |
| 2011/0254865 A1 | 10/2011 | Yee et al. |
| 2011/0310001 A1 | 12/2011 | Madau et al. |
| 2012/0113223 A1 | 5/2012 | Hilliges et al. |
| 2012/0151416 A1 | 6/2012 | Bell et al. |
| 2012/0170840 A1 | 7/2012 | Caruso et al. |
| 2012/0218395 A1 | 8/2012 | Andersen et al. |
| 2012/0257035 A1 | 10/2012 | Larsen |
| 2013/0127850 A1 | 5/2013 | Bindon |
| 2013/0211843 A1 | 8/2013 | Clarkson |
| 2013/0229345 A1 | 9/2013 | Day et al. |
| 2013/0271397 A1 | 10/2013 | Hildreth et al. |
| 2013/0278501 A1* | 10/2013 | Bulzacki .......... G06F 18/2413 345/157 |
| 2013/0286004 A1 | 10/2013 | Mcculloch et al. |
| 2013/0326364 A1 | 12/2013 | Latta et al. |
| 2013/0342564 A1 | 12/2013 | Kinnebrew et al. |
| 2013/0342570 A1 | 12/2013 | Kinnebrew et al. |
| 2014/0002338 A1 | 1/2014 | Raffa et al. |
| 2014/0028548 A1 | 1/2014 | Bychkov et al. |
| 2014/0075361 A1 | 3/2014 | Reynolds et al. |
| 2014/0108942 A1 | 4/2014 | Freeman et al. |
| 2014/0125584 A1 | 5/2014 | Xun et al. |
| 2014/0198017 A1 | 7/2014 | Lamb et al. |
| 2014/0258942 A1 | 9/2014 | Kutliroff et al. |
| 2014/0282272 A1 | 9/2014 | Kies et al. |
| 2014/0320404 A1 | 10/2014 | Kasahara |
| 2014/0347391 A1 | 11/2014 | Keane et al. |
| 2015/0035822 A1 | 2/2015 | Arsan et al. |
| 2015/0035832 A1 | 2/2015 | Sugden et al. |
| 2015/0067580 A1 | 3/2015 | Um et al. |
| 2015/0123890 A1 | 5/2015 | Kapur et al. |
| 2015/0177937 A1* | 6/2015 | Poletto .............. G06F 3/167 715/739 |
| 2015/0187093 A1 | 7/2015 | Chu et al. |

(56) References Cited

U.S. PATENT DOCUMENTS

| | | |
|---|---|---|
| 2015/0205106 A1 | 7/2015 | Norden |
| 2015/0220152 A1 | 8/2015 | Tait et al. |
| 2015/0227285 A1 | 8/2015 | Lee et al. |
| 2015/0242095 A1 | 8/2015 | Sonnenberg |
| 2015/0317832 A1 | 11/2015 | Ebstyne et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0026242 A1 | 1/2016 | Burns et al. |
| 2016/0026253 A1 | 1/2016 | Bradski et al. |
| 2016/0062636 A1 | 3/2016 | Jung et al. |
| 2016/0093108 A1 | 3/2016 | Mao et al. |
| 2016/0098094 A1 | 4/2016 | Minkkinen |
| 2016/0171304 A1 | 6/2016 | Golding et al. |
| 2016/0196692 A1 | 7/2016 | Kjallstrom et al. |
| 2016/0253063 A1* | 9/2016 | Critchlow ............ G06F 3/0488 715/769 |
| 2016/0253821 A1 | 9/2016 | Romano et al. |
| 2016/0275702 A1 | 9/2016 | Reynolds et al. |
| 2016/0306434 A1 | 10/2016 | Ferrin |
| 2016/0313890 A1 | 10/2016 | Walline et al. |
| 2016/0379409 A1 | 12/2016 | Gavriliuc et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0046872 A1 | 2/2017 | Geselowitz et al. |
| 2017/0060230 A1 | 3/2017 | Faaborg et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0153866 A1 | 6/2017 | Grinberg et al. |
| 2017/0206691 A1 | 7/2017 | Harrises et al. |
| 2017/0228130 A1 | 8/2017 | Palmaro |
| 2017/0285737 A1 | 10/2017 | Khalid et al. |
| 2017/0315715 A1 | 11/2017 | Fujita et al. |
| 2017/0344223 A1 | 11/2017 | Holzer et al. |
| 2017/0358141 A1 | 12/2017 | Stafford et al. |
| 2018/0045963 A1 | 2/2018 | Hoover et al. |
| 2018/0075658 A1 | 3/2018 | Lanier et al. |
| 2018/0081519 A1 | 3/2018 | Kim |
| 2018/0095634 A1 | 4/2018 | Alexander |
| 2018/0095635 A1 | 4/2018 | Valdivia et al. |
| 2018/0101223 A1 | 4/2018 | Ishihara et al. |
| 2018/0114364 A1 | 4/2018 | Mcphee et al. |
| 2018/0150997 A1 | 5/2018 | Austin |
| 2018/0158222 A1 | 6/2018 | Hayashi |
| 2018/0181199 A1 | 6/2018 | Harvey et al. |
| 2018/0188802 A1 | 7/2018 | Okumura |
| 2018/0210628 A1 | 7/2018 | Mcphee et al. |
| 2018/0239144 A1 | 8/2018 | Woods et al. |
| 2018/0300023 A1 | 10/2018 | Hein |
| 2018/0315248 A1 | 11/2018 | Bastov et al. |
| 2018/0322701 A1 | 11/2018 | Pahud et al. |
| 2018/0348861 A1 | 12/2018 | Uscinski et al. |
| 2019/0034076 A1 | 1/2019 | Vinayak et al. |
| 2019/0050062 A1 | 2/2019 | Chen et al. |
| 2019/0080572 A1* | 3/2019 | Kim ............ G06Q 50/12 |
| 2019/0088149 A1* | 3/2019 | Fink ............ G09B 5/02 |
| 2019/0094979 A1 | 3/2019 | Hall et al. |
| 2019/0101991 A1 | 4/2019 | Brennan |
| 2019/0130633 A1 | 5/2019 | Haddad et al. |
| 2019/0130733 A1 | 5/2019 | Hodge |
| 2019/0146128 A1 | 5/2019 | Cao et al. |
| 2019/0204906 A1 | 7/2019 | Ross et al. |
| 2019/0227763 A1 | 7/2019 | Kaufthal |
| 2019/0258365 A1 | 8/2019 | Zurmoehle et al. |
| 2019/0310757 A1 | 10/2019 | Lee et al. |
| 2019/0324529 A1 | 10/2019 | Stellmach et al. |
| 2019/0339770 A1 | 11/2019 | Kurlethimar et al. |
| 2019/0362557 A1 | 11/2019 | Lacey et al. |
| 2019/0371072 A1 | 12/2019 | Lindberg et al. |
| 2019/0377487 A1* | 12/2019 | Bailey ............ G06F 1/163 |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0043243 A1 | 2/2020 | Bhushan et al. |
| 2020/0082602 A1 | 3/2020 | Jones |
| 2020/0089314 A1 | 3/2020 | Poupyrev et al. |
| 2020/0098140 A1 | 3/2020 | Jagnow et al. |
| 2020/0098173 A1 | 3/2020 | Mccall |
| 2020/0117213 A1 | 4/2020 | Tian et al. |
| 2020/0159017 A1 | 5/2020 | Lin et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0356221 A1 | 11/2020 | Behzadi et al. |
| 2020/0357374 A1 | 11/2020 | Verweij et al. |
| 2020/0387228 A1 | 12/2020 | Ravasz et al. |
| 2021/0074062 A1 | 3/2021 | Madonna et al. |
| 2021/0090337 A1 | 3/2021 | Ravasz et al. |
| 2021/0096726 A1 | 4/2021 | Faulkner et al. |
| 2021/0191600 A1 | 6/2021 | Lemay et al. |
| 2021/0295602 A1 | 9/2021 | Scapel et al. |
| 2021/0303074 A1 | 9/2021 | Vanblon et al. |
| 2021/0319617 A1 | 10/2021 | Ahn et al. |
| 2021/0327140 A1 | 10/2021 | Rothkopf et al. |
| 2021/0339134 A1 | 11/2021 | Knoppert |
| 2021/0350564 A1 | 11/2021 | Peuhkurinen et al. |
| 2021/0375022 A1 | 12/2021 | Lee et al. |
| 2022/0011855 A1 | 1/2022 | Hazra et al. |
| 2022/0030197 A1 | 1/2022 | Ishimoto |
| 2022/0083197 A1 | 3/2022 | Rockel et al. |
| 2022/0092862 A1 | 3/2022 | Faulkner et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0137705 A1 | 5/2022 | Hashimoto et al. |
| 2022/0155909 A1 | 5/2022 | Kawashima et al. |
| 2022/0157083 A1 | 5/2022 | Jandhyala et al. |
| 2022/0187907 A1 | 6/2022 | Lee et al. |
| 2022/0191570 A1 | 6/2022 | Reid et al. |
| 2022/0229524 A1 | 7/2022 | Mckenzie et al. |
| 2022/0229534 A1 | 7/2022 | Terre et al. |
| 2022/0245888 A1 | 8/2022 | Singh et al. |
| 2022/0253149 A1 | 8/2022 | Berliner et al. |
| 2022/0276720 A1 | 9/2022 | Yasui |
| 2022/0326837 A1 | 10/2022 | Dessero et al. |
| 2022/0413691 A1 | 12/2022 | Becker et al. |
| 2023/0004216 A1 | 1/2023 | Rodgers et al. |
| 2023/0008537 A1 | 1/2023 | Henderson et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0093979 A1 | 3/2023 | Stauber et al. |
| 2023/0133579 A1 | 5/2023 | Chang et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168788 A1 | 6/2023 | Faulkner et al. |
| 2023/0185426 A1 | 6/2023 | Rockel et al. |
| 2023/0186577 A1 | 6/2023 | Rockel et al. |
| 2023/0244857 A1 | 8/2023 | Weiss et al. |
| 2023/0273706 A1 | 8/2023 | Smith et al. |
| 2023/0274504 A1 | 8/2023 | Ren et al. |
| 2023/0315385 A1 | 10/2023 | Akmal et al. |
| 2023/0316634 A1 | 10/2023 | Chiu et al. |
| 2023/0325004 A1 | 10/2023 | Burns et al. |
| 2023/0350539 A1 | 11/2023 | Owen et al. |
| 2023/0384907 A1 | 11/2023 | Boesel et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0095984 A1 | 3/2024 | Ren et al. |
| 2024/0103613 A1 | 3/2024 | Chawda et al. |
| 2024/0103684 A1 | 3/2024 | Yu et al. |
| 2024/0103707 A1 | 3/2024 | Henderson et al. |

(56) References Cited

U.S. PATENT DOCUMENTS

2024/0104836 A1  3/2024  Dessero et al.
2024/0104877 A1  3/2024  Henderson et al.
2024/0111479 A1  4/2024  Paul

FOREIGN PATENT DOCUMENTS

| CN | 105264461 A | 1/2016 |
|---|---|---|
| CN | 105264478 A | 1/2016 |
| CN | 108633307 A | 10/2018 |
| CN | 110476142 A | 11/2019 |
| CN | 110673718 A | 1/2020 |
| EP | 2741175 A2 | 6/2014 |
| EP | 2947545 A1 | 11/2015 |
| EP | 3503101 A1 | 6/2019 |
| EP | 3588255 A1 | 1/2020 |
| EP | 3654147 A1 | 5/2020 |
| JP | H10-51711 A | 2/1998 |
| JP | 2005-215144 A | 8/2005 |
| JP | 2012-234550 A | 11/2012 |
| JP | 2013-196158 A | 9/2013 |
| JP | 2013-257716 A | 12/2013 |
| JP | 2014-514652 A | 6/2014 |
| JP | 2015-515040 A | 5/2015 |
| JP | 2015-118332 A | 6/2015 |
| JP | 2016-194744 A | 11/2016 |
| JP | 2017-27206 A | 2/2017 |
| JP | 2018-5516 A | 1/2018 |
| JP | 2019-169154 A | 10/2019 |
| JP | 2022-53334 A | 4/2022 |
| KR | 10-2016-0012139 A | 2/2016 |
| KR | 10-2019-0100957 A | 8/2019 |
| WO | 2013/169849 A2 | 11/2013 |
| WO | 2014/105276 A1 | 7/2014 |
| WO | 2019/142560 A1 | 7/2019 |
| WO | 2020/066682 A1 | 4/2020 |
| WO | 2021/202783 A1 | 10/2021 |
| WO | 2022/046340 A1 | 3/2022 |
| WO | 2022/055822 A1 | 3/2022 |
| WO | 2022/066399 A1 | 3/2022 |
| WO | 2022/164881 A1 | 8/2022 |
| WO | 2023/141535 A1 | 7/2023 |

OTHER PUBLICATIONS

International Search Report received for PCT Patent Application No. PCT/US2022/013208, mailed on Apr. 26, 2022, 7 pages.
Notice of Allowance received for U.S. Appl. No. 17/580,495, mailed on Nov. 30, 2022, 12 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Corrected Notice of Allowance received for U.S. Appl. No. 17/478,593, mailed on Dec. 21, 2022, 2 pages.
International Search Report received for PCT Patent Application No. PCT/US2021/050948, mailed on Mar. 4, 2022, 6 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Bhowmick, Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Chatterjee et al., "Gaze+Gesture: Expressive, Precise and Targeted Free-Space Interactions", ICMI '15, Nov. 9-13, 2015, 8 pages.
Lin et al., "Towards Naturally Grabbing and Moving Objects in VR", IS&T International Symposium on Electronic Imaging and The Engineering Reality of Virtual Reality, 2016, 6 pages.
Pfeuffer et al., "Gaze + Pinch Interaction in Virtual Reality", In Proceedings of SUI '17, Brighton, United Kingdom, Oct. 16-17, 2017, pp. 99-108.
AquaSnap Window Manager: dock, snap, tile, organize [online], Nurgo Software, Available online at: <https://www.nurgo-software.com/products/aquasnap>, [retrieved on Jun. 27, 2023], 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.
International Search Report received for PCT Application No. PCT/US2023/019458, mailed on Aug. 8, 2023, 7 pages.
International Search Report received for PCT Application No. PCT/US2023/060943, mailed on Jun. 6, 2023, 7 pages.
International Search Report received for PCT Patent Application No. PCT/US2021/065240, mailed on May 23, 2022, 6 pages.
International Search Report received for PCT Patent Application No. PCT/US2021/065242, mailed on Apr. 4, 2022, 3 pages.
Non-Final Office Action received for U.S. Appl. No. 17/580,495, mailed on Dec. 11, 2023, 27 pages.
Non-Final Office Action received for U.S. Appl. No. 18/182,300, mailed on Oct. 26, 2023, 29 pages.
Restriction Requirement received for U.S. Appl. No. 17/932,999, mailed on Oct. 3, 2023, 6 pages.
Brennan, Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich, Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
McGill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 18/465,098, mailed on Mar. 13, 2024, 3 pages.
European Search Report received for European Patent Application No. 21791153.6, mailed on Mar. 22, 2024, 5 pages.
Extended European Search Report received for European Patent Application No. 23197572.3, mailed on Feb. 19, 2024, 7 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 18/182,300, mailed on Feb. 16, 2024, 32 pages.
International Search Report received for PCT Patent Application No. PCT/US2021/071596, mailed on Apr. 8, 2022, 7 pages.
International Search Report received for PCT Patent Application No. PCT/US2022/071704, mailed on Aug. 26, 2022, 6 pages.
International Search Report received for PCT Patent Application No. PCT/US2023/074257, mailed on Nov. 21, 2023, 5 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.

(56) References Cited

OTHER PUBLICATIONS

Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/305,201, mailed on May 23, 2024, 11 pages.
Notice of Allowance received for U.S. Appl. No. 18/463,739, mailed on Jun. 17, 2024, 9 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/421,675, mailed on Apr. 11, 2024, 9 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Oct. 30, 2023, 11 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Notice of Allowance received for U.S. Appl. No. 18/465,098, mailed on Jun. 20, 2024, 8 pages.
Search Report received for Chinese Patent Application No. 202310873465.7, mailed on Feb. 1, 2024, 5 pages (2 pages of English Translation and 3 pages of Official Copy).

\* cited by examiner

1400

In response to detecting the first input directed to the first user interface element, and in accordance with a determination that the first input satisfies one or more criteria:  1402e In accordance with a determination that the first input corresponds to input of a first magnitude, move the first user interface element toward the second user interface element away from the viewpoint of the user in accordance with the first input without moving the second user interface element or the third user interface in the three-dimensional environment  1402f In accordance with a determination that the first input corresponds to input of a second magnitude, greater than the first magnitude, move the first user interface element toward the second user interface element, and the second user interface element toward the third user interface element, away from the viewpoint of the user in accordance with the first input, without moving the third user interface in the three-dimensional environment  1402g In accordance with a determination that the first input corresponds to input of a second magnitude, greater than the first magnitude, move the first user interface element toward the second user interface element, and the second user interface element toward the third user interface element, away from the viewpoint of the user in accordance with the first input, without moving the third user interface element in the three-dimensional environment  1402h

METHODS FOR INTERACTING WITH VIRTUAL CONTROLS AND/OR AN AFFORDANCE FOR MOVING VIRTUAL OBJECTS IN VIRTUAL ENVIRONMENTS

CROSS-REFERENCE TO RELATED APPLICATIONS

This application claims the benefit of U.S. Provisional Application No. 63/083,802, filed Sep. 25, 2020 and U.S. Provisional Application No. 63,261,555, filed Sep. 23, 2021, the contents of which are incorporated herein by reference in their entirety for all purposes.

TECHNICAL FIELD

This relates generally to computer systems with a display generation component and one or more input devices that present graphical user interfaces, including but not limited to electronic devices that present three-dimensional environments, via the display generation component, that include virtual objects.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for navigating and interacting with user interfaces. Such methods and interfaces may complement or replace conventional methods for interacting with objects in a three-dimensional environment. Such methods and interfaces reduce the number, extent, and/or the nature of the inputs from a user and produce a more efficient human-machine interface.

In some embodiments, an electronic device enhances interactions with selectable user interface elements. In some embodiments, an electronic device enhances interactions with slider user interface elements. In some embodiments, an electronic device moves virtual objects in a three-dimensional environment and facilitates accessing actions associated with virtual objects.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 14A-14L is a flowchart illustrating a method of enhancing interactions with selectable user interface elements in accordance with some embodiments.

DESCRIPTION OF EMBODIMENTS

Figure 1:
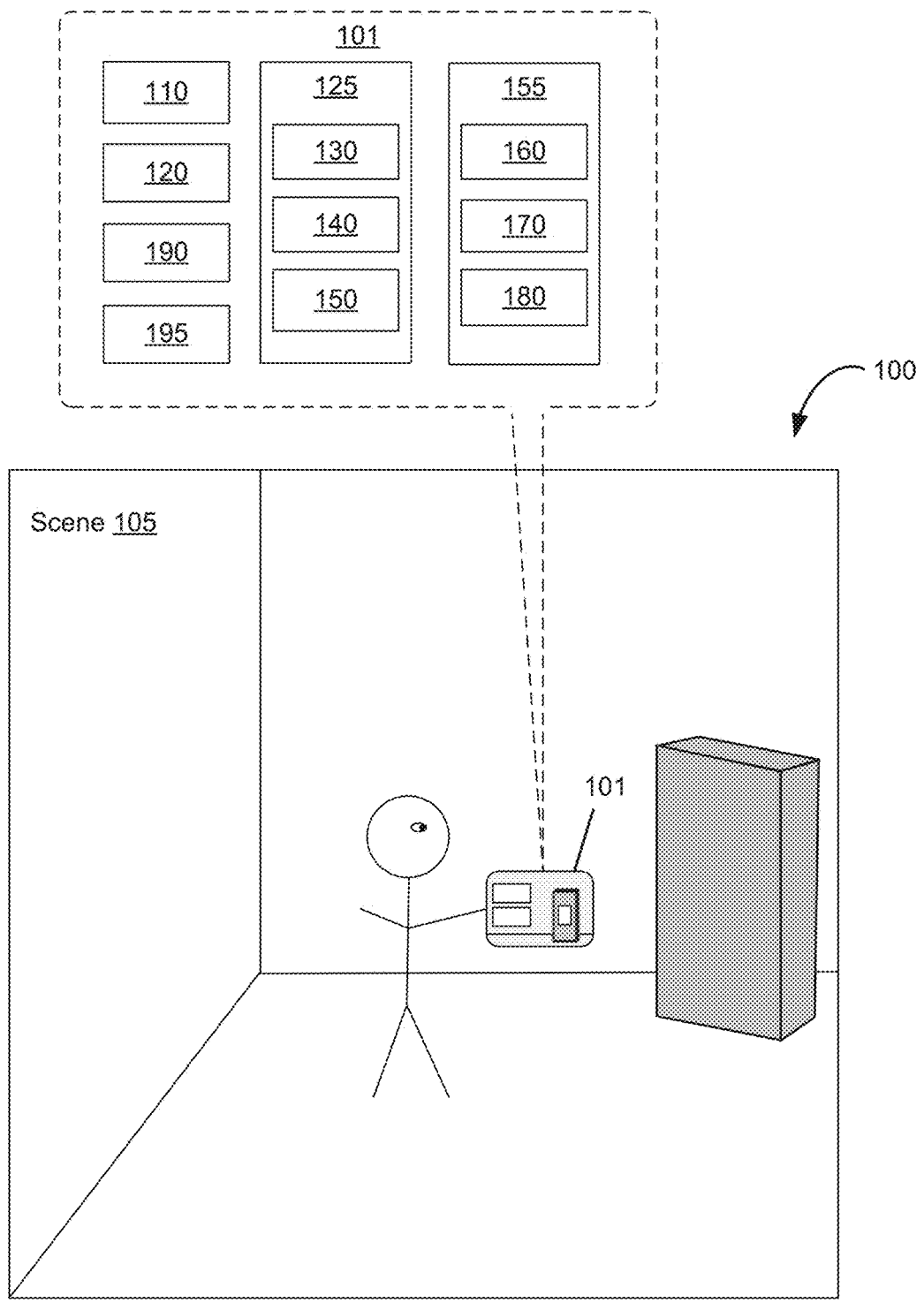
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein provide improved ways for an electronic device to interact with and manipulate objects in a three-dimensional environment. The three-dimensional environment optionally includes one or more virtual objects, one or more representations of real objects (e.g., displayed as photorealistic (e.g., "pass-through") representations of the real objects or visible to the user through a transparent portion of the display generation component) that are in the physical environment of the electronic device, and/or representations of users in the three-dimensional environment.

In some embodiments, an electronic device facilitates interactions with selectable user interface elements. In some embodiments, an electronic device presents one or more selectable user interface elements in a three-dimensional environment. In response to detecting the gaze of the user directed to a respective selectable user interface element, the electronic device updates the appearance of the selectable user interface element, such as increasing z-separation of the selectable user interface element from another portion of the user interface, in some embodiments. In some embodiments, the electronic device selects a user interface element and performs an associated action in response to a user input that includes one or more of detecting gaze of the user and detecting the user performing a predetermined gesture with the their hand. Enhancing interactions with selectable user interface elements in this way provides efficient and intuitive ways of making selections and performing actions with an electronic device.

In some embodiments, an electronic device enhances interactions with slider user interface elements. In some embodiments, the slider user interface element includes an indication of the current input state of the slider user interface. In some embodiments, in response to detecting the gaze of the user on the slider user interface element, the electronic device updates the slider user interface element to include indications of a plurality of available input states of the slider user interface element. The electronic device optionally changes the current input state of the slider user interface element in response to inputs including detecting the gaze of the user and/or detecting the user performing a predetermined hand gesture. Enhancing interactions with a slider user interface element provides an efficient way of adjusting the input state of the slider user interface element and performing actions on the electronic device associated with the slider.

In some embodiments, an electronic device moves virtual objects in a three-dimensional environment and facilitates accessing actions associated with virtual objects. In some embodiments, the electronic device displays a user interface element associated with a virtual object in a virtual environment. In some embodiments, in response to detecting a first input directed towards the user interface element, the electronic device initiates a process for moving the associated virtual object in the virtual environment. In some embodiments, in response to detecting a second input directed towards the user interface element, the electronic device updates the user interface element to include a plurality of selectable options that, when selected, causes the electronic device to perform a respective action directed to the virtual object. Moving virtual objects and enhancing additional actions directed to virtual objects with user interface elements provides an efficient way of interacting with virtual objects.

In some embodiments, an electronic device facilitates interactions with selectable user interface elements and provides enhanced visual feedback in response to detecting at least a portion of a selection input directed to the selectable user interface elements. In some embodiments, an electronic device presents a selectable user interface element within a first container user interface element that is within a second container user interface element. In response to detecting the gaze of the user directed to the selectable user interface element, the electronic device updates the appearance of the selectable user interface element and first container user interface element, such as increasing z-separation of the selectable user interface element from the first container user interface element and increasing the z-separation of the first container user interface element from the second container user interface element, in some embodiments. In some embodiments, in response to the beginning of a selection input, the electronic device decreases visual separation between the selectable user interface element and the first container user interface element. In some embodiments, in response to a continuation of the selection input corresponding to reducing the z-height of the selectable user interface element by an amount that exceeds the visual separation between the selectable user interface element and the first container user interface element, the electronic device continues the visual feedback by decreasing the z-height of the selectable user interface element and the first container user interface element and decreasing the visual separation between the first container user interface element and the second container user interface element in accordance with continuation of the input. In some embodiments, in response to a continuation of the selection input corresponding to reducing the z-height of the selectable user interface element and the first container user interface element by more than the amount of z-separation between the first container user interface element and the second container user interface element, the electronic device decreases the z-height of the selectable user interface element, the first container user interface element, and the second container user interface element in accordance with continuation of the input. Enhancing interactions with selectable user interface elements in this way provides efficient and intuitive ways of making selections and performing actions with an electronic device.

FIGS. 1-6 provide a description of example computer systems for providing CGR experiences to users (such as described below with respect to methods 800, 1000, 1200, and 1400). In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CGR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
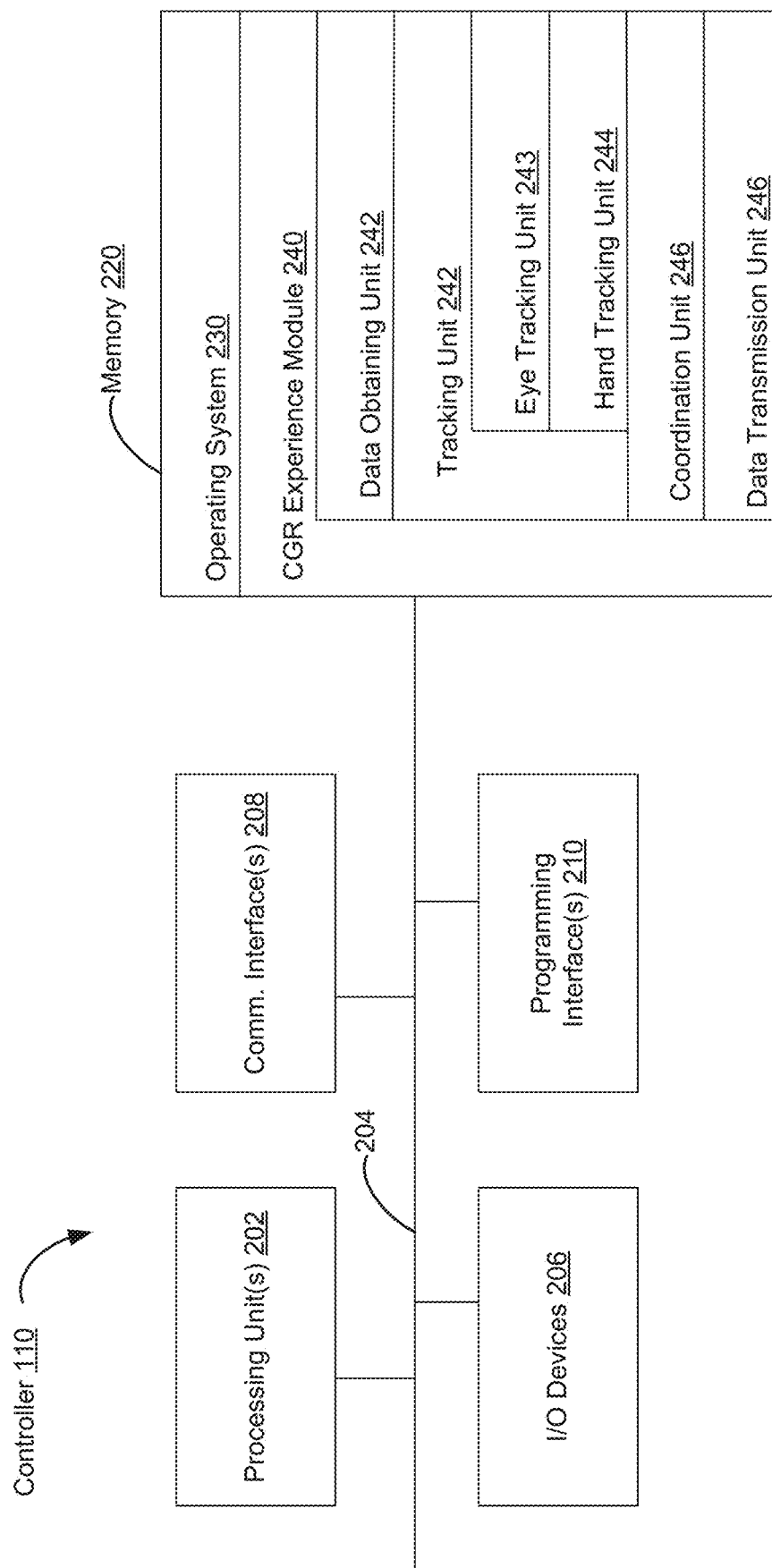
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 245 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
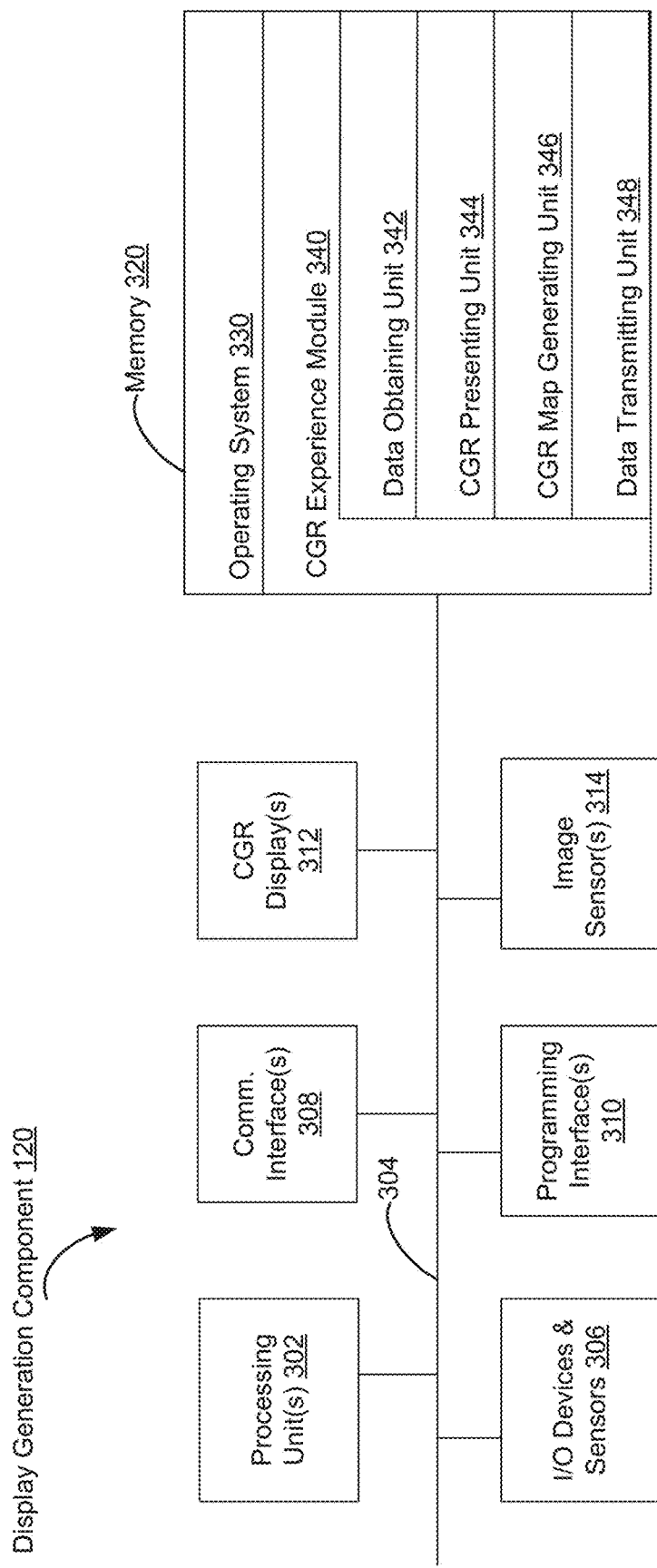
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
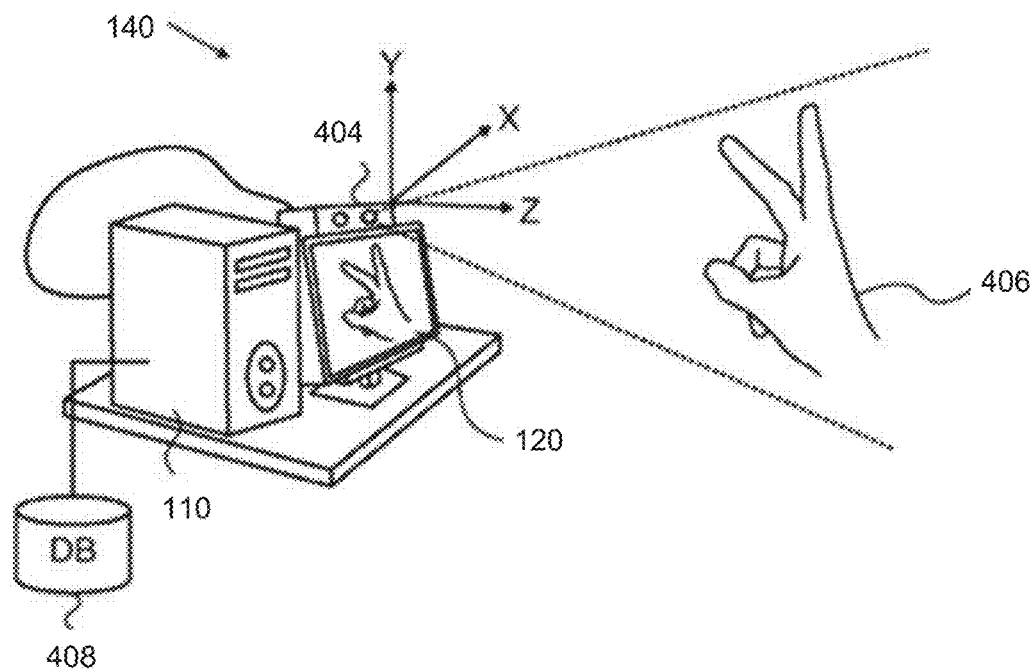
FIG. 4 is a block diagram illustrating a hand tracking unit of a computer system that is configured to capture gesture inputs of the user in accordance with some embodiments.
Figure 4:
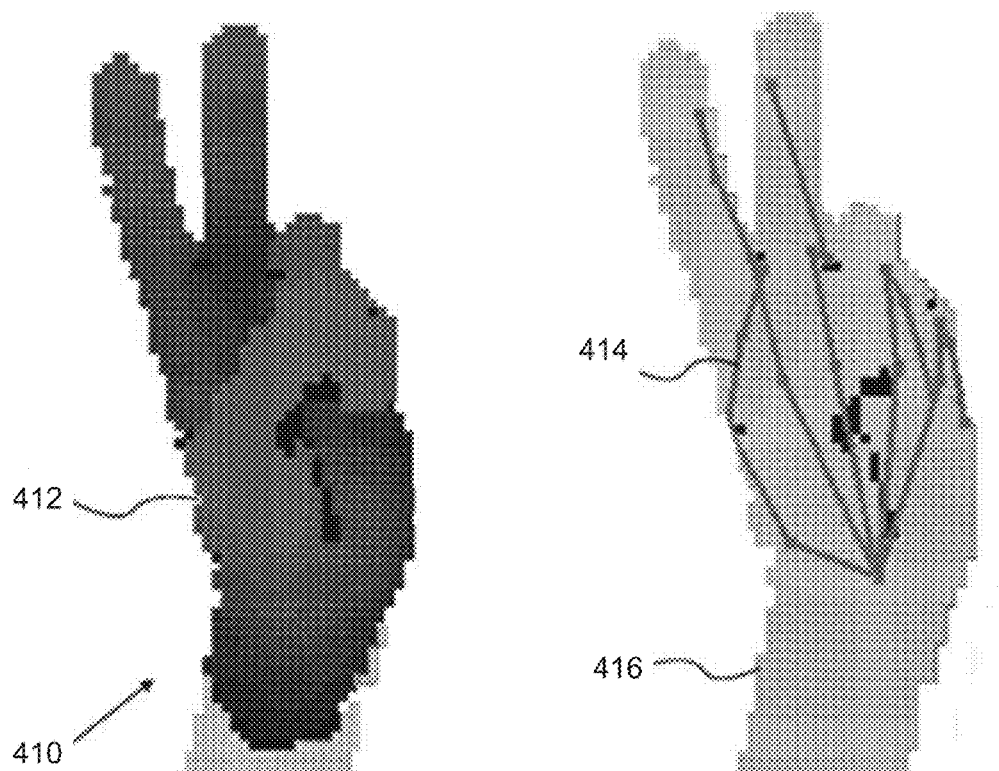

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
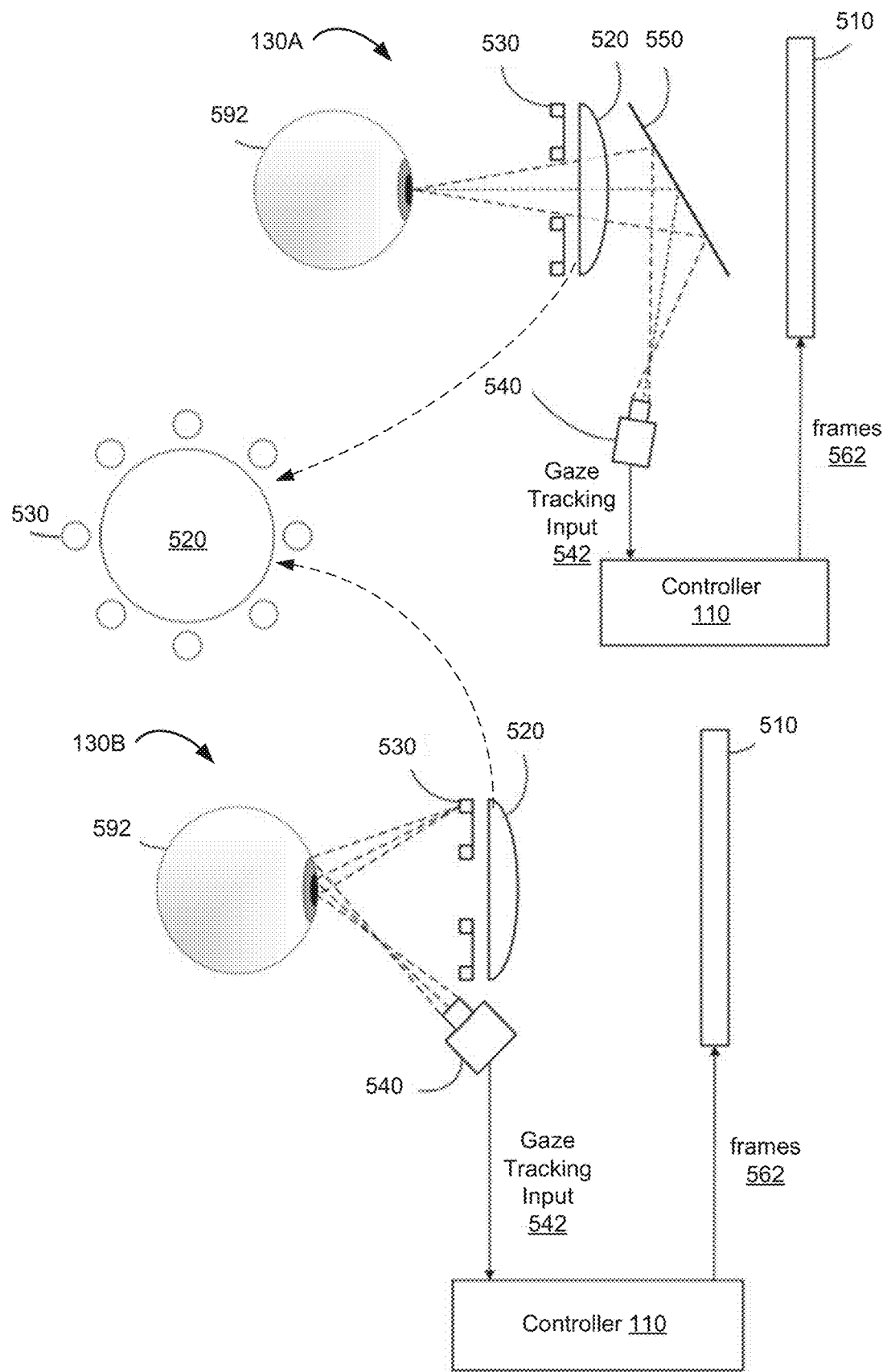
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
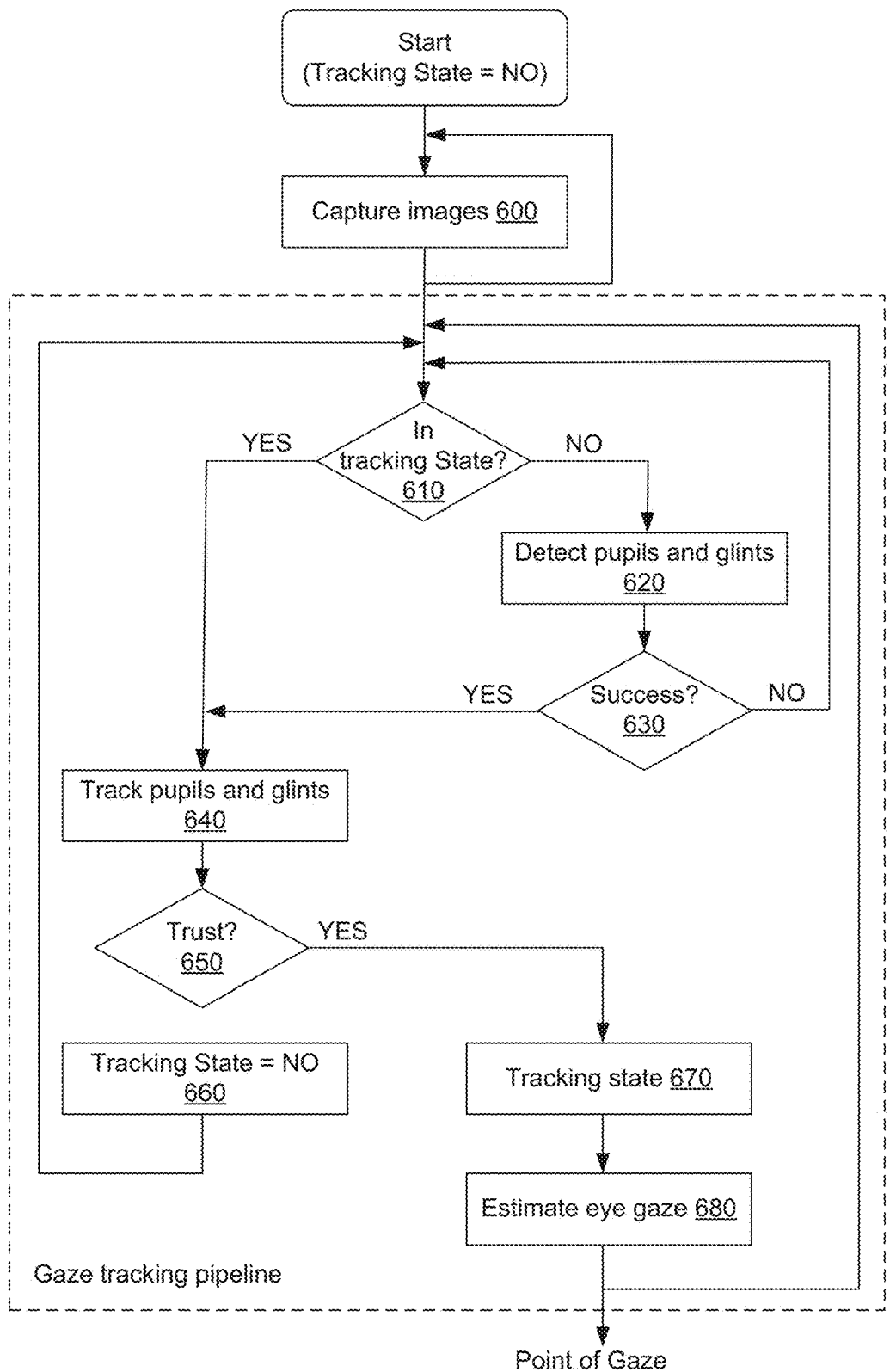
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

Thus, the description herein describes some embodiments of three-dimensional environments (e.g., CGR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an electronic device, or passively via a transparent or translucent display of the electronic device). As described previously, the three-dimensional environment is optionally a mixed reality system in which the three-dimensional environment is based on the physical environment that is captured by one or more sensors of the device and displayed via a display generation component. As a mixed reality system, the device is optionally able to selectively display portions and/or objects of the physical environment such that the respective portions and/or objects of the physical environment appear as if they exist in the three-dimensional environment displayed by the electronic device. Similarly, the device is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the device optionally displays a vase such that it appears as if a real vase is placed on top of a table in the physical environment. In some embodiments, each location in the three-dimensional environment has a corresponding location in the physical environment. Thus, when the device is described as displaying a virtual object at a respective location with respect to a physical object (e.g., such as a location at or near the hand of the user, or at or near a physical table), the device displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as though the virtual objects were real objects in the physical environment. For example, as described above, one or more sensors of the device optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or projection of the user interface onto a transparent/translucent surface or projection of the user interface onto the user's eye or into a field of view of the user's eye. Thus, in some embodiments, the hands of the user are displayed at a respective location in the three-dimensional environment and are treated as though they were objects in the three-dimensional environment that are able to interact with the virtual objects in the three-dimensional environment as though they were real physical objects in the physical environment. In some embodiments, a user is able to move his or her hands to cause the representations of the hands in the three-dimensional environment to move in conjunction with the movement of the user's hand.

In some of the embodiments described below, the device is optionally able to determine the "effective" distance between physical objects in the physical world and virtual objects in the three-dimensional environment, for example, for the purpose of determining whether a physical object is interacting with a virtual object (e.g., whether a hand is touching, grabbing, holding, etc. a virtual object or within a threshold distance from a virtual object). For example, the device determines the distance between the hands of the user and virtual objects when determining whether the user is interacting with virtual objects and/or how the user is interacting with virtual objects. In some embodiments, the device determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the device optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared against the position of the virtual object of interest in the three-dimensional environment to determine the distance between the one or more hands of the user and the virtual object. In some embodiments, the device optionally determines a distance between a physical object and a virtual object by comparing positions in the physical world (e.g., as opposed to comparing positions in the three-dimensional environment). For example, when determining the distance between one or more hands of the user and a virtual object, the device optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the device optionally performs any of the techniques described above to map the location of the physical object to the three-dimensional environment and/or map the location of the virtual object to the physical world.

In some embodiments, the same or similar technique is used to determine where and what the gaze of the user is directed to and/or where and at what a physical stylus held by a user is pointed. For example, if the gaze of the user is directed to a particular position in the physical environment, the device optionally determines the corresponding position in the three-dimensional environment and if a virtual object is located at that corresponding virtual position, the device optionally determines that the gaze of the user is directed to that virtual object. Similarly, the device is optionally able to determine, based on the orientation of a physical stylus, to where in the physical world the stylus is pointing. In some embodiments, based on this determination, the device determines the corresponding virtual position in the three-dimensional environment that corresponds to the location in the physical world to which the stylus is pointing, and optionally determines that the stylus is pointing at the corresponding virtual position in the three-dimensional environment.

Similarly, the embodiments described herein may refer to the location of the user (e.g., the user of the device) and/or the location of the device in the three-dimensional environment. In some embodiments, the user of the device is holding, wearing, or otherwise located at or near the electronic device. Thus, in some embodiments, the location of the device is used as a proxy for the location of the user. In some embodiments, the location of the device and/or user in the physical environment corresponds to a respective location in the three-dimensional environment. In some embodiments, the respective location is the location from which the "camera" or "view" of the three-dimensional environment extends. For example, the location of the device would be the location in the physical environment (and its corresponding location in the three-dimensional environment) from which, if a user were to stand at that location facing the respective portion of the physical environment displayed by the display generation component, the user would see the objects in the physical environment in the same position, orientation, and/or size as they are displayed by the display generation component of the device (e.g., in absolute terms and/or relative to each other). Similarly, if the virtual objects displayed in the three-dimensional environment were physical objects in the physical environment (e.g., placed at the same location in the physical environment as they are in the three-dimensional environment, and having the same size and orientation in the physical environment as in the three-dimensional environment), the location of the device and/or user is the position at which the user would see the virtual objects in the physical environment in the same position, orientation, and/or size as they are displayed by the display generation component of the device (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7D illustrate examples of how an electronic device enhances interactions with selectable user interface elements in accordance with some embodiments.

Figure 7A:
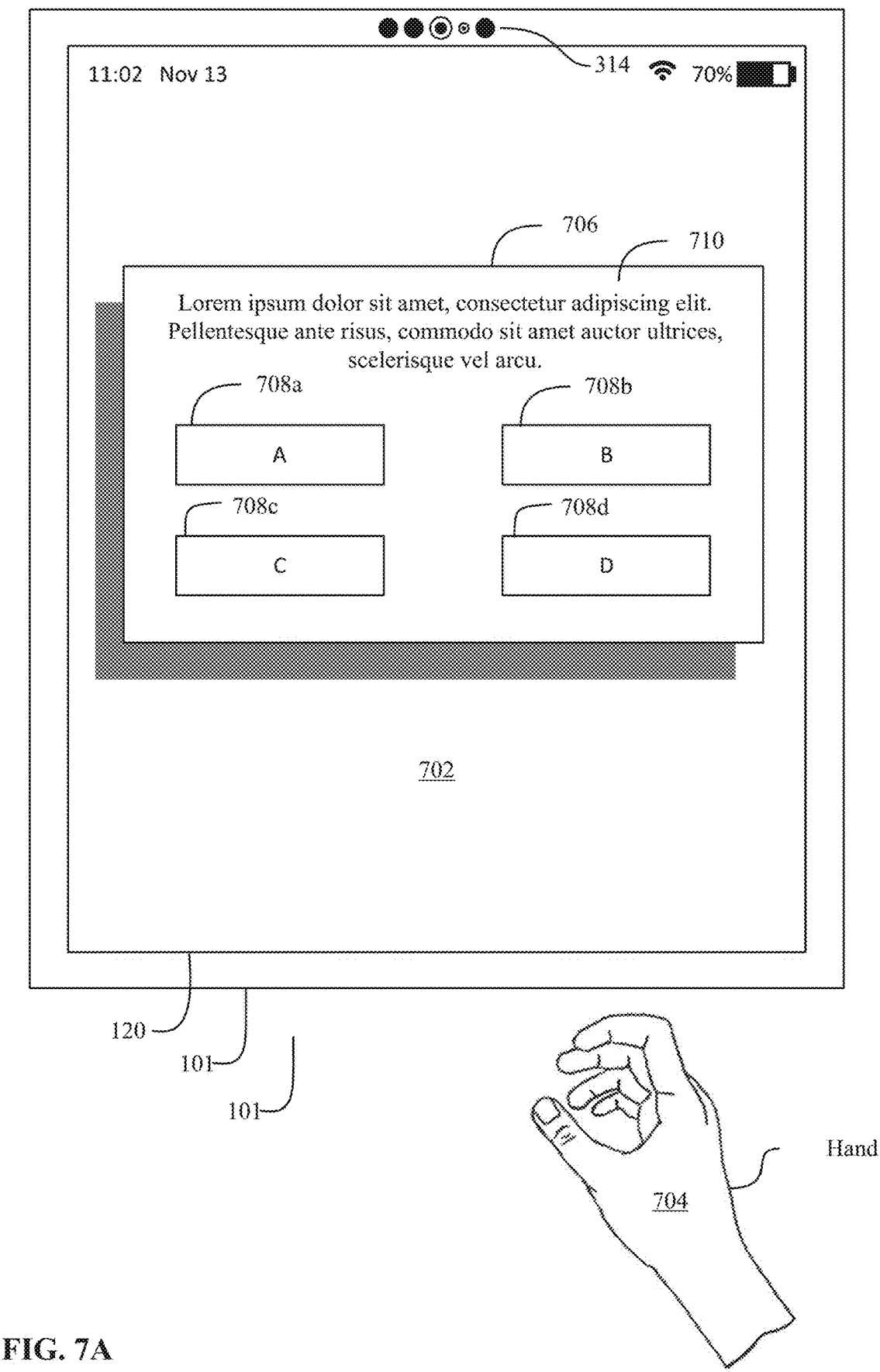
FIGS. 7A-7D illustrate examples of how an electronic device enhances interactions with selectable user interface elements in accordance with some embodiments.

FIG. 7A illustrates an electronic device 101 displaying, via a display generation component 120, a three-dimensional environment 702 on a user interface. It should be understood that, in some embodiments, electronic device 101 utilizes one or more techniques described with reference to FIGS. 7A-7D in a two-dimensional environment without departing from the scope of the disclosure. As described above with reference to FIGS. 1-6, the electronic device 101 optionally includes a display generation component 120 (e.g., a touch screen) and a plurality of image sensors 314. The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

As shown in FIG. 7A, the three-dimensional environment 702 includes a dialog box 706 including text 710 and a plurality of selectable options 708a-d. In some embodiments, the electronic device 101 presents a three-dimensional environment 702 from a viewpoint of the user of electronic device 101 in the three-dimensional environment 702. Thus, in some embodiments, the electronic device 101 displays one or more objects in the three-dimensional environment 702 at various distances from the viewpoint of the user (e.g., various z-heights) in the three-dimensional environment 702. For example, dialog box 706 is displayed with a shadow that indicates the z-height of the dialog box relative to a frame of reference in the three-dimensional environment 706 (e.g., the physical environment of device 101). As another example, in FIG. 7A, options 708a-708d are displayed without shadows, indicating that options 708a-708d are displayed at the same z-height as the rest of dialog box 706 in the three-dimensional environment 702.

In some embodiments, in response to detecting selection of one of the plurality of selectable options 708a-d, the electronic device 101 performs an action associated with the selected option. In some embodiments, the selectable options 708a-d are related to the text 710 included in dialog box 706. For example, text 710 describes a feature or setting with a plurality of available configurations and selectable options 708a-d are selectable to configure the electronic device 101 according to a respective configuration of the feature or setting described by text 710.

In some embodiments, as will be described below with reference to FIGS. 7B-7D, the electronic device 101 detects selection of options 708a-d in response to user inputs including detection of the user's gaze and detection of a position of and/or gesture performed with the hand 704 of the user. For example, the electronic device 101 selects an option 708a-d in response to detecting the gaze of the user directed to a respective option for a predetermined period of time (e.g., 0.2, 0.5, 1, 2, etc. seconds) without detecting an additional input; in response to detecting the user "push" the respective option by moving their hand with one or more fingers extended (e.g., in a pointing gesture) to a location corresponding to the three-dimensional environment 702 corresponding to touching an option and pushing it away from the user by a predetermined amount; and/or in response to detecting the user perform a predetermined gesture with their hand 704 (e.g., touching a thumb to another finger (e.g., index, middle, ring, little finger) on the same hand as the thumb (e.g., a pinch gesture)) while looking at the respective option. In some embodiments, the electronic device 101 modifies the appearance of a respective option while selection is being detected. Modifying the appearance of the respective option while selection is being detected provides feedback to the user that the selection is being detected and allows the user to correct a selection error before the selection is made.

FIG. 7A illustrates the dialog box 706 while the electronic device 101 does not detect input directed towards any of selectable options 708a-d. As described above, inputs directed towards the selectable options 708a-d optionally include detecting the gaze of the user directed to one of the selectable options 708a-d and/or detecting the hand 704 of the user with a respective gesture and/or position directed towards one of the options 708a-d. In FIG. 7A, the gaze of the user (not shown) is not directed to one of the selectable options 708a-d. The hand 704 of the user in FIG. 7A is optionally not performing one of the predetermined gestures (e.g., a pointing gesture or a pinch gesture) and/or is not in a position that corresponds to the location of one of the selectable options 708a-d in the three-dimensional environment 702.

Figure 7B:
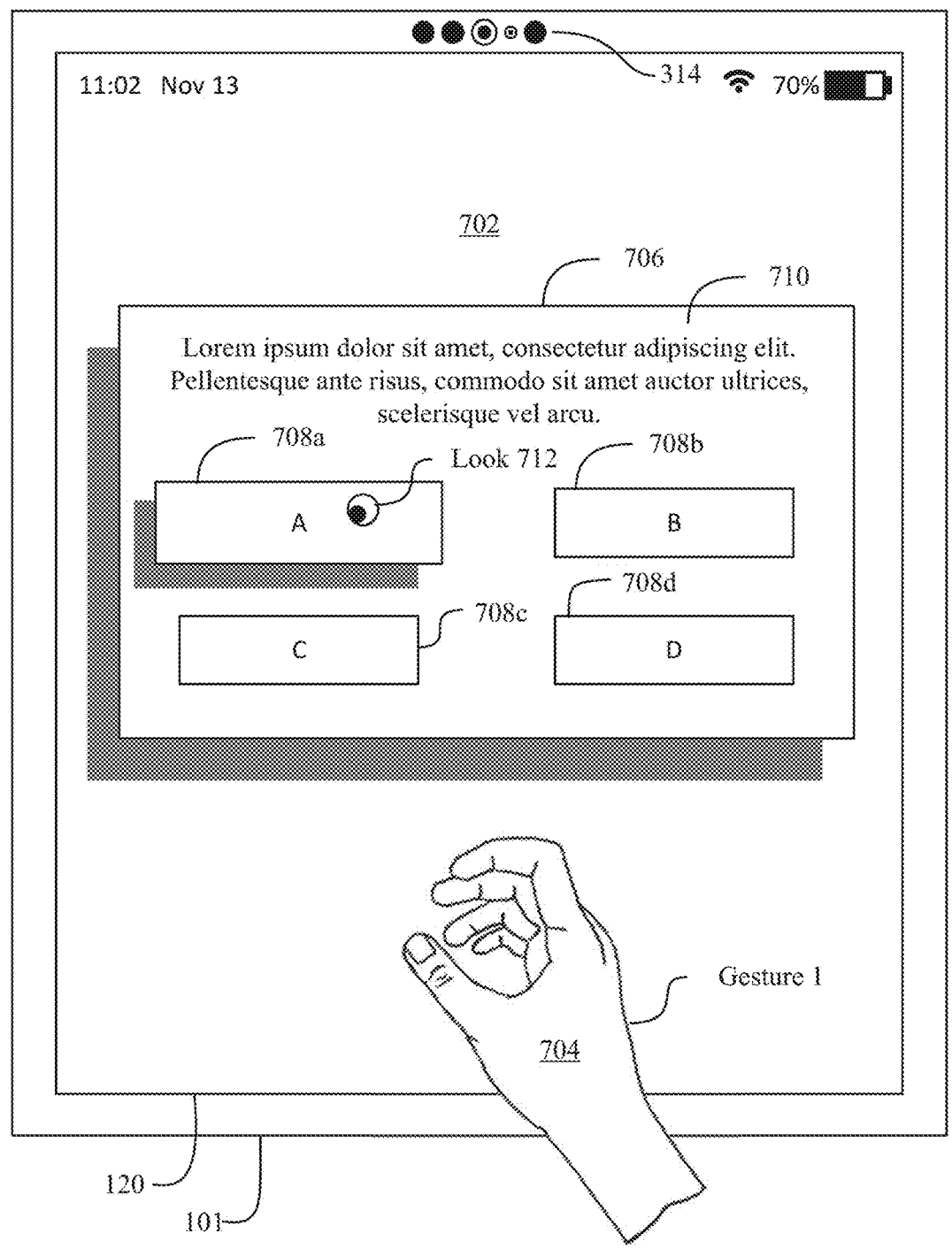

In FIG. 7B, the electronic device 101 detects the beginning of an input directed towards option A 708a. For example, the electronic device 101 detects the gaze 712 of the user directed towards option A 708a for a predetermined time threshold (e.g., 0.1, 0.2, 0.5, 1, etc. seconds) without detecting an additional input (e.g., an input that includes detecting the user's hand 704). As another example, the electronic device 101 detects the hand 704 of the user extended towards the location of option A 708a in the three-dimensional environment 702 with one or more (or all) fingers extended. In some embodiments, the hand 704 of the user makes the pointing gesture (e.g., one or more, but not all fingers extended). In some embodiments, the hand 704 of the user does not make the pointing gesture (e.g., all of the fingers of hand 704 are extended). In some embodiments, the location of the hand is within a threshold distance (e.g., 1, 2, 10, 20, 30, etc. centimeters) from the location corresponding to the option 708a in the three-dimensional environment 702. In some embodiments, the hand makes the beginning of a pinch gesture, such as the thumb and another finger being within a threshold distance (e.g., 0.5, 1, 2, etc. centimeters) of each other. The electronic device 101 optionally concurrently detects the gaze 712 of the user on option A 708a and the gesture and/or position of hand 704 described above.

In response to detecting the gaze 712 and/or gesture and/or position of hand 704, the electronic device 101 gradually increases the z-separation between option A 708a and the rest of dialog box 706 while the gaze and/or hand gesture and/or position is detected. In some embodiments, the electronic device 101 moves option 708a towards the user in the three-dimensional environment 702 and/or moves the rest of dialog box 706 away from the user in the three-dimensional environment 702. In some embodiments, the three-dimensional environment 702 includes hierarchical levels for a plurality of possible z-heights from the viewpoint of the user in the three-dimensional environment 702. For example, in FIG. 7B, option A 708a is presented in a first hierarchical level and the rest of dialog box 706 is presented in a second (e.g., lower) hierarchical level. In some embodiments, the three-dimensional environment 702 includes additional objects at additional hierarchal levels at additional z-heights from the user in the three-dimensional environment 702.

Figure 7C:
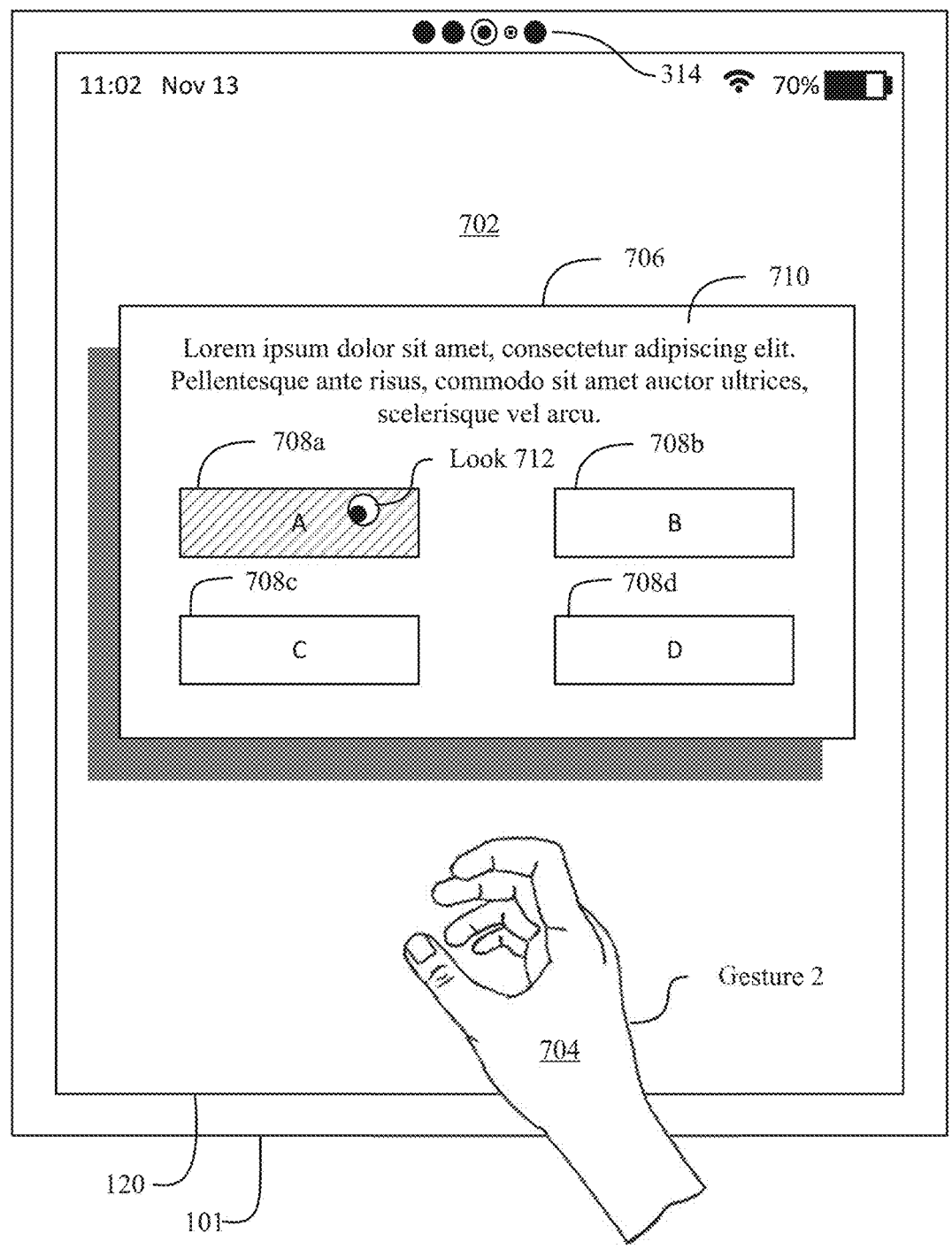

FIG. 7C illustrates the electronic device 101 detecting selection of option A 708a. In some embodiments, in response to detecting selection of option A 708a while displaying the three-dimensional environment 702 illustrated in FIG. 7B, the electronic device 101 decreases the z-separation between option A 708a and the rest of dialog box 706. In some embodiments, once the z-height of option A 708a reaches the z-height of the rest of dialog box 706, the electronic device 101 selects option A 708a and updates the color of option A 708a.

In some embodiments, selection of option A 708a is detected by detecting the gaze 712 of the user on option A 708a for a second threshold time (e.g., 0.2, 0.5, 1, 2, etc. seconds) that is longer than the duration of the gaze 712 of the user in FIG. 7B without detecting additional inputs (e.g., via the hand 704 of the user). In some embodiments, while detecting the gaze 712 on option A 708a for longer than the amount of time corresponding to FIG. 7B, the electronic device 101 gradually decreases the z-separation between option A 708a and the rest of dialog box 706. In some embodiments, once the gaze 712 has been detected on option A 708a for the second threshold time and the electronic device 101 displays option A 708a at the same z-height as the dialog box 706, the electronic device 101 updates the color of option A 708a and performs the operation in accordance with option A 708a.

In some embodiments, selection of option A 708a is detected in response to detecting the user perform the pinch gesture with their hand 704 while the gaze 712 of the user is directed towards option A 708a. In some embodiments, in response to detecting the user perform the pinch gesture with their hand 704 while detecting the gaze 712 on option A 708a, the electronic device 101 gradually decreases the z-separation between option A 708a and the rest of dialog box 706 at a speed faster than the speed at which the electronic device 101 decreases the z-separation between option A 708a and the rest of dialog box 706 in response to a gaze-only input. In some embodiments, once option A 708a reaches the same z-height as the rest of dialog box 706 (e.g., in response to the pinch gesture being maintained for a threshold (e.g., 0.1, 0.2, 0.5, etc. seconds) time), the electronic device 101 updates the color 708a of option A 708a. In some embodiments, the electronic device 101 performs the action associated with option A 708a in response to detecting an end of the pinch gesture (e.g., the user moving their thumb away from the other finger) while displaying the three-dimensional environment 702 as shown in FIG. 7C.

In some embodiments, selection of option A 708a is detected in response to detecting the user "pushing" option A 708a by making the pointing gesture with their hand 704 and moving their hand 704 from a location corresponding to the location of option A 708a in the three-dimensional environment 702 illustrated in FIG. 7B in a direction that corresponds to being towards the rest of dialog box 706. In some embodiments, the electronic device 101 gradually decreases the z-separation between option A 708a and the rest of dialog box 706 at a predetermined speed while the gaze 712 of the user is directed towards option A 708a without the pinch gesture (or the pointing gesture) being detected. In some embodiments, once the user beings to "push" option A 708a towards the rest of dialog box 706 as just described, the electronic device 101 updates z-height of option A 708a in accordance with movement of the user's hand 704 towards the rest of dialog box 706. For example, the speed and distance by which the electronic device 101 updates the z-position of option A 708a corresponds to the speed and distance of movement of the user's hand 704 towards the rest of dialog box 706. In some embodiments, in response to the movement of the user's hand 704 while maintaining the pointing gesture corresponding to the electronic device 101 displaying option A 708a at the same z-height as the rest of dialog box 706, the electronic device updates the color 708a of option A 708a. In some embodiments, the electronic device 101 performs the action associated with option A 708a in response to detecting an end of the user "pushing" option A 708a after having "pushed" option A 708a to the same z-height as the rest of dialog box 706 (e.g., the user ceases performing the pointing gesture, the user moves the hand 704 away from the location corresponding to option A 708a).

In some embodiments, the electronic device 101 begins to decrease the z-separation of option A 708a illustrated in FIG. 7B but does not select option A 708a as described above in response to an input that begins to satisfy selection criteria but ultimately does not meet the selection criteria. For example, the electronic device 101 detects the gaze 712 of the user for a duration that is greater than the duration corresponding to display of the three-dimensional environment 702 as shown in FIG. 7B but is less than the duration corresponding to display of the three-dimensional environment 702 as shown in FIG. 7C. As another example, the electronic device 101 detects the user performing the pinch gesture with their hand 704 while the gaze 712 of the user is directed towards option 708*a* for an amount of time that is less than a predetermined threshold (e.g., 0.1, 0.2, 0.5, 1, etc. seconds). As another example, the user "pushes" option A 708*a* from the z-height illustrated in FIG. 7B by a distance that is less than the z-separation between option A 708*a* in FIG. 7B. In some embodiments, in response to detecting an input that corresponds to beginning to select option A 708*a* without making the selection of option A 708*a*, the electronic device 101 animates the separation between option A 708*a* and the rest of dialog box 706 increasing to the separation illustrated in FIG. 7B with inertia. For example, the electronic device 101 illustrates deceleration of the z-separation between option A 708*a* and the rest of dialog box 706 followed by increasing the z-separation between option A 708*a* and the rest of dialog box 706.

Figure 7D:
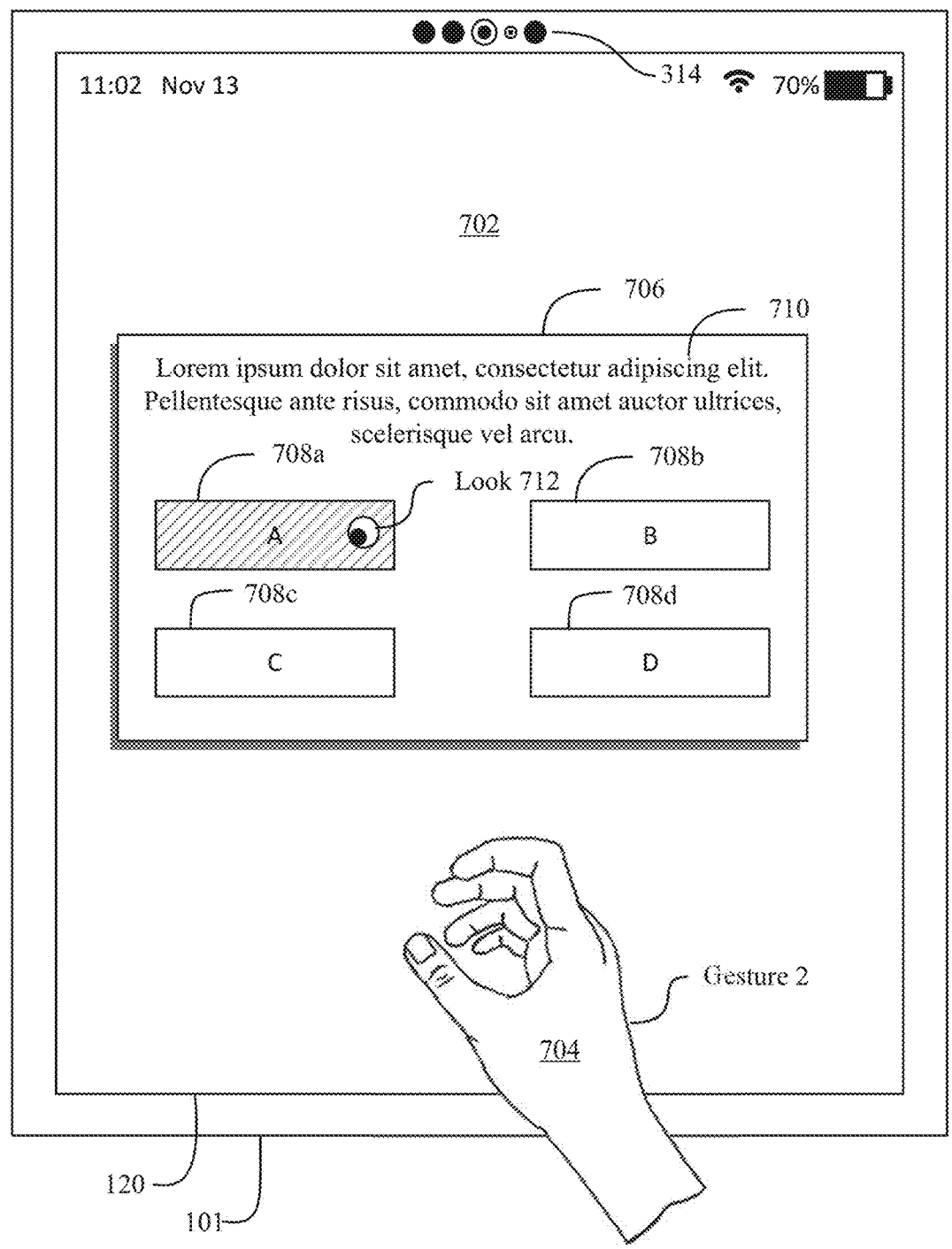
Figure 8A:
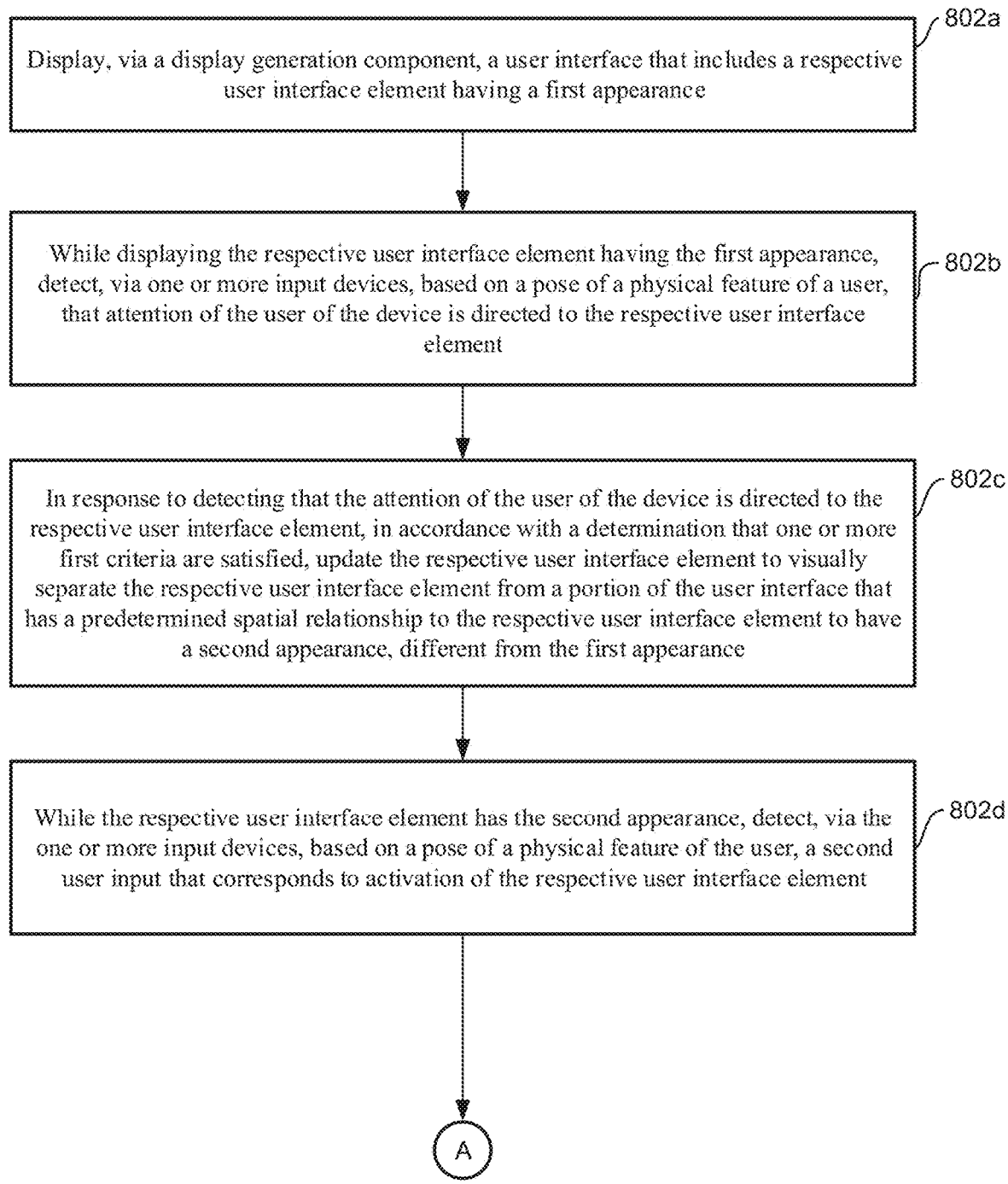
FIGS. 8A-8M is a flowchart illustrating a method of enhancing interactions with selectable user interface elements in accordance with some embodiments.
Figure 8B:
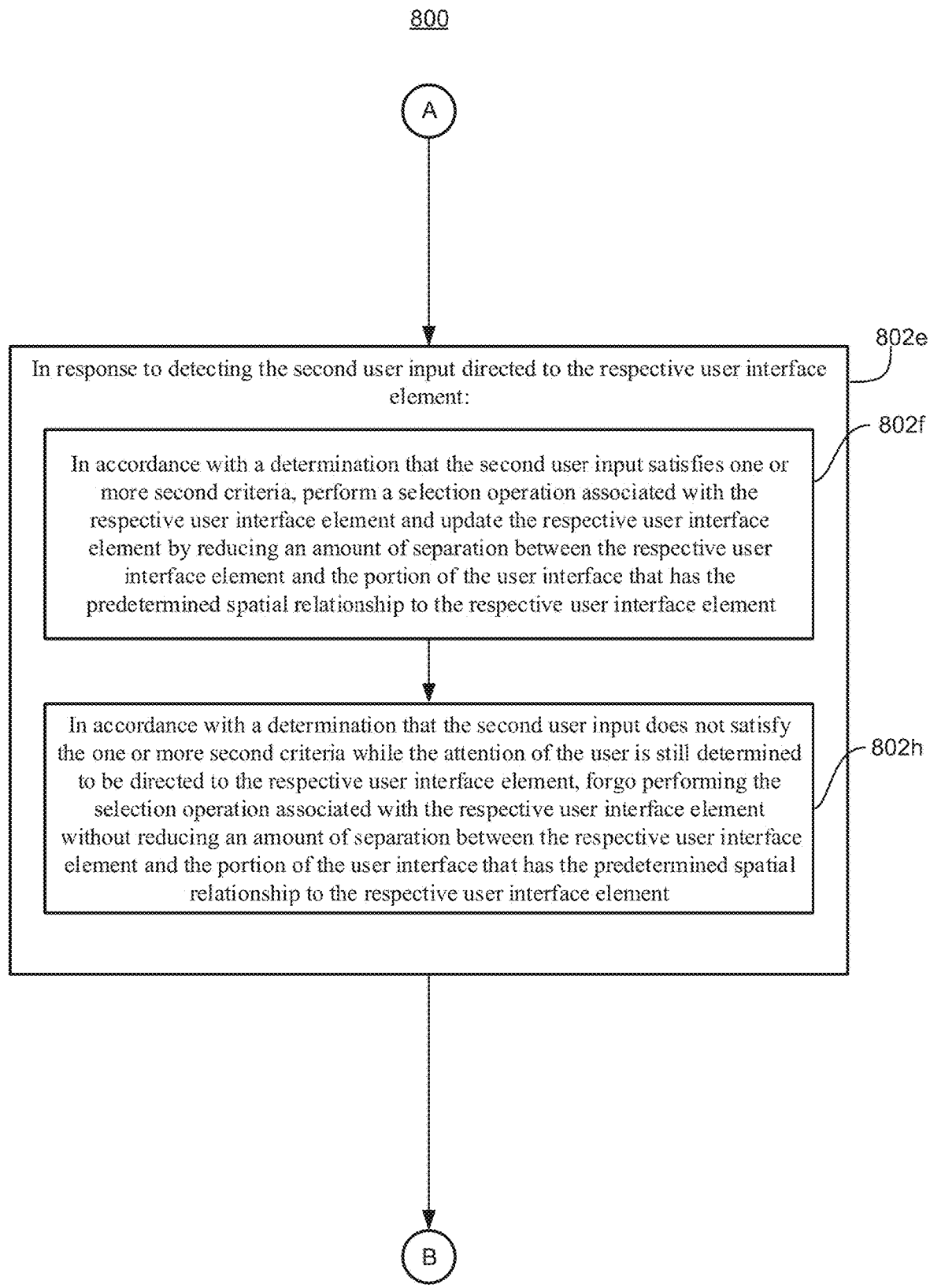
Figure 8C:
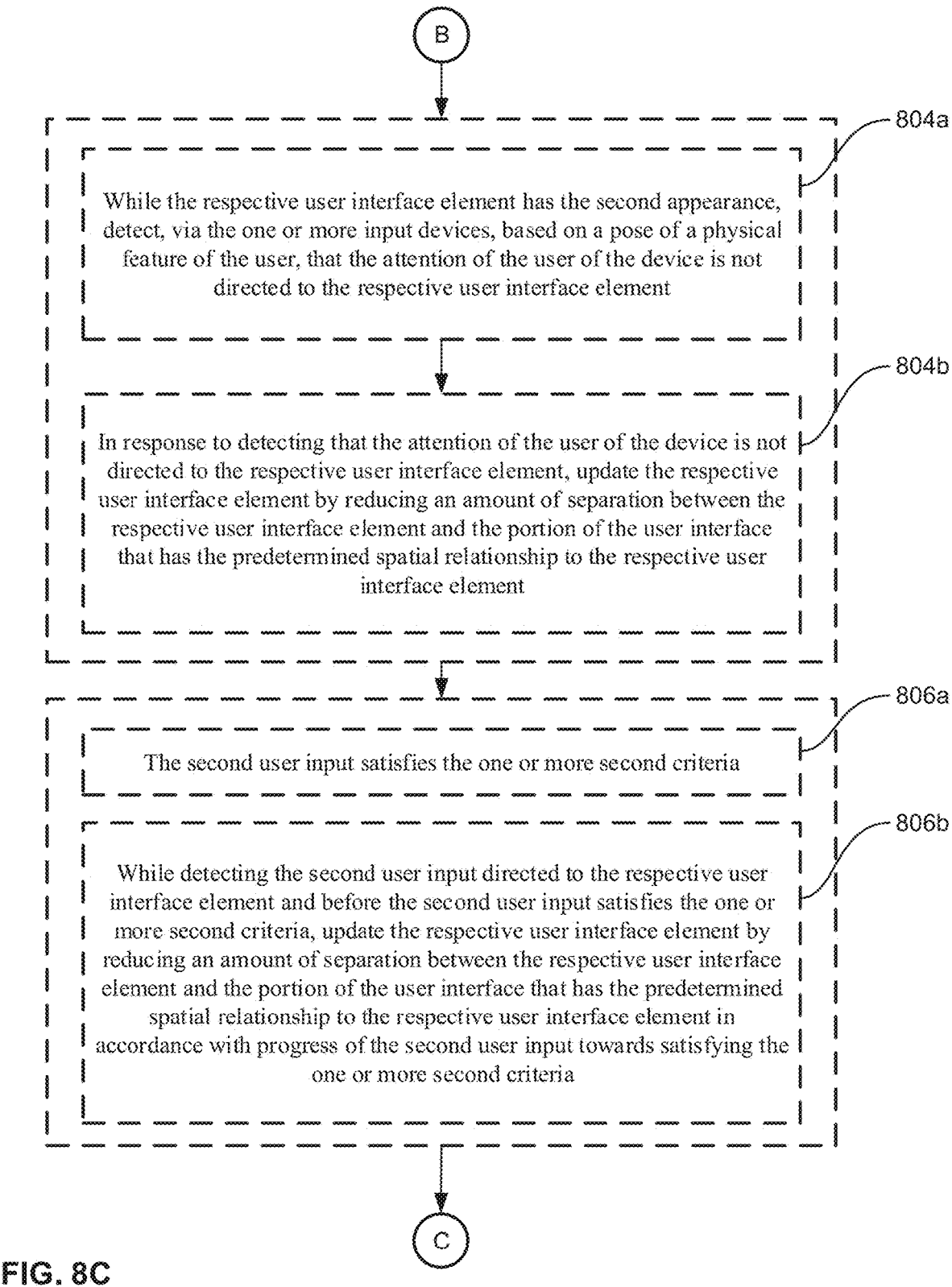
Figure 8D:
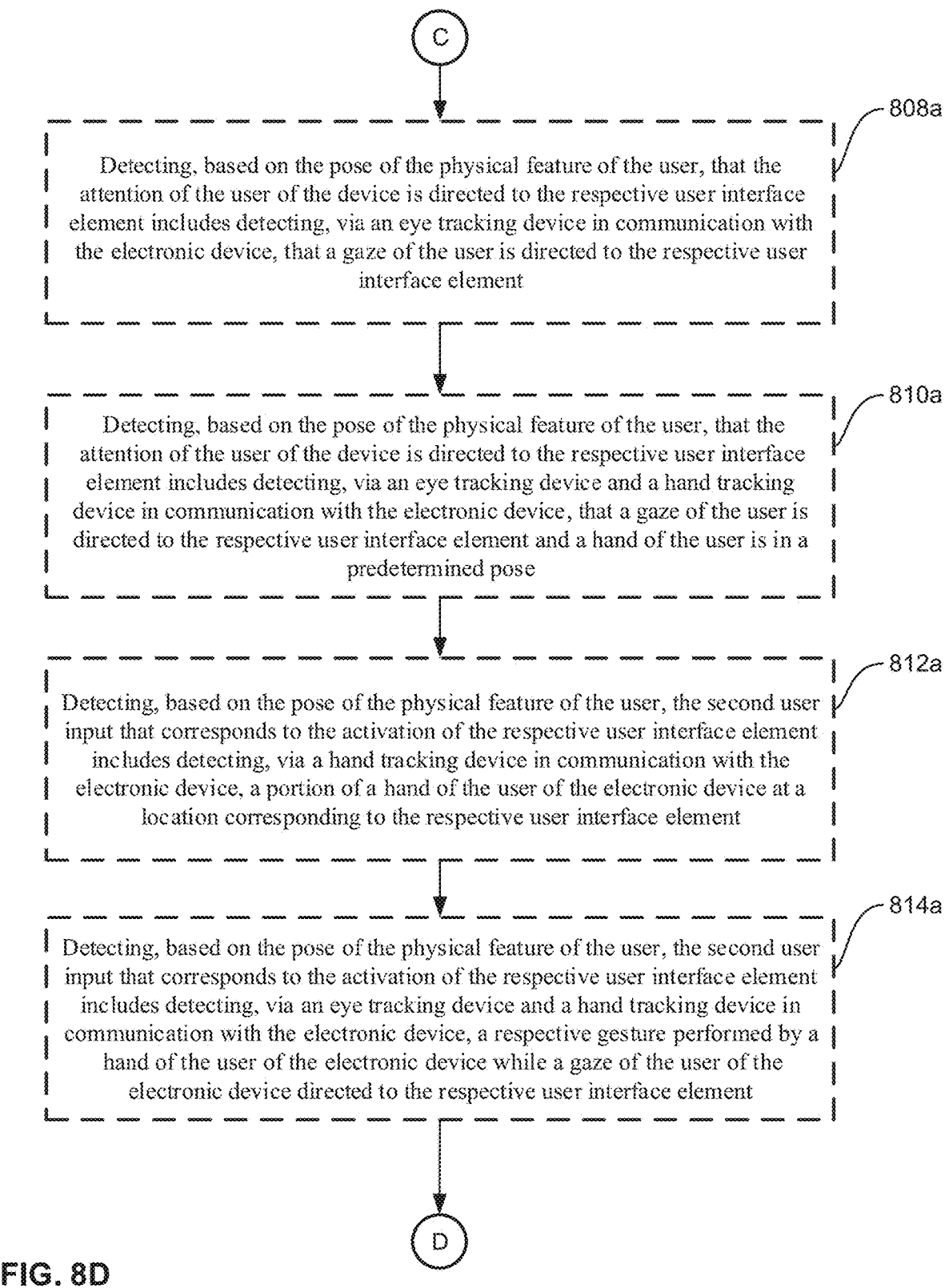
Figure 8E:
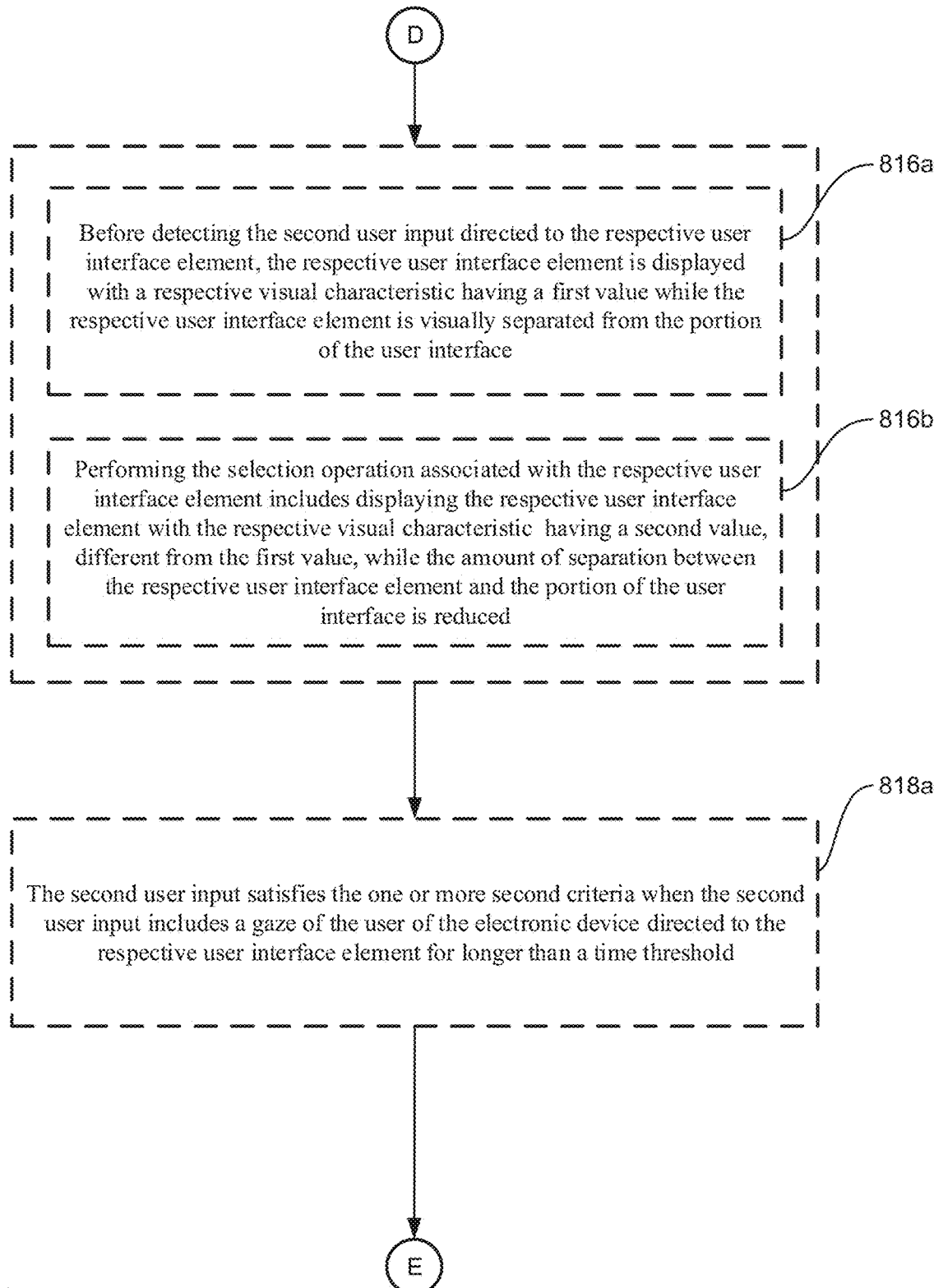
Figure 8F:
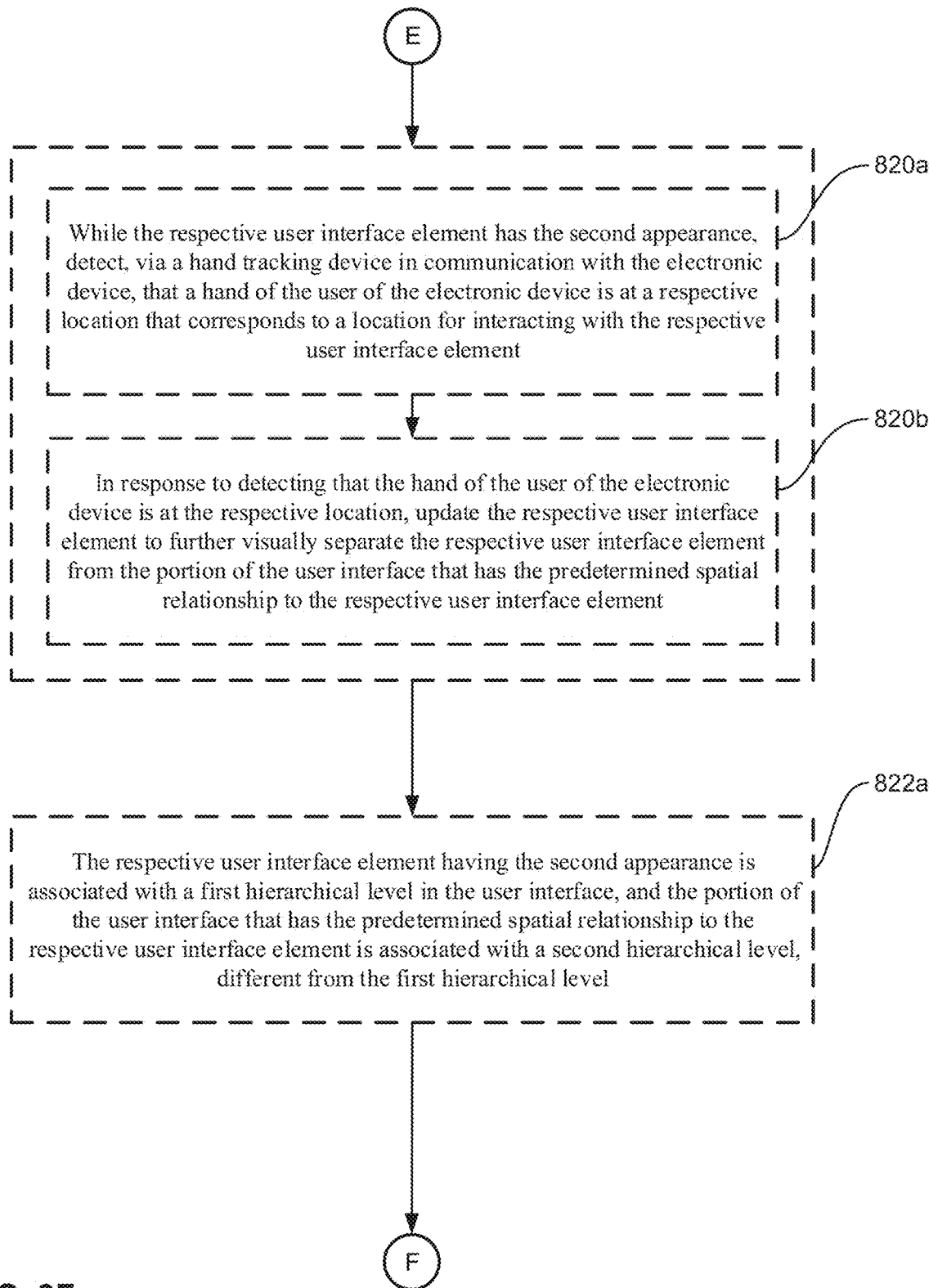
Figure 8G:
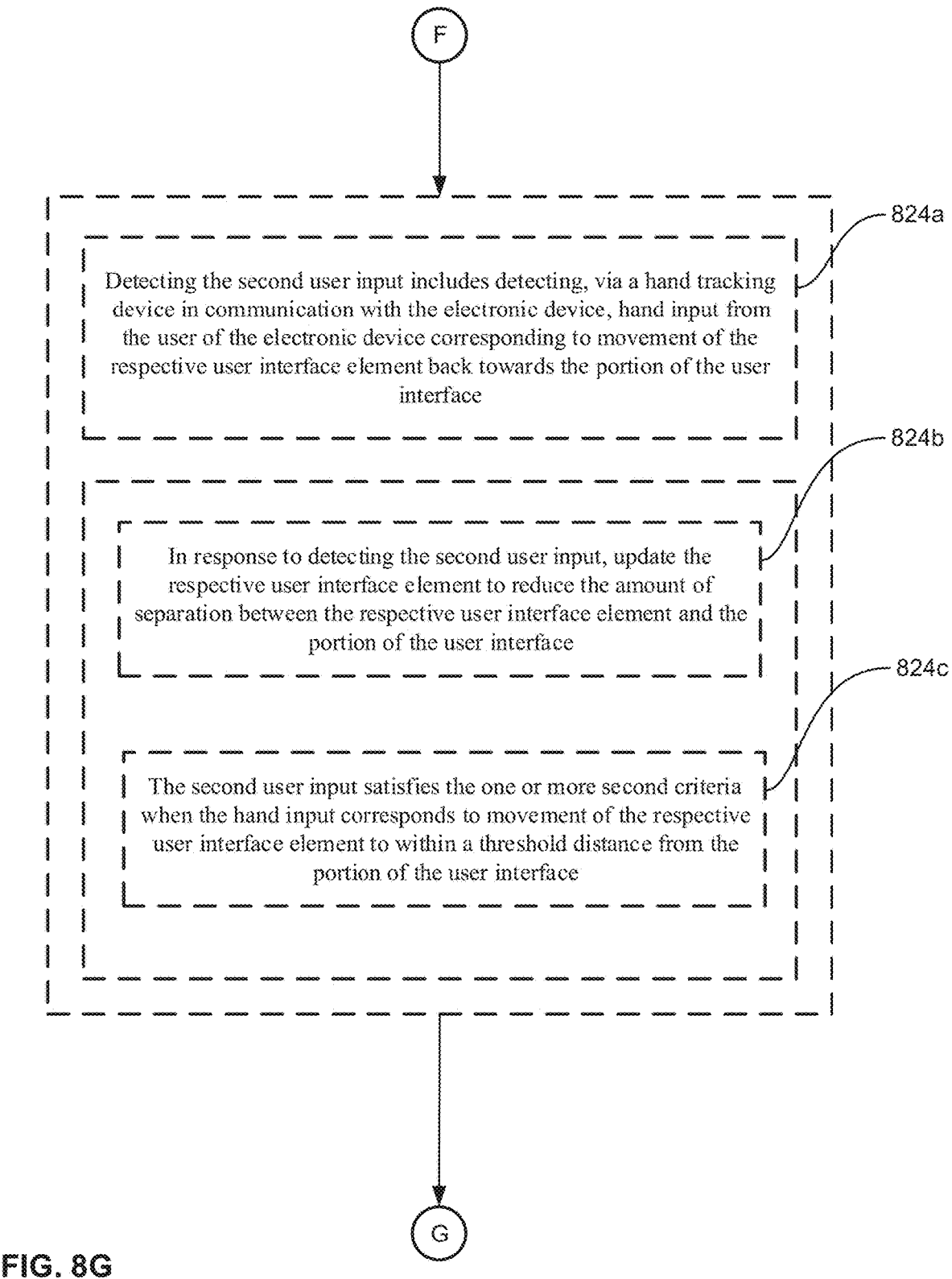
Figure 8H:
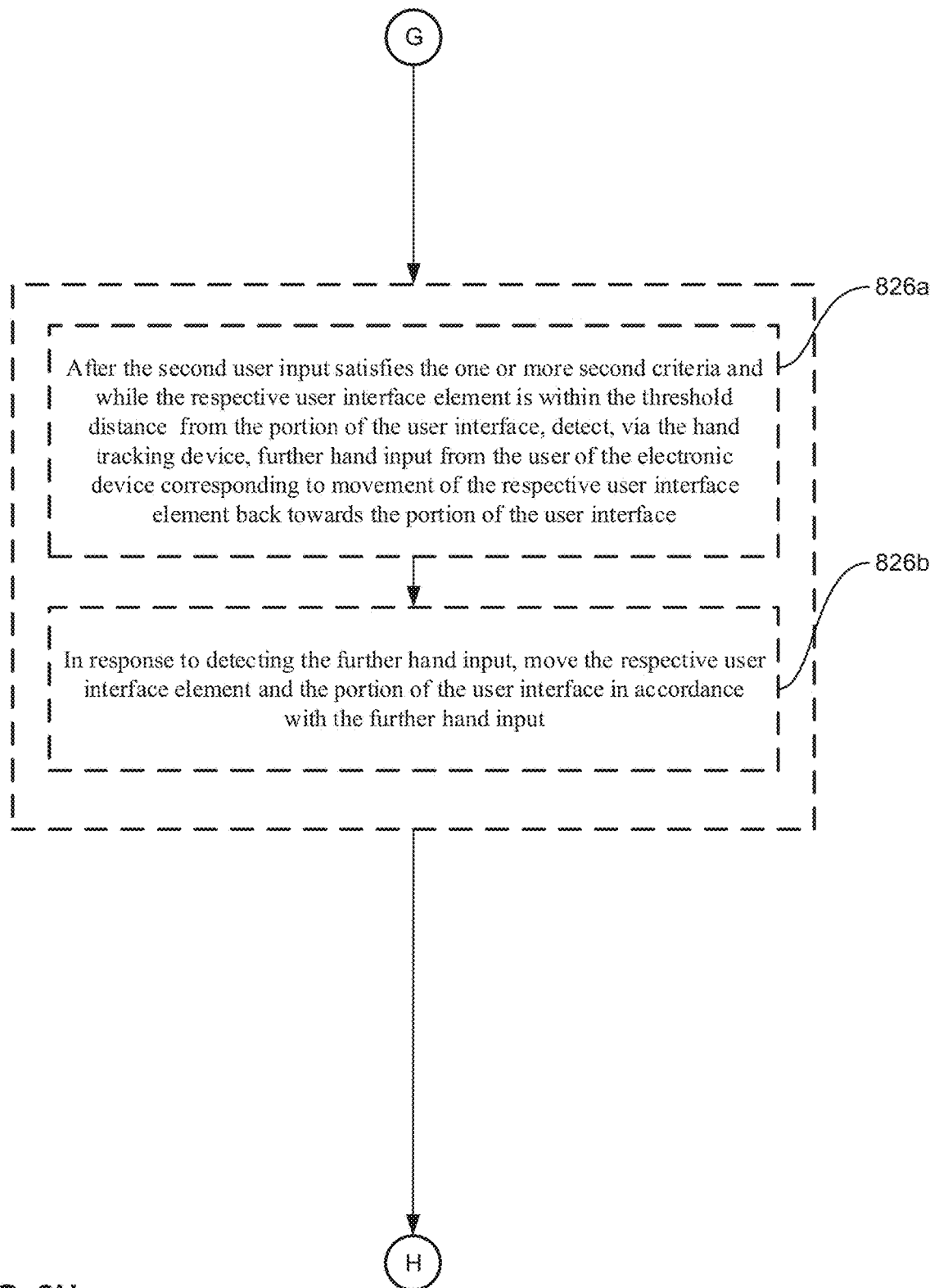
Figure 8I:
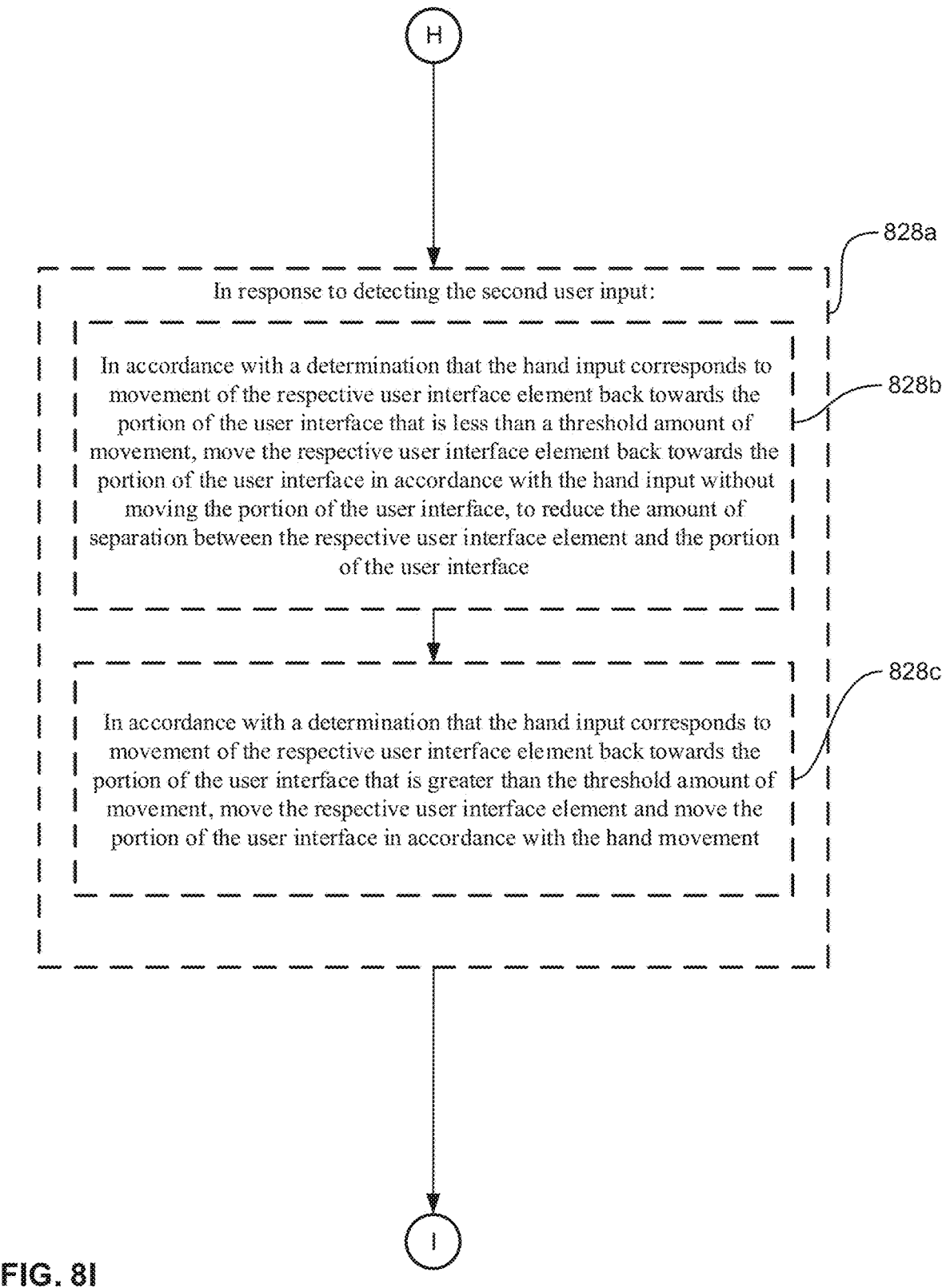
Figure 8J:
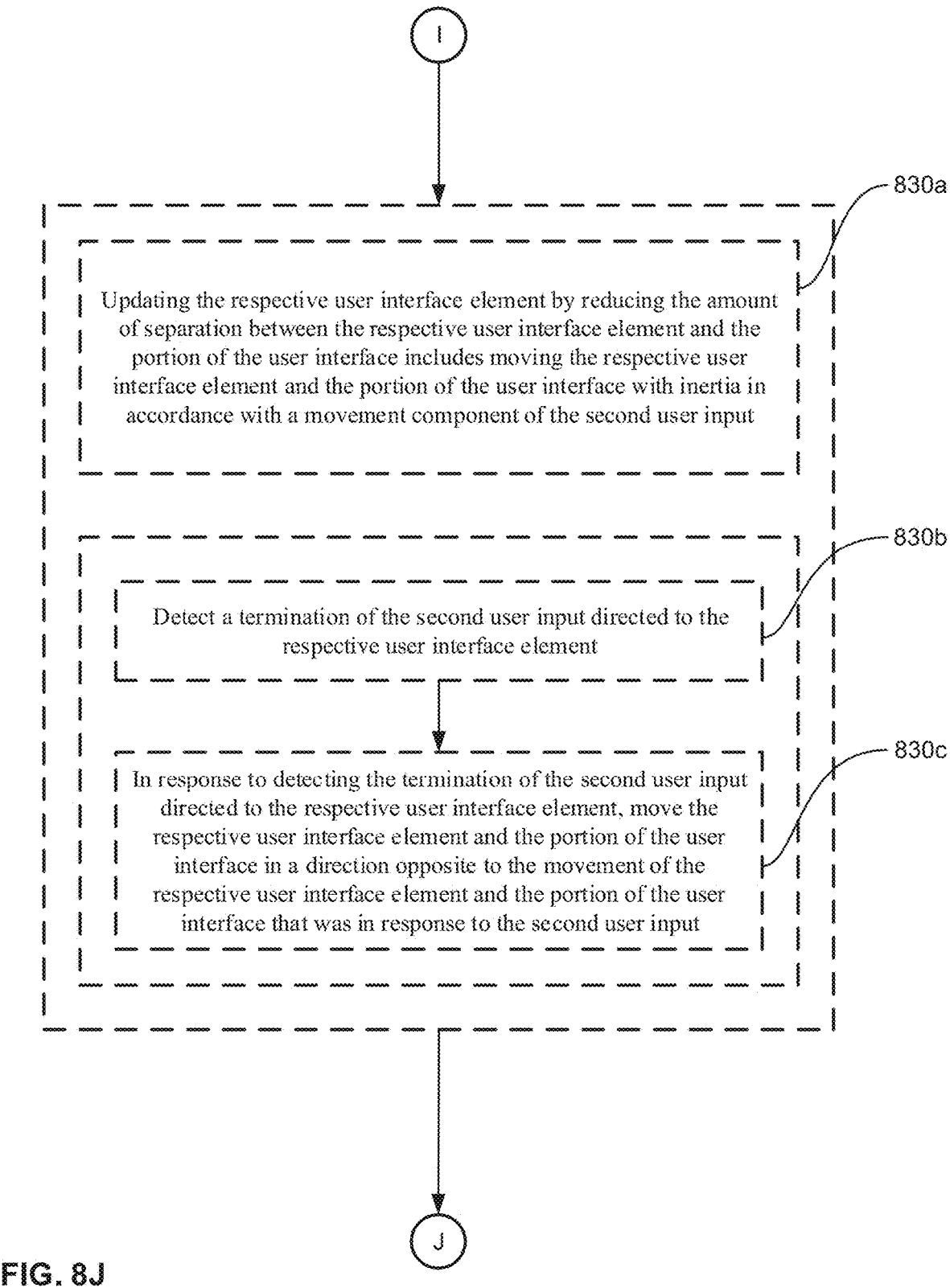
Figure 8K:
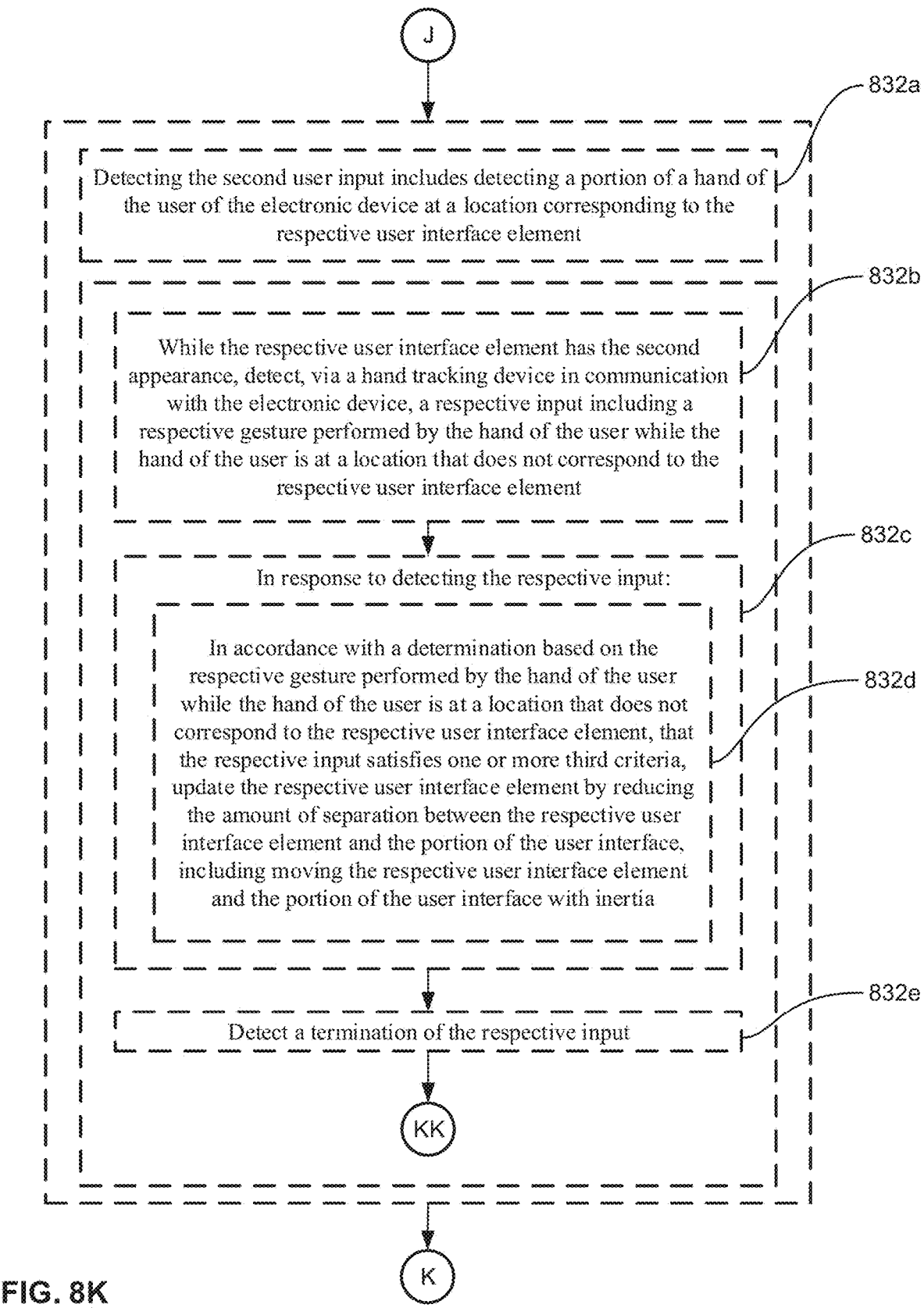
Figure 8L:
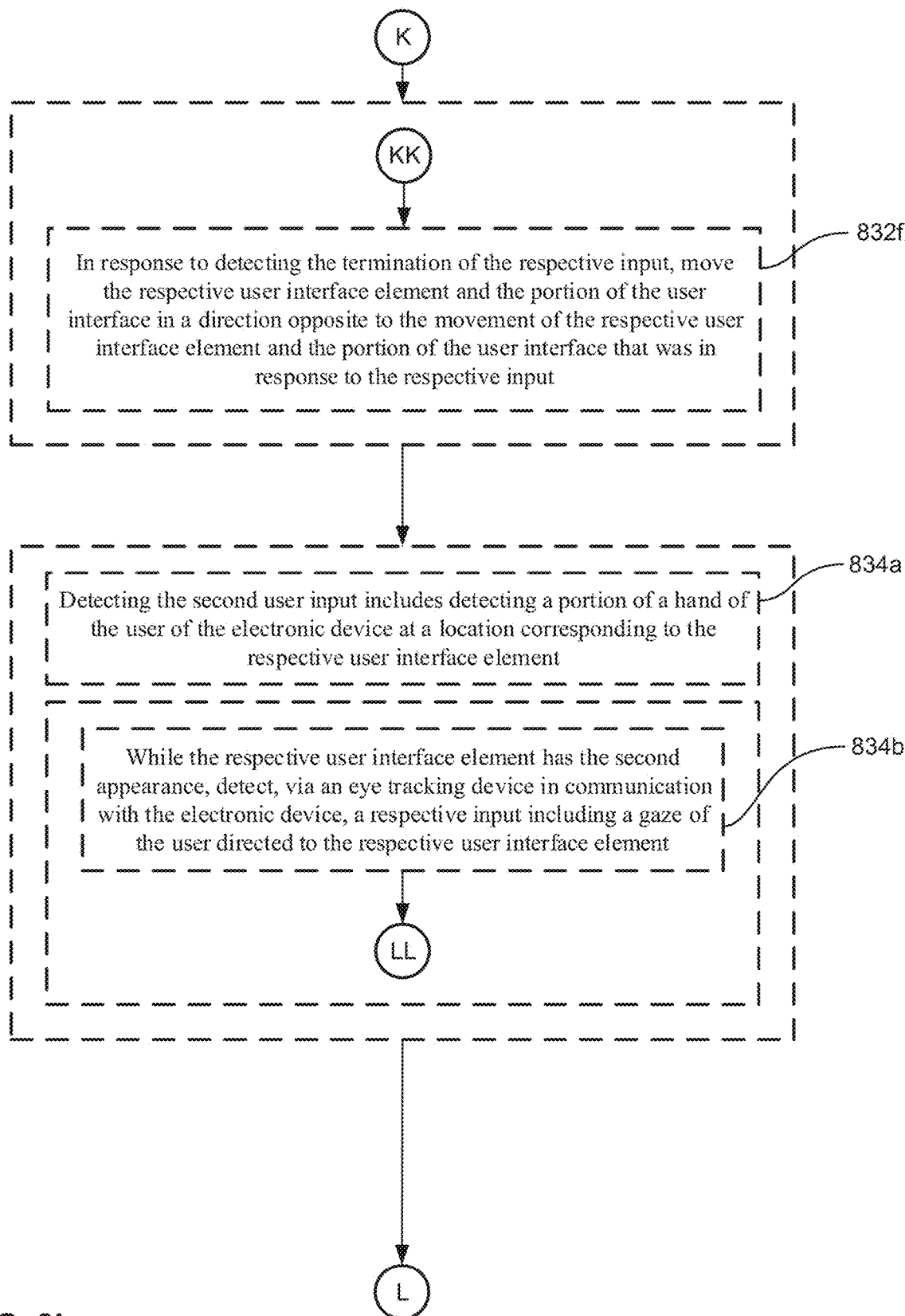
Figure 8M:
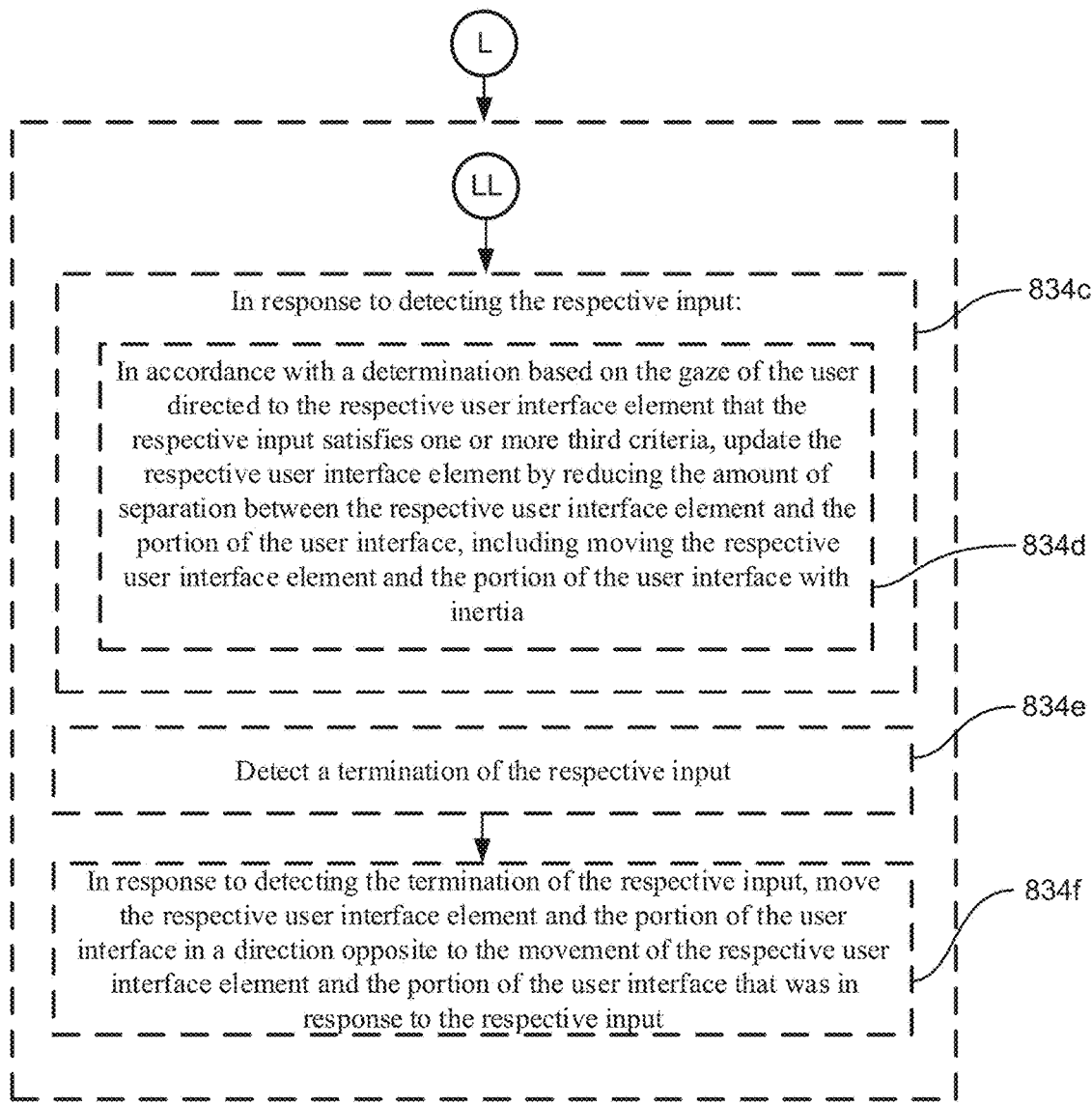

In some embodiments, in response to detecting a selection input that continues after satisfying the selection criteria while displaying the three-dimensional environment 702 as shown in FIG. 7C, the electronic device 101 gradually moves dialog box 706, including text 710 and options 708*a-d*, away from the user in the three-dimensional environment 702 while maintaining the updated color of option A 708*a*, as shown in FIG. 7D. For example, the electronic device 101 detects the user maintaining the pinching gesture while the gaze 712 of the user is directed to option A 708*a* for longer than the threshold amount of time (e.g., 0.1, 0.2, 0.5, 1, etc. seconds) corresponding to selection of option A 708*a*. In some embodiments, in response to detecting the user maintaining the pinch gesture past selection of option 708*a*, the electronic device 101 gradually moves the dialog box 706 away from the user at a predetermined rate (e.g., as time continues to elapse).

As another example, the electronic device 101 detects the user "pushing" option A 708*a* past the z-height of dialog box 706 illustrated in FIG. 7C by moving hand 704 to a location that corresponds to a z-height behind dialog box 706 in FIG. 7C. In some embodiments, in response to detecting the user "pushing" option A 708*a* past the z-height of dialog box 706 in FIG. 7C, the electronic device 101 continues to move dialog box 706 in accordance with the speed and distance of movement of the hand 704 of user in the three-dimensional environment 702, as shown in FIG. 7D.

In some embodiments, in response to detecting the end of an input that pushes dialog box 706 away from the user in the three-dimensional environment 702, the electronic device 101 performs the action corresponding to option A 708*a* and moves dialog box 706 back to the position in the three-dimensional environment 702 illustrated in FIG. 7A (e.g., the original position of dialog box 706 in three-dimensional environment 702). In some embodiments, the dialog box 706 moves from the position in FIG. 7D to the position in 7A with inertia in a manner similar to the manner in which option A 708*a* moves with inertia described above with reference to FIG. 7B.

In some embodiments, the electronic device 101 displays an additional user interface element at a z-height behind dialog box 706. For example, dialog box 706 is displayed in a user interface displayed behind dialog box 706 in the three-dimensional environment 702. In response to an input (e.g., a pinch gesture or push gesture) that pushes the dialog box 706 past the user interface object behind it, the electronic device 101 optionally pushes each of the object behind dialog box 706, dialog box 706, and option 708*a* (and options 708*b-d*) back in accordance with the additional input. In some embodiments, the user interface behind dialog box 706 is the three-dimensional environment 702 itself, and device 101 moves the three-dimensional environment 702 away from the viewpoint of the user as if the user were moving in the direction opposite to the direction of the pushing in the three-dimensional environment 702.

In some embodiments, in response to detecting the end of an input that pushes an object behind dialog box 706 away from the user in the three-dimensional environment 702, the electronic device 101 performs the action corresponding to option A 708*a* and moves the object dialog box 706, including text 710 and options 708*a-d*, back to the position in the three-dimensional environment 702 before the beginning of selection of option A 708*a* was detected (e.g., the state of three-dimensional environment 702 illustrated in FIG. 7A). In some embodiments, the object behind dialog box 706 moves from the position pushed away from the user to its initial position with inertia in a manner similar to the manner in which option A 708*a* moves with inertia described above with reference to FIG. 7B.

FIGS. 8A-8M is a flowchart illustrating a method of automatically updating the orientation of a virtual object in a three-dimensional environment based on a viewpoint of a user in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, such as in FIG. 7A, method 800 is performed at an electronic device in communication with a display generation component and one or more input devices (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 7A, the electronic device (e.g., 101) displays (802a), via the display generation component, a user interface that includes a respective user interface element (e.g., 708a) having a first appearance. In some embodiments, the respective user interface element is displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.). In some embodiments, displaying the respective user interface element with the first appearance includes displaying the respective user interface element with a first size, color, and/or translucency and/or displaying the respective user interface element within a first respective virtual layer of the user interface. In some embodiments, a three-dimensional user interface includes a plurality of virtual layers that create the appearance of varying virtual distances between various user interface elements and the user. For example, displaying the respective user interface element with the first appearance includes displaying an interactable element (e.g., a selectable option such as a button, a slider indicating one of a plurality of possible slider positions optionally set by the user) within the same virtual layer as a background behind the respective user interface element with a first size and first color.

In some embodiments, such as in FIG. 7B, while displaying the respective user interface element (e.g., 708a) having the first appearance, the electronic device (e.g., 101) detects (802b), via the one or more input devices, based on a pose (e.g., position, orientation, and/or grip) of a physical feature of a user (e.g., an eye or a hand), that attention of the user of the device is directed to the respective user interface element. In some embodiments, the electronic device detects, via an eye tracking device, that the user has been looking at the respective user interface element for a predetermined threshold of time (e.g., 0.02, 0.05, 0.1, 0.2, 0.25, 0.3, 0.5, 1 second, etc.) or detects that the user is looking at the respective user interface element without a consideration of a length of time during which the user has been looking at the respective user interface element. In some embodiments, the electronic device detects, via a hand tracking device, that the user's hand is within a predetermined location for a predetermined threshold of time (e.g., 0.02, 0.05, 0.1, 0.2, 0.25, 0.3, 0.5, 1 second, etc.). For example, the predetermined location is one of a location corresponding to the virtual location of the respective user interface element, such as a location at which the user's hand appears to overlap or be within a threshold distance (e.g., 1, 3, 10 inches) of overlapping the respective user interface element in a VR environment, MR environment, or AR environment and/or a location corresponding to a physical location at which the respective user interface element is displayed by the display generation component, such as the location on a touch-sensitive display at which or above which (e.g., if the hand is hovering above the touch-sensitive display) the respective user interface element is displayed. In some embodiments, the electronic device detects movement of an input device to move the input focus of the electronic device and/or a cursor displayed in the user interface to the location of the respective user interface element within the user interface.

In some embodiments, such as in FIG. 7B, in response to detecting that the attention of the user of the device is directed to the respective user interface element (e.g., 708a), in accordance with a determination that one or more first criteria are satisfied, the electronic device (e.g., 101) updates (802c) the respective user interface element (e.g., 708a) to visually separate the respective user interface element from a portion (e.g., 706) of the user interface that has a predetermined spatial relationship to (e.g., is contained by, is near, is adjacent to, is laterally adjacent to, is horizontally adjacent to, is vertically adjacent to) the respective user interface element (e.g., 708a) to have a second appearance, different from the first appearance. In some embodiments, visually separating the respective user interface element from the portion of the user interface includes increasing the z-separation between the respective user interface element and the portion of the user interface, such as by displaying the respective user interface element to appear closer to the location of the user in the three-dimensional environment and/or displaying the portion of the user interface to appear further from the location of the user in the three-dimensional environment. In some embodiments, updating the respective user interface element to have the second appearance different from the first appearance includes updating the size, color, position, and/or translucency with which the respective user interface element is displayed and/or updating the virtual layer of the user interface in which the respective user interface element is displayed. For example, in response to the first user input, the electronic device updates the respective user interface element from being displayed with a first color in the same layer of the user interface as the background behind the user interface element to displaying the respective user interface element with a second color within a virtual layer of the user interface that is on top (e.g., in front of) of the virtual layer of the user interface in which the background behind the user interface is displayed. In this example, in response to the first input, the electronic device changes the color of the respective user interface element and reduces the virtual distance between the respective user interface element and the user, such that the respective user interface element (e.g., button) pops forward out of the backplane on which the respective user interface element is displayed.

In some embodiments, such as in FIG. 7B, while the respective user interface element (e.g., 708a) has the second appearance, the electronic device (e.g., 101) detects (802d), via the one or more input devices, based on a pose (e.g., position, orientation, and/or grip) of a physical feature of the user (e.g., an eye or a hand), a second user input that corresponds to activation of the respective user interface element (e.g., 708a). In some embodiments, the electronic device detects the pose via the eye tracking device, the hand tracking device, a touch-sensitive surface (e.g., touch screen or trackpad), keyboard, or mouse. For example, in response to detecting, via the eye tracking device, that the user is looking at the respective user interface element, the electronic device updates the position of the user interface element to move from a first layer to a second that appears closer to the user. In this example, in response to detecting, via the hand tracking device, that the user taps their thumb and a finger (e.g., index, middle, ring, or little finger) on the same hand together, the electronic device updates the respective user interface element from being displayed in the second layer to being displayed at a layer that appears further from the user than the second layer (e.g., the first layer, a layer between the first and second layers, a layer behind the first layer, etc.).

In some embodiments, in response to detecting the second user input directed to the respective user interface element (e.g., 708*a*) (802*e*), in accordance with a determination that the second user input satisfies one or more second criteria, the electronic device (e.g., 101) performs (802*f*) a selection operation associated with the respective user interface element (e.g., 708*a*) and updates the respective user interface element (e.g., 708*a*) by reducing an amount of separation between the respective user interface element (e.g., 708*a*) and the portion (e.g., 706) of the user interface that has the predetermined spatial relationship to the respective user interface element (e.g., 708*a*), such as in FIG. 7C. In some embodiments, the one or more second criteria include criteria that are satisfied when the electronic device detects, using an eye tracking device, that the user has looked at the respective user interface element for a threshold amount of time (e.g., 0.02, 0.05, 0.1, 0.2, 0.25, 0.3, 0.5, 0.6, 0.7, 0.8, 0.9, 1, 1.5, 2, 2.5 seconds, etc.) that is optionally longer than time thresholds associated with the first user input. In some embodiments, the one or more second criteria include criteria that are satisfied when the electronic device detects, via a hand tracking device, that the user has performed a predetermined gesture (e.g., with their hand(s)) while simultaneously detecting, via an eye tracking device, that the user is looking at the respective user interface element while the gesture is performed. In some embodiments, the predetermined gesture includes the user tapping together their thumb and one of their fingers (e.g., the index finger, middle finger, ring finger, little finger). In some embodiments, the one or more second criteria are satisfied when the electronic device detects, via the hand tracking device, that the location of the user's hand or a finger of the user's hand corresponds to a predetermined location, such as a location corresponding to a predetermined virtual location in the user interface. For example, the one or more second criteria are satisfied when the electronic device detects, using the hand tracking device, that the user moves their hand from a virtual location in the user interface at which the respective user interface element is displayed in a first virtual layer of the user interface to a virtual location in the user interface in a second virtual layer of the user interface (e.g., a virtual location in the second virtual layer that corresponds to a virtual location behind the virtual location in the user interface at which the respective user interface element was displayed in the first virtual layer). In some embodiments, the one or more second criteria are satisfied in response to detecting liftoff of a selection input, such as release of a hardware key or button of an input device (e.g., keyboard, mouse, trackpad, remote, etc.) or liftoff of a contact on a touch sensitive surface (e.g., of a touch-sensitive display, trackpad, etc.). In some embodiments, while the electronic device reduces the amount of separation between the respective user interface element and the portion of the user interface that has the predetermined spatial relationship to the respective user interface element, the electronic device displays the respective user interface element with a third size, third color, and/or third translucency and/or displaying the respective user interface element at a third virtual location or in a third virtual layer of the user interface. In some embodiments, the third size, color, translucency, virtual location, and/or third virtual layer are different from the second size, color, translucency, virtual location, and/or second virtual layer corresponding to the second appearance of the respective user interface element. In some embodiments, the third size, color, translucency, virtual location, and/or third virtual layer are the same as the second size, color, translucency, virtual location, and/or second virtual layer corresponding to the second appearance of the respective user interface element. In some embodiments, the third size, color, translucency, virtual location, and/or third virtual layer are different from the first size, color, translucency, virtual location, and/or first virtual layer corresponding to the first appearance of the respective user interface element. In some embodiments, the third size, color, translucency, virtual location, and/or third virtual layer are the same as the first size, color, translucency, virtual location, and/or first virtual layer corresponding to the first appearance of the respective user interface element. For example, while displaying the respective user interface element with reduced separation between the respective user interface element and the portion of the user interface that has the predetermined spatial relationship to the respective user interface element, the electronic device displays the respective user interface element with a third color that is different from the first color and second color in the first layer of the user interface at which the respective user interface element was displayed with the first appearance. In some embodiments, updating the respective user interface element from the first appearance to the second appearance includes transitioning from displaying the respective user interface element in a first virtual layer of the user interface to a second virtual layer in the user interface that appears closer to the user than the first layer. In some embodiments, the second user input satisfying the one or more second criteria corresponds to the magnitude of the input corresponding to moving the respective user interface element from the second virtual layer to the first virtual layer and the electronic device displays an animation of moving the user interface element from the second virtual layer to the first virtual layer while the second input is being received. In some embodiments, the first input and the second input are detected with different input devices. For example, detecting the first user input includes detecting, via the eye tracking device, the user's gaze on the respective user interface element while detecting, via the hand tracking device, a respective hand gesture being performed by the user, and detecting the second user input includes detecting the gaze of the user for a period of time that exceeds a threshold (e.g., 0.02, 0.05, 0.1, 0.2, 0.25, 0.3, 0.5, 0.6, 0.7, 0.8, 0.9, 1, 1.5, 2, 2.5 seconds, etc.) without detecting an input with the hand tracking device.

In some embodiments, in response to detecting the second user input directed to the respective user interface element (e.g., 708*a*) (802*e*), such as in FIG. 7B, in accordance with a determination that the second user input does not satisfy the one or more second criteria while the attention of the user is still determined to be directed to the respective user interface element (e.g., 708*a*), the electronic device (e.g., 101) forgoes (802*h*) performing the selection operation associated with the respective user interface element (e.g., 708*a*) without reducing an amount of separation between the respective user interface element (e.g., 708*a*) and the portion (e.g., 706) of the user interface that has the predetermined spatial relationship to the respective user interface element. In some embodiments, in accordance with the determination that the second user input does not satisfy the one or more second criteria, the electronic device continues to display the respective user interface element with the second appearance and continues to visually separate the respective user interface element and the portion of the user interface that has the predetermined spatial relationship to the respective user interface element. In some embodiments, in accordance with the determination that the second user input does not satisfy the one or more second criteria, the electronic device displays the respective user interface element with the first appearance. The above-described manner of updating the respective user interface element to have the second appearance in response to the first user input and updating the respective user interface element to be displayed with increased separation from the portion of the user interface that has the predetermined spatial relationship to the respective user interface element in response to the second user input that satisfies the one or more second criteria provides an efficient way of providing feedback to the user that the first and second user inputs are received, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while the respective user interface element (e.g., 708a) has the second appearance, such as in FIG. 7B, the electronic device (e.g., 101) detects (804a), via the one or more input devices, based on a pose (e.g., position, orientation, and/or grip) of a physical feature of the user (e.g., an eye or a hand), that the attention of the user of the device is not directed to the respective user interface element (e.g., 708b). In some embodiments, the electronic device detects, via the eye tracking device, the user's gaze directed towards a location in the user interface other than the respective user interface element and/or detects, via the hand tracking device, the electronic device detects the user moving their hand away from a predetermined location associated with the respective user interface element. In some embodiments, in response to detecting that the attention of the user of the device (e.g., 101) is not directed to the respective user interface element (e.g., 708a), the electronic device (e.g., 101) updates (804b) the respective user interface element (e.g., 708a) by reducing an amount of separation between the respective user interface element (e.g., 708a) and the portion (e.g., 706) of the user interface that has the predetermined spatial relationship to the respective user interface element (e.g., 708a). In some embodiments, the electronic device forgoes performing the selection operation associated with the respective user interface element. In some embodiments, the electronic device displays the respective user interface element in the same virtual layer as the portion of the user interface that has the predetermined spatial relationship to the respective user interface element.

The above-described manner of reducing the amount of separation between the respective user interface element and the portion of the user interface that has the predetermined spatial relationship to the respective user interface element in response to detecting that the attention of the user of the electronic device is not directed to the respective user interface element provides an efficient way of reverting the appearance of the portion of the user interface that has the predetermined spatial relationship to the respective user interface element without requiring an additional user input to do so, which additionally reduces power usage and improves battery life of the electronic device by enabling the user to use the electronic device more quickly and efficiently, while reducing errors in usage.

In some embodiments, such as in FIG. 7C, the second user input satisfies the one or more second criteria (806a). In some embodiments, while detecting the second user input directed to the respective user interface element (e.g., 708a) and before the second user input satisfies the one or more second criteria, such as in FIG. 7B, the electronic device (e.g., 101) updates (806b) the respective user interface element (e.g., 708a) by reducing an amount of separation between the respective user interface element (e.g., 708a) and the portion (e.g., 706) of the user interface that has the predetermined spatial relationship to the respective user interface element (e.g., 708a) in accordance with progress of the second user input towards satisfying the one or more second criteria. In some embodiments, the electronic device displays an animation of the respective user interface element returning to the same virtual layer as the portion of the user interface that has the predetermined spatial relationship to the respective user interface element while the second user input is being detected. For example, in response to detecting the gaze of the user on the respective user interface element, the electronic device animates gradually moving the respective user interface element to the portion of the user interface that has the predetermined spatial relationship to the respective user interface while the user's gaze is held on the respective user interface element and completes the animation and performs the selection action in accordance with a determination that a predetermined time period (e.g., 0.1, 0.2, 0.3, 0.4, 0.5, 1, 2, etc. seconds) has passed while the user held their gaze on the respective user interface element.

The above-described manner of reducing the amount of separation between the respective user interface element and the portion of the user interface that has the predetermined spatial relationship to the respective user interface element while detecting the second user input before the second user input satisfies the one or more second criteria provides an efficient way of indicating the progress of selecting the respective user interface element to the user, which additionally reduces power usage and improves battery life of the electronic device by enabling the user to use the electronic device more quickly and efficiently, while reducing errors in usage.

In some embodiments, such as in FIG. 7B, detecting, based on the pose of the physical feature of the user, that the attention of the user of the device is directed to the respective user interface element (e.g., 708a) includes detecting, via an eye tracking device in communication with the electronic device (e.g., 101), that a gaze (e.g., 712) of the user is directed to the respective user interface element (e.g., 708a) (808a). In some embodiments, the electronic device increases the separation between the respective user interface element and the portion of the user interface containing the respective user interface element in accordance with a determination that the user's gaze is held on the respective user interface element for a predetermined period of time (e.g., 01, 0.2, 0.3, 0.4, 0.5, 1, etc. seconds). In some embodiments, the electronic device initiates separating the respective user interface element from the portion of the user interface containing the respective user interface element in response to detecting the gaze of the user on the respective user interface element for any period of time (e.g., immediately upon detecting the gaze). In some embodiments, the electronic device initiates separating the respective user interface element from the portion of the user interface in response to gaze input only (e.g., without receiving additional input via an input device other than the eye tracking device).

The above-described manner of detecting the attention of the user based on gaze provides an efficient way of initiating selection of the respective user interface element without an input other than the gaze of the user, which additionally reduces power usage and improves battery life of the electronic device by enabling the user to use the electronic device more quickly and efficiently, while reducing errors in usage.

In some embodiments, such as in FIG. 7B, detecting, based on the pose of the physical feature of the user, that the attention of the user of the device is directed to the respective user interface element (e.g., 708*a*) includes detecting, via an eye tracking device and a hand tracking device in communication with the electronic device, that a gaze (e.g., 712) of the user is directed to the respective user interface element and a hand (e.g., 704) of the user is in a predetermined pose (810*a*) (e.g., gesture, location, motion). In some embodiments, the electronic device increases the separation between the respective user interface element and the portion of the user interface containing the respective user interface element in response to detecting a non-gaze input while detecting the gaze of the user on the respective user interface element. In some embodiments, the non-gaze input is a hand gesture or position detected via the hand tracking device. For example, the hand gesture is a finger of the hand being extended towards a location in the three-dimensional environment corresponding to the respective user interface element. As another example, the hand gesture is the user's thumb moving towards a finger (e.g., index finger, middle finger, ring finger, little finger) on the same hand as the thumb. As another example, the electronic device detects the hand in a location of the three-dimensional environment corresponding to the respective user interface element. For example, in response to detecting the gaze of the user on the respective user interface element while the user extends their finger towards the respective user interface element in the three-dimensional environment, the electronic device begins separating the respective user interface element from the portion of the user interface containing the respective user interface element.

The above-described manner of detecting the attention of the user based on the user's gaze and a pose of the user's hand provides an efficient way of initiating selection of the respective user interface element in a way that is intuitive for the user which additionally reduces power usage and improves battery life of the electronic device by enabling the user to use the electronic device more quickly and efficiently, while reducing errors in usage.

In some embodiments, such as in FIG. 7B, detecting, based on the pose of the physical feature of the user, the second user input that corresponds to the activation of the respective user interface element (e.g., 708*a*) includes detecting, via a hand tracking device in communication with the electronic device, a portion of a hand (e.g., 704) of the user of the electronic device at a location corresponding to the respective user interface element (e.g., 708*a*) (812*a*). In some embodiments, detecting the second user input further includes detecting a predetermined gesture performed with the hand (e.g., touching the thumb to a finger, extending one or more fingers in a pointing gesture). In some embodiments, detecting the second user input includes detecting the user's hand at a location that is within a threshold distance (e.g., 1, 2, 3, 5, 10, 15, 20, 30, 50 centimeters) of the location of the respective user interface element in the three-dimensional environment while one or more fingers of the hand are extended (e.g., pointing with one or more fingers). For example, detecting the second input includes detecting the user "pushing" the respective user interface elements with one or more fingers at a location in the three-dimensional environment corresponding to the respective user interface element. In some embodiments, detecting the second user input includes detecting, via a hand tracking device, the tip of one or more fingers of the user within a threshold distance (e.g., 1, 2, 3, 5, 10, 15, 20, 30, 50 centimeters) of the location of the respective user interface element in the three-dimensional environment, followed by detecting movement of the fingers/hand/arm towards the respective user interface element while remaining at a location corresponding to the respective user interface element.

The above-described manner of detecting the second user input based on the location of a portion of the hand of the user provides an efficient way of accepting an input that is intuitive to the user and does not require the user to manipulate a physical input device, which additionally reduces power usage and improves battery life of the electronic device by enabling the user to use the electronic device more quickly and efficiently, while reducing errors in usage.

In some embodiments, such as in FIG. 7B, detecting, based on the pose of the physical feature of the user, the second user input that corresponds to the activation of the respective user interface element (e.g., 708*a*) includes detecting, via an eye tracking device and a hand tracking device in communication with the electronic device (e.g., 101), a respective gesture (e.g., touching the thumb to a finger, extending one or more fingers in a pointing gesture) performed by a hand (e.g., 704) of the user of the electronic device (e.g., 101) while a gaze (e.g., 712) of the user of the electronic device directed to the respective user interface element (e.g., 708*a*) (814*a*). In some embodiments, detecting the second user input further includes detecting a predetermined gesture performed with the hand (e.g., touching the thumb to a finger, extending one or more fingers in a pointing gesture) while the hand is in a predetermined location (e.g., a location within a threshold distance (e.g., 5, 10, 20, 30, 45, etc. centimeters) from the respective user interface element in the three-dimensional environment) while detecting, via the eye tracking device, that the gaze of the user is directed towards the respective user interface element. For example, detecting the second input includes detecting the user tapping their thumb to another finger (e.g., index finger, middle finger, ring finger, little finger) on the same hand as the thumb while the user is looking at the respective user interface element.

The above-described manner of detecting the second user input based on the location of a portion of the hand of the user provides an efficient way of accepting an input that is intuitive to the user and does not require the user to manipulate a physical input device, which additionally reduces power usage and improves battery life of the electronic device by enabling the user to use the electronic device more quickly and efficiently, while reducing errors in usage.

In some embodiments, such as in FIG. 7A, before detecting the second user input directed to the respective user interface element (e.g., 708*a*), the respective user interface element (e.g., 708*a*) is displayed with a respective visual characteristic (e.g., other than the distance between the respective user interface element and the portion of the user interface containing the respective user interface element) having a first value while the respective user interface element (e.g., 708*a*) is visually separated from the portion (e.g., 706) of the user interface (816*a*). In some embodiments, the respective visual characteristic is a size, color, translucency, etc. of the respective user interface element. In some embodiments, such as in FIG. 7C, performing the selection operation associated with the respective user interface element (e.g., 708a) includes displaying the respective user interface element with the respective visual characteristic having a second value, different from the first value, while the amount of separation between the respective user interface element (e.g., 708a) and the portion of the user interface is reduced (e.g., 706) (816b) (e.g., while the respective user interface element is not separated from the portion of the user interface). For example, before detecting the second input, the electronic device displays the respective user interface element with a first color and in response to the second user input (e.g., selection), the electronic device performs the selection action while displaying the respective user interface element with a second color, different from the first color.

The above-described manner of updating the visual characteristic as part of the selection operation provides an efficient way of confirming selection of the respective user interface element, which additionally reduces power usage and improves battery life of the electronic device by enabling the user to use the electronic device more quickly and efficiently, while reducing errors in usage.

In some embodiments, such as in FIG. 7C, the second user input satisfies the one or more second criteria when the second user input includes a gaze (e.g., 712) of the user of the electronic device (e.g., 101) directed to the respective user interface element (e.g., 708a) for longer than a time threshold (818a) (e.g., 0.02, 0.05, 0.1, 0.2, 0.25, 0.3, 0.5, 1, 2, etc. seconds). In some embodiments, the one or more second criteria are satisfied in response to the gaze being directed to the respective user interface element for longer than the time threshold without an additional non-gaze input. In some embodiments, the electronic device gradually reduces the amount of separation between the respective user interface element and the portion of the user interface while the user's gaze is maintained on the respective user interface element over the time threshold. In some embodiments, the one or more second criteria are satisfied based on the gaze of the user only without detecting an additional input via an input device other than the gaze tracking device.

The above-described manner of selecting the respective user interface element in response to the user's gaze being directed towards the respective user interface element for the time threshold provides an efficient way of selecting the respective user interface element without requiring the user manipulate a physical input device, which additionally reduces power usage and improves battery life of the electronic device by enabling the user to use the electronic device more quickly and efficiently, while reducing errors in usage.

In some embodiments, while the respective user interface element (e.g., 708a) has the second appearance, the electronic device (e.g., 101) detects (820a), via a hand tracking device in communication with the electronic device, that a hand (e.g., 704) of the user of the electronic device is at a respective location that corresponds to a location for interacting with the respective user interface element (e.g., 708a), such as in FIG. 7B. In some embodiments, the hand is within a threshold distance (e.g., 5, 10, 15, 20, 25, 30, 40, etc. centimeters) of the respective user interface element in the three-dimensional environment while in a predetermined pose (e.g., one or more fingers extended in a pointing gesture, the thumb within a threshold (e.g., 0.5, 1, 2, etc. centimeters) from another finger in a near-pinch gesture). In some embodiments, such as in FIG. 7C, in response to detecting that the hand (e.g., 704) of the user of the electronic device (e.g., 101) is at the respective location, the electronic device (e.g., 101) updates (820b) the respective user interface element (e.g., 708a) to further visually separate the respective user interface element (e.g., 708a) from the portion (e.g., 706) of the user interface that has the predetermined spatial relationship to the respective user interface element. In some embodiments, the electronic device updates the respective user interface in response to the hand being at the respective location while the user's gaze is on the respective user interface element and/or the user's hand is in a predetermined pose (e.g., one or more fingers "pointing" towards the respective user interface element). In some embodiments, further visually separating the respective user interface element and the portion of the user interface that has the predetermined spatial relationship to the respective use interface element includes one or more of moving the respective user interface element towards the viewpoint of the user in the three-dimensional environment and/or moving the user interface away from the viewpoint of the user in the three-dimensional environment.

The above-described manner of updating the respective user interface to further visually separate the respective user interface element from the portion of the user interface that has the predetermined spatial relationship to the respective user interface element in response to detecting the hand of the user at the respective location that corresponds to the location for interacting with the respective user interface element makes the user interface element easier for the user to select with a hand movement or gesture, which additionally reduces power usage and improves battery life of the electronic device by enabling the user to use the electronic device more quickly and efficiently, while reducing errors in usage.

In some embodiments, such as in FIG. 7B, the respective user interface element (e.g., 708a) having the second appearance is associated with a first hierarchical level in the user interface, and the portion (e.g., 706) of the user interface that has the predetermined spatial relationship to the respective user interface element is associated with a second hierarchical level, different from the first hierarchical level (822a). In some embodiments, the portion of the user interface that has the predetermined spatial relationship to the respective user interface element is displayed within a virtual container (e.g., a user interface, a backplane, etc.) that has a third hierarchical level above the second hierarchical level, which is above the first hierarchical level. In some embodiments, the hierarchical levels define the distance of respective user interface elements from a viewpoint of the user in the three-dimensional environment (e.g., z-depth). For example, the respective user interface element is displayed between the viewpoint of the user and the portion of the user interface that has the predetermined spatial relationship to the respective user interface element. In some embodiments, the dynamic range of the respective user interface element extends from the first hierarchical level to the second hierarchal level in response to the second user input. In some embodiments, the hierarchical levels are navigational levels. For example, the currently-displayed user interface is at a first hierarchical level and the user interface from which the electronic device navigated to the current user interface is at a second hierarchical level.

The above-described manner of associating the respective user interface element with the second appearance with the first hierarchical level and associating the respective portion of the user interface that has the predetermined spatial relationship to the respective user interface element with the second hierarchical level provides an efficient way of directing the user's attention to the respective user interface element for interaction and reduces the cognitive burden on the user, which additionally reduces power usage and improves battery life of the electronic device by enabling the user to use the electronic device more quickly and efficiently, while reducing errors in usage.

In some embodiments, such as in FIG. 7B, detecting the second user input includes detecting, via a hand tracking device in communication with the electronic device, hand input from the user of the electronic device corresponding to movement of the respective user interface element (e.g., 708a) back towards the portion (e.g., 706) of the user interface (824a). In some embodiments, the respective user interface element is displayed between the viewpoint of the user in the three-dimensional environment and the portion of the user interface. In some embodiments, the electronic device moves the respective user interface element in accordance with the hand input. In some embodiments, the electronic device moves the respective user interface element towards the portion of the user interface in response to a hand input that corresponds to pushing the respective user interface element towards the portion of the user interface (e.g., one or more fingers extended from the hand, touching or within a threshold distance (e.g., 0.5, 1, 2, 3, 5, 10, 20, 30, etc. centimeters) of touching a location corresponding to the respective user interface element and pushing the respective user interface element away from the user towards the portion of the user interface). In some embodiments, such as in FIG. 7C, in response to detecting the second user input (e.g., including the hand input), the electronic device (e.g., 101) updates (824b) the respective user interface element (e.g., 708a) to reduce the amount of separation between the respective user interface element (e.g., 708a) and the portion (e.g., 706) of the user interface. In some embodiments, the electronic device reduces the amount of separation between the respective user interface element and the portion of the user interface in accordance with a characteristic (e.g., distance or speed of movement, duration) of the hand input. For example, in response to detecting the hand move towards the portion of the user interface by a first amount, the electronic device decreases the separation between the respective user interface element and the portion of the user interface by a second amount. In this example, in response to detecting the hand move towards the portion of the user interface by a third amount that is greater than the first amount, the electronic device decreases the separation between the respective user interface element and the portion of the user interface by a fourth amount that is greater than the second amount. In some embodiments, such as in FIG. 7C, the second user input satisfies the one or more second criteria when the hand input corresponds to movement of the respective user interface element (e.g., 708a) to within a threshold distance (e.g., 0, 0.5, 1, 2, 3, 5, 10, etc. centimeters) from the portion (e.g., 706) of the user interface (824c). In some embodiments, the one or more second criteria include a criterion that is satisfied when the respective user interface element reaches the portion of the user interface in accordance with the hand input. In some embodiments, prior to detecting the second input, the respective user interface element is displayed at a first hierarchical level and the portion of the user interface is displayed at a second hierarchical level and there are no hierarchical levels (e.g., no other user interface elements displayed) in between the first and second hierarchical levels.

The above-described manner of updating the amount of separation between the respective user interface element and the portion of the user interface and satisfying the one or more second criteria when the hand input corresponds to movement of the respective user interface element to within a threshold distance from the portion of the user interface provides an efficient way of providing feedback to the user while the user provides the second input, which additionally reduces power usage and improves battery life of the electronic device by enabling the user to use the electronic device more quickly and efficiently, while reducing errors in usage.

In some embodiments, such as in FIG. 7D, after the second user input satisfies the one or more second criteria and while the respective user interface element (e.g., 708a) is within the threshold distance (e.g., 0, 0.5, 1, 2, 3, 5, 10, etc. centimeters) from the portion (e.g., 706) of the user interface, the electronic device (e.g., 101) detects (826a), via the hand tracking device, further hand input from the user of the electronic device (e.g., 101) corresponding to movement of the respective user interface element (e.g., 708a) back towards the portion (e.g., 706) of the user interface. In some embodiments, the movement of the hand continues past the amount at which the one or more second criteria are satisfied. In some embodiments, such as in FIG. 7D, in response to detecting the further hand input, the electronic device (e.g., 101) moves (826b) the respective user interface element (e.g., 708a) and the portion (e.g., 706) of the user interface in accordance with the further hand input (e.g., without changing the amount of separation between the respective user interface element and the portion of the user interface). In some embodiments, when objects in the first hierarchical level (e.g., the respective user interface element) are pushed into objects in the second hierarchical level (e.g., the portion of the user interface), the objects in both levels move together in response to further user input (e.g., as though they are both included in the second hierarchical level). In some embodiments, further hand input causes the electronic device to push the respective user interface element and the portion of the user interface further into a third hierarchical level behind the second hierarchal level (e.g., the second hierarchical level is between the first and second hierarchical levels). In some embodiments, the electronic device displays a backplane of the portion of the user interface at the third hierarchal level. In some embodiments, the electronic device moves the third hierarchical level back to a fourth hierarchical level in response to further hand input pushing the first, second, and third hierarchical levels further, and so on. In some embodiments, the movement of the respective user interface element and the portion of the user interface in accordance with the further hand input is based on the speed, direction and/or distance of movement of the hand input. In some embodiments, in response to detecting movement of the hand towards the torso of the user, the electronic device display the user interface element and the portion of the user interface moving towards the user in the three-dimensional environment with inertia.

The above-described manner of moving the respective user interface element and the portion of the user interface in accordance with the further hand input in response to further hand input received while the respective user interface element is within the threshold of the portion of the user interface provides an efficient way of confirming receipt of the further hand input and reduces cognitive burden on the user, which additionally reduces power usage and improves battery life of the electronic device by enabling the user to use the electronic device more quickly and efficiently, while reducing errors in usage.

In some embodiments, such as in FIG. 7C, in response to detecting the second user input (828a), in accordance with a determination that the hand input corresponds to movement of the respective user interface element (e.g., 708*a*) back towards the portion (e.g., 706) of the user interface that is less than a threshold amount of movement (e.g., 0.5, 1, 2, 3, 4, 5, 7, 10, 20, etc. centimeters, or otherwise the distance between the respective user interface element and the portion of the user interface), the electronic device (e.g., 101) moves (828*b*) the respective user interface element (e.g., 708*a*) back towards the portion (e.g., 706) of the user interface in accordance with (e.g., by an amount proportional to a metric (e.g., duration, speed, distance) of) the hand input without moving the portion (e.g., 706) of the user interface, to reduce the amount of separation between the respective user interface element (e.g., 708*a*) and the portion of the user interface (e.g., 706), such as in FIG. 7C. In some embodiments, in response to the hand input that corresponds to less than the threshold amount of movement, the electronic device reduces the separation between the respective user interface element and the portion of the user interface without moving the portion of the user interface in accordance with the hand input. In some embodiments, the electronic device moves the respective user interface element by an amount proportional to a metric (e.g., duration, speed, distance) of the hand input. For example, in response to detecting movement of the hand by a first amount, the electronic device moves the respective user interface element towards the portion of the user interface by a second amount. As another example, in response to detecting movement of the hand by a third amount greater than the first amount, the electronic device moves the respective user interface element towards the portion of the user interface by a fourth amount greater than the second amount. In some embodiments, the first threshold corresponds to an amount of movement at which the respective user interface element reaches the hierarchical level of the portion of the user interface. In some embodiments, the hand input satisfies one or more second criteria in response to the hand input corresponding to the threshold amount of movement. In some embodiments, such as in FIG. 7D, in response to detecting the second user input (828*a*), in accordance with a determination that the hand input corresponds to movement of the respective user interface element (e.g., 708*a*) back towards the portion (e.g., 706) of the user interface that is greater than the threshold amount of movement (e.g., but less than a second threshold (e.g., 1, 2, 3, 4, 5, 7, 10, 20, 30, 40, etc. centimeters) corresponding to a hierarchical level behind the hierarchical level of the portion of the user interface), the electronic device (e.g., 101) moves (828*c*) the respective user interface element (e.g., 706*a*) and moves the portion (e.g., 706) of the user interface in accordance with the hand movement (e.g., without changing the amount of separation between the respective user interface element and the portion of the user interface). In some embodiments, when objects in the first hierarchical level (e.g., the respective user interface element) are pushed at least the threshold amount to push into objects in the second hierarchical level (e.g., the portion of the user interface), the objects in both levels move together in response to further user input (e.g., as though they are both included in the second hierarchical level). In some embodiments, further hand input (e.g., beyond the second threshold) causes the electronic device to push the respective user interface element and the portion of the user interface further into a third hierarchical level behind the second hierarchal level (e.g., the second hierarchical level is between the first and second hierarchical levels). In some embodiments, the electronic device displays a backplane of the portion of the user interface at the third hierarchal level. In some embodiments, the electronic device moves the third hierarchical level back to a fourth hierarchical level in response to further hand input pushing the first, second, and third hierarchical levels further, and so on.

The above-described manner of moving the portion of the user interface in accordance with the hand input in response to the hand input exceeding a threshold provides an efficient way of providing feedback to the user when the hand input exceeds the threshold, which additionally reduces power usage and improves battery life of the electronic device by enabling the user to use the electronic device more quickly and efficiently, while reducing errors in usage.

In some embodiments, such as in FIG. 7C, updating the respective user interface (e.g., 708*a*) element by reducing the amount of separation between the respective user interface element (e.g., 708*a*) and the portion (e.g., 706) of the user interface includes moving the respective user interface element (e.g., 708*a*) and the portion (e.g., 706) of the user interface with inertia (e.g., a simulated physical property based on the rate of movement of the respective user interface element and portion of the user interface) in accordance with a movement component of the second user input (830*a*). In some embodiments, in response to detecting the user ceasing the movement component of the second user input or detecting the movement component of the second user input changing from moving towards the respective user interface element and the portion of the user interface to moving away from the respective user interface element and the portion of the user interface, the electronic device animates continued progress, but deceleration of, reducing the separation of the respective user interface element and the portion of the user interface. For example, the second user input includes motion of the user's hand towards the respective user interface element and the portion of the user interface. In this example, in response to the second input, the electronic device moves the respective user interface away from a viewpoint of the user and towards the portion of the user interface and, in response to detecting that the user ceases moving their hand towards the respective user interface element and the portion of the user interface, the respective user interface element continues to move towards the portion of the user interface with inertia for a time period (e.g., 0.1, 0.3, 0.5 seconds), even though the electronic device decelerates the motion of the respective user interface element towards the portion of the user interface. In some embodiments, if the second input causes the portion of the user interface to move away from the user, the portion of the user interface moves with inertia as well (e.g., continuing to move and decelerating for a time period after the second input stops moving in a direction from the respective use interface element to the portion of the user interface). In some embodiments, if the second input does not cause the portion of the user interface to move, the portion of the user interface continues not to move after second input stops moving in a direction from the respective use interface element to the portion of the user interface. In some embodiments, the electronic device (e.g., 101) detects (830*b*) a termination of the second user input directed to the respective user interface element (e.g., 708*a*) in FIG. 7C. In some embodiments, the user ceases looking at the respective user interface element, the user ceases moving their hand towards the respective user interface element, the user ceases performing a predetermined gesture (e.g., releases a pinch gesture), moves their hand away from a predetermined location associated with the location of the respective user interface element, etc. In some embodiments, termination of the second user input is detected without the second user input satisfying the one or more second criteria. In some embodiments, in response to detecting the termination of the second user input directed to the respective user interface element (e.g., 708*a*) in FIG. 7C, the electronic device (e.g., 101) moves (830*c*) the respective user interface element (e.g., 708*a*) and the portion (e.g., 706) of the user interface in a direction opposite to the movement of the respective user interface element (e.g., 708*a*) and the portion (e.g., 706) of the user interface that was in response to the second user input. In some embodiments, in response to detecting termination of the second user input, the electronic device increases the separation between the respective user interface element and the portion of the user interface. In some embodiments, the one or more respective criteria include criteria that are satisfied when the second input does not satisfy the one or more second criteria, when the user continues to look at the respective user interface element, and/or until an additional input directed to a different user interface element is received. In some embodiments, if the second input causes the portion of the user interface to move away from the user, the portion of the user interface moves in a direction towards the respective user interface element in response to termination of the second input. In some embodiments, the respective user interface element moves at a faster speed and/or for a longer duration than the portion of the user interface moves so that the distance between the respective user interface element and the portion of the user interface increases in response to detecting termination of the second input. In some embodiments, if the second input does not cause the portion of the user interface to move, the portion of the user interface continues not to move after the electronic device detects termination of the second user input.

The above-described manner of moving the respective user interface element with inertia and moving the respective user interface element and the portion of the user interface in the direction opposite the direction in response to the second user input in response to detecting termination of the second user input provides an efficient way of indicating to the user that the second user input did not satisfy the one or more second criteria which additionally reduces power usage and improves battery life of the electronic device by enabling the user to use the electronic device more quickly and efficiently, while reducing errors in usage.

In some embodiments, such as in FIG. 7B, detecting the second user input includes detecting a portion of a hand (e.g., 704) of the user of the electronic device (e.g., 101) at a location corresponding to the respective user interface element (e.g., 708*a*) (832*a*) (e.g., detecting the user "push" the respective user interface element with one or more fingers of the hand). In some embodiments, while the respective user interface element (e.g., 708*a*) has the second appearance, the electronic device (e.g., 101) detects (832*b*), via a hand tracking device in communication with the electronic device, a respective input including a respective gesture (e.g., a pinch gesture in which the user touches a thumb to another finger (e.g., index, middle, ring, little finger) on the hand of the thumb) performed by the hand (e.g., 704) of the user while the hand of the user is at a location that does not correspond to the respective user interface element (e.g., 708*a*), such as in FIG. 7B. In some embodiments, the gesture is performed while the hand is not at a location in the three-dimensional environment that corresponds to the respective user interface element (e.g., a location from which the hand cannot "push" the respective user interface element to select it, but rather a location that is remote from the location of the respective user interface element). In some embodiments, the gesture is performed while the hand is at the location that corresponds to the respective user interface element and the response of the electronic device is the same as though the user had performed the gesture with the hand at the location that does not correspond to the respective user interface element. In some embodiments, in response to detecting the respective input (832*c*), in accordance with a determination based on the respective gesture performed by the hand (e.g., 704) of the user while the hand (e.g., 704) of the user is at a location that does not correspond to the respective user interface element (e.g., 708*a*), that the respective input satisfies one or more third criteria, the electronic device (e.g., 101) updates (832*d*) the respective user interface element (e.g., 708*a*) by reducing the amount of separation between the respective user interface element (e.g., 708*a*) and the portion (e.g., 706) of the user interface, including moving the respective user interface element (e.g., 708*a*) and the portion of the user interface with inertia (e.g., 706), such as in FIG. 7D. In some embodiments, moving the respective user interface element and the portion of the user interface with inertia includes gradually increasing the movement speed of the respective user interface element and the portion of the user interface as the respective input is received and gradually decreasing the movement speed of the respective user interface element in response to termination of the respective input. In some embodiments, in response to detecting the respective input (e.g., the user performing the pinch gesture while looking at the respective user interface element), the respective user interface element and/or the portion of the user interface move towards each other the reduce the separation between the respective user interface element and the portion of the user interface. In some embodiments, the electronic device (e.g., 101) detects (832*e*) a termination of the respective input. In some embodiments, the user ceases performing the gesture, such as moving the thumb away from the other finger or the hand tracking device ceases to detect the hand of the user because the user moved the hand away from the detection area of the hand tracking device. In some embodiments, in response to detecting the termination of the respective input, the electronic device (e.g., 101) moves (832*f*) the respective user interface element (e.g., 708*a*) and the portion (e.g., 706) of the user interface in a direction opposite to the movement of the respective user interface element (e.g., 708*a*) and the portion (e.g., 706) of the user interface that was in response to the respective input. In some embodiments, in response to detecting termination of the respective user input, the electronic device increases the separation between the respective user interface element and the portion of the user interface. In some embodiments, in accordance with a determination that the respective input satisfies the one or more second criteria before the termination of the respective input is detected, the electronic device performs the selection operation associated with the respective user interface element and updates the respective user interface element by reducing the amount of separation between the respective user interface element and the portion of the user interface. In some embodiments, the electronic device responds to the respective input in the same way the electronic device responds to the second input.

The above-described manner of moving the respective user interface element with inertia and moving the respective user interface element and the portion of the user interface in the direction opposite the direction in response to the respective user input in response to detecting termination of the respective user input provides an efficient way of indicating to the user that the respective user input did not satisfy the one or more second criteria, which additionally reduces power usage and improves battery life of the electronic device by enabling the user to use the electronic device more quickly and efficiently, while reducing errors in usage.

In some embodiments, such as in FIG. 7B detecting the second user input includes detecting a portion of a hand (e.g., 704) of the user of the electronic device (e.g., 101) at a location corresponding to the respective user interface element (e.g., 708a) (834a) (e.g., detecting the user "push" the respective user interface element with one or more fingers of the hand). In some embodiments, such as in FIG. 7B, while the respective user interface element (e.g., 708a) has the second appearance, the electronic device (e.g., 101) detects (834b), via an eye tracking device in communication with the electronic device, a respective input including a gaze (e.g., 712) of the user directed to the respective user interface element (e.g., 708a). (e.g., while the hand of the user is at a location that does not correspond to the respective user interface element). In some embodiments, the electronic device detects the gaze of the user directed towards the respective user interface element while detecting the hand of the user at the location that corresponds to the respective user interface element and the response of the electronic device is the same as though the user's gaze was detected on the respective user interface element with hand at the location that does not correspond to the respective user interface element. In some embodiments, such as in FIG. 7B, in response to detecting the respective input (834c), in accordance with a determination based on the gaze (e.g., 712) of the user (e.g., based on one or more parameters such as direction, duration, etc. of the gaze) directed to the respective user interface element (e.g., 708a) that the respective input satisfies one or more third criteria (e.g., the gaze of the user is held on the respective user interface element for a predetermined time threshold (e.g., 0.02, 0.05, 0.1, 0.2, 0.25, 0.3, 0.5, etc. seconds), the electronic device (e.g., 101) updates (834d) the respective user interface element (e.g., 708a) by reducing the amount of separation between the respective user interface element (e.g., 708a) and the portion (e.g., 706) of the user interface, such as in FIG. 7C, including moving the respective user interface element (e.g., 708a) and the portion (e.g., 706) of the user interface with inertia. In some embodiments, moving the respective user interface element and the portion of the user interface with inertia includes gradually increasing the movement speed of the respective user interface element and the portion of the user interface as the respective input is received and gradually decreasing the movement speed of the respective user interface element in response to termination of the respective input. In some embodiments, in response to detecting the respective input, the respective user interface element and/or the portion of the user interface move towards each other the reduce the separation between the respective user interface element and the portion of the user interface. In some embodiments, the electronic device (e.g., 101) detects (834e) a termination of the respective input (e.g., detecting the gaze of the user being directed away from the respective user interface element and/or detecting the user closing their eyes for a predetermined threshold of time (e.g., 0.02, 0.05, 0.1, 0.2, 0.25, 0.3, 0.5, 0.7, 1, etc. seconds). In some embodiments, in response to detecting the termination of the respective input, the electronic device (e.g., 101) moves (834f) the respective user interface element (e.g., 708a) and the portion (e.g., 706) of the user interface in a direction opposite to the movement of the respective user interface element (e.g., 708a) and the portion (e.g., 706) of the user interface that was in response to the respective input. In some embodiments, in response to detecting termination of the respective user input, the electronic device increases the separation between the respective user interface element and the portion of the user interface. In some embodiments, in accordance with a determination that the respective input satisfies the one or more second criteria before the termination of the respective input is detected, the electronic device performs the selection operation associated with the respective user interface element and updates the respective user interface element by reducing the amount of separation between the respective user interface element and the portion of the user interface. In some embodiments, the electronic device responds to the respective input in the same way the electronic device responds to the second input.

The above-described manner of moving the respective user interface element with inertia and moving the respective user interface element and the portion of the user interface in the direction opposite the direction in response to the respective user input in response to detecting termination of the respective user input provides an efficient way of indicating to the user that the respective user input did not satisfy the one or more second criteria, which additionally reduces power usage and improves battery life of the electronic device by enabling the user to use the electronic device more quickly and efficiently, while reducing errors in usage.

FIGS. 9A-9E illustrate examples of how an electronic device enhances interactions with slider user interface elements in accordance with some embodiments.

Figure 9A:
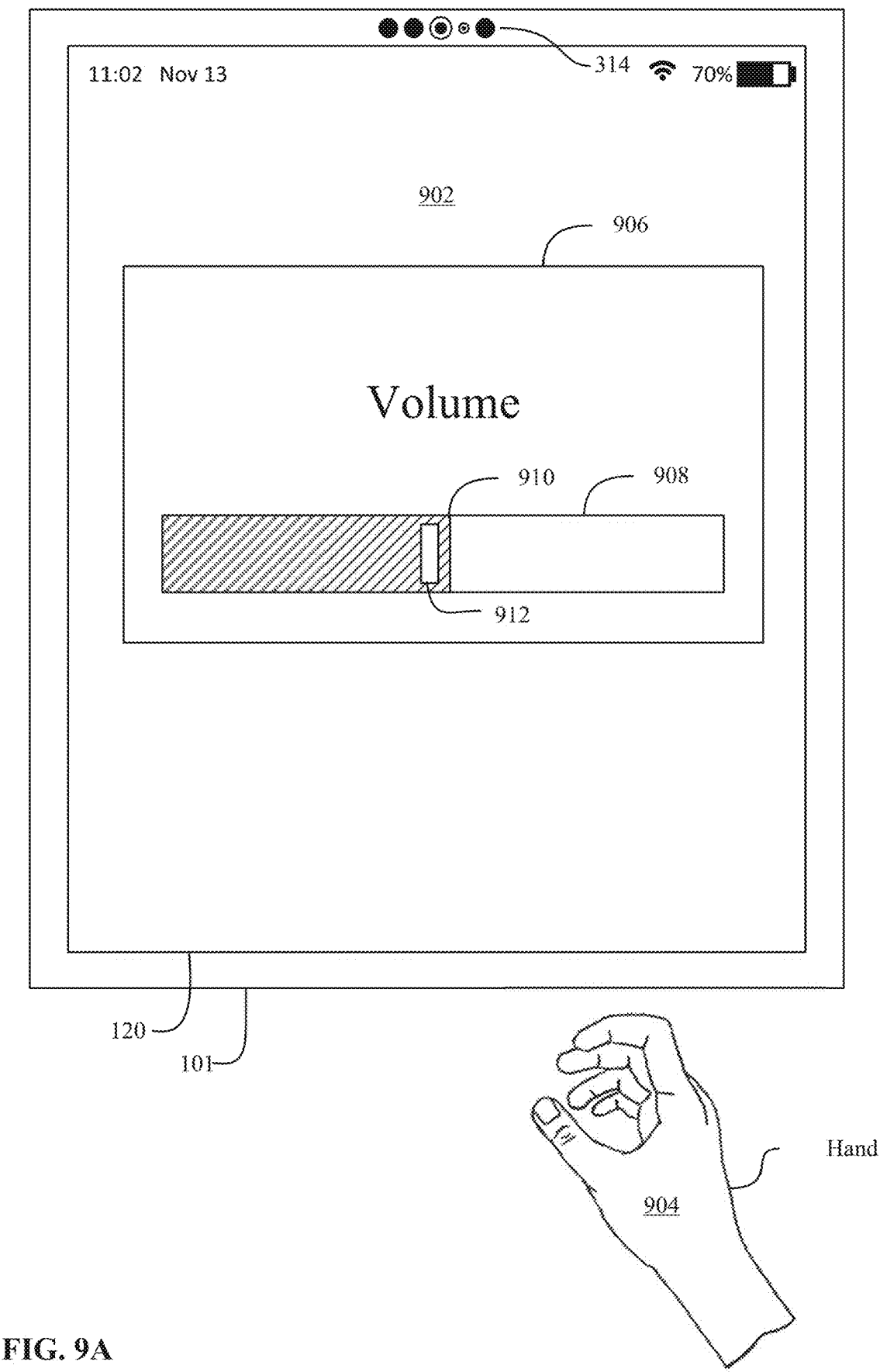
FIGS. 9A-9E illustrate examples of how an electronic device enhances interactions with slider user interface elements in accordance with some embodiments.

FIG. 9A illustrates an electronic device 101 displaying, via a display generation component 120, a three-dimensional environment 902 on a user interface. It should be understood that, in some embodiments, the electronic device 101 implements one or more techniques described herein with reference to FIGS. 9A-9E in a two-dimensional environment without departing from the scope of the disclosure. As described above with reference to FIGS. 1-6, the electronic device 101 optionally includes a display generation component 120 (e.g., a touch screen) and a plurality of image sensors 314. The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

FIG. 9A illustrates the electronic device 101 displaying a dialog box 906 or control element in three-dimensional environment 902. Dialog box 906 includes a slider user interface element 908 that has an indicator 910 of the current input state of the slider user interface element 908. The indicator 910 of the current input state of the slider user interface element 908 includes a selectable element 912 that, when selected, causes the electronic device 101 to initiate one of the ways to change the current input state of the slider. As shown in FIG. 9A, the slider user interface element 908 controls the current volume level of the electronic device 101. In some embodiments, an electronic device 101 presents slider user interface elements similar to slider 908 that control other settings and/or operations of the electronic device 101.

As shown in FIG. 9A, the slider user interface element 908 is displayed without a cursor or indications of other available input states of the slider user interface element 908 other than the current input state indicator 910. In some embodiments, the electronic device 101 presents the slider user interface element 908 as shown in FIG. 9A in response to detecting the gaze of the user away from the slider user interface element 908 and/or dialog box 906 (e.g., the gaze of the user is directed to another part of the user interface) and/or detecting that the hand 904 of the user is at a location that does not correspond to the location of the slider user interface element 908 in the three-dimensional environment 902. As will be described in more detail below, in some embodiments, the electronic device 101 updates the slider user interface element 908 in response to inputs including detecting the user performing a predetermined gesture with their hand 904. In FIG. 9A, the user does not perform the predetermined gesture with their hand 904.

Figure 9B:
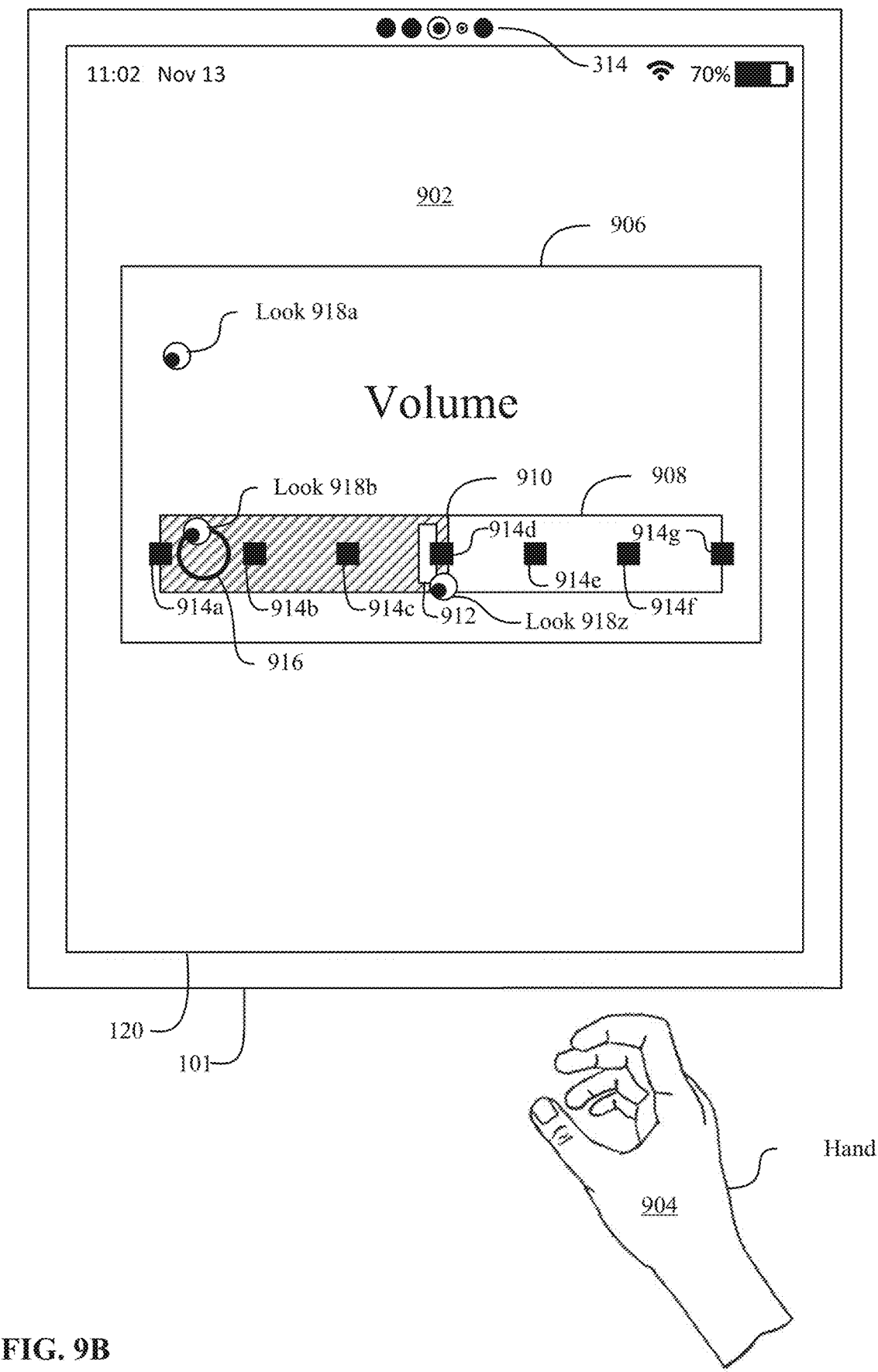

FIG. 9B illustrates the electronic device 101 initiating a process to change the current input state of the slider user interface element 908, such as by displaying a cursor 916 and/or indications 914a-g of available input states of the slider user interface element 908 in response to detecting the gaze of the user on the dialog box 906 or the slider user interface element 908. It should be understood that, in some embodiments, the electronic device 101 displays the indications 914a-g of available input states without displaying the cursor 916. In some embodiments, the electronic device 101 displays cursor 916 without displaying indications 914a-g. In some embodiments, the electronic device 101 displays the cursor 916 and/or indications 914a-g in response to detecting the gaze 918a of the user anywhere within dialog box 906. In some embodiments, the electronic device 101 does not display the cursor 916 and/or indications 914a-g unless the gaze 918b of the user is directed to the slider user interface element 908. In some embodiments, the electronic device 101 presents an indication of a location of the user's gaze while facilitating the interactions with the slider user interface element 908 illustrated in FIGS. 9A-9E. For example, displaying the indication of the gaze includes increasing the brightness or lightness of a region of the three-dimensional environment 902 towards which the gaze of the user is detected.

In some embodiments, the electronic device 101 displays cursor 916 at a location along slider 908 based on one or more of the gaze 918b of the user and/or the location of a hand 904 of the user. For example, the electronic device 101 initially displays cursor 916 at a location along slider user interface element 908 at which the gaze 918b of the user is directed. In some embodiments, the electronic device 101 updates the location of the cursor 916 in response to detecting movement of the hand 904 of the user. For example, in response to detecting movement of the hand to the left, the electronic device 101 moves cursor 916 to the left along slider 908 and, in response to detecting movement of the hand 904 to the right, the electronic device 101 moves cursor 916 to the right along slider 908. As will be described below with reference to FIG. 9E, in response to detecting the user performing a predetermined gesture with their hand 904 (e.g., touching a thumb to another finger (e.g., index, middle, ring, little finger) on the same hand as the thumb (e.g., a pinch gesture)), the electronic device 101 moves the current input indicator 12 of the slider and the cursor 916 in accordance with further movement of the hand 904 while the hand maintains the pinch gesture. In some embodiments, while the pinch gesture is not detected, the electronic device 101 moves the cursor 916 in accordance with the movement of the hand without updating the current input state of the slider. In some embodiments, the cursor 916 only moves in the dimension along which the slider user interface element 908 is oriented (e.g., horizontally in FIG. 9B, vertically for a vertical slider user interface element). Thus, in some embodiments, the electronic device 101 moves the cursor 916 in accordance with a horizontal component of the movement of the user's hand 904 irrespective of a vertical component of the movement of the user's hand 904. Additional details regarding cursor 916 are described below with reference to FIG. 9E.

In some embodiments, the electronic device 101 updates the current input state of the slider 908 in response to an input directed to the indication 910 of the current input state of the slider 908 while indications 914a-g are displayed. As shown in FIG. 9B, the electronic device 101 detects the gaze 918z of the user on the end 912 of the indication 910 of the current input state of the slider 908. In some embodiments, in response to detecting the user performing a predetermined gesture with their hand 904 while the gaze 918z of the user is detected on the end 912 of the slider user interface element 908, the electronic device 101 initiates a process to move the current input state indicator 910 of the slider in accordance with movement of the hand 904 while the gesture is being maintained. For example, the predetermined gesture is the user touching a thumb to another finger (e.g., index, middle, ring, little finger) on the same hand as the thumb (e.g., a pinch gesture). In some embodiments, in response to detecting the pinch gesture, the electronic device 101 ceases display of the indications 914a-g. In some embodiments, the electronic device 101 continues displaying the indications 914a-g in response to detecting the pinch gesture and while the user moves the current input state indicator 910 of the slider user interface element 908 in accordance with movement of the hand 904 while maintaining the pinch gesture. In some embodiments, the current input state indicator 910 of the slider user interface element 908 snaps to one of the indications 914a-g. In some embodiments, it is possible to move the current input state indicator 910 of the slider user interface element 908 to a location between indications 914a-g. In some embodiments, in response to detecting the user ceasing to perform the pinch gesture with their hand 904 (e.g., detecting the thumb and the finger apart from each other), the electronic device 101 updates the current input state of the slider user interface element 908 and maintains display of the indicator 910 of the current input state, corresponding to the updated state, of the slider user interface element 908.

Figure 9C:
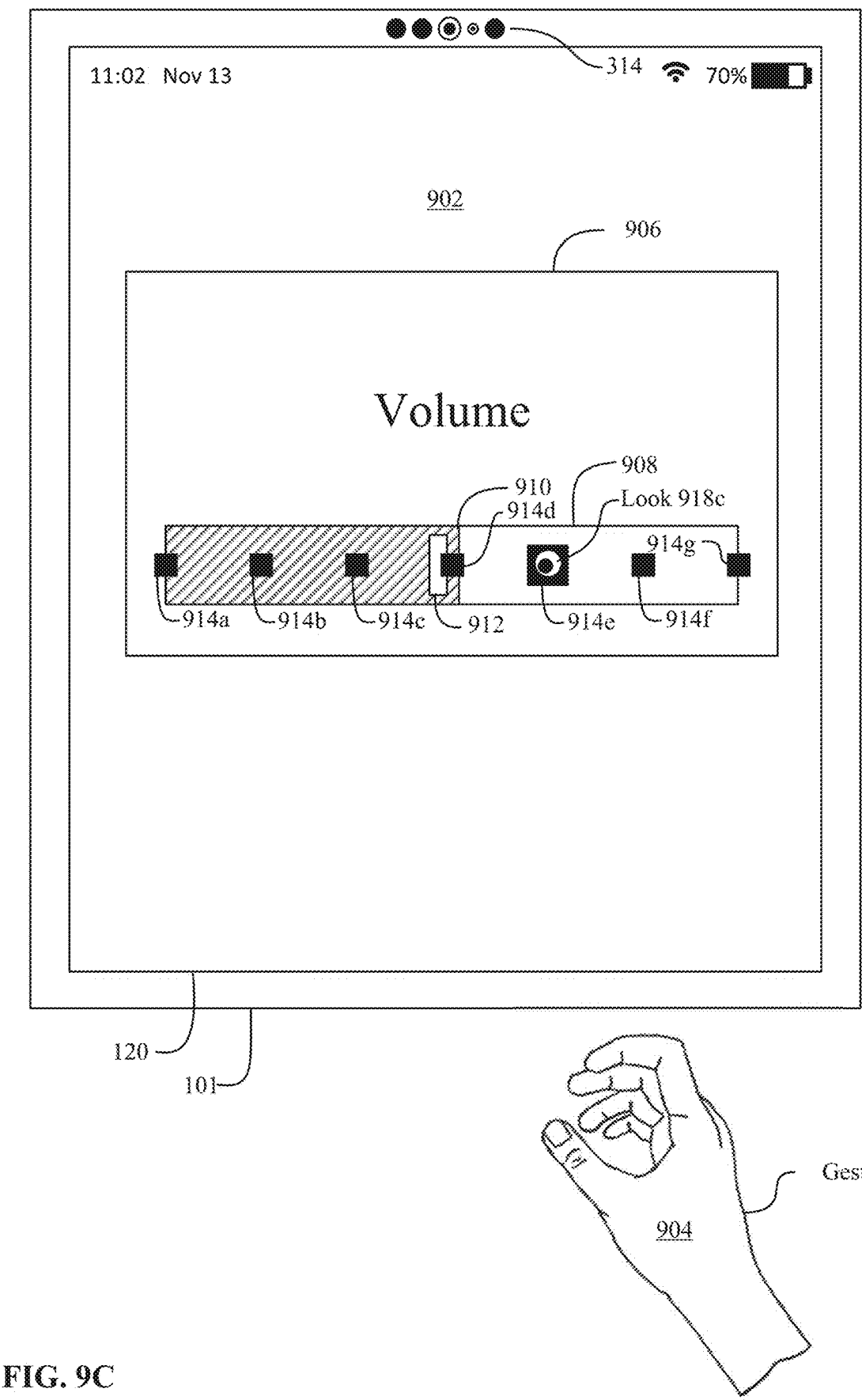
Figure 9D:
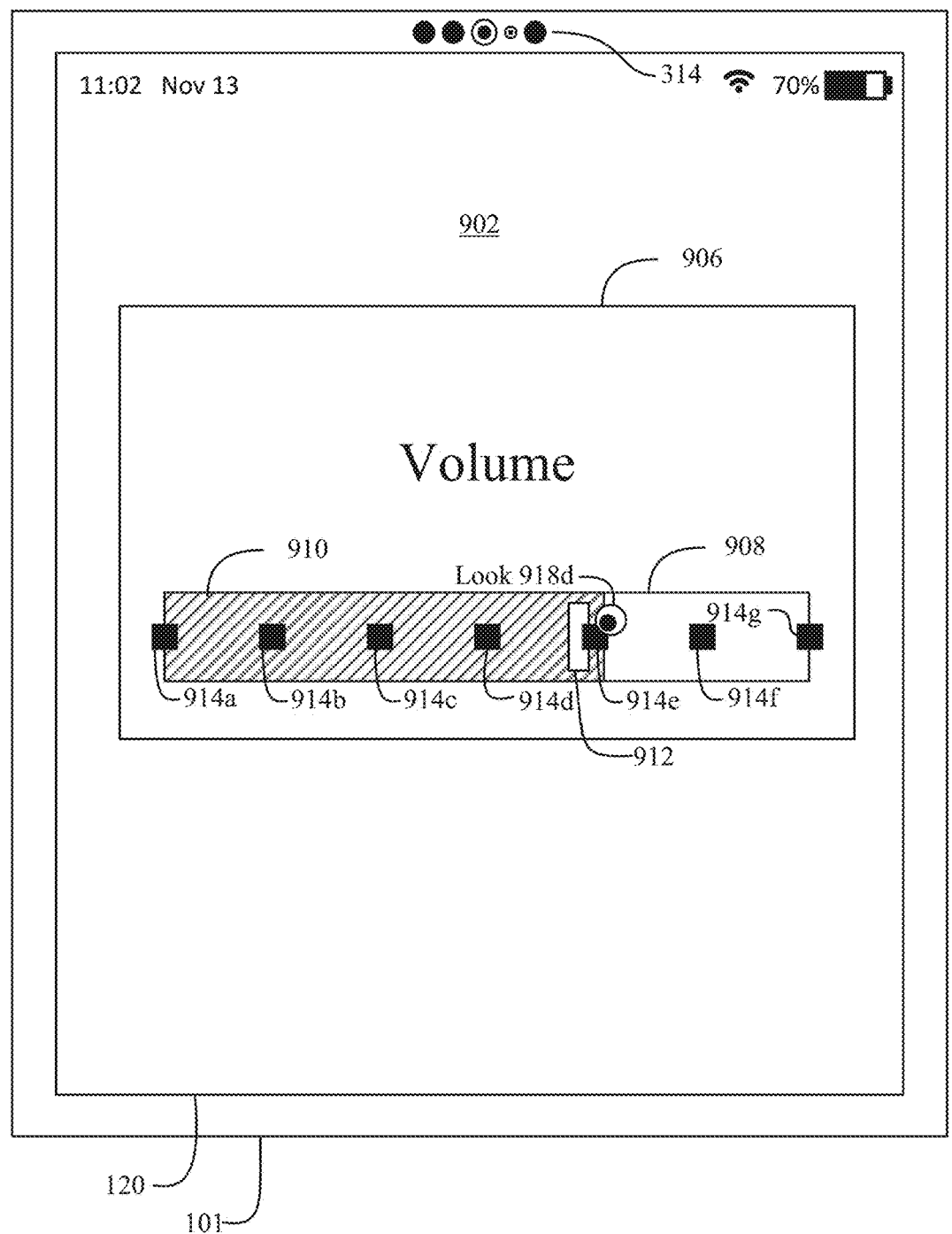

In some embodiments, the electronic device 101 updates the current input state of the slider user interface element 908 and moves the indication 910 of the current input state of the slider user interface element 908 in response to detecting selection of one of the indications 914a-g of other input states of the slider, as shown in FIGS. 9C-9D. FIG. 9C illustrates the electronic device 101 detecting selection of one of the indications 914e of an input state of the slider user interface element 908. For example, in some embodiments, while displaying the slider user interface element 908, the electronic device 101 detects the gaze 918c of the user directed to one of the indications 914e of an input state of the slider user interface element 908. In response to detecting the gaze 908c of the user directed to the indication 914e, the electronic device 101 gradually increases the size of indication 914e.

Once the gaze 918c has been detected for a predetermined threshold time (e.g., 0.1, 0.2, 0.5, 1, 5, 10, 30, etc. seconds), the electronic device 101 updates the current input state and the indication 910 of the current input state of the slider user interface element 908 to be a location corresponding to indication 914e, as shown in FIG. 9D. In some embodiments, while the gaze 918c of the user has been directed to the indication 914e for less than the threshold period of time, the electronic device 101 detects the user performing the pinch gesture with their hand 904. In some embodiments, in response to detecting the pinch gesture performed by the hand 904 of the user while the gaze 918c of the user is directed to indication 914e, the electronic device 101 updates the current input state of the slider to correspond to indication 914e as shown in FIG. 9D irrespective of how long the gaze 918c has been detected on indication 914e.

In some embodiments, while displaying the indication 914e at a larger size than the other indications 914a-d and 914f-g in response to detecting the gaze 918c of the user directed to indication 914e in FIG. 9C for less than the threshold time, the electronic device 101 detects the user's gaze on a different one of the indications 914a-d or 914f-g. For example, the electronic device 101 detects the user's gaze directed towards indication 914f. In this example, in response to detecting the gaze of the user directed towards indication 914f, the electronic device 101 updates indication 914e to be the same size as indications 914a-d and 914g that the user is not looking at, and gradually increases the size of indication 914f In some embodiments, the electronic device 101 updates the current input state of the slider to correspond to the indication 914f in response to the gaze continuing to be directed to the indication 914f (e.g., for the previously described time threshold) or in response to detecting the pinch gesture while the gaze is held on indication 914f irrespective of whether the gaze was held for the time threshold, as described above. It should be understood that the electronic device 101 behaves similarly in response to detecting the gaze of the user on any other indications 914a-d and 914g.

Figure 9E:
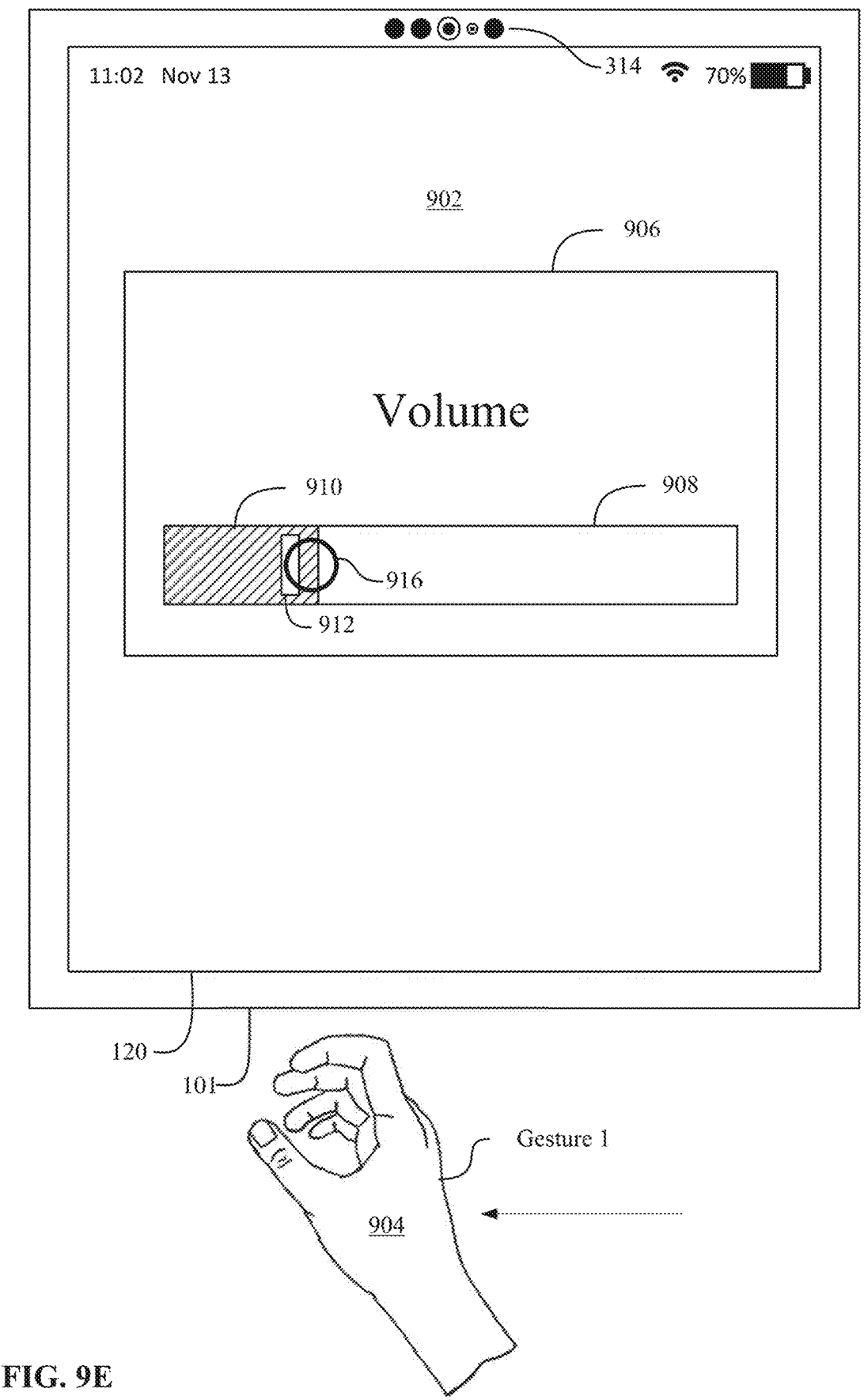
Figure 10A:
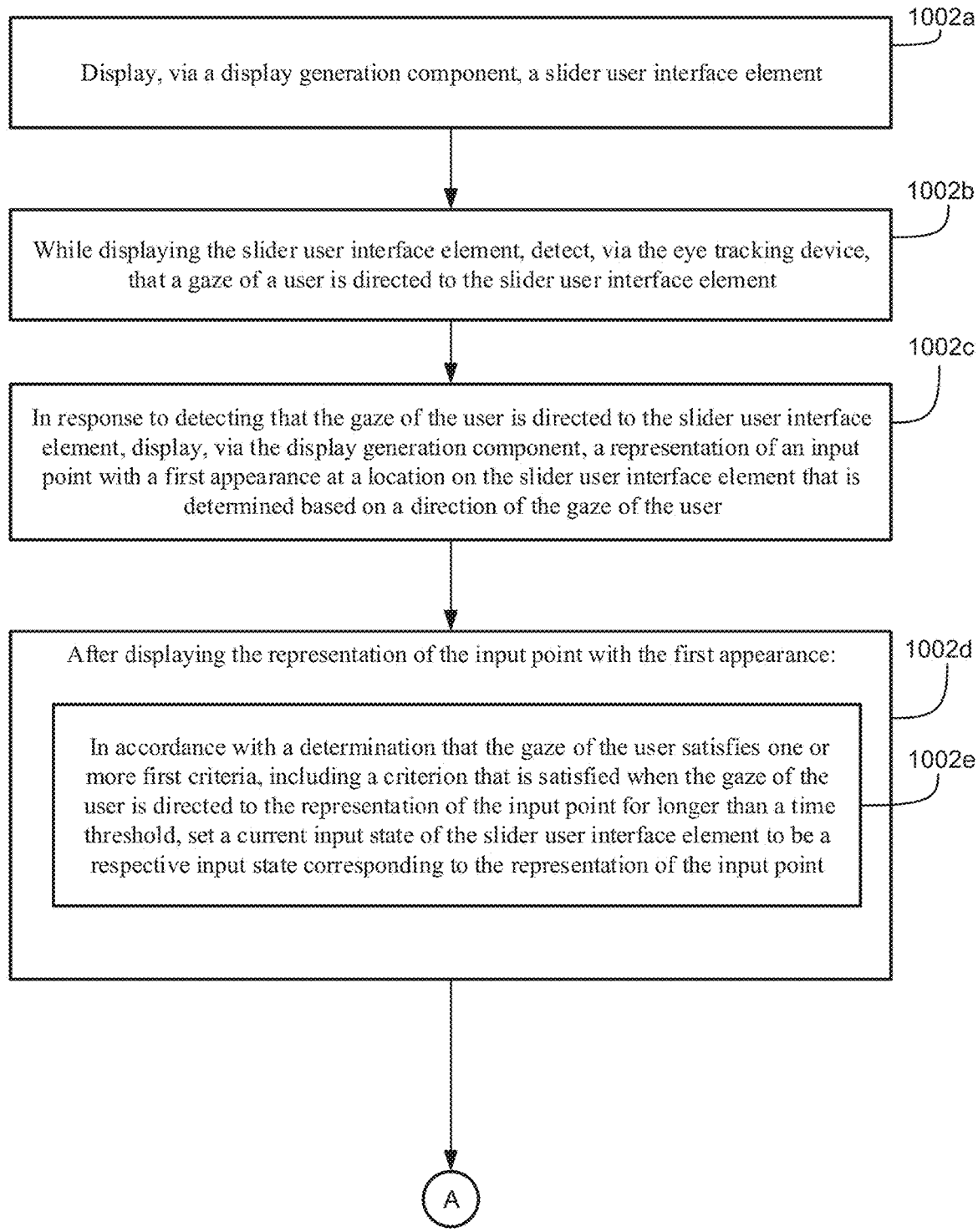
FIGS. 10A-10J is a flowchart illustrating a method of enhancing interactions with slider user interface elements in accordance with some embodiments.
Figure 10B:
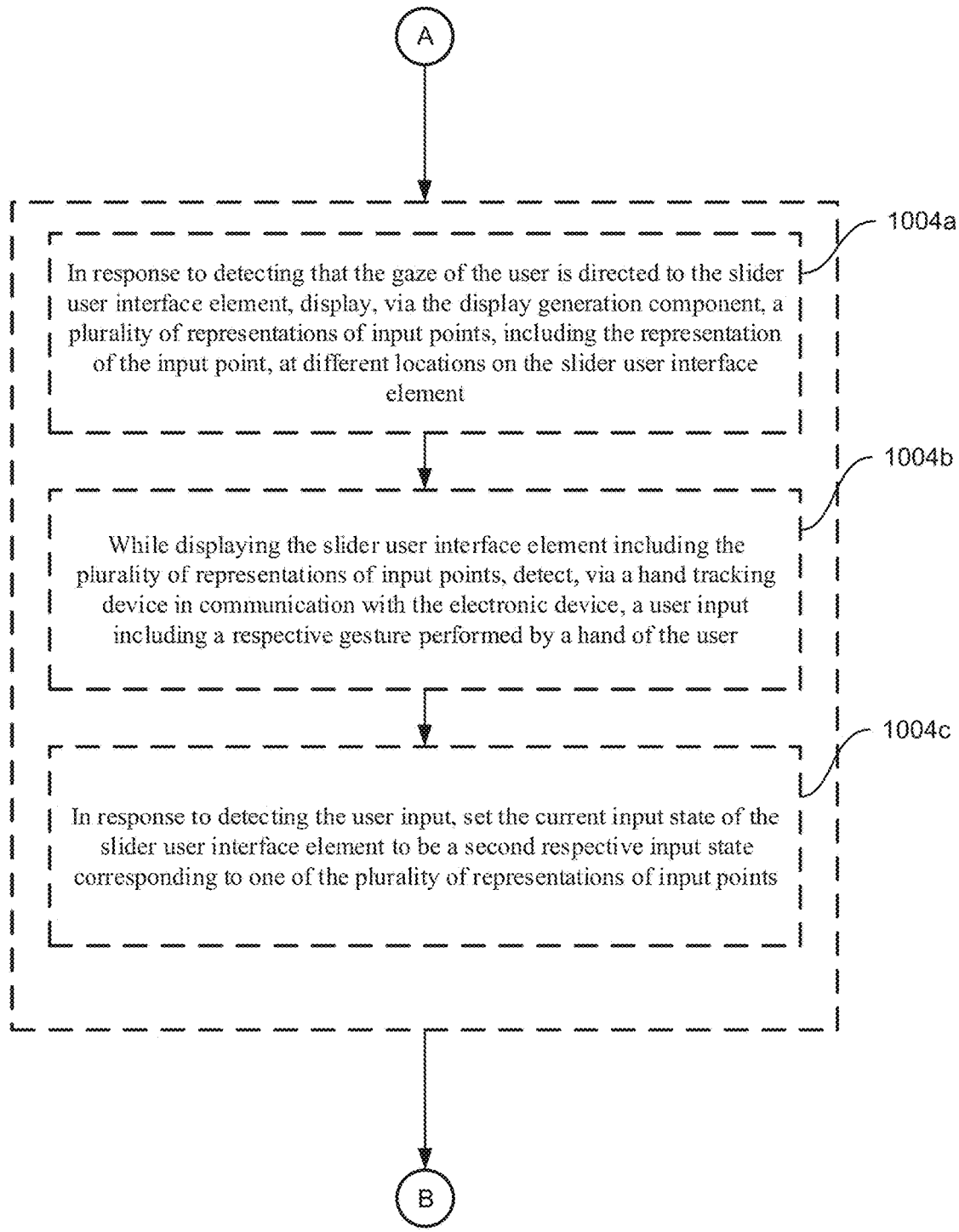
Figure 10C:
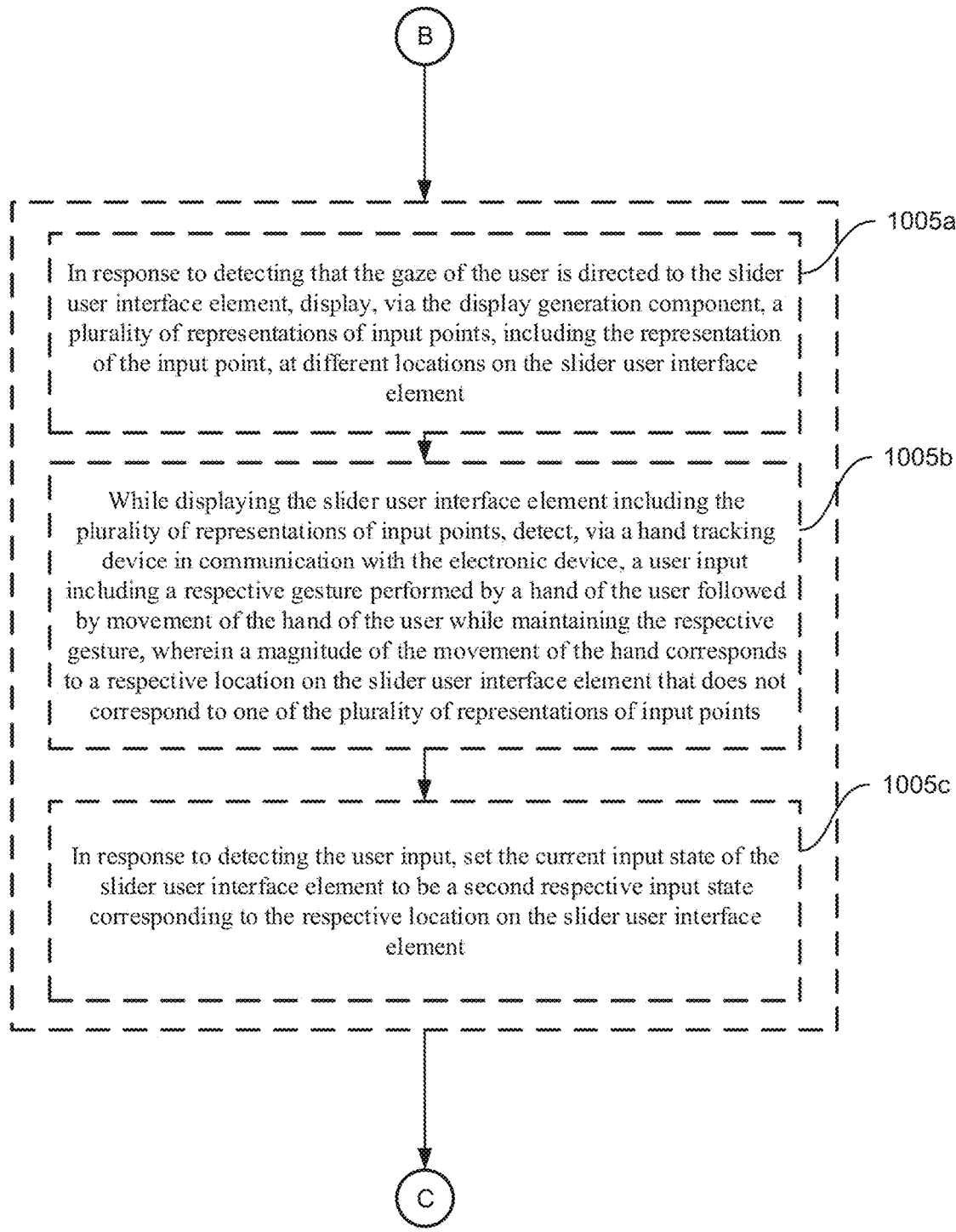
Figure 10D:
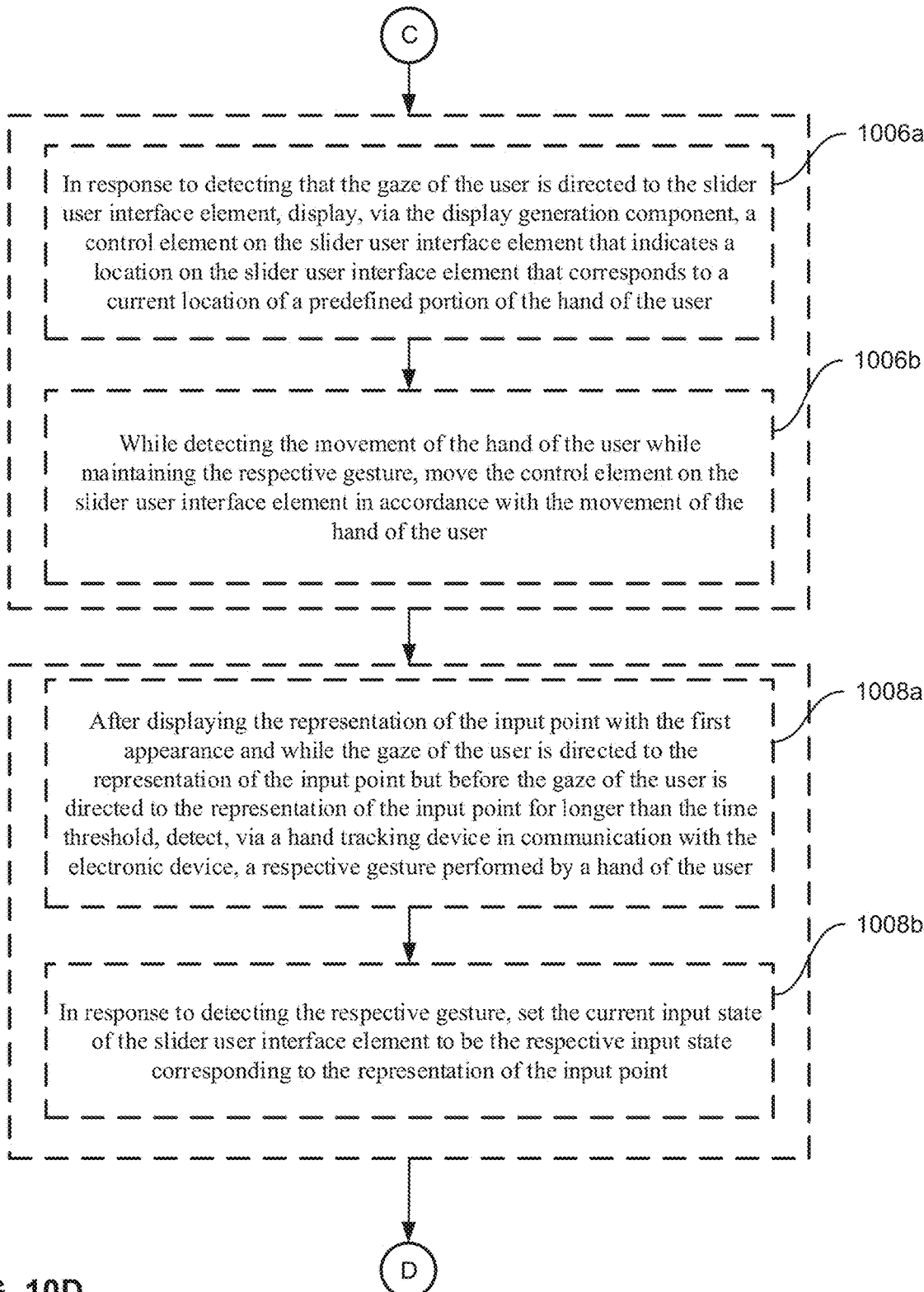
Figure 10E:
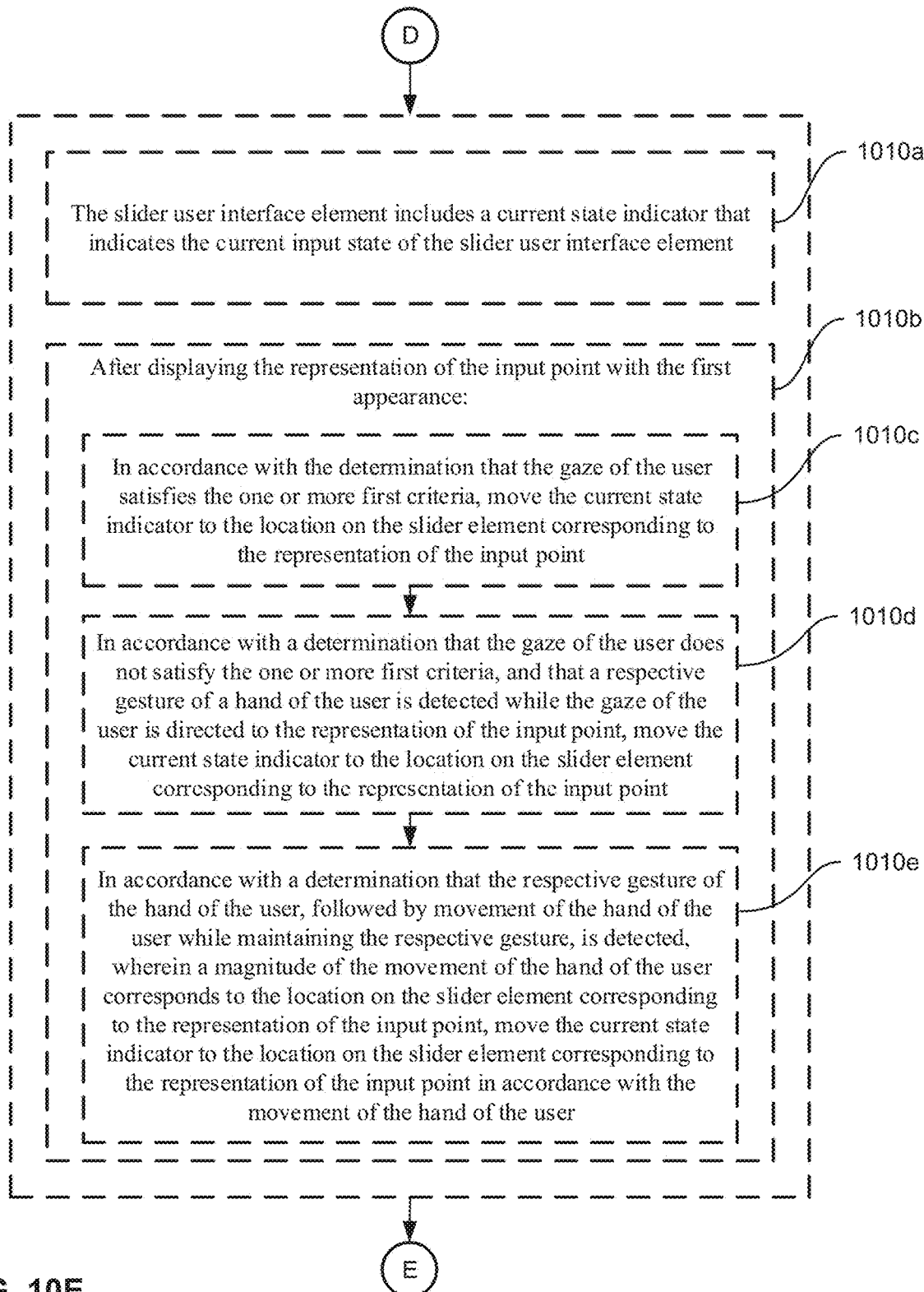
Figure 10F:
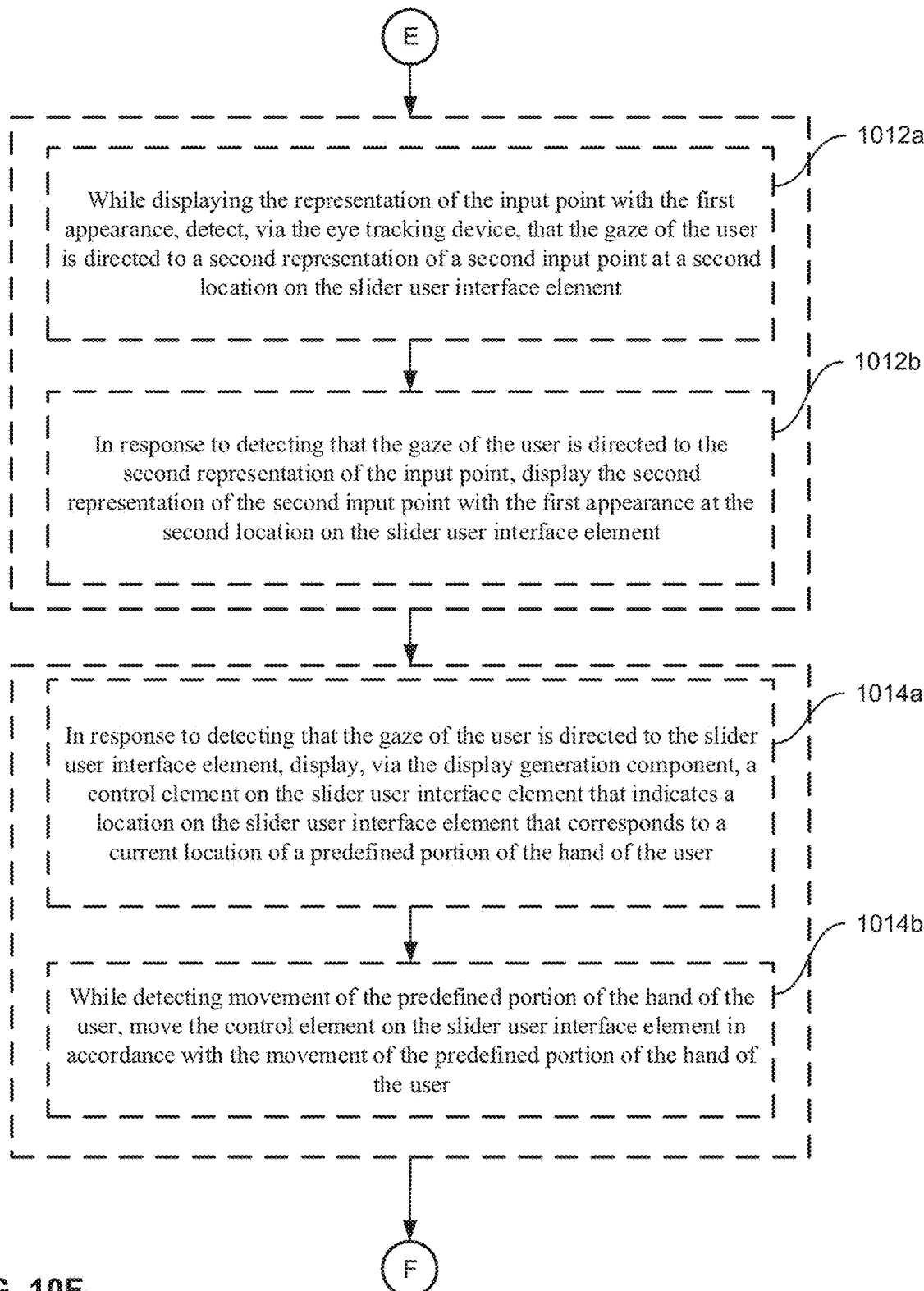
Figure 10G:
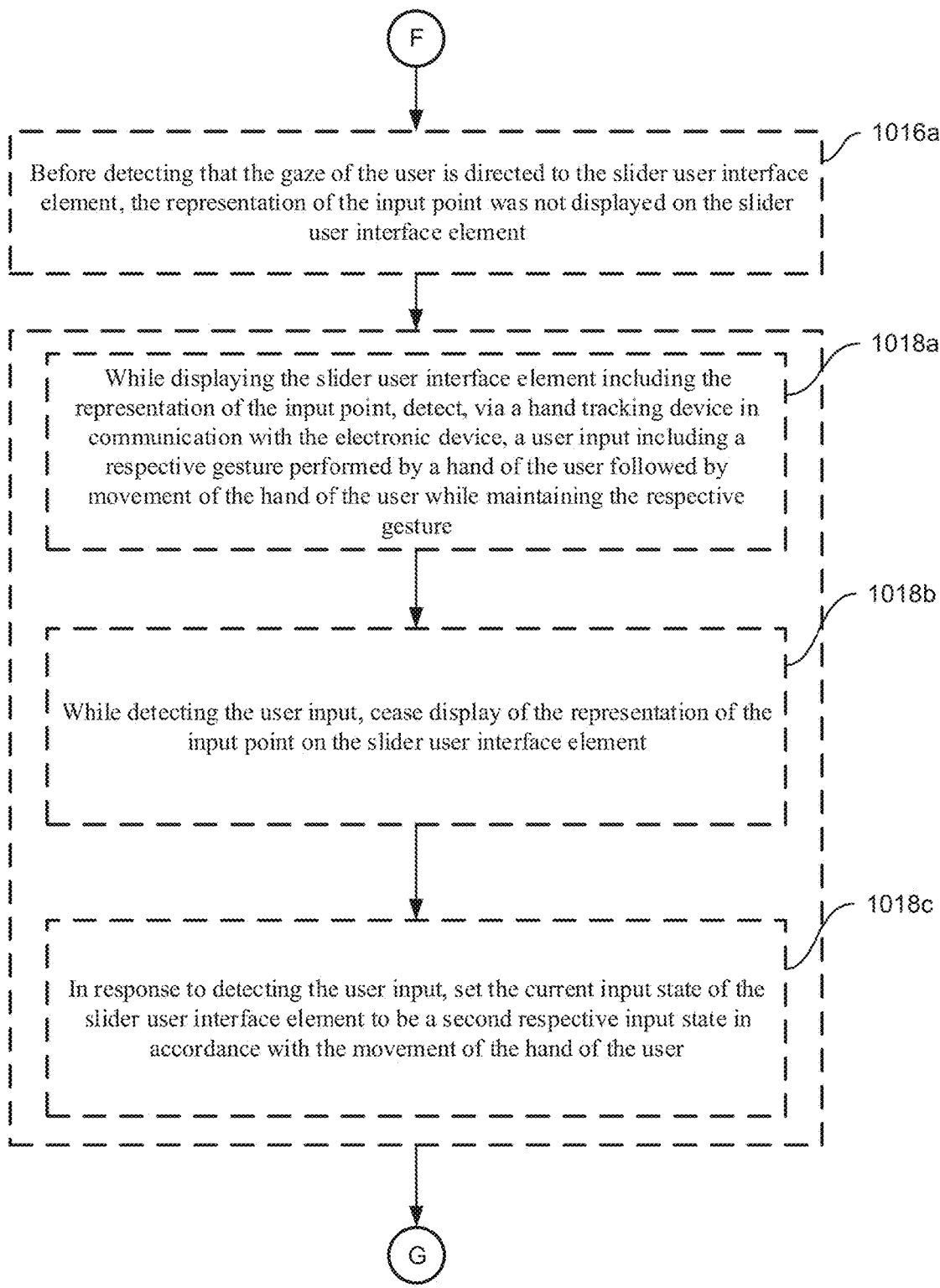
Figure 10H:
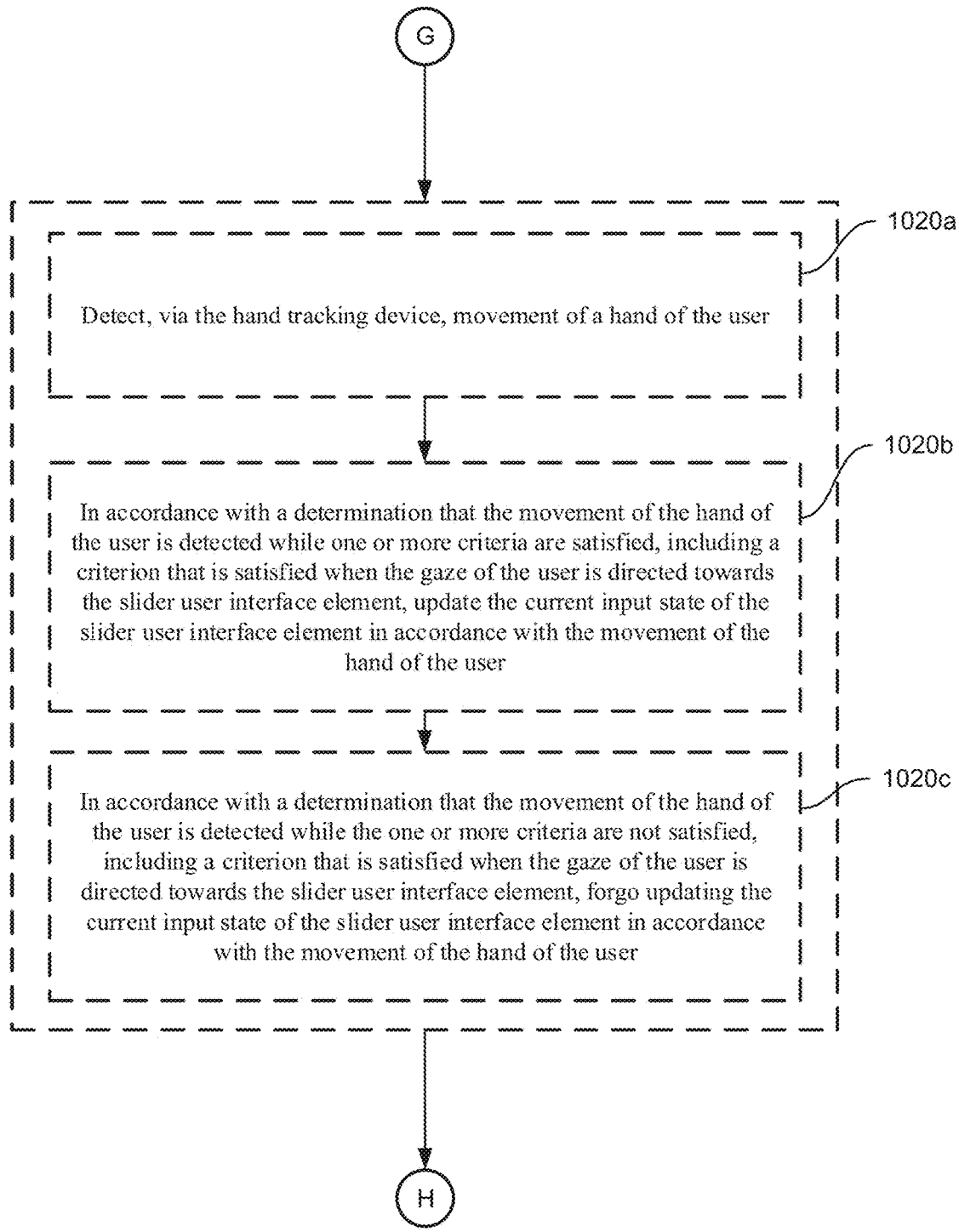
Figure 10I:
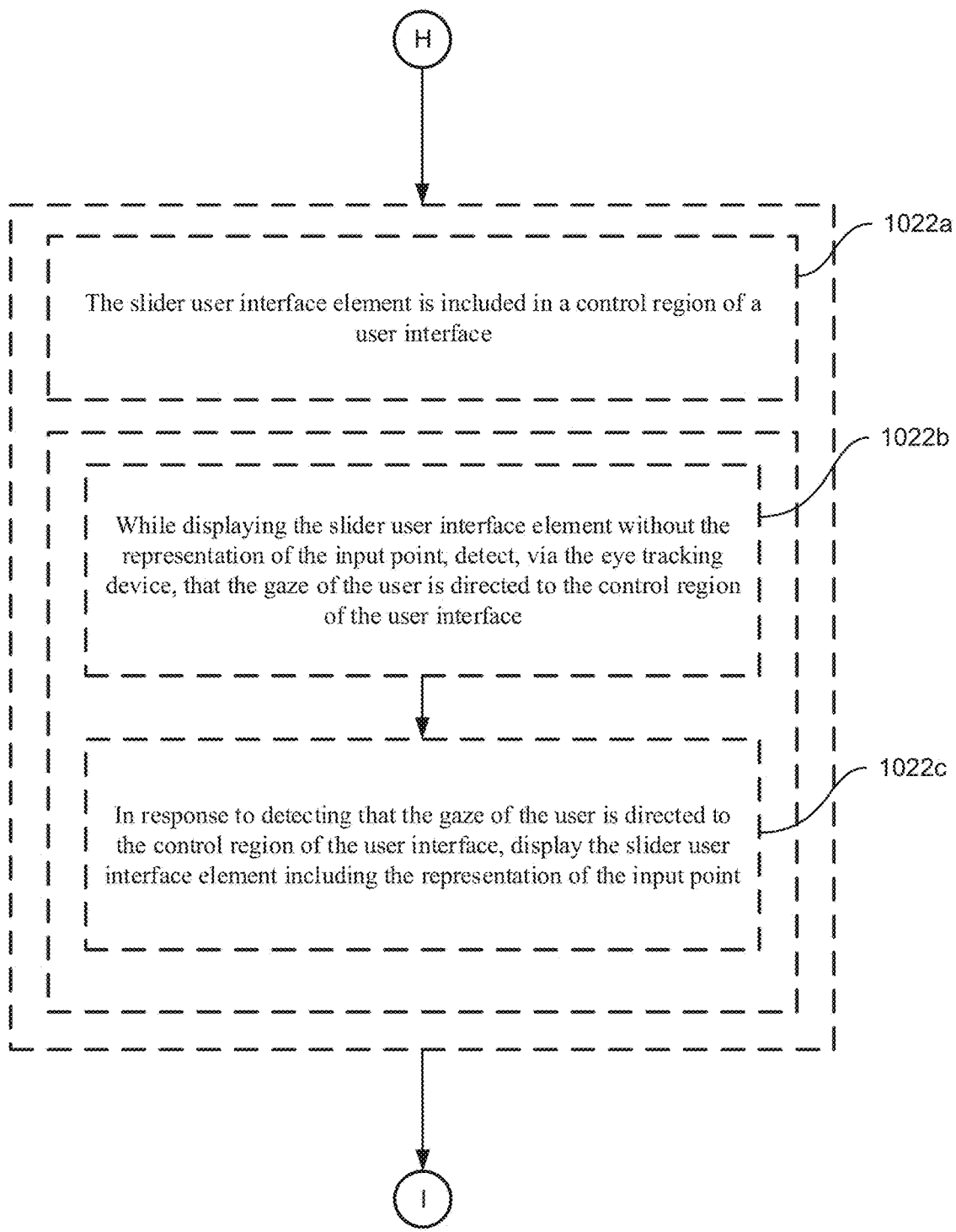
Figure 10J:
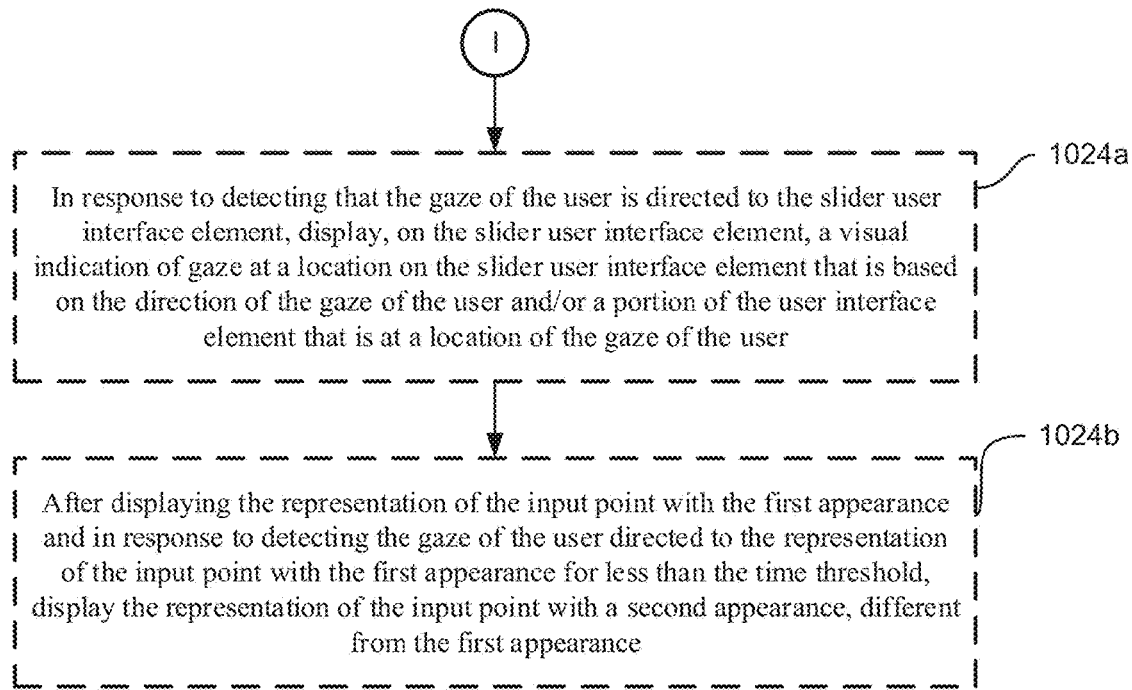

FIG. 9E illustrates the user updating the current input state of slider user interface element 908 while the electronic device 101 displays cursor 916. As described above with reference to FIG. 9B, the electronic device 101 updates the position of cursor 916 along slider user interface element 908 accordance with movement of the hand 904 of the user while maintaining the pinch gesture in response to detecting the pinch gesture while the gaze of the user was directed to the end 912 of the slider user interface element 908, as shown in FIG. 9B. In FIG. 9E, the electronic device 101 moves the indicator 910 of the current input state of slider user interface element 908 with cursor 916 in accordance with movement of the hand 904 of the user while maintaining the pinch gesture. In some embodiments, the electronic device 101 ceases display of indication 914a-g illustrated in FIGS. 9B-9D in response to detecting the pinch gesture. In some embodiments, the indications 914a-g continue to be displayed while the user manipulates the current input state indicator 910 of slider user interface element 908 with movement of the hand 904 while maintaining the pinch gesture.

In some embodiments, in response to detecting the user ceasing to perform the pinch gesture with their hand 904, the electronic device 101 updates the current input state of the slider user interface element 908 to the value corresponding to the position of the indicator 910 of the current input state of the slider user interface element 908 when the pinch gesture was ceased. For example, in response to detecting the user ceasing to perform the pinch gesture while displaying the slider user interface element 908 as shown in FIG. 9E, the electronic device 101 would update the current input state of the slider user interface element 908 to the position of the indicator 910 illustrated in FIG. 9E and maintain display of the indicator 910 as shown in FIG. 9E.

FIGS. 10A-10J is a flowchart illustrating a method of enhancing interactions with slider user interface elements in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, such as in FIG. 9A, method 1000 is performed at an electronic device in communication with a display generation component and an eye tracking device (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the eye tracking device is a camera and/or a motion sensor capable of determining the direction and/or location of the user's gaze. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 9A, the electronic device (e.g., 101) displays (1002a), via the display generation component 120, a slider user interface element (e.g., 908). In some embodiments, the slider user interface element includes a current representation of the input point corresponding to a current input state of the slider user interface element and a respective representation of the input point that corresponds to a respective input state of the slider different form the current input state of the slider (or a plurality of respective representations of input points each corresponding to a respective input state. In some embodiments, the electronic device initially displays the slider user interface element with a slider bar at the position corresponding to the current input state without displaying the respective representation of the input point. In some embodiments, the electronic device displays the respective representation of the input point in accordance with a determination that one or more first criteria are met. The one or more first criteria optionally include a criterion that is satisfied in response to detecting, via an eye tracking device, that the user looks at the slider user interface element; in some embodiments, in response to detecting that the user looks at the slider user interface element for longer than a predetermined period of time (e.g., 01, 0.2, 0.3, 0.4 seconds, etc.). In some embodiments, while displaying the slider user interface element with the current representation of the input point and the respective representation of the input point, the electronic device displays the slider user interface element with a plurality of respective representations of input points at various locations along the length of the slider user interface element (e.g., at various predetermined input positions along the slider, such as 10%, 20%, 30%, etc. positions along the slider). In some embodiments, the respective representation of the input point is a marking displayed overlaid on the slider user interface element. For example, the slider user interface element includes a slider bar extending from one end of the slider to the respective location corresponding to the current input state of the slider user interface element, and the respective representation of the input point is displayed overlaid on the slider bar or overlaid on a portion of the slider user interface element other than the slider bar. In some embodiments, while the gaze of the user is not coincident with the respective representation of the input point, the respective representation of the input point is displayed at a first size, first color and/or with a first transparency.

In some embodiments, while displaying the slider user interface element (e.g., 908), the electronic device (e.g., 101) detects (1002b), via the eye tracking device, that a gaze (e.g., 918b) of a user is directed to the slider user interface element (e.g., 908), such as in FIG. 9B. In some embodiments, the gaze of the user is detected, by the eye tracking device, as being directed to the slider user interface element. In some embodiments, the electronic device detects, via the eye tracking device, that the gaze of the user is directed to the slider user interface element for a period of time between a first time threshold (e.g., 0.02, 0.05, 0.1, 0.2, 0.25, 0.3, 0.5, seconds, etc.) and a second time threshold greater than the first time threshold (e.g., by 0.02, 0.05, 0.1, 0.2, 0.25, 0.3, 0.5, seconds, etc.).

In some embodiments, such as in FIG. 9B, in response to detecting that the gaze (e.g., 918b) of the user is directed to the slider user interface element (e.g., 908), the electronic device (e.g., 101) displays (1002c), via the display generation component, a representation (e.g., 914e) of an input point with a first appearance at a location on the slider user interface element (e.g., 908) that is determined based on a direction of the gaze of the user (e.g., initially displaying the representation of the input point with the first appearance or changing the appearance of the representation of the input point from a prior appearance to the first appearance that is different from the first appearance). In some embodiments, the representation of the input point is one of a plurality of a respective locations along the slider corresponding to a respective input state of the slider. In some embodiments, the electronic device displays visual indications of the respective locations along the slider corresponding to the respective input states of the slider. In some embodiments, the visual indications are displayed in response to detecting the gaze of the user on the slider user interface element. In some embodiments, the representation of the input point is an indication of the current input state of the slider. In some embodiments, the electronic device updates (e.g., a size, color, opacity, etc. of or adds an additional visual indication to) the indication of the current input state of the slider in response to detecting the gaze of the user on the slider user interface element and/or on the indication of the current input state of the slider. In some embodiments, updating the respective representation of the input point includes one or more of updating a size, color, translucency, and/or opacity or updating the virtual layer of the user interface in which the respective representation of the input point is displayed (e.g., popping the respective representation of the input point out in front of the remainder of the slider element and/or other respective representations of input points).

In some embodiments, after displaying the representation of the input point (e.g., 914e) with the first appearance (1002d), such as in FIG. 9B, in accordance with a determination that the gaze (e.g., 918c) of the user satisfies one or more first criteria, including a criterion that is satisfied when the gaze (e.g., 918c) of the user is directed to the representation (e.g., 914e) of the input point for longer than a time threshold, such as in FIG. 9C (e.g., the second time threshold, such as 0.02, 0.05, 0.1, 0.2, 0.25, 0.3, 0.5, 0.6, 1 second, etc.), the electronic device (e.g., 101) sets (1002e) a current input state of the slider user interface element (e.g., 908) to be a respective input state corresponding to the representation (e.g., 914e) of the input point, such as in FIG. 9D. In some embodiments, the electronic device sets the current input state of the slider user interface element to the respective input state corresponding to the respective representation of the input point in accordance with the determination that the gaze of the user satisfies the one or more first criteria without an additional input corresponding to a request to update the slider (e.g., without an input detected via the hand tracking device). In some embodiments, setting the current input state of the slider user interface element to the respective input state corresponding to the respective representation of the input point includes updating the slider user interface element to display the slider bar with a location corresponding to the respective input state (rather than the previous input state). In some embodiments, in accordance with a determination that the gaze of the user does not satisfy the one or more criteria, the electronic device forgoes updating the current input state of the slider.

The above-described manner of updating the respective representation of the input point to have the second appearance in response to detecting that the gaze of the user is directed to the respective representation of the input point and setting the current input state of the slider user interface element to the respective input state in accordance with the determination that the gaze of the user satisfies the one or more first criteria provides for an efficient way of providing feedback to the user that their gaze will cause and/or actually causes the input state of the slider to change, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 9B, in response to detecting that the gaze (e.g., 918) of the user is directed to the slider user interface element (e.g., 908), the electronic device (e.g., 101) displays (1004a), via the display generation component, a plurality of representations (e.g., 914a-g) of input points, including the representation (e.g., 914e) of the input point, at different locations on the slider user interface element. In some embodiments, the representations of input points each correspond to a respective input state of the slider. In some embodiments, the slider includes additional input states between the visual indicators. In some embodiments, the slider does not include additional input states between the visual indicators (e.g., all possible input states are marked with an indicator). In some embodiments, while displaying the slider user interface element including the plurality of representations (e.g., 914*a*-914*g*) of input points, such as in FIG. 9B (e.g., and while the gaze of the user is directed to the slider user interface element), the electronic device (e.g., 101) detects (1004*b*), via a hand tracking device in communication with the electronic device, a user input including a respective gesture performed by a hand (e.g., 704) of the user, such as in FIG. 9B. In some embodiments, the gesture is followed by movement of the hand of the user while maintaining the respective gesture, wherein a magnitude of the movement of the hand corresponds to a respective location on the slider user interface element that does not correspond to one of the plurality of representations of input points. In some embodiments, the respective gesture performed by the hand is the user touching a thumb to another finger (e.g., index, middle, ring, little finger) on the same hand as the thumb. In some embodiments, the electronic device detects the user holding their thumb to their finger while moving their hand and/or arm in a direction along with the indicators are oriented. For example, the electronic device detects horizontal movement of the hand to change the input state of a horizontal slider. In some embodiments, the electronic device updates the current input state of the slider in accordance with the magnitude and/or speed and/or duration of the movement. For example, in response to detecting the user moving their hand a first amount, the electronic device moves the indication of the current input state of the slider by a second amount and if the user moves their hand a third amount, the electronic device moves the indication of the current input state of the slider by a fourth amount. In some embodiments, such as in FIG. 9D, in response to detecting the user input, the electronic device (e.g., 101) sets (1004*c*) the current input state of the slider user interface element (e.g., 908) to be a second respective input state corresponding to one of the plurality of representations of input points. In some embodiments, the representation of the input point corresponding to the second respective input state is the representation of the input point that is closest to the respective location corresponding to the magnitude of movement of the hand. In some embodiments, the slider includes a visual indicator that is positioned at a location along the slider that corresponds to the current input state of the slider. In some embodiments, in response to detecting that the location on the slider corresponding to the movement of the hand of the user does not correspond to one of the representations of input points, the electronic device moves the current input state of the slider to the representation of the input point closest to the location corresponding to the movement of the hand.

The above-described manner of setting the current input state of the slider to an input state corresponding to a representation of the input point in response to the user's movement that corresponds to a location that does not include a representation of the input point provides an efficient way of selecting an input state corresponding to an representation of the input point, which additionally reduces power usage and improves battery life of the electronic device by enabling the user to use the electronic device more quickly and efficiently, while reducing errors in usage.

In some embodiments, in response to detecting that the gaze (e.g., 918) of the user is directed to the slider user interface element (e.g., 908), the electronic device (e.g., 101) displays (1005*a*), via the display generation component, a plurality of representations (e.g., 914*a*-*g*) of input points, including the representation (e.g., 914*e*) of the input point, at different locations on the slider user interface element (e.g., 908), such as in FIG. 9B. In some embodiments, the representations of input points each correspond to a respective input state of the slider. In some embodiments, the slider includes additional input states between the visual indicators. In some embodiments, the slider does not include additional input states between the visual indicators (e.g., all possible input states are marked with an indicator). In some embodiments, while displaying the slider user interface element (e.g., 908) including the plurality of representations (e.g., 914*a*-*g*) of input points (e.g., and while the gaze of the user is directed to the slider user interface element), such as in FIG. 9B, the electronic device (e.g., 101) detects (1005*b*), via a hand tracking device in communication with the electronic device, a user input including a respective gesture performed by a hand (e.g., 904) of the user followed by movement of the hand (e.g., 904) of the user while maintaining the respective gesture, such as in FIG. 9B, wherein a magnitude of the movement of the hand (e.g., 904) corresponds to a respective location on the slider user interface element (e.g., 908) that does not correspond to one of the plurality of representations (e.g., 914*a*-*g*) of input points. In some embodiments, the respective gesture performed by the hand is the user touching a thumb to another finger (e.g., index, middle, ring, little finger) on the same hand as the thumb. In some embodiments, the electronic device detects the user holding their thumb to their finger while moving their hand and/or arm in a direction along with the indicators are oriented. For example, the electronic device detects horizontal movement of the hand to change the input state of a horizontal slider. In some embodiments, the electronic device updates the current input state of the slider in accordance with the magnitude and/or speed and/or duration of the movement. For example, in response to detecting the user moving their hand a first amount, the electronic device moves the indication of the current input state of the slider by a second amount and if the user moves their hand a third amount, the electronic device moves the indication of the current input state of the slider by a fourth amount. In some embodiments, while detecting the gesture and movement of the hand, the electronic device ceases display of the plurality of representations of input points. In some embodiments, such as in FIG. 9E, in response to detecting the user input, the electronic device (e.g., 101) sets (1005*c*) the current input state of the slider user interface element (e.g., 908) to be a second respective input state corresponding to the respective location on the slider user interface element (e.g., 908). In some embodiments, the second respective input state does not correspond to one of the plurality of representations of input points. Thus, in some embodiments, a user is able to set the current input state of the slider to be any state within the slider when using a hand gesture as described above. In some embodiments, the second respective input state of the slider user interface element is based on the location of the gaze of the user when the predetermined hand gesture was detected and the direction, distance, speed of movement of the user's hand while maintaining the predetermined gesture.

The above-described manner of setting the current input state to a location corresponding to the user's hand movement that does not correspond to one of the plurality of representations of input points efficiently provides the user with the ability to fine-tune the input state of the slider to an input state between or otherwise not corresponding to the plurality of representations of input points, which additionally reduces power usage and improves battery life of the electronic device by enabling the user to use the electronic device more quickly and efficiently, while reducing errors in usage.

In some embodiments, such as in FIG. 9B, in response to detecting that the gaze (e.g., 918b) of the user is directed to the slider user interface element, the electronic device displays (1006a), via the display generation component, a control element (e.g., 916) (e.g., a cursor) on the slider user interface element (e.g., 908) that indicates a location on the slider user interface element (e.g., 908) that corresponds to a current location of a predefined portion (e.g., one or more of the user's fingers and/or the user's thumb) of the hand (e.g., 904) of the user. In some embodiments, the electronic device initially places the cursor at a location corresponding to the location of the user's hand. For example, if the hand of the user is to the left of a predetermined region of the three-dimensional environment in which the slider is displayed, the electronic device displays the cursor to the left of the current input state of the slider. As another example, if the hand of the user is to the right of the predetermined region, the electronic device displays the cursor to the right of the current input state of the slider. In some embodiments, the electronic device displays the cursor in response to detecting, via a hand tracking device, the user performing a predetermined gesture (e.g., touching a thumb to another finger (e.g., index, middle, ring, little finger) on the same hand as the thumb. In some embodiments, such as in FIG. 9E, while detecting the movement of the hand (e.g., 904) of the user while maintaining the respective gesture, the electronic device (e.g., 101) moves (1006b) the control element (e.g., 916) on the slider user interface element (e.g., 908) in accordance with the movement of the hand (e.g., 904) of the user. In some embodiments, the electronic device moves the cursor in accordance with movement of the hand in the dimension along which the slider is oriented. For example, in response to detecting movement of the hand upwards and to the right, the electronic device would update the current input state of a horizontal slider by moving it to the right or would update the current input state of a vertical slider by moving it up. In some embodiments, the electronic device moves the cursor without updating the current input state in response to detecting movement of the hand without detecting the hand is performing a predetermined gesture (e.g., touching a thumb to another finger (e.g., index, middle, ring, little finger) on the same hand as the thumb).

The above-described manner of displaying and updating the control element of the slider provides an efficient way of indicating to the user how the input state of the slider will be updated in response to hand detection-based input, which additionally reduces power usage and improves battery life of the electronic device by enabling the user to use the electronic device more quickly and efficiently, while reducing errors in usage.

In some embodiments, such as in FIG. 9B after displaying the representation (e.g., 914e) of the input point with the first appearance and while the gaze (e.g., 918c) of the user is directed to the representation (e.g., 914e) of the input point but before the gaze (e.g., 918c) of the user is directed to the representation (e.g., 914e) of the input point for longer than the time threshold (0.02, 0.05, 0.1, 0.2, 0.25, 0.3, 0.5, 0.6, 1 second, etc.), such as in FIG. 9C, the electronic device (e.g., 101) detects (1008a), via a hand tracking device in communication with the electronic device, a respective gesture performed by a hand (e.g., 904) of the user, such as in FIG. 9C (e.g., touching a thumb to another finger (e.g., index, middle, ring, little finger) on the same hand as the thumb, extending one or more fingers towards the slider user interface element). In some embodiments, such as in FIG. 9D, in response to detecting the respective gesture, the electronic device (e.g., 101) sets (1008b) the current input state of the slider user interface element (e.g., 908) to be the respective input state corresponding to the representation (e.g., 914e) of the input point (e.g., before the gaze of the user has been directed to the representation of the input point for the threshold amount of time (0.02, 0.05, 0.1, 0.2, 0.25, 0.3, 0.5, 0.6, 1 second, etc.). In some embodiments, the electronic device sets the current input state of the slider user interface element to be the respective input state corresponding to the respective representation of the input point in response to detecting the gesture while the gaze of the user is directed to the respective representation of the input point. In some embodiments, the electronic device updates the input state of the slider in response to detecting, via the hand tracking device, that the hand of the user is at a predetermined location and/or performs a predetermined gesture. For example, the predetermined location corresponds to the virtual location at which the slider user interface element and/or the respective representation of the input point is displayed in the user interface. As another example, the predetermined gesture is the user tapping their thumb and a finger (e.g., index finger, middle finger, ring finger, little finger) together. In some embodiments, in accordance with a determination that the one or more first criteria are not satisfied and/or the electronic device does not detect the gesture, the electronic device forgoes updating the current input state of the slider user interface element.

The above-described manner of updating the input state of the slider before the threshold time has been reached in response to the gesture provides an efficient way of interacting with the slider in less time than the threshold time which additionally reduces power usage and improves battery life of the electronic device by enabling the user to use the electronic device more quickly and efficiently, while reducing errors in usage.

In some embodiments, such as in FIG. 9Am the slider user interface element (e.g., 908) includes a current state indicator (e.g., 910) that indicates the current input state of the slider user interface element (e.g., 908) (1010a). In some embodiments, the slider includes a bar with one end aligned with an end of the slider and another end (e.g., the current state indicator) aligned with the current input state of the slider. In some embodiments, the indicator is a visual indication displayed at a location corresponding to the current input state of the slider. In some embodiments, after displaying the representation (e.g., 914e) of the input point with the first appearance (1010b), such as in FIG. 9B, in accordance with the determination that the gaze (e.g., 918c) of the user satisfies the one or more first criteria (e.g., the gaze is held on the representation of the input point for a threshold amount of time (e.g., 0.02, 0.05, 0.1, 0.2, 0.25, 0.3, 0.5, 0.6, 1 second, etc.)), such as in FIG. 9C, the electronic device (e.g., 101) moves (1010c) the current state indicator (e.g., 910) to the location on the slider user interface element (e.g., 908) corresponding to the representation (e.g., 914e) of the input point, such as in FIG. 9D. In some embodiments, after displaying the representation (e.g., 914e) of the input point with the first appearance (1010b), such as in FIG. 9B, in accordance with a determination that the gaze (e.g., 918c) of the user does not satisfy the one or more first criteria, and that a respective gesture of a hand (e.g., 904) of the user is detected (e.g., via a hand tracking device) while the gaze (e.g., 918*c*) of the user is directed to the representation (e.g., 914*e*) of the input point, such as in FIG. 9C, the electronic device (e.g., 101) moves (1010*d*) the current state indicator (e.g., 910) to the location on the slider user interface element (e.g., 908) corresponding to the representation (e.g., 914*e*) of the input point, such as in FIG. 9D. In some embodiments, the electronic device moves the current state indicator to the location on the slider element corresponding to the representation of the input point in response to detecting the gesture of the hand while the gaze has been held for less than the threshold amount of time (e.g., 0.02, 0.05, 0.1, 0.2, 0.25, 0.3, 0.5, 0.6, 1 second, etc.). In some embodiments, the gesture includes the user touching a thumb to another finger (e.g., index, middle, ring, little finger) on the same hand as the thumb. In some embodiments, after displaying the representation (e.g., 914*e*) of the input point with the first appearance (1010*b*), such as in FIG. 9B, in accordance with a determination that the respective gesture of the hand (e.g., 904) of the user, followed by movement of the hand of the user while maintaining the respective gesture, is detected (e.g., via a hand tracking device), wherein a magnitude of the movement (e.g., distance, speed, duration) of the hand (e.g., 904) of the user corresponds to the location on the slider user interface element (e.g., 908) corresponding to the representation (e.g., 914*e*) of the input point, the electronic device (e.g., 101) moves (1010*e*) the current state indicator (e.g., 910) to the location on the slider user interface element (e.g., 908) corresponding to the representation (e.g., 914*e*) of the input point in accordance with the movement of the hand (e.g., 904) of the user, such as in FIG. 9D. In some embodiments, in accordance with a determination that the magnitude of the movement of the hand of the user corresponds to a second location on the slider corresponding to a second representation of the input point, the electronic device moves the current state indicator to the second location on the slider element corresponding to the second representation of the input point in accordance with the movement of the hand. Thus, in some embodiments, the electronic device updates the current input state of the slider in response to detecting any of (1) the gaze of the user is on the representation of the input point for a threshold amount of time; (2) the gaze of the user is on the representation of the input point while a hand gesture is detected; or (3) the user performs a gesture with their hand and moves their hand (e.g., while holding the gesture) in the direction along which the slider is oriented.

The above-described manner of updating the slider in response to gaze and non-gaze input provides different quick and efficient ways of updating the slider's input state, allowing the user to provide an input that is convenient and accessible to them, which additionally reduces power usage and improves battery life of the electronic device by enabling the user to use the electronic device more quickly and efficiently, while reducing errors in usage.

In some embodiments, while displaying the representation (e.g., 914*e*) of the input point with the first appearance, such as in FIG. 9B, the electronic device (e.g., 101) detects (1012*a*), via the eye tracking device, that the gaze of the user is directed to a second representation (e.g., 914*b*) of a second input point at a second location on the slider user interface element (e.g., 908). In some embodiments, while the user's gaze is directed to the representation of the input point, the second representation of the second input point is displayed with an appearance (e.g., size, color, opacity, translucency, virtual layer, distance from a viewpoint of the user) that is different from the first appearance. In some embodiments, the slider includes a plurality of representations of input points and one or more or all of the representations of input points other than the representation of the input point at which the user is currently looking are displayed with the appearance other than the first appearance while the representation of the input point is displayed with the first appearance. For example, while the user's gaze is directed to the representation of the input point, the other representations of input points are displayed at a smaller size than the representation of the input point at which the user is looking. In some embodiments, in response to detecting that the gaze of the user is directed to the second representation (e.g., 914*b*) of the input point, the electronic device (e.g., 101) displays (1012*b*) the second representation (e.g., 914*b*) of the second input point with the first appearance at the second location on the slider user interface element (e.g., 908) (e.g., and updates the representation of the input point to be displayed with the appearance other than the first appearance). For example, in response to detecting the user looking at the second representation of the input point, the electronic device displays the representation of the input point (e.g., and one or more or all of the other representations of input points of the slider) at a smaller size than the second representation of the input point. Thus, in some embodiments, if the user initially looks at a first representation of an input point and moves their gaze to a second representation of the input point, the electronic device updates the appearance of the second representation of an input point (e.g., and also to change the appearance of the first representation of the input point) in response to the user's gaze on the second representation of the input point.

The above-described manner of updating the appearance of the second representation of the second input point in response to the user's gaze being directed to the second representation of the second input point provides an efficient way of changing the representation of the input point to be selected, which additionally reduces power usage and improves battery life of the electronic device by enabling the user to use the electronic device more quickly and efficiently, while reducing errors in usage.

In some embodiments, such as in FIG. 9B, in response to detecting that the gaze (e.g., 918*b*) of the user is directed to the slider user interface element (e.g., 908), the electronic device (e.g., 101) displays (1014*a*), via the display generation component, a control element (e.g., 916) (e.g., a cursor, a representation of the user's hand) on the slider user interface element (e.g., 908) that indicates a location on the slider user interface element (e.g., 908) that corresponds to a current location of a predefined portion (e.g., one or more fingers) of the hand (e.g., 904) of the user. For example, in accordance with a determination that the hand of the user is located to the left of a predetermined region in space, the electronic device displays the control element on the left side of the slider. In some embodiments, such as in FIG. 9E, while detecting movement of the predefined portion of the hand (e.g., 904) of the user, the electronic device (e.g., 101) moves (1014*b*) the control element (e.g., 916) on the slider user interface element (e.g., 908) in accordance with the movement of the predefined portion of the hand (e.g., 904) of the user. For example, in response to detecting the hand moving to the right, the electronic device moves the control element to the right. In some embodiments, the control element moves at a speed proportional to the speed of the movement of the hand and/or by a distance proportional to the distance by which the hand moved. Thus, in some embodiments, the electronic device provides visual feedback to the user while the user controls the input state of the slider with a hand input.

The above-described manner of displaying and moving the control element on the slider user interface while the user controls the slider with the movement of their hand provides an efficient way of indicating to the user how the slider will change in response to the hand input while the hand input is being provided which additionally reduces power usage and improves battery life of the electronic device by enabling the user to use the electronic device more quickly and efficiently, while reducing errors in usage.

In some embodiments, such as in FIG. 9A, before detecting that the gaze of the user is directed to the slider user interface element (e.g., 908), the representation of the input point (e.g., 914e) in FIG. 9B was not displayed on the slider user interface element (e.g., 908) (1016a). In some embodiments, prior to detecting the gaze of the user on the slider user interface element, the electronic device displays the slider user interface element with an indication of the current input state of the slider without displaying indications of the other respective input states of the slider (e.g., without displaying the representations of input points on the slider).

The above-described manner of displaying the representation of the input point of the slider in response to detecting the user's gaze on the slider provides an efficient way of indicating to the user that the slider's input state is mutable while the user looks at the slider and reduces visual clutter and cognitive burden on the user while the user's gaze is not directed to the slider, which additionally reduces power usage and improves battery life of the electronic device by enabling the user to use the electronic device more quickly and efficiently, while reducing errors in usage.

In some embodiments, while displaying the slider user interface element (e.g., 908) including the representation of the input point (e.g., 914e) (e.g., and a plurality of representations of input points corresponding to a plurality of respective input states of the slider), such as in FIG. 9B, the electronic device (e.g., 101) detects (1018a), via a hand tracking device in communication with the electronic device (e.g., 101), a user input including a respective gesture performed by a hand (e.g., 904) of the user followed by movement of the hand (e.g., 904) of the user while maintaining the respective gesture, such as in FIG. 9E. In some embodiments, the respective gesture is the user touching a thumb to another finger (e.g., index, middle, ring, little finger) on the same hand as the thumb and the electronic device detects the movement of the hand and/or the arm of the hand while the thumb is touching the finger. In some embodiments, the electronic device updates the location of the indication of the current input state of the slider in accordance with the movement of the hand while the gesture is held and finalizes the input state of the slider in response to detecting the user releasing the gesture (e.g., moving the thumb and finger away from each other). In some embodiments, such as in FIG. 9E, while detecting the user input, the electronic device (e.g., 101) ceases (1018b) display of the representation (e.g., 914e) of the input point in FIG. 9B on the slider user interface element (e.g., 908) (e.g., and ceases display of the plurality of representations of input points on the slider). In some embodiments, after ceasing display of the representation of the input point, the electronic device continues to display the indication of the current input state of the slider. In some embodiments, such as in FIG. 9E, in response to detecting the user input (e.g., in response to detecting the user ceasing the gesture, such as moving the thumb and finger apart from each other), the electronic device (e.g., 101) sets (1018c) the current input state of the slider user interface element (e.g., 908) to be a second respective input state in accordance with the movement of the hand (e.g., 904) of the user. In some embodiments, the current input state of the slider moves in accordance with the distance, speed, and/or duration of the movement of the user's hand and/or arm. For example, the current input state will move by a larger amount in response to a hand movement that is relatively long in distance and/or duration and/or high in speed than the amount by which the current input state will move in response to a hand movement that is relatively short in distance and/or duration and/or low in speed. In some embodiments, after the input to update the current input state of the slider is terminated, the electronic device displays the slider user interface element with the representations of input points. Thus, in some embodiments, the electronic device ceases display of the representation of the input point (e.g., and a plurality of representations of input points) of the slider while detecting an input to change the current input state of the slider including movement of the user's arm.

The above-described manner of ceasing display of the representation of the input point while the input including hand movement is being detected provides an efficient way of reducing visual clutter and cognitive burden on the user while interacting with the slider, which additionally reduces power usage and improves battery life of the electronic device by enabling the user to use the electronic device more quickly and efficiently, while reducing errors in usage.

In some embodiments, the electronic device (e.g., 101) detects (1020a), via the hand tracking device, movement of a hand (e.g., 904) of the user, such as in FIG. 9E. In some embodiments, in accordance with a determination that the movement of the hand (e.g., 904) of the user is detected while one or more criteria are satisfied, including a criterion that is satisfied when the gaze of the user is directed towards the slider user interface element (e.g., 908), the electronic device (e.g., 101) updates (1020b) the current input state of the slider user interface element (e.g., 908) in accordance with the movement of the hand (e.g., 904) of the user, such as in FIG. 9E. In some embodiments, the one or more criteria further include detecting a predetermined gesture being performed with the hand of the user (e.g., a pinch gesture). In some embodiments, updating the current input state of the slider user interface element in accordance with the movement of the hand of the user (e.g., while maintaining the pinch gesture) includes updating the current input state of the slider in accordance with a component of the movement of the hand that is in the direction of the slider user interface element. For example, movement of the hand up and to the right causes a horizontal slider to move to the right or a vertical slider to move up. In some embodiments, in accordance with a determination that the movement of the hand (e.g., 904) of the user is detected while the one or more criteria are not satisfied, including a criterion that is satisfied when the gaze of the user is directed towards the slider user interface element (e.g., 908), the electronic device (e.g., 101) forgoes (1020c) updating the current input state of the slider user interface element (e.g., 908) in accordance with the movement of the hand (e.g., 904) of the user. In some embodiments, the criterion is not satisfied in response to detecting the gaze of the user directed towards a control element including the slider unless the gaze is directed to the slider itself.

The above-described manner of forgoing updating the current input state of the slider if the gaze is not directed to the slider provides an efficient way of preventing the user from accidentally updating the input state of the slider, which additionally reduces power usage and improves battery life of the electronic device by enabling the user to use the electronic device more quickly and efficiently, while reducing errors in usage.

In some embodiments, the slider user interface element is included in a control region of a user interface (e.g., a region of a user interface including a plurality of user interface elements that, when manipulated, cause the electronic device to change and/or activate a setting and/or perform another action). In some embodiments, the control region of the user interface is visually distinguished from the rest of the user interface (e.g., the control region is a visual container in the user interface). In some embodiments, while displaying the slider user interface element without the representation of the input point, the electronic device detects, via the eye tracking device (e.g., one or more cameras, depth sensors, proximity sensors, touch sensors (e.g., a touch screen, a trackpad)), that the gaze of the user is directed to the control region of the user interface without being directed to the slider user interface element. In some embodiments, in response to detecting that the gaze of the user is directed to the control region of the user interface without being directed to the slider user interface element, the electronic device maintains display of the slider user interface element without the representation of the input point. In some embodiments, the gaze of the user is directed to a portion of the control region that does not include a user interface element (e.g., a portion of a background of the control region). In some embodiments, the gaze of the user is directed towards another user interface element in the control region. In some embodiments, the electronic device does not display the representation of the input point (e.g., or any other of the plurality of representations of input points of the slider) unless and until the user's gaze is directed to the slider (e.g., or within a threshold distance (e.g., 0.5, 1, 2, 3, etc. centimeters) of the slider. In some embodiments, in response to detecting, via the hand tracking device, the user performing a predetermined hand gesture (e.g., touching a thumb to another finger (e.g., index, middle, ring, little finger) on the same hand as the thumb) and moving the hand along the direction of the slider user interface element without detecting the user's gaze on the slider user interface element, the electronic device forgoes updating the current input state of the slider user interface element.

In some embodiments, such as in FIG. 9A, the slider user interface element (e.g., 908) is included in a control region (e.g., 906) of a user interface (1022*a*) (e.g., a region of a user interface including a plurality of user interface elements that, when manipulated, cause the electronic device to change and/or activate a setting and/or perform another action). In some embodiments, the control region of the user interface is visually distinguished from the rest of the user interface (e.g., the control region is a visual container in the user interface). In some embodiments, while displaying the slider user interface element (e.g., 908) without the representation (e.g., 914*e*) of the input point in FIG. 9B, such as in FIG. 9A, the electronic device (e.g., 101) detects (1022*b*), via the eye tracking device (e.g., one or more cameras, depth sensors, proximity sensors, touch sensors (e.g., a touch screen, a trackpad)), that the gaze (e.g., 918*a*) of the user is directed to the control region of the user interface (e.g., 906), such as in FIG. 9B (e.g., without regard to whether or not the gaze of the user is directed to the slider user interface element). In some embodiments, the gaze of the user is directed to a portion of the control region that does not include a user interface element (e.g., a portion of a background of the control region). In some embodiments, the gaze of the user is directed towards another user interface element in the control region. In some embodiments, in response to detecting that the gaze (e.g., 918*a*) of the user is directed to the control region (e.g., 906) of the user interface, the electronic device (e.g., 101) displays (1022*c*) the slider user interface element (e.g., 908) including the representation (e.g., 914*e*) of the input point, such as in FIG. 9B. In some embodiments, in accordance with a determination that the user's gaze is not directed to the control region (e.g., the user is looking at a different part of the user interface, closing their eyes, looking away from the display generation component), the electronic device displays the slider user interface element without the representation of the input point. In some embodiments, in response to detecting, via the hand tracking device, the user performing a predetermined hand gesture (e.g., touching a thumb to another finger (e.g., index, middle, ring, little finger) on the same hand as the thumb) and moving the hand along the direction of the slider user interface element while detecting the user's gaze on the control region, the electronic device updates the current input state of the slider user interface element in accordance with the movement of the user's hand. In some embodiments, in response to detecting the user's gaze on the control region, the electronic device updates one or more other user interface elements in the control region (e.g., updating a second slider to include representations of input points, updating the color, size, virtual distance from the user of one or more other user interface elements).

The above-described manner of displaying the representation of the input point in response to detecting the gaze of the user on a part of the control region other than the slider provides an efficient way of indicating the input states of the slider without waiting for the user to look at the slider, which additionally reduces power usage and improves battery life of the electronic device by enabling the user to use the electronic device more quickly and efficiently, while reducing errors in usage.

In some embodiments, in response to detecting that the gaze of the user is directed to the slider user interface element (e.g., 908), the electronic device (e.g., 101) displays (1024*a*), on the slider user interface element (e.g., 908), a visual indication of gaze at a location on the slider user interface element (e.g., 908) that is based on the direction of the gaze of the user and/or a portion of the user interface element that is at a location of the gaze of the user. In some embodiments, in response to detecting movement of the user's gaze from a first respective portion of the slider to a second respective portion of the slider, the electronic device updates the location of the visual indication to correspond to the second respective portion of the slider. In some embodiments, the visual indication is one of an icon and/or modifying the appearance (e.g., color, translucency, opacity, etc.) of the slider at the location at which the user is looking.

The above-described manner of displaying the visual indication of the user's gaze provides an efficient way of indicating that the user's gaze is being detected and/or the electronic device is able to update the slider in accordance with a gaze-based input, which additionally reduces power usage and improves battery life of the electronic device by enabling the user to use the electronic device more quickly and efficiently, while reducing errors in usage.

In some embodiments, after displaying the representation (e.g., 914*e*) of the input point with the first appearance, such as in FIG. 9B, and in response to detecting the gaze (e.g., 918*c*) of the user directed to the representation (e.g., 914*e*) of the input point with the first appearance for less than the time threshold, such as in FIG. 9C (e.g., 0.02, 0.05, 0.1, 0.2, 0.25, 0.3, 0.5, 0.6, 1 second, etc.), the electronic device (e.g., 101) displays (1024*b*) the representation (e.g., 914*e*) of the input point with a second appearance (e.g., size, color, opacity, translucency, distance from a viewpoint of the user in the three-dimensional environment in which the slider is displayed), different from the first appearance, such as in FIG. 9C. In some embodiments, the electronic device gradually updates the appearance of the representation of the input point as the user's gaze is held on the representation of the input point until the threshold time is reached. For example, prior to detecting the user's gaze on the representation of the input point, the electronic device displays the representation of the input point at a first size and, in response to detecting the user's gaze on the representation of the input point and while continuing to detect the user's gaze on the representation of the input point, the electronic device gradually increases the size of the representation of the input point until the threshold time is reached and the electronic device updates the input state of the slider to correspond to the respective representation of the input point. As another example, the electronic device gradually changes the color of the representation of the input point while the user's gaze is on the representation of the input point.

The above-described manner of updating the appearance of the representation of the input point while the user's gaze is on the representation of the input point for less than the threshold time provides an efficient way of indicating to the user that the input state of the slider will be updated to correspond to the representation of the input point if the user continues to look at the representation of the input point, which additionally reduces power usage and improves battery life of the electronic device by enabling the user to use the electronic device more quickly and efficiently, while reducing errors in usage.

FIGS. 11A-11D illustrate examples of how an electronic device moves virtual objects in a three-dimensional environment and facilitates accessing actions associated with virtual objects in accordance with some embodiments.

Figure 11A:
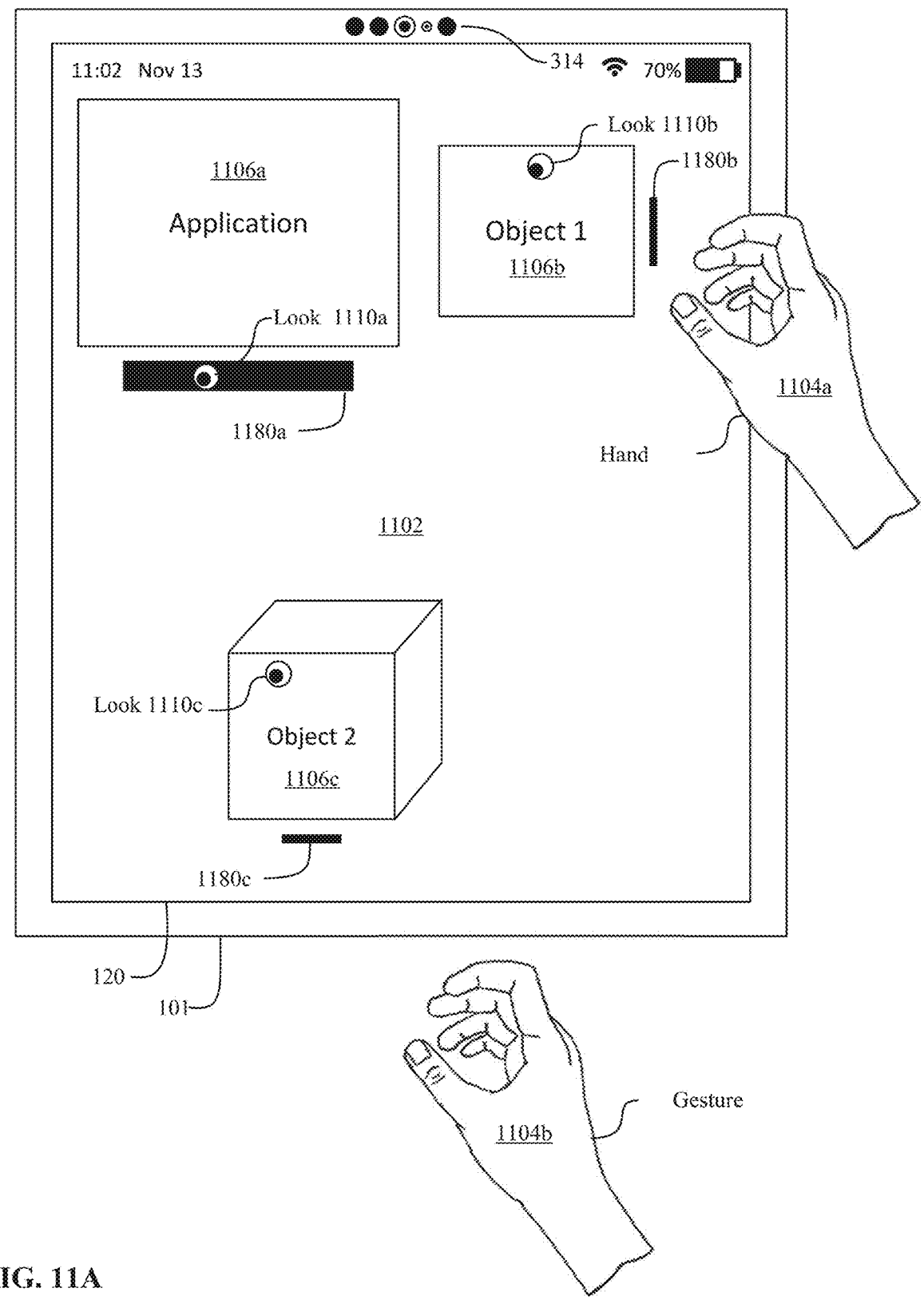
FIGS. 11A-11D illustrate examples of how an electronic device moves virtual objects in a three-dimensional environment and facilitates accessing actions associated with virtual objects in accordance with some embodiments.

FIG. 11A illustrates electronic device 101 displaying, via a display generation component 120, a three-dimensional environment 1102 on a user interface. As described above with reference to FIGS. 1-6, the electronic device 101 optionally includes a display generation component 120 (e.g., a touch screen) and a plurality of image sensors 314. The image sensors 314 optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

In FIG. 11A the electronic device 101 displays a representation 1106*a* of an application, a two-dimensional object 1106*b*, and a three-dimensional object 1106*c* in the three-dimensional environment 1102. In some embodiments, the representation 1106*a* of the application includes a user interface of the application, including selectable options, content, and the like. In some embodiments, the two-dimensional object 1106*b* is a file or item of content, such as a document, image, or video content. In some embodiments, the two-dimensional object 1106*b* is an object associated with the application associated with representation 1106*a* or associated with a different application. For example, representation 1106*a* is a representation of an e-mail application and the two-dimensional object 1106*b* is an attachment to an e-mail that the electronic device 101 is displaying outside of representation 1106*a* in response to an input to separately display two-dimensional object 1106*b*. In some embodiments, three-dimensional object 1106*c* is a virtual object or three-dimensional content. In some embodiments, three-dimensional object 1106*c* is associated with the same application that is associated with representation 1106*a* or a different application.

In some embodiments, in response to detecting the gaze of the user on a respective virtual object (e.g., representation 1106*a*, two-dimensional object 1106*b*, three-dimensional object 1106*c*), in some embodiments for a predetermined threshold time (e.g., 0.1, 0.2, 0.5, 1, etc. seconds), the electronic device 101 displays a user interface element 1180*a*-1180*c* proximate to the respective virtual object. In some embodiments, the electronic device 101 displays the user interface element 1180*a-c* in response to detecting the user perform a gesture with their hand 1104*b* while the gaze of the user is on a respective virtual object (e.g., representation 1106*a*, two-dimensional object 1106*b*, three-dimensional object 1106*c*) irrespective of the duration of the gaze (e.g., even if the gaze is detected for less than the threshold time). In some embodiments, the gesture is a pinch gesture that includes the user touching a thumb to another finger (e.g., index, middle, ring, little finger) on the same hand as the thumb. For example, in response to detecting the gaze 1110*c* of the user on the three-dimensional object 1106*c* for the threshold time and/or concurrently with detecting the pinch gesture, the electronic device 101 displays user interface element 1180*c*. As another example, in response to detecting the gaze 1110*b* of the user on two-dimensional object 1106*b* for the threshold time and/or concurrently with detecting the pinch gesture, the electronic device 101 displays user interface element 1180*b*. As another example, in response to detecting the gaze of the user on the representation 1106*a* of an application for the threshold time and/or concurrently with detecting the pinch gesture, the electronic device 101 displays user interface element 1180*a*. User interface element 1180*a* associated with the representation 1106*a* of an application is optionally larger than the user interface elements 1180*b-c* associated with objects in the three-dimensional environment 1102. In some embodiments, user interface elements similar to user interface element 1180*a* are displayed at a first size when displayed in association with representations of applications and/or virtual objects that are displayed independent from other objects in the three-dimensional environment. IN some embodiments, user interface elements similar to user interface element 1180*b* are displayed at a second, smaller size when displayed in association with representations of objects that were initially displayed within another object or application user interface. For example, representation 1106*a* is a representation of an e-mail application that is independently displayed and object 1106*b* is an attachment to an e-mail that was initially displayed within representation 1106*a*. In some embodiments, the respective user interface elements 1180 associated with virtual objects in the three-dimensional environment 1102 are the same even for virtual objects associated with different applications. For example, two-dimensional object 1106*b* and three-dimensional object 1106*c* are associated with different applications, but user interface element 1180*b* and user interface element 1180*c* are the same. In some embodiments, the electronic device 101 displays one user interface element 1180 at a time corresponding to the virtual object towards which the user's gaze is directed. In some embodiments, the electronic device 101 displays all of the user interface elements 1180 concurrently (e.g., in response to detecting the gaze of the user on one of the virtual objects in the three-dimensional environment 1102).

The electronic device 101 displays the user interface element 1180*b* on the right side of two-dimensional object 1106*b* in response to detecting the hand 1104*a* of the user on the right side of the two-dimensional object 1106*b* while the gaze 1110*b* is detected on the two-dimensional object 1106*b*. In some embodiments, if, instead of detecting hand 1104*a* on the right side of two-dimensional object 1106*b*, the electronic device 101 detected the hand 1104*a* on the left side of two-dimensional object 1106*b*, the electronic device 101 would display the user interface element 1180*b* on the left side of two-dimensional object 1106*b*. In some embodiments, the electronic device 101 similarly displays user interface element 1180*c* on the side of the three-dimensional object 1106*c* at which a hand 1104*a* of the user is detected while the gaze 1110*c* of the user is directed to three dimensional object 1106*c*, and similarly displays user interface element 1180*a* on the side of the representation 1106*a* at which a hand 1104*a* of the user is detected while the gaze of the user is directed to representation 1106*a*. In some embodiments, if the location of the hand 1104*a* changes while the gaze 1110*b* of the user is directed to two-dimensional object 1106*b*, the electronic device 101 presents an animation of user interface element 1180*b* moving to a location corresponding to the updated position of the hand.

In some embodiments, the electronic device 101 only displays the user interface element 1180*b* on the right side of two-dimensional object 1106*b* in response to the position of hand 1104*a* if the hand is in a predetermined posture and within a threshold distance (e.g., 1, 5, 10, 30, 50, 100, etc. centimeters) of two-dimensional object 1106*b* in the three-dimensional environment 1102, such as the beginning of a pinch gesture in which the thumb is less than a threshold distance from another finger (e.g., 0.1, 0.5, 1, 2, 5, 10, 30, etc. centimeters). In some embodiments, in response to detecting the pinch gesture while the hand 1104*a* of the user is within a threshold distance (e.g., 1, 5, 10, 30, 50, 100, etc. centimeters) of object 1106*b* in the three-dimensional environment 1102, the electronic device 101 moves the user interface element 1180*b* to a location corresponding to the pinch. For example, if the electronic device 101 detects the hand 1104*a* in the pinch gesture towards the lower right corner of the two-dimensional object 1106*b*, the electronic device 101 displays the user interface element 1180*b* at the lower right corner of two-dimensional object 1106*b* (or in some embodiments, in the middle of the right side of two-dimensional object 1106*b*). If, instead of detecting the hand 1104*a* in the beginning of the pinch gesture, the electronic device 101 detects the hand in a different gesture, such as a pointing gesture with one or more (but not all) fingers extended while the hand 1104*a* is within the threshold distance (e.g., 1, 5, 10, 20, 50, 100, etc. centimeters) of the two-dimensional object 1106*b* in the three-dimensional environment 1102, the electronic device 101 updates the user interface element 1180*b* to include one or more selectable options related to the two-dimensional object 1106*b* similar to the way user interface element 1180*a* includes selectable options 1112*a-e* related to the representation 1106*a* of the application, as will be described with reference to FIG. 11B.

If the electronic device 101 does not detect a hand 1104*a* of the user on one side of two-dimensional object 1106*b* while detecting the gaze 1110*b* of the user on two-dimensional object 1106*b*, the electronic device 101 would optionally display the user interface element 1180*b* along the bottom edge of two-dimensional object 1106*b* in a manner similar to how electronic device 101 displays user interface element 1180*a* along the bottom edge of the representation 1106*a* of an application in FIG. 11A. Because three-dimensional object 1106*c* is three-dimensional, the electronic device 101 optionally displays the user interface element 1180*c* along the front bottom edge of three-dimensional object 1106*c* (e.g., as opposed to the rear (e.g., further) bottom edge of three-dimensional object 1106*c*).

In some embodiments, in response to detecting an input directed towards one of the user interface elements 1180, the electronic device 101 updates the user interface element 1180 to include one or more selectable options that, when selected, causes the electronic device 101 to perform an action directed to the virtual object associated with user interface element 1180. In some embodiments, the input directed to the user interface element 1180 includes gaze input. As shown in FIG. 11A, the electronic device 101 detects the gaze 1110*a* of the user directed to the user interface element 1180*a* associated with the representation 1106*a* of an application 1106*a*. In some embodiments, the gaze 1106*a* of the user on user interface element 1180*a* is detected for a threshold duration of time (e.g., 0.1, 0.2, 0.5, 1, 5, 10, 30, 50 etc. seconds). In some embodiments, the electronic device 101 detects the user performing a pinch gesture with their hand 1104*b* while detecting the gaze 1106*a* of the user on the user interface element 1180*a* for a duration of time that is less than the threshold time. In response to detecting the gaze 1110*a* of the user on user interface element 1180*a* for the threshold time, or for any duration of time while concurrently detecting the pinch gesture performed with hand 1104*b*, the electronic device 101 updates the user interface element 1180*a* to include a plurality of selectable options 1112*a-e* related to the representation 1106*a* of an application, as shown in FIG. 11B.

Figure 11B:
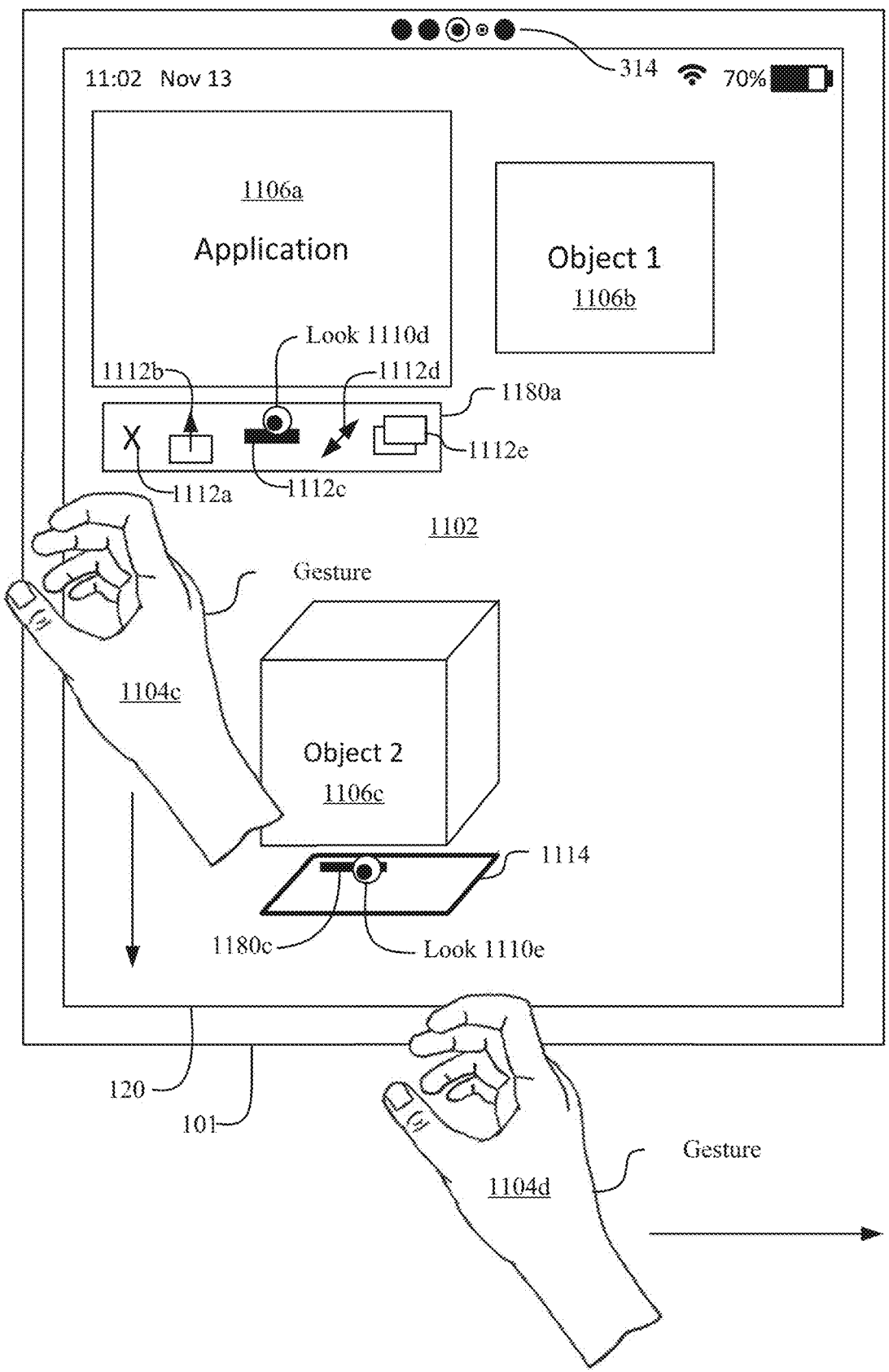

FIG. 11B illustrates the electronic device 101 displaying selectable options 1112*a-e* in expanded user interface element 1180*a* in response to detecting one of the inputs directed to user interface element 1180*a* described with reference to FIG. 11A. In some embodiments, in response to detecting selection of option 1112*a*, the electronic device 101 ceases display of representation 1106*a*. In some embodiments, in response to detecting selection of option 1112*b*, the electronic device 101 initiates a process to share representation 1106*a* with another user in the three-dimensional environment 1102. In some embodiments, in response to detecting selection of option 1112*c*, the electronic device 101 initiates a process to update the location of representation 1106*a* in the three-dimensional environment 1102. In some embodiments, in response to detecting selection of option 1112*d*, the electronic device 101 displays the representation 1106*a* in a full screen/fully immersive mode that includes ceasing display of the other objects 1106*b-c* (e.g., virtual and/or real objects) in the three-dimensional environment 1102, for example. In some embodiments, in response to detecting selection of option 1112*e*, the electronic device 101 displays all objects and representations associated with the same application associated with representation 1106*a* within a threshold distance (e.g., 1, 5, 10, 30, 50, etc. centimeters) of each other in the three-dimensional environment 1102. In some embodiments, selection of an option 1112*a-e* is detected in response to detecting the gaze of the user directed to a respective option while the user performs a pinch gesture with their hand 1104c.

In some embodiments, the options 1112a-e included in user interface object 1180a are customized to the application corresponding to representation 1106a. Thus, in some embodiments, the options displayed for a different application may be different from the options 1112a-e displayed for the application associated with representation 1106a. For example, a content editing application optionally includes a markup option, whereas an interne browser optionally does not include a markup option. Moreover, in some embodiments, the electronic device 101 displays different options depending on if the options are associated with a representation of an application or with a virtual object (e.g., two-dimensional object 1106b, three-dimensional object 1106c). For example, the options displayed in representation 1180c associated with three-dimensional object 1106c or the options displayed in representation 1180b associated with two-dimensional object 1106b are optionally different from options 1112a-e. For example, the options associated with two-dimensional object 1106b include an option to cease display of the two-dimensional object 1106b, an option to share the two-dimensional object with another user with access to the three-dimensional environment 1102, an option to move object 1106b, an option to display the object 1106b in a full screen or immersive mode, and an option to edit the two-dimensional object 1106b (e.g., via markup or a text editing application).

As shown in FIG. 11B, the electronic device 101 detects the gaze 1110d of the user directed to the option 1112c to move the representation 1106a in the three-dimensional environment 1102. While detecting the gaze 1110d of the user on option 1112c, the electronic device 101 also detects the user perform a pinch gesture with hand 1104c. In some embodiments, while the user maintains the pinch gesture with their hand 1104c, the electronic device 101 moves the representation 1106a of the application in the three-dimensional environment 1102 in accordance with movement of the hand. For example, in response to detecting movement of the hand 1104d towards the user, the electronic device 101 moves the representation 1106a towards the user in the three-dimensional environment 1102, as shown in FIG. 11D.

Figure 11C:
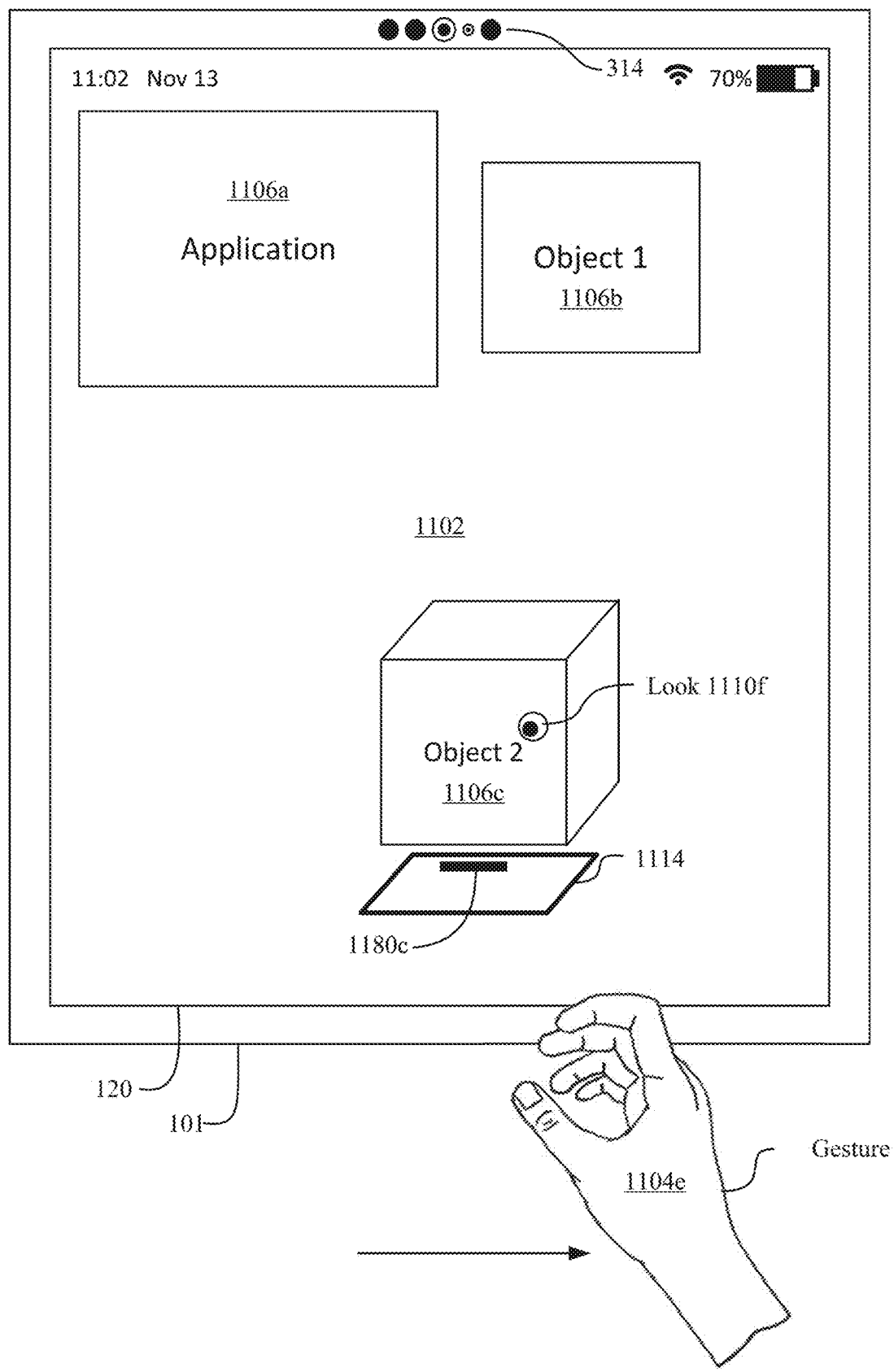
Figure 11D:
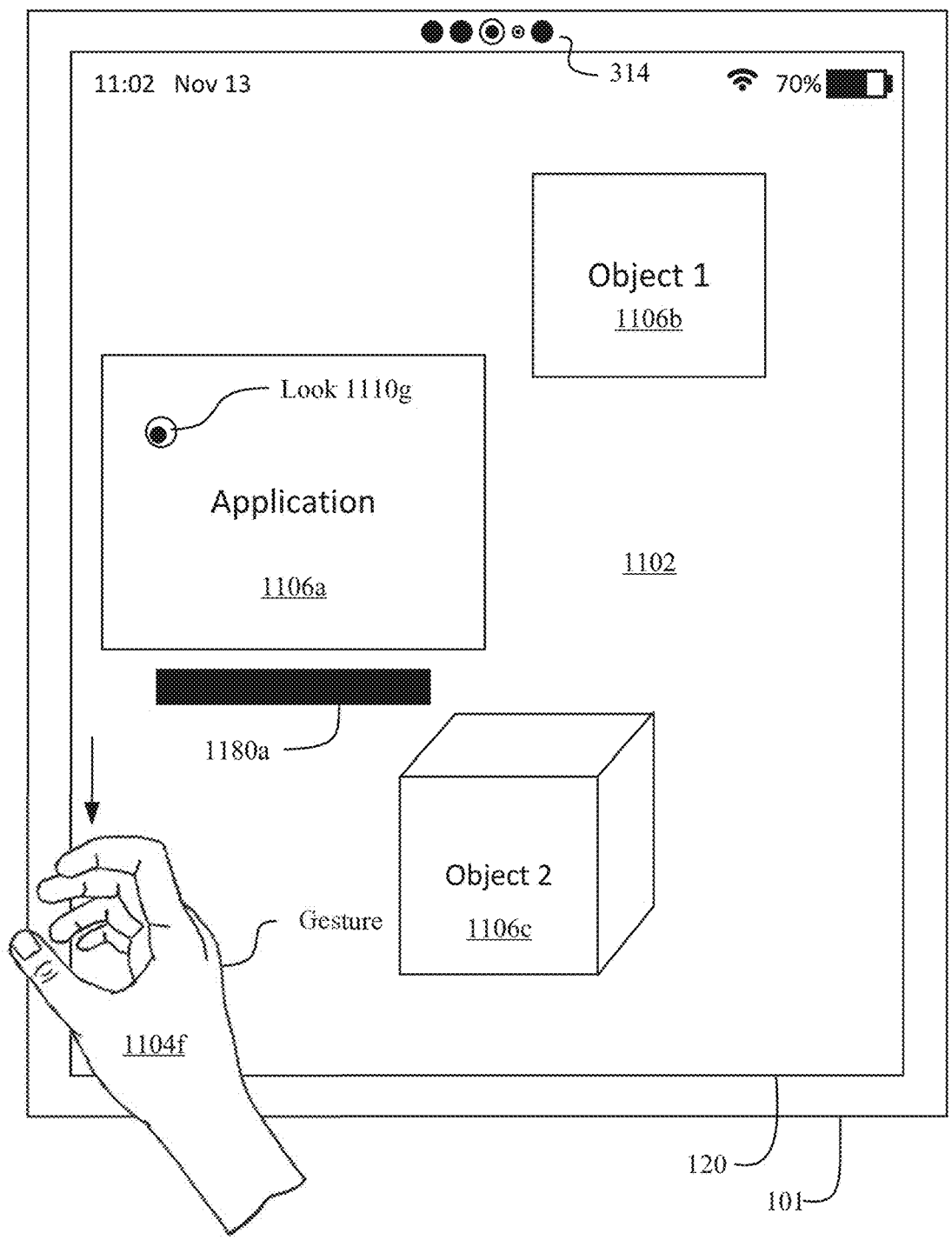

Referring to FIG. 11D, while the electronic device 101 moves the representation 1106a of the application in accordance with movement of the hand 1104f while maintaining the pinch gesture, the electronic device 101 displays user interface element 1180a without the selectable options 1112a-e (e.g., device 101 collapses element 1180a back to its state shown in FIG. 11A). In some embodiments, in response to detecting the end of the pinch gesture, the electronic device 101 maintains display of the representation 1106a of the application at the updated location in the three-dimensional environment 1102 and resumes display of the selectable options 1112a-e (e.g., device 101 automatically re-expands element 1180a to its state shown in FIG. 11B). In some embodiments, the electronic device 101 continues to display the selectable options 1112a-e while moving the representation 1106a of the application in accordance with movement of the hand 1104f making the pinch gesture (e.g., device 101 maintains element 1180a in its expanded state shown in FIG. 11B). In some embodiments, the user is able to select the selectable options 1112a-e while moving the representation 1106a. For example, the electronic device 101 detects selection of an option 1112a-e by detecting the user "pressing" one of the options 1112a-e with their other hand by moving the hand to a location in the three-dimensional environment 1102 that is within the threshold distance (e.g., 1, 5, 10, 30, etc. centimeters) of the selected option in the three-dimensional environment 1102 while the hand is in a pointing gesture with one or more (but not all) fingers extended. The pointing finger of the user's other hand optionally selects one of options 1112a-e (e.g., such as described with reference to method 800).

Thus, the electronic device 101 moves objects in the three-dimensional environment 1102 in response to a user input directed to user interface element 1180. The movement of three-dimensional object 1106c in response to detecting an input directed to user interface element 1180c will now be described. Referring back to FIG. 11B, the electronic device 101 detects the user perform the pinch gesture with hand 1104d while detecting the gaze 1110e of the user on user interface element 1180c associated with three-dimensional object 1106c. In response to detecting the gaze 1110e of the user on user interface element 1180c and the pinch gesture, the electronic device 101 initiates a process to move three-dimensional object 1106c in the three-dimensional environment 1102 in accordance with movement of hand 1104d while the pinch gesture is maintained. In response to the input to move three-dimensional object 1106c, the electronic device 101 shifts the position of three-dimensional object 1106c up in the three-dimensional environment 1102 (e.g., as shown in the transition from FIG. 11A to 11B) and displays an indication 1114 of the footprint of the three-dimensional object 1106c corresponding to the location at which the three-dimensional object will be displayed (e.g., placed) in response to termination of the input to move the object. In some embodiments, the indication 1114 has the same shape as a bottom surface of three-dimensional object 1106c. In some embodiments, the indication 1114 is displayed to appear as though it is on a surface in the three-dimensional environment (e.g., a virtual surface or a representation of a real surface in the physical environment of the electronic device 101).

FIG. 11C illustrates the electronic device 101 continuing to move the three-dimensional object 1106c in accordance with movement of the hand 1104e that is maintaining the pinch gesture. As shown in FIG. 11C, the electronic device 101 continues to display the indication 1114 of the location at which the three-dimensional object 1106c will be displayed (e.g., placed) in the three-dimensional environment 1102 in response to detecting termination of the movement input.

In some embodiments, the electronic device 101 only shifts the three-dimensional object 1106c up and displays indication 1114 if the three-dimensional object 1106c is "snapped" to a surface in the three-dimensional environment 1102. For example, in FIG. 11A, object 1106c is "snapped" to a floor in the three-dimensional environment 1102 that corresponds to a floor in the physical environment of the electronic device 1102, and the electronic device 101 displays the three-dimensional object 1106c to appear as though it is placed on the floor in the three-dimensional environment 1102. In some embodiments, a virtual object "snaps" to a representation of a hand of the user in the three-dimensional environment 1102 while the object is being moved. In some embodiments, the representation of the hand of the user is either a photorealistic representation of the hand displayed via display generation component 120 or a view of the hand through a transparent portion of the display generation component 120. In some embodiments, the three-dimensional object 1106c only snaps to certain objects in the three-dimensional environment 1102, such as the user's hand(s) and/or surface (e.g., flat or vertical surfaces) when the three-dimensional object 1106c is within a predetermined threshold (e.g., 1, 10, 50, 100, etc. centimeters) of the object.

In some embodiments, while moving the three-dimensional object 1106c, the electronic device 101 updates the appearance of user interface element 1180c, such as by changing a size or color of the user interface element 1180c. In some embodiments, while moving the three-dimensional object 1106c, the electronic device 101 tilts the three-dimensional object 1106c in response to detecting rotation of hand 1104e (e.g., relative to the arm of the user). In some embodiments, in response to detecting the end of the movement input, the electronic device 101 displays the three-dimensional object 1106c at the angle illustrated in FIG. 11C (e.g., upright) even if the user terminates the movement input while the three-dimensional object 1106c is tilted in response to rotation of the hand 1104e. In some embodiments, the end of the movement input is detected in response to detecting the user ceasing to perform the pinch gesture with their hand 1104e (e.g., by moving the thumb and finger apart from each other).

In some embodiments, the electronic device 101 detects the end of the movement input while displaying the three-dimensional object 1106c as shown in FIG. 11C. In response, the electronic device 101 displays the three-dimensional object 1106c as shown in FIG. 11D. In FIG. 11D, the electronic device 101 displays the three-dimensional object 1106c at a location in the three-dimensional environment 1102 corresponding to the location of indication 1114 in FIG. 11C. Thus, in response to detecting the termination of the movement input in FIG. 11C, the electronic device 101 lowers the representation 1106c in the three-dimensional environment 1102 onto the area of footprint 1114, optionally by the same amount by which the electronic device 101 lifted the representation 1106c in FIG. 11B in response to the beginning of the movement input.

It is understood that unless otherwise stated, any of the characteristics of any one of elements 1180a-c described above are optionally analogously applicable to any of elements 1180a-c.

Figure 12A:
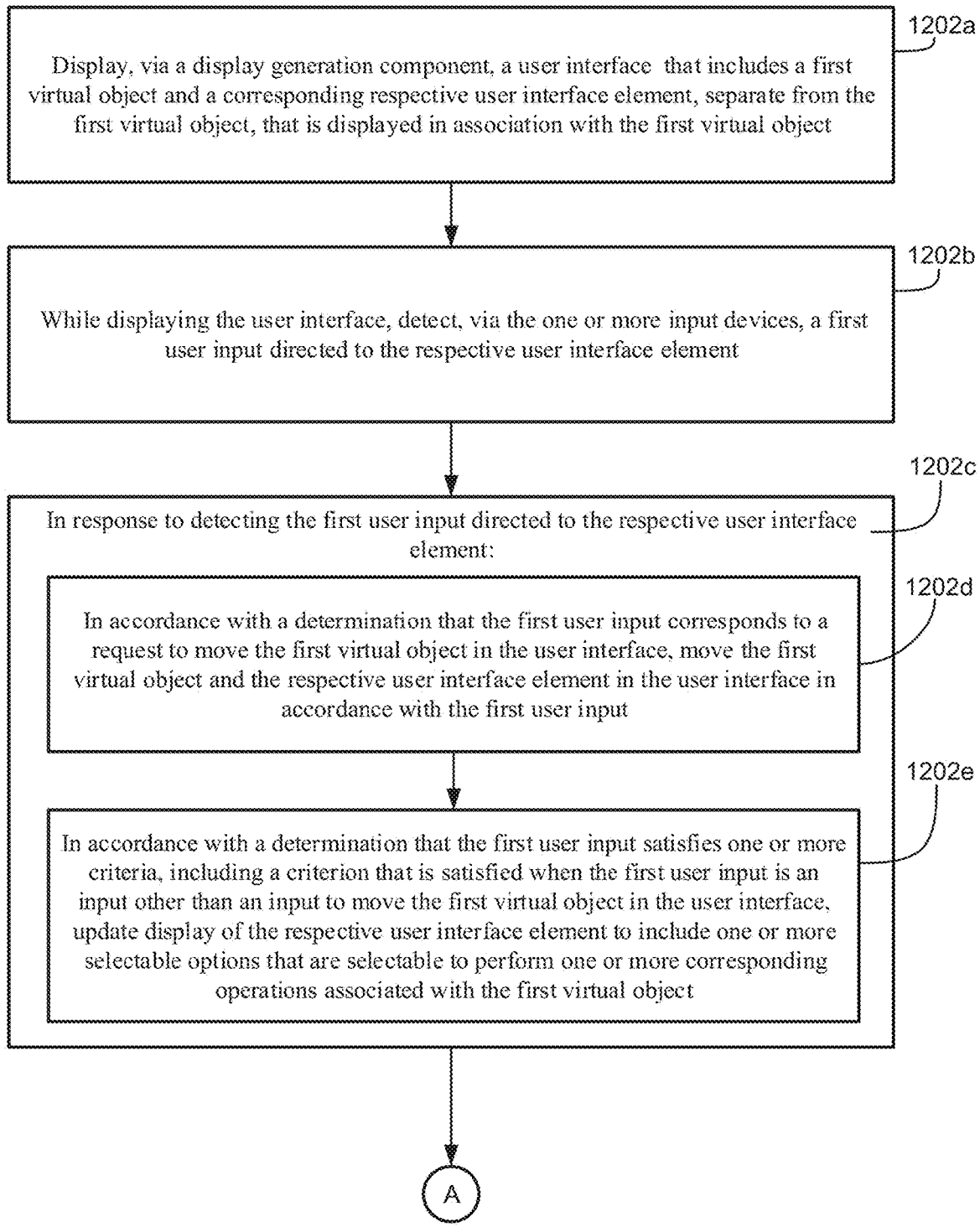
FIGS. 12A-12O is a flowchart illustrating a method of moving virtual objects in a three-dimensional environment and facilitating accessing actions associated with virtual objects in accordance with some embodiments.
Figure 12B:
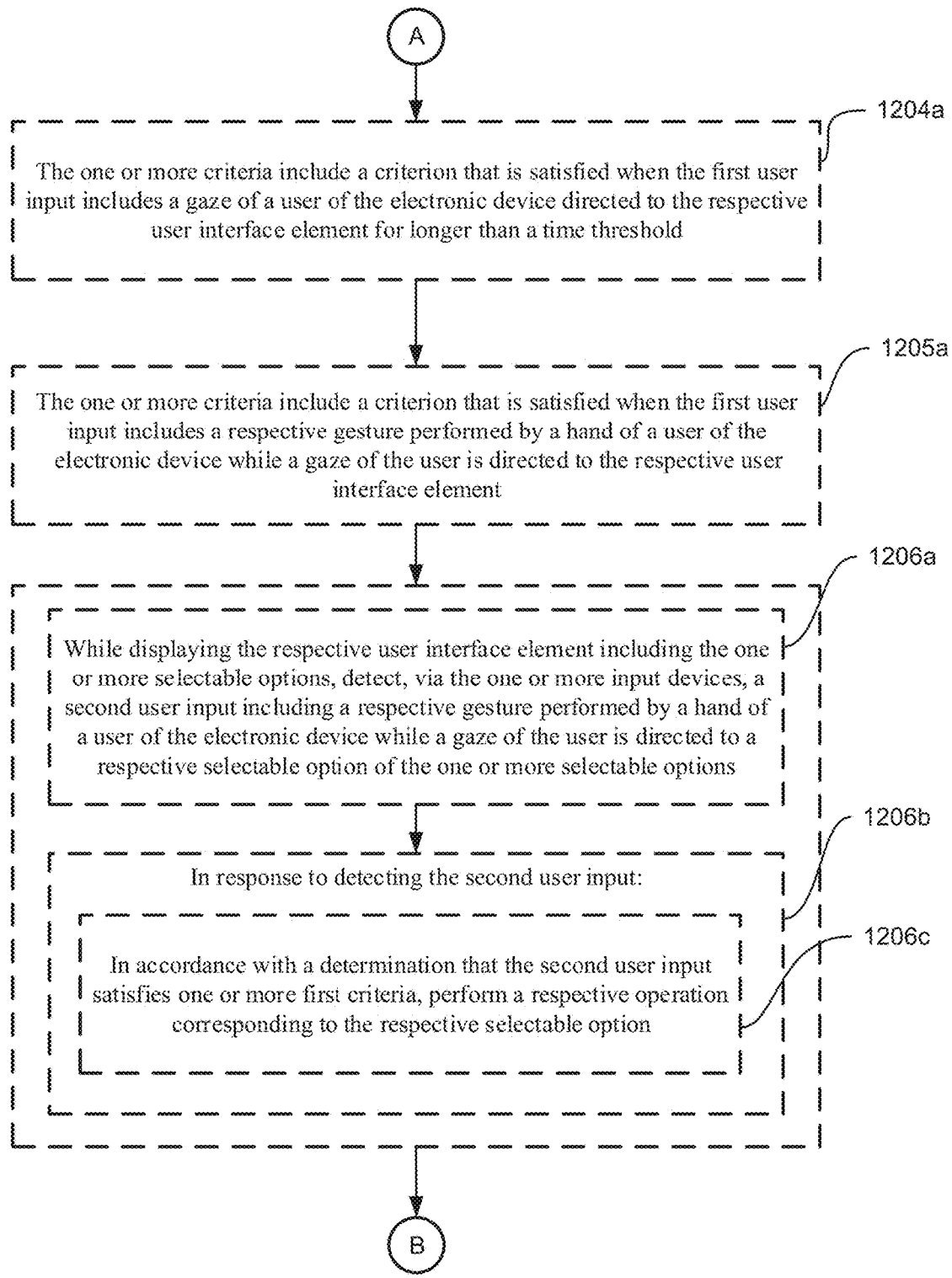
Figure 12C:
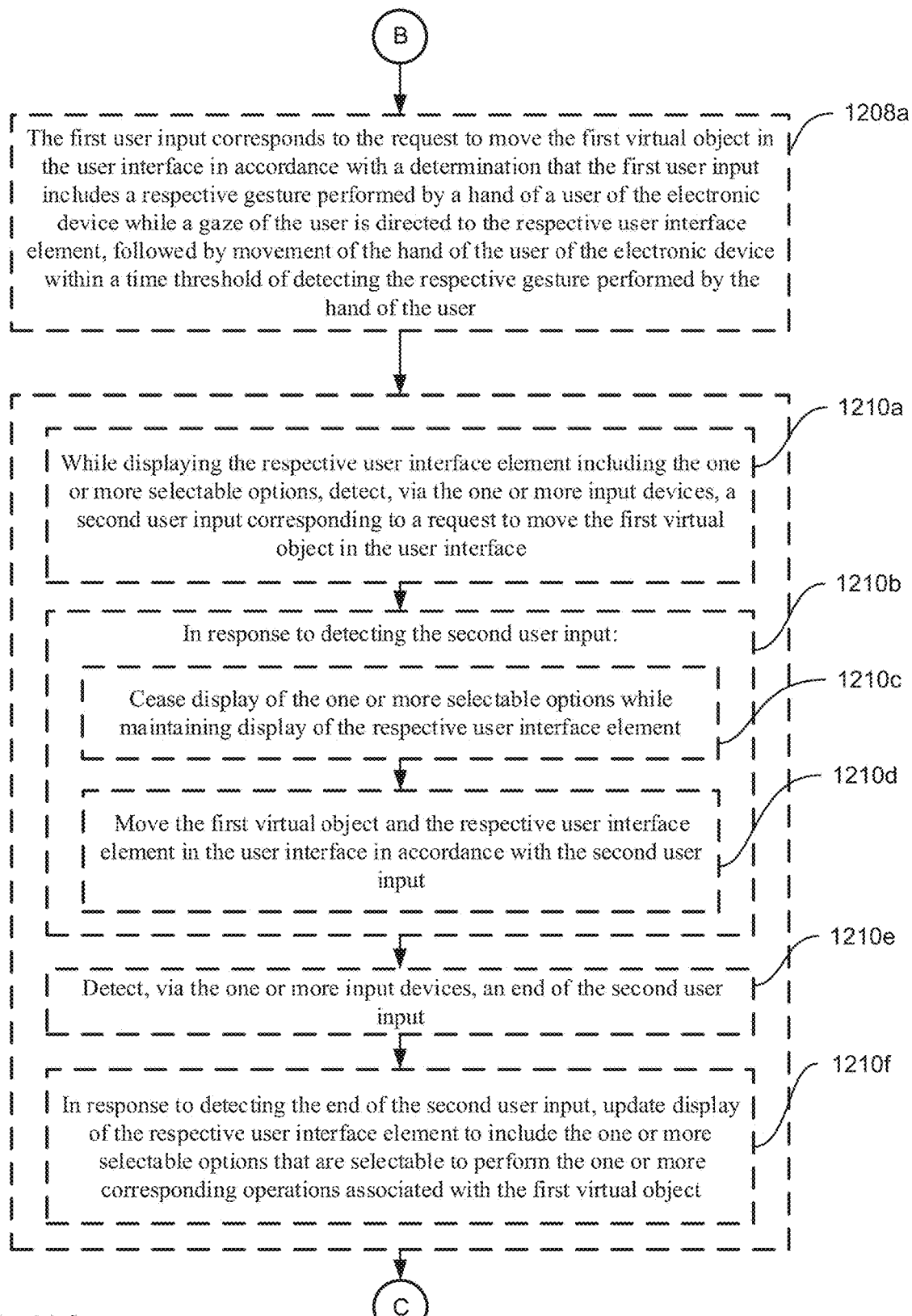
Figure 12D:
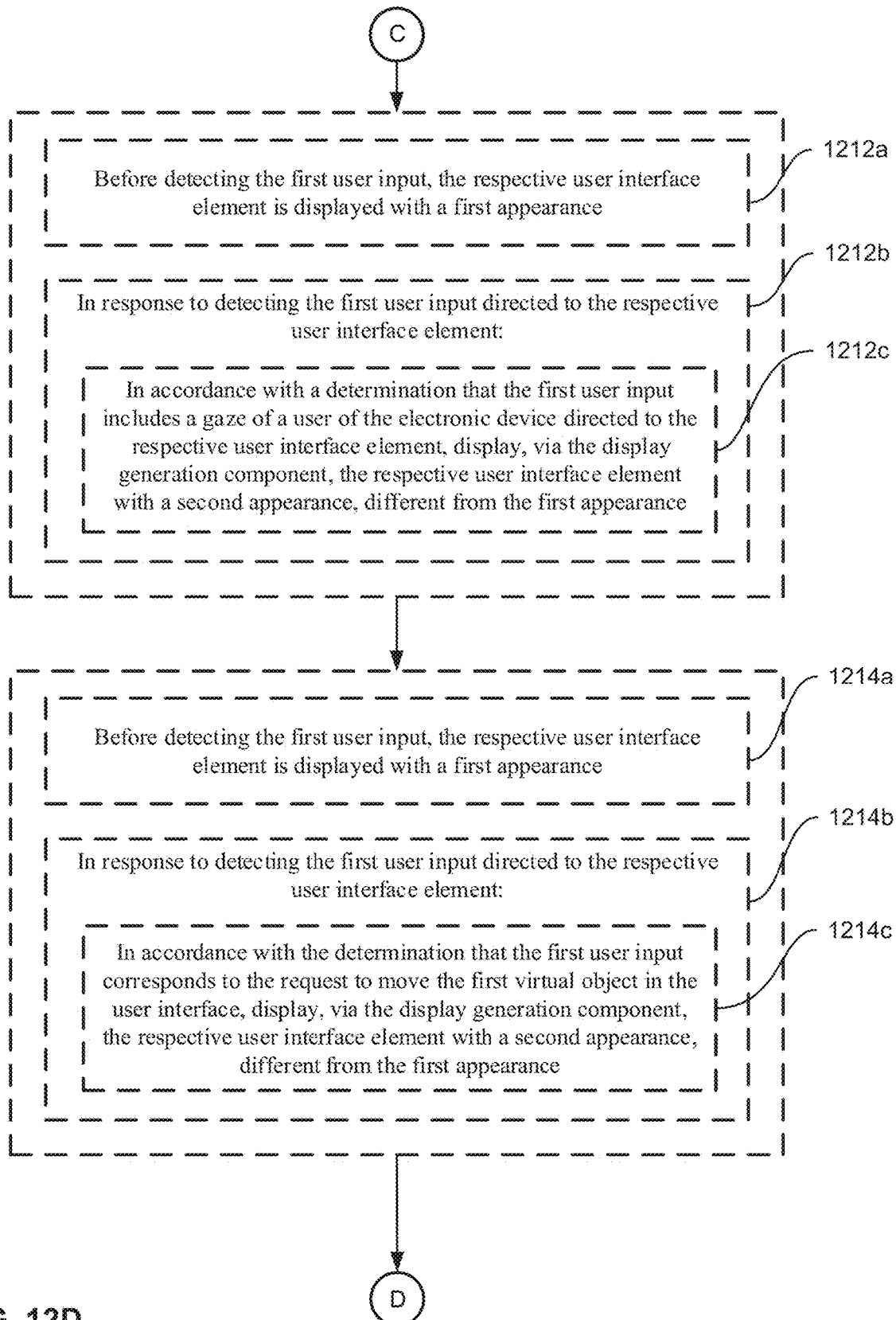
Figure 12E:
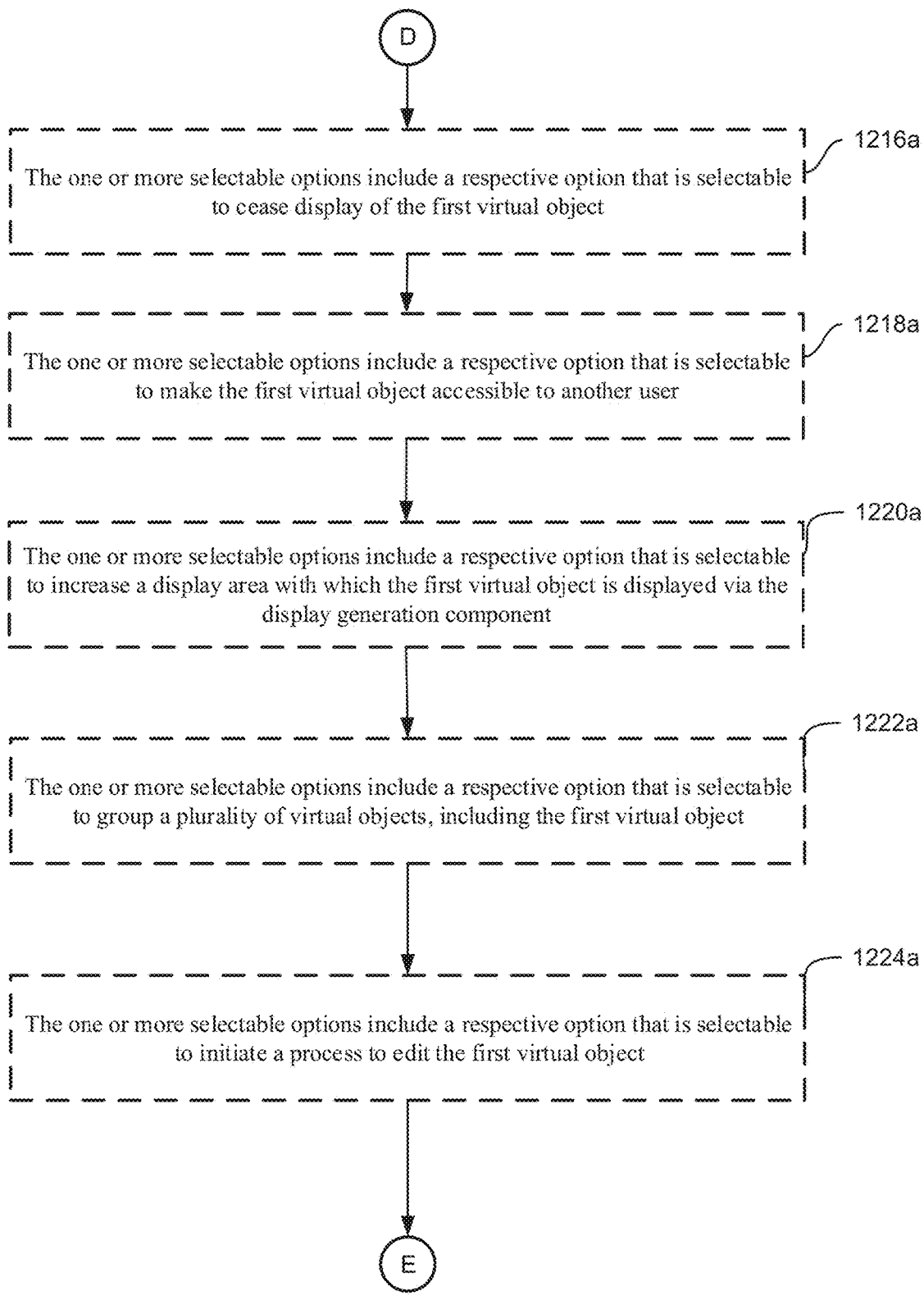
Figure 12F:
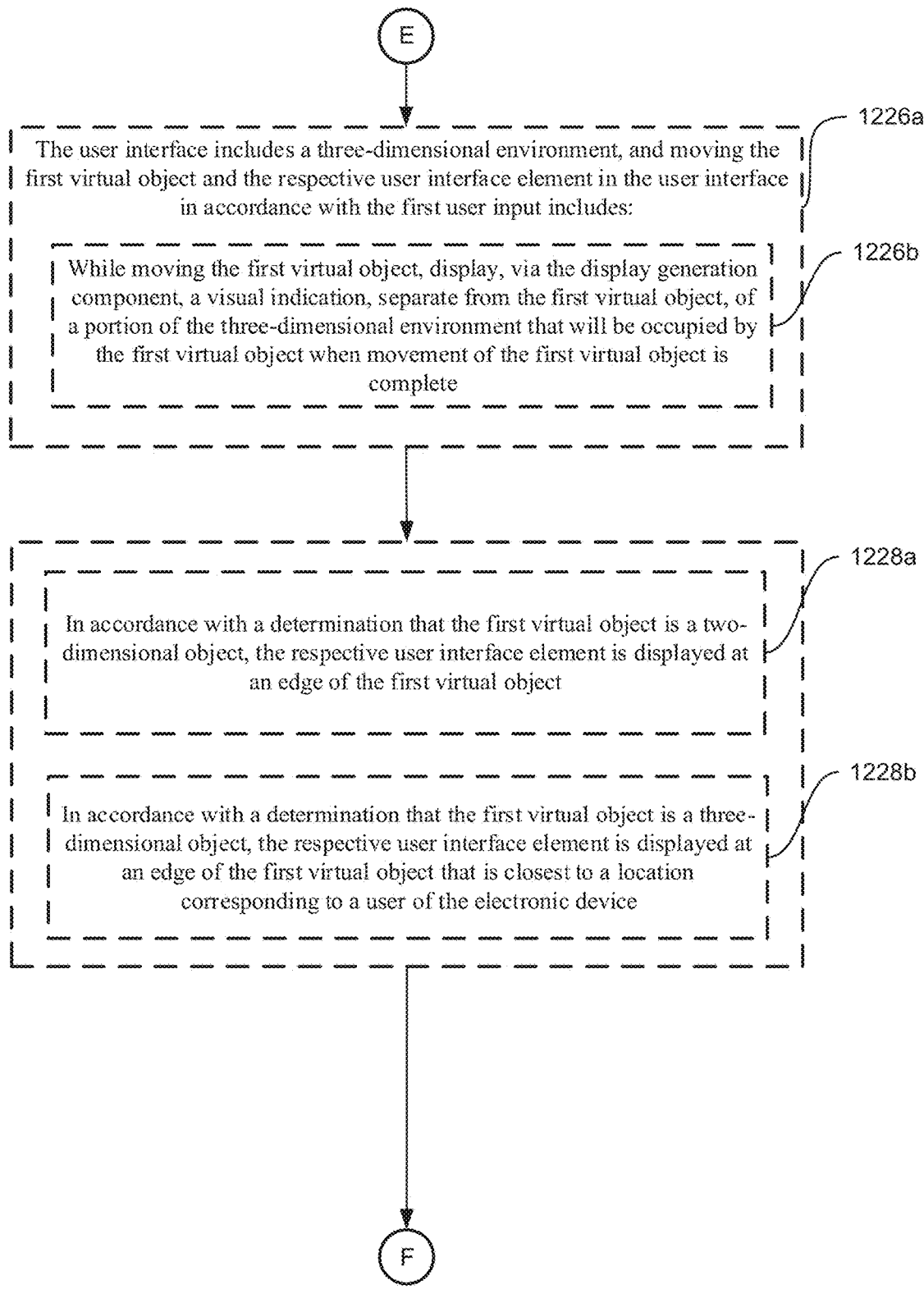
Figure 12G:
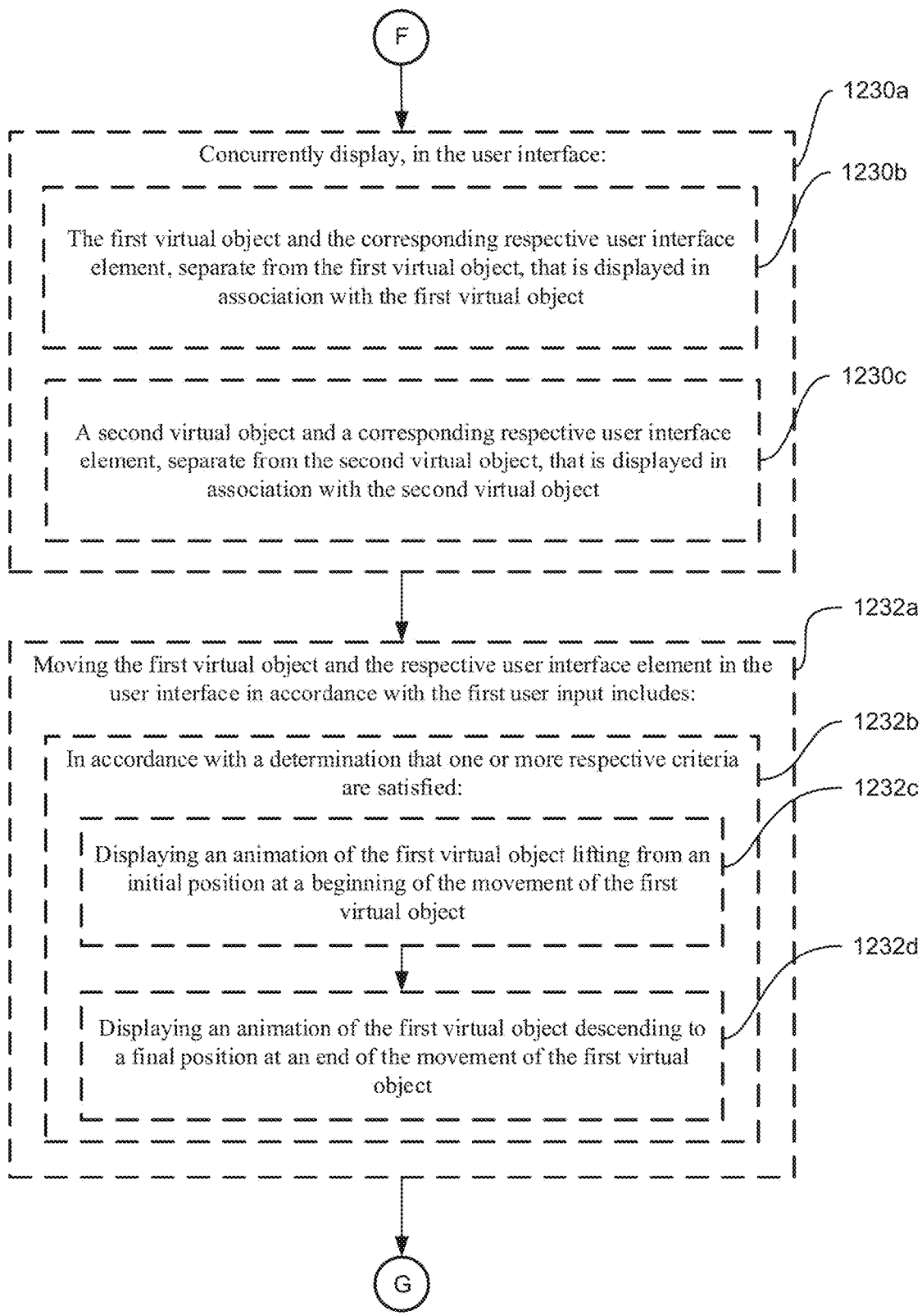
Figure 12H:
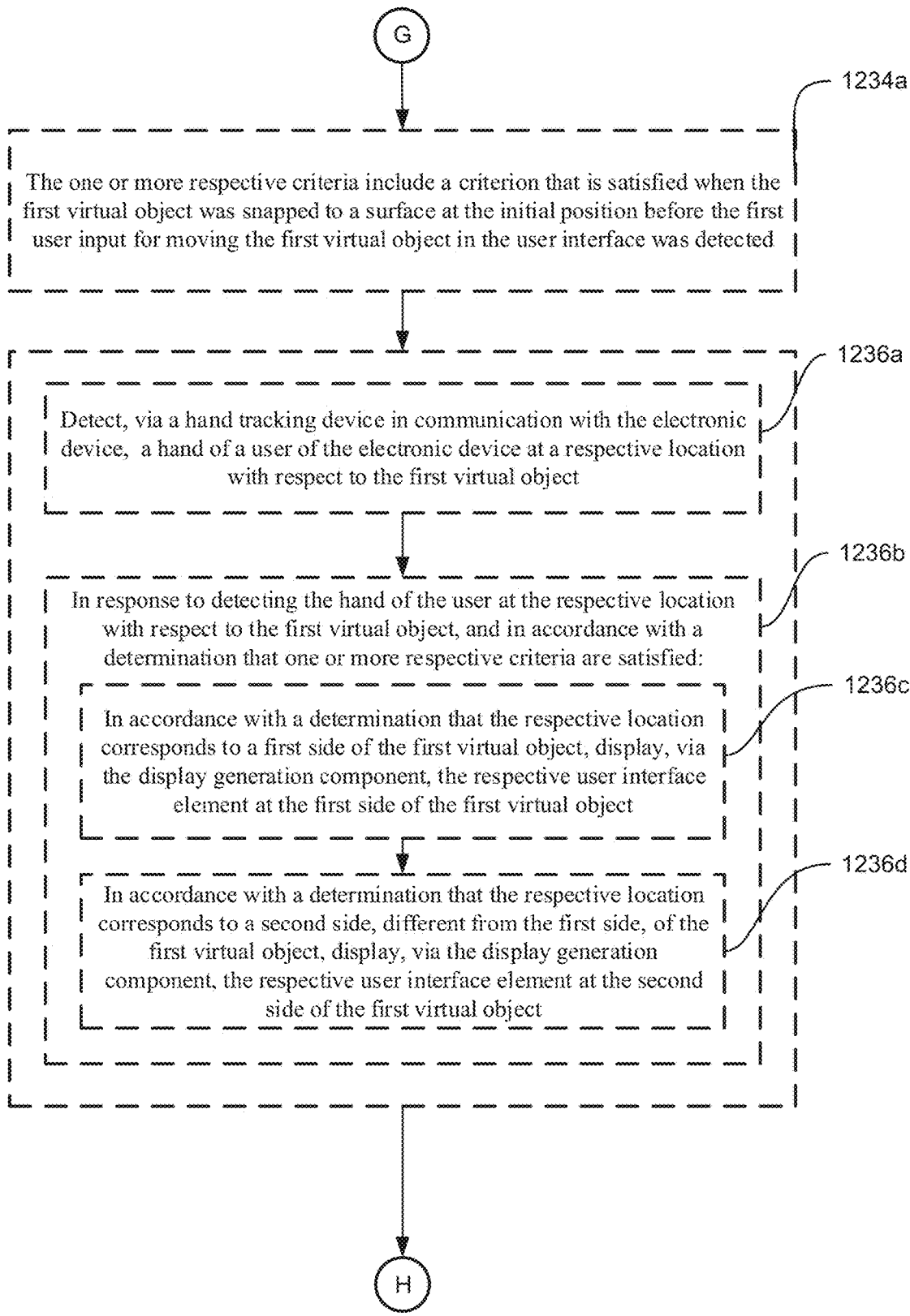
Figure 12I:
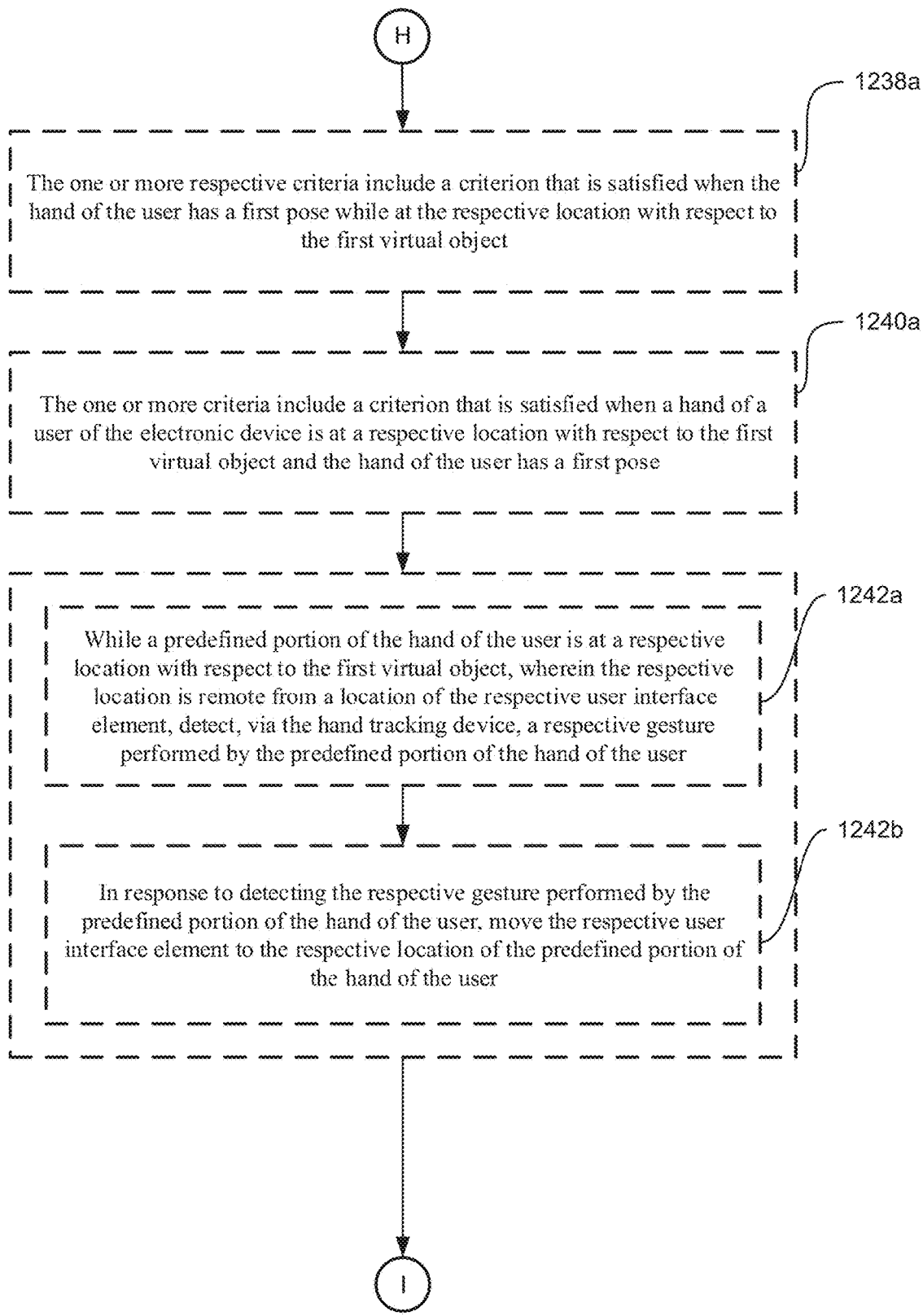
Figure 12J:
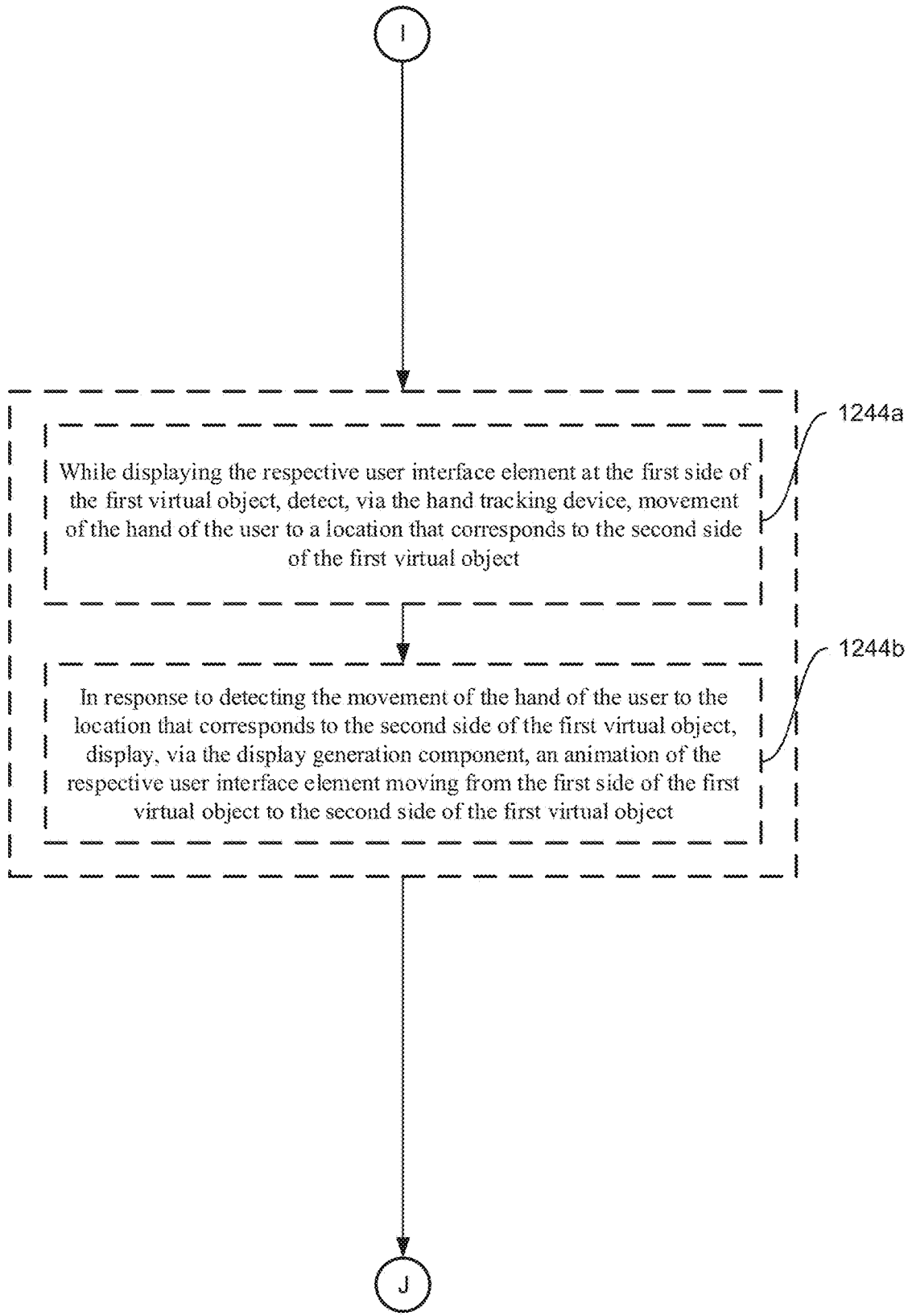
Figure 12K:
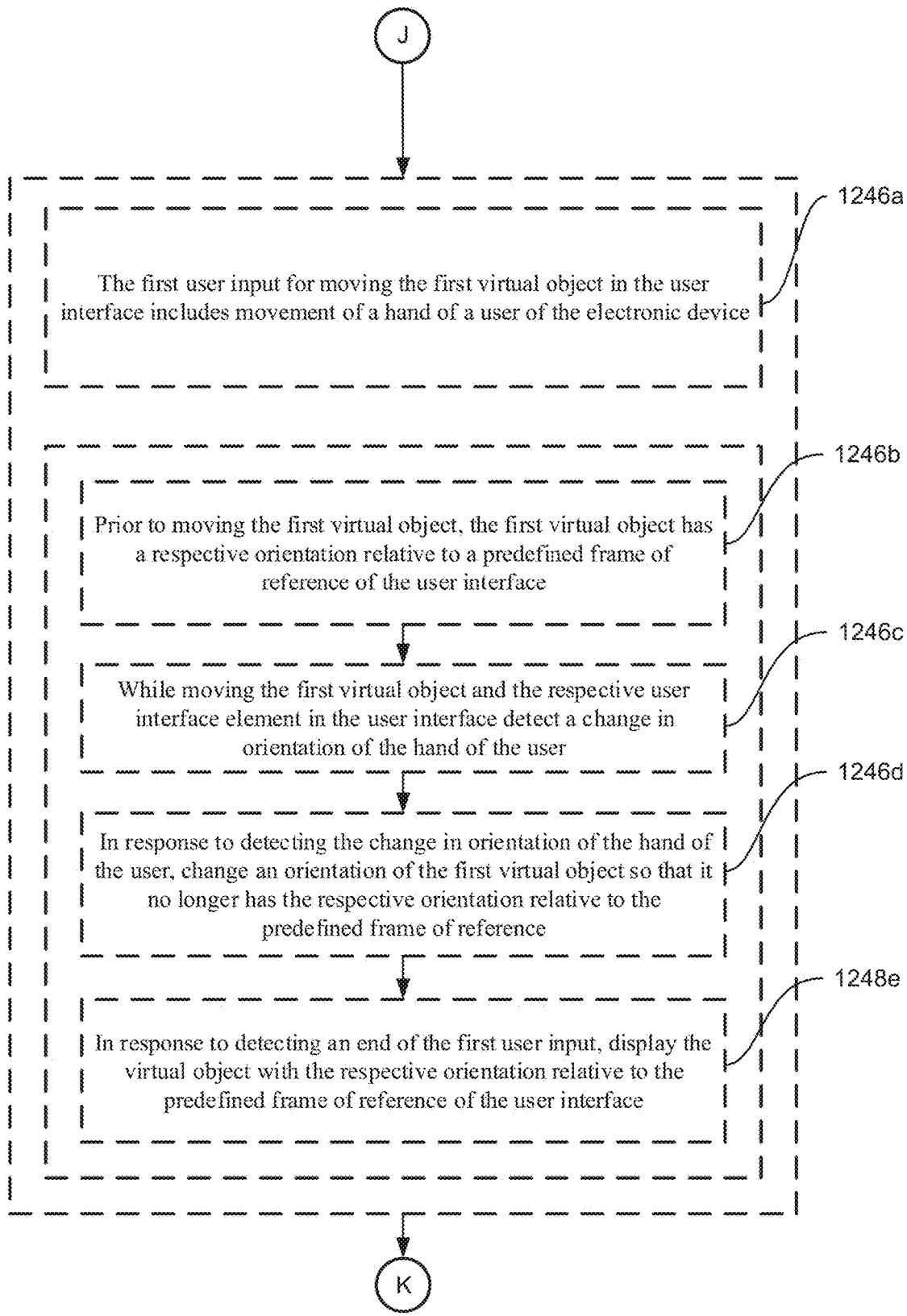
Figure 12L:
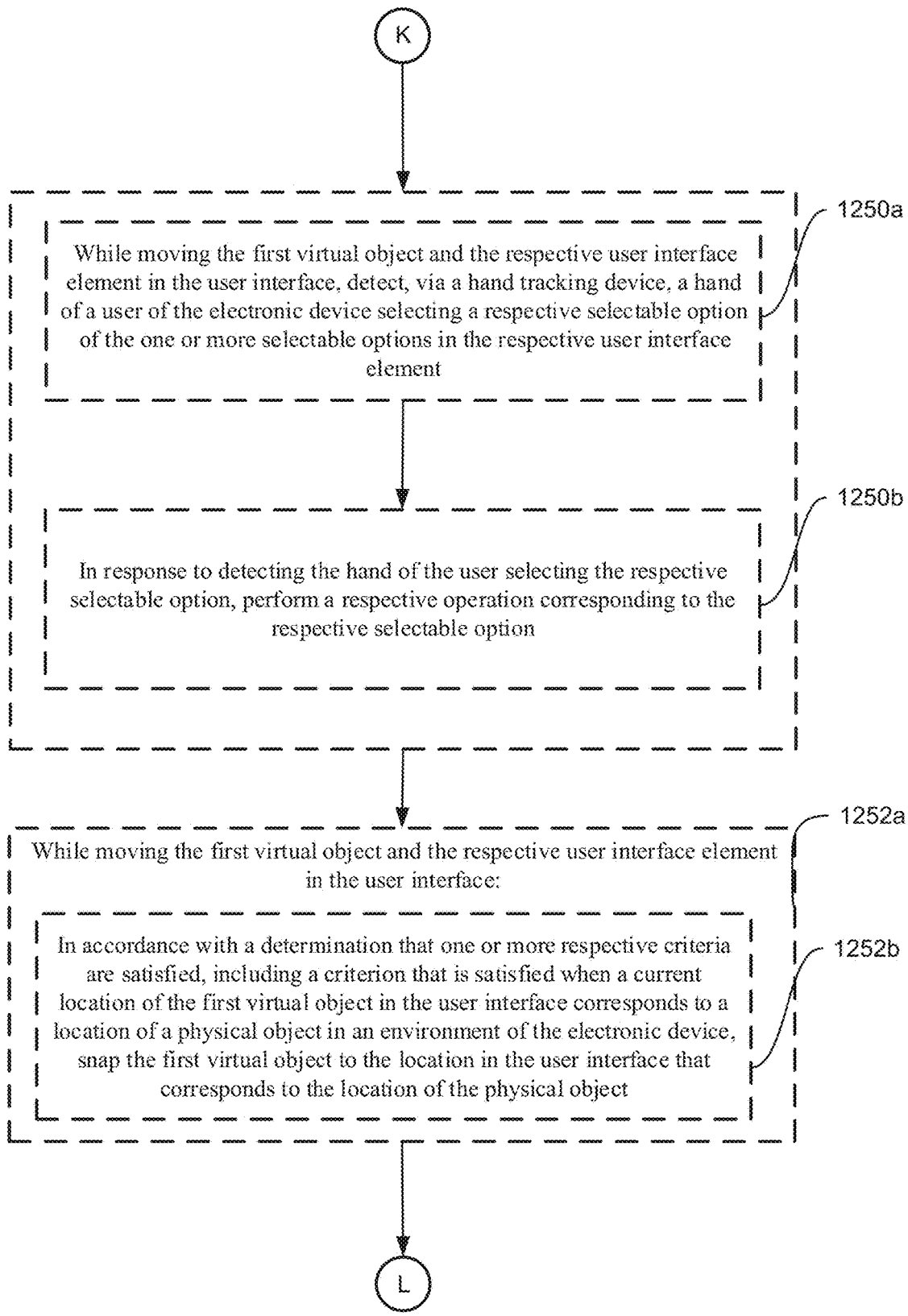
Figure 12M:
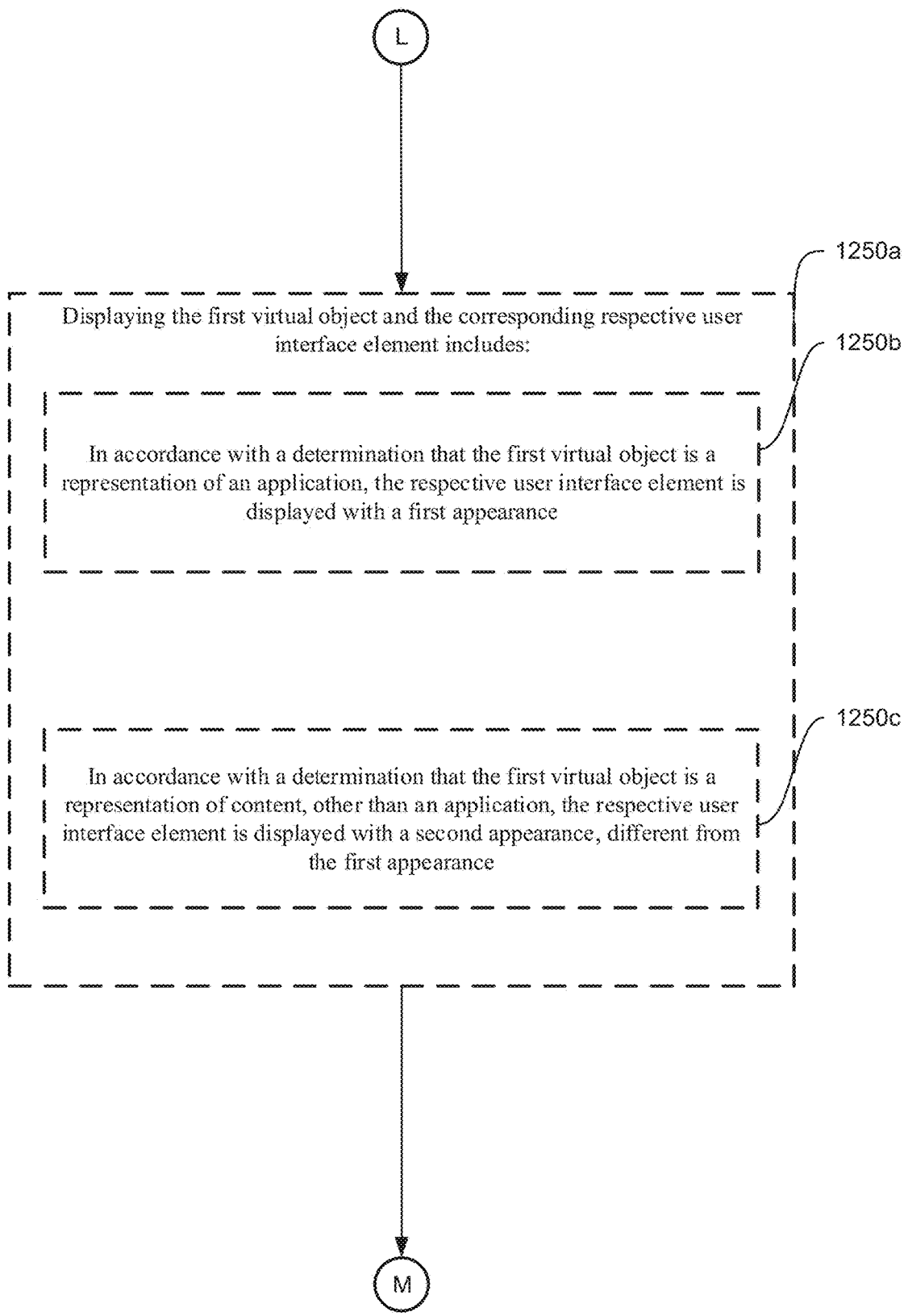
Figure 12N:
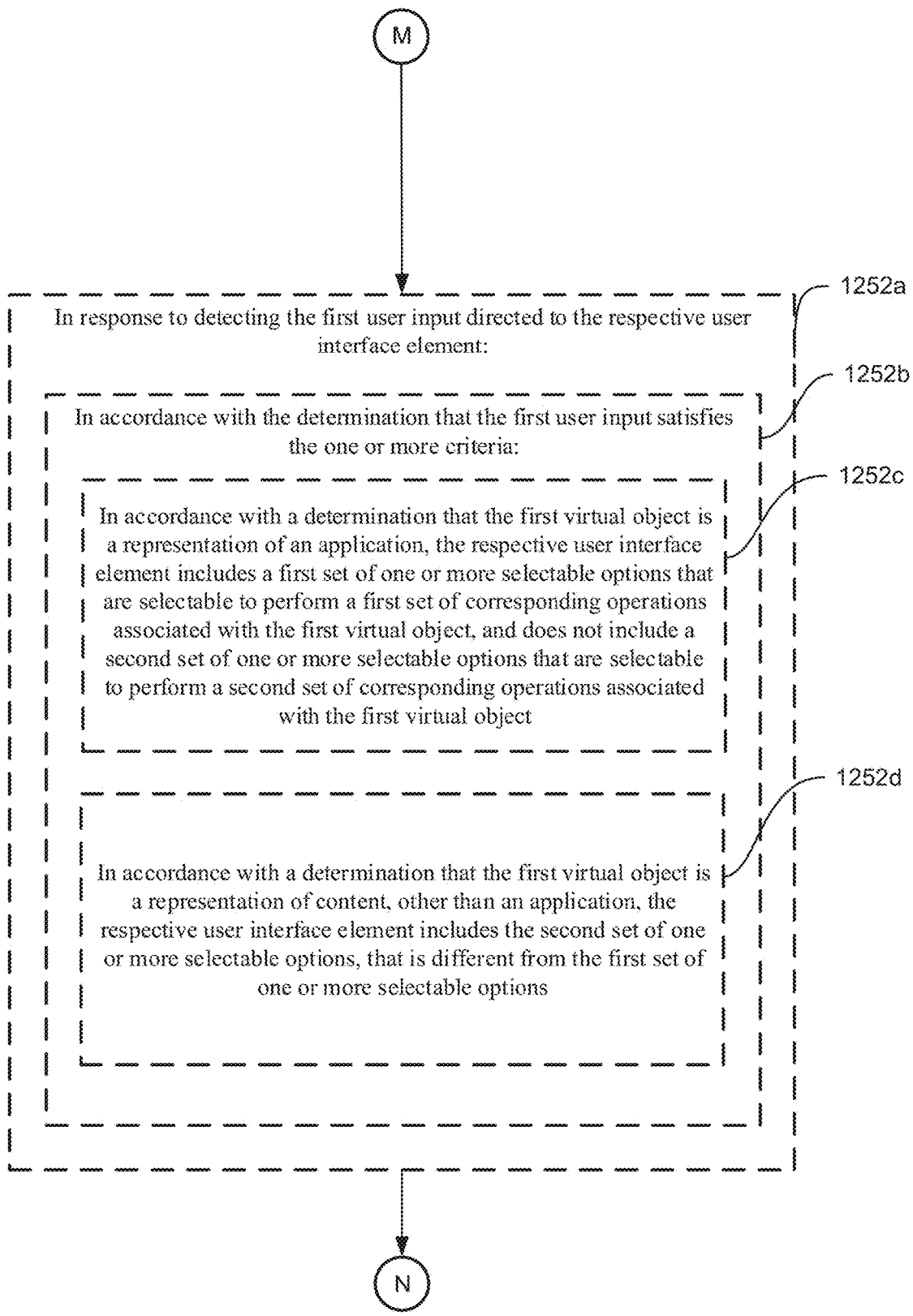
Figure 12O:
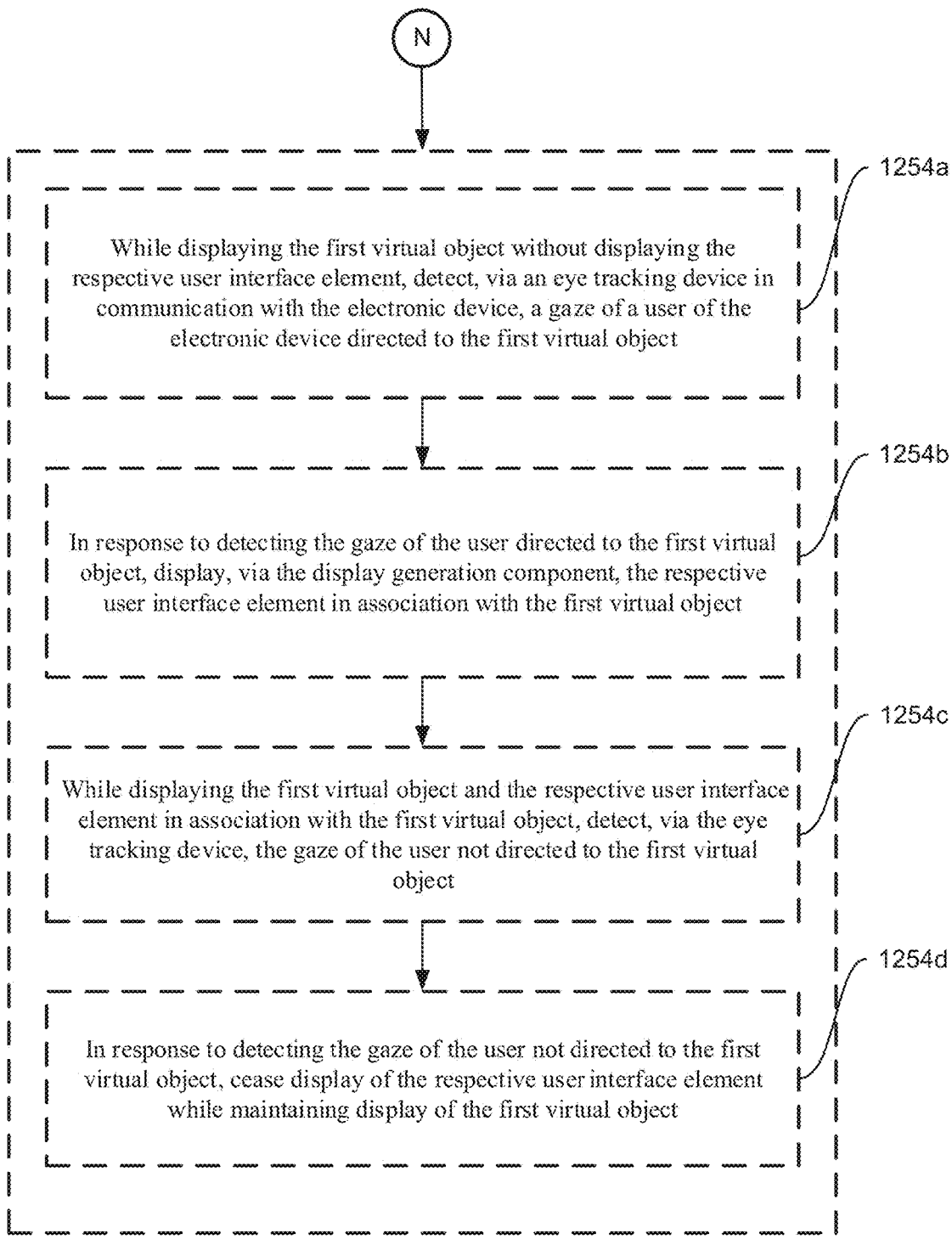

FIGS. 12A-120 is a flowchart illustrating a method of moving virtual objects in a three-dimensional environment and facilitating accessing actions associated with virtual objects in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, such as in FIG. 11A, method 1200 is performed at an electronic device 101 in communication with a display generation component 120 and one or more input devices (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 11A, the electronic device (e.g., 101) displays (1202a), via the display generation component, a user interface (e.g., a three-dimensional environment, a computer-generated reality (CGR) environment such as a virtual reality (VR) environment, a mixed reality (MR) environment, or an augmented reality (AR) environment, etc.) that includes a first virtual object (e.g., 1106a) (e.g., application, window of an application, a virtual object such as a virtual clock, etc.) and a corresponding respective user interface element (e.g., 1180a), separate from the first virtual object (e.g., 1106a), that is displayed in association with the first virtual object (e.g., 1106a). In some embodiments, the corresponding respective user interface element is a horizontal bar displayed at a predetermined location relative to the first virtual object, such as below the horizontal center of first virtual object, overlaid on the first virtual object, etc. The user interface optionally includes a plurality of virtual objects (e.g., apps, windows, etc.) and each virtual object is optionally displayed in association with its own respective user interface element.

In some embodiments, such as in FIG. 11A, while displaying the user interface, the electronic device (e.g., 101) detects (1202b), via the one or more input devices, a first user input directed to the respective user interface element (e.g., 1180a). In some embodiments, the electronic device detects the first input via an eye tracking device, a hand tracking device, a touch-sensitive surface (e.g., touch screen or trackpad), mouse, or keyboard. For example, the electronic device detects, via the eye tracking device, that the user's gaze is directed towards the respective user interface element. As another example, the electronic device detects, via the hand tracking device, that the user performs a predetermined gesture (e.g., touching a thumb to another finger (e.g., index, middle, ring, little finger) on the same hand as the thumb) while detecting, via the eye tracking device, that the user looks at the respective user interface element. In some embodiments, such as in FIG. 11B, in response to detecting the first user input directed to the respective user interface element (e.g., 1180a) (1202c), in accordance with a determination that the first user input corresponds to a request to move the first virtual object (e.g., 1106a) in the user interface, the electronic device (e.g., 101)

moves (1202*d*) the first virtual object (e.g., 1106*a*) and the respective user interface element (e.g., 1180*a*) in the user interface in accordance with the first user input, such as in FIG. 11D. In some embodiments, the first user input corresponds to a request to move the first virtual object in the user interface if the user input includes selection of the respective user interface element followed by a directional input. In some embodiments, the directional input is detected within a threshold time (e.g., 0.02, 0.05, 0.1, 0.2, 0.25, 0.3, 0.5, 1 second, etc.) of detecting the selection of the respective user interface element. For example, the electronic device detects, via an eye tracking device, that the user looks at the respective user interface element and detects, via a hand tracking device, that the user makes a pinching gesture while looking at the respective user interface element, and moves their hand. In this example, in response to the user input, the electronic device moves the first virtual object and the respective user interface element in accordance with the movement of the user's hand. In some embodiments, the electronic device maintains the position of the respective user interface element relative to the first virtual object while moving the first virtual object and the respective user interface element. In some embodiments, in response to detecting the first user input directed to the respective user interface element (e.g., 1180*a*) (1202*c*), such as in FIG. 11A, in accordance with a determination that the first user input satisfies one or more criteria, including a criterion that is satisfied when the first user input is an input other than an input to move the first virtual object (e.g., 1106*a*) in the user interface, the electronic device (e.g., 101) updates (1202*e*) display of the respective user interface element (e.g., 1180*a*) to include one or more selectable options (e.g., 1110*a-e*) that are selectable to perform one or more corresponding operations associated with the first virtual object (e.g., 1106*a*), such as in FIG. 11B. In some embodiments, the first user input satisfies the one or more criteria if the first user input does not include a directional input. In some embodiments, detecting the first user input includes detecting, via an eye tracking device, that the user looks at the respective user interface element; in some embodiments, looking at the respective user interface element for longer than a predetermined amount of time (e.g., 0.02, 0.05, 0.1, 0.2, 0.25, 0.3, 0.5, 1 second) without detecting a directional input (e.g., not detecting, via a hand tracking device, a hand gesture corresponding to a request to move a user interface element). In some embodiments, detecting the first user input includes detecting, via an eye tracking device, that the user looks at the respective user interface element while detecting, via a hand tracking device, a predetermined gesture. In some embodiments, the predetermined gesture corresponds to a request to select the respective user interface element. In some embodiments, detecting the predetermined gesture includes detecting, via a hand tracking device, the user tapping their thumb and a finger (e.g., index finger, middle finger, ring finger, little finger) together. In some embodiments, updating the display of the respective user interface element to include the one or more selectable options includes updating the appearance of the respective user interface element (e.g., increasing the size, changing the color, translucency, etc. of the respective user interface element) and displaying the one or more selectable options within the respective user interface element. In some embodiments, the one or more selectable options include an option that, when selected, causes the electronic device to close the first virtual object (e.g., cease displaying the first virtual object). The one or more selectable options includes a selectable option that, when selected, causes the electronic device to initiate a process to move the first virtual object. In some embodiments, the one or more selectable options include a selectable option that, when selected, causes the electronic device to initiate a process to share the first virtual object using an application or sharing protocol accessible to the electronic device (e.g., sharing with/making visible to another user in the three-dimensional environment).

The above-described manner of moving the first virtual object and the respective user interface element in accordance with the determination that the first user input corresponds to a request to move the first virtual object in the user interface and updating display of the respective user interface element to include one or more selectable options in accordance with a determination that the first user input satisfies one or more criteria provides for an efficient way of either moving the object or gaining access to options related to the object, which simplifies the interaction between the user and the electronic device (e.g., by reducing the number of inputs and time needed to move the first virtual object or gain access to options related to the object) and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 11A, the one or more criteria include a criterion that is satisfied when the first user input includes a gaze (e.g., 1110*a*) of a user of the electronic device directed to the respective user interface element (e.g., 1180*a*) for longer than a time threshold (1204*a*) (e.g., 0.02, 0.05, 0.1, 0.2, 0.25, 0.3, 0.5, 1, etc. seconds). In some embodiments, the first user input satisfies the one or more criteria when the electronic device detects, via the eye tracking device, the user's gaze on the respective user interface element for longer than a time threshold without detecting a non-gaze input via another input device. In some embodiments, while displaying the one or more selectable options, in accordance with a determination that the user's gaze is no longer directed to the respective user interface element, the electronic device ceases displaying the one or more selectable options. Thus, in some embodiments, in response to detecting the user's gaze on the respective user interface element for longer than the time threshold, the electronic device displays the one or more selectable options.

The above-described manner of displaying the one or more selectable options in response to the user's gaze on the respective user interface element provides an efficient way of displaying the respective user interface element with reduced visual clutter until the user looks at the respective user interface and quickly displaying the selectable options when it is likely the user wishes to interact with the selectable options based on the user's gaze, which additionally reduces power usage and improves battery life of the electronic device by enabling the user to use the electronic device more quickly and efficiently, while reducing errors in usage.

In some embodiments, such as in FIG. 11A, the one or more criteria include a criterion that is satisfied when the first user input includes a respective gesture performed by a hand 704 of a user of the electronic device while a gaze (e.g., 1110*a*) of the user is directed to the respective user interface element (e.g., 1180*a*) (1205*a*). In some embodiments, the gesture is detected using a hand tracking device. In some embodiments, the gesture is the user touching a thumb to another finger (e.g., index, middle, ring, little finger) on the same hand as the thumb. In some embodiments, the one or more criteria are satisfied when the electronic device detects the gesture while detecting the gaze of the user on the respective user interface element for at least a predetermined time threshold (e.g., 0.1, 0.2, 0.3, 0.4, 0.5, 1, etc. seconds). In some embodiments, the one or more criteria are satisfied when the electronic device detects the gesture while detecting the gaze of the user on the respective user interface element for any amount of time (e.g., less than the time threshold). In some embodiments, the electronic device displays the one or more selectable options in response to either detecting the user's gaze on the respective user interface element for the predetermined threshold time (e.g., an input satisfying one or more first criteria) or in response to detecting the user's gaze on the respective user interface element while detecting the gesture (e.g., an input satisfying one or more second criteria). In some embodiments, the electronic device displays the options in response to one of detecting the user's gaze on the respective user interface element for the predetermined threshold time or detecting the user's gaze on the respective user interface element while detecting the gesture, but not both. Thus, in some embodiments, the electronic device displays the one or more selectable options in response to detecting the user's gaze on the respective user interface element while detecting the user performing a predetermined gesture.

The above-described manner of displaying the one or more selectable options in response to detecting the user's gaze on the respective user interface element while the user performs a gesture provides an efficient way of displaying the one or more selectable options without waiting for a threshold time (e.g., displaying the options only after the user's gaze is held on the respective user interface element for a predetermined threshold time) which additionally reduces power usage and improves battery life of the electronic device by enabling the user to use the electronic device more quickly and efficiently, while reducing errors in usage.

In some embodiments, such as in FIG. 11B, while displaying the respective user interface element (e.g., 1180*a*) including the one or more selectable options (e.g., 1112*a-e*), the electronic device (e.g., 101) detects (1206*a*), via the one or more input devices (e.g., a hand tracking device), a second user input including a respective gesture performed by a hand (e.g., 1104*c*) of a user of the electronic device while a gaze (e.g., 1110*d*) of the user is directed to a respective selectable option (e.g., 1112*c*) of the one or more selectable options (e.g., In some embodiments, the gesture is the user touching a thumb to another finger (e.g., index, middle, ring, little finger) on the same hand as the thumb.). In some embodiments, in response to detecting the second user input (1206*b*), such as in FIG. 11B, in accordance with a determination that the second user input satisfies one or more first criteria, the electronic device (e.g., 101) performs (1206*c*) a respective operation corresponding to the respective selectable option (e.g., 1112*c*). In some embodiments, the one or more first criteria are satisfied in accordance with a determination that the user performs the gesture while looking at the respective selectable option irrespective of the duration of time for which the user's gaze is held on the respective selectable option. In some embodiments, in response to detecting the user's gaze on the respective selectable option and before detecting the gesture, the electronic device updates a visual characteristic (e.g., size, color, etc.) of the respective selectable option. For example, in response to detecting the user's gaze on a first selectable option, the electronic device highlights the first selectable option and in response to detecting the user's gaze on a second selectable option, the electronic device highlights the second selectable option. Thus, in some embodiments, the electronic device performs an operation corresponding to a respective selectable option in response to detecting the user's gaze on the respective selectable option while detecting the user performing a predetermined gesture with their hand. In some embodiments, in accordance with a determination that the second user input does not satisfy the one or more first criteria, the electronic device forgoes performing the respective operation corresponding to the respective selectable option.

The above-described manner of performing the operation associated with a respective selectable option in response to a gaze and non-gaze input provides an efficient way of causing the electronic device to perform operations, which additionally reduces power usage and improves battery life of the electronic device by enabling the user to use the electronic device more quickly and efficiently, while reducing errors in usage.

In some embodiments, the first user input corresponds to the request to move the first virtual object (e.g., 1106*c*) in the user interface in accordance with a determination that the first user input includes a respective gesture performed by a hand (e.g., 1104*d*) of a user of the electronic device while a gaze (e.g., 1110*e*) of the user is directed to the respective user interface element (e.g., 1180*c*), followed by movement of the hand (e.g., 1104*d*) of the user of the electronic device within a time threshold (e.g., 0.02, 0.05, 0.1, 0.2, 0.25, 0.3, 0.5, 1, etc. seconds) of detecting the respective gesture performed by the hand (e.g., 1104*d*) of the user (1208*a*), such as in FIG. 11B. In some embodiments, in accordance with a determination that the user has been looking at the respective user interface element for the time threshold without performing the predetermined hand gesture (e.g., touching a thumb to another finger (e.g., index, middle, ring, little finger) on the same hand as the thumb), the electronic device displays the one or more selectable options. In some embodiments, in accordance with a determination that the user has been looking at the respective user interface element for the time threshold while performing the predetermined hand gesture (e.g., touching a thumb to another finger (e.g., index, middle, ring, little finger) on the same hand as the thumb) without moving the hand, the electronic device displays the one or more selectable options. In some embodiments, in response to detecting the movement of the hand while performing the gesture within the threshold time of detecting the gaze on the respective user interface element, the electronic device moves the first virtual object and respective user interface element in accordance with movement of the hand of the user without displaying the one or more selectable options. In some embodiments, the first user input corresponds to the request to move the first virtual object in the user interface in accordance with a determination that the first user input includes a respective gesture performed by a hand of a user of the electronic device while a gaze of the user is directed to the respective user interface element within a time threshold (e.g., 0.1, 0.2, 0.3, 0.4, 0.5, 1, etc. seconds) of detecting the respective gesture performed by the hand of the user. In some embodiments, the first user input corresponds to the request to move the first virtual object in the user interface in accordance with a determination that the first user input includes a respective gesture performed by a hand of a user of the electronic device while a gaze of the user is directed to the respective user interface element, followed by movement of the hand of the user of the electronic device within a time threshold (e.g., 0.02, 0.05, 0.1, 0.2, 0.25, 0.3, 0.5, 1, etc. seconds) of detecting the user's gaze on the respective user interface element.

The above-described manner of detecting a request to move the first virtual object in response to detecting movement of the hand within a threshold period of time of detecting the user's gaze on the respective user interface element provides an efficient way of moving the first virtual object in accordance with the movement of the hand without intermediate steps to initiate movement of the first virtual object, which additionally reduces power usage and improves battery life of the electronic device by enabling the user to use the electronic device more quickly and efficiently, while reducing errors in usage.

In some embodiments, while displaying the respective user interface element including the one or more selectable options (e.g., 1112a-e), such as in FIG. 11B, the electronic device (e.g., 101) detects (1210a), via the one or more input devices, a second user input corresponding to a request to move the first virtual object (e.g., 1106a) in the user interface, such as in FIG. 11B. In some embodiments, the one or more selectable options include an option to initiate a process to move the first virtual object in the user interface. In some embodiments, the request to move the first virtual object is selection of the option to initiate the process to move the first virtual object. In some embodiments, in response to detecting the user's gaze on the option to move the first virtual object while detecting the user performing a hand gesture (e.g., touching a thumb to another finger (e.g., index, middle, ring, little finger) on the same hand as the thumb), the electronic device selects the option to move the first virtual object. In some embodiments, the request to move the first virtual object in the user interface is not selection of an option to move the object. For example, the request to move the first virtual object is detecting the user looking at a region of the respective user interface element at which there is no selectable option displayed for a predetermined time threshold (e.g., 0.02, 0.05, 0.1, 0.2, 0.25, 0.3, 0.5, 1, etc. seconds) and/or the user looking at the a region of the respective user interface element at which there is no selectable option displayed while performing a hand gesture (e.g., touching a thumb to another finger (e.g., index, middle, ring, little finger) on the same hand as the thumb). In some embodiments, initiating the process to move the first virtual object includes moving the first virtual object in accordance with movement of the user's hand detected by a hand tracking device. In some embodiments, in response to detecting the second user input (1210b), the electronic device (e.g., 101) ceases (1210c) display of the one or more selectable options (e.g., 1112a-e) in FIG. 11B while maintaining display of the respective user interface element (e.g., 1180a), such as in FIG. 11D. In some embodiments, in response to detecting the second user input (1210b), the electronic device (e.g., 101) moves (1210d) the first virtual object (e.g., 1106a) and the respective user interface element (e.g., 1106a) in the user interface in accordance with the second user input, such as in FIG. 11D. In some embodiments, the second user input includes a movement component (e.g., a directional input such as movement of a hand or arm, movement of the user's eyes, selection of a directional key (e.g., an arrow key)) and the electronic device moves the respective user interface element and the first virtual object in accordance with a magnitude (e.g., distance, duration, speed) of the movement of the second input. In some embodiments, such as in FIG. 11D, the electronic device (e.g., 101) detects (1210e), via the one or more input devices, an end of the second user input. In some embodiments, the end of the second user input is the user ceasing to provide input. In some embodiments, the end of the second user input is the user ceasing to perform a predetermined gesture with their hand. For example, the predetermined gesture includes the user touching a thumb to another finger (e.g., index, middle, ring, little finger) on the same hand as the thumb (e.g., pinching) and detecting the termination of the gesture includes detecting the user move their thumb away from the finger (e.g., un-pinching). In some embodiments, the end of the second user input is the user looking away from the respective user interface element and/or first virtual object and/or user interface. In some embodiments, in response to detecting the end of the second user input, (e.g., automatically, without an input for displaying the one or more selectable options) the electronic device (e.g., 101) updates (1210f) display of the respective user interface element (e.g., 1180a) to include the one or more selectable options (e.g., 1112a-e) that are selectable to perform the one or more corresponding operations associated with the first virtual object (e.g., 1106a), such as in FIG. 11B. For example, the electronic device detects selection of an option to move the first virtual object (e.g., the user looking at the option and touching their thumb to a finger) and, in response to detecting selection of the option, the electronic device ceases displaying the one or more selectable options and initiates a process to move the first virtual object. In this example, the electronic device moves the first virtual object in accordance with the movement of the user's hand while the gesture is maintained (e.g., holding the thumb and finger together) and stops moving the first virtual object and redisplays the one or more selectable options in the respective user interface element (at its new location) in response to detecting the user ceasing to perform the gesture (e.g., the user separates their finger and thumb). Thus, in some embodiments, the electronic device hides the one or more selectable options while the user moves the first virtual object and displays the one or more selectable options in response to the end of the movement input.

The above-described manner of hiding the one or more selectable options while moving the first virtual object provides an efficient way of reducing visual clutter and cognitive burden on the user while moving the first object and enables the user to better see the three-dimensional environment while moving the first virtual object, which additionally reduces power usage and improves battery life of the electronic device by enabling the user to use the electronic device more quickly and efficiently, while reducing errors in usage.

In some embodiments, such as in FIG. 11A, before detecting the first user input, the respective user interface element (e.g., 1180a) is displayed with a first appearance (1212a) (e.g., size, position, color, opacity, translucency). In some embodiments, in response to detecting the first user input directed to the respective user interface element (e.g., 1180a) (1212b), in accordance with a determination that the first user input includes a gaze of a user of the electronic device directed to the respective user interface element (e.g., 1180a), the electronic device (e.g., 101) displays (1212c), via the display generation component, the respective user interface element (e.g., 1180a) with a second appearance (e.g., size, position, color, opacity, translucency), different from the first appearance. For example, the electronic device increases the size of the respective user interface element in response to detecting the user's gaze on the respective user interface element. In some embodiments, the electronic device updates the appearance of the respective user interface element in response to the first user input when the first user input is not a request to move the object and does not satisfy the one or more criteria. For example, the one or more criteria include a criterion that is satisfied when the user's gaze is held on the respective user interface element for a predetermined time threshold (e.g., 0.02, 0.05, 0.1, 0.2, 0.25, 0.3, 0.5, 1, etc. seconds) and the electronic device updates the appearance of the respective user interface element in response to the gaze of the user being held for less than the predetermined threshold time (or irrespective of the duration for which the user's gaze is held on the respective user interface element).

The above-described manner of updating the appearance of the first respective user interface element in response to detecting the first user input provides an efficient way of indicating to the user that the respective user interface element is interactable which additionally reduces power usage and improves battery life of the electronic device by enabling the user to use the electronic device more quickly and efficiently, while reducing errors in usage.

In some embodiments, such as in FIG. 11A, before detecting the first user input, the respective user interface element (e.g., 1180a) is displayed with a first appearance (1214a) (e.g., size, color, translucency, opacity, distance from the view point of the user in the three-dimensional environment). In some embodiments, in response to detecting the first user input directed to the respective user interface element (e.g., 1180a) (1214b), in accordance with the determination that the first user input corresponds to the request to move the first virtual object (e.g., 1106a) in the user interface, the electronic device (e.g., 101) displays (1214c), via the display generation component, the respective user interface element (e.g., 1180a) with a second appearance, different from the first appearance. For example, prior to detecting the first user input, the electronic device displays the respective user interface element with a first color (e.g., white) and, in response to the first user input, the electronic device displays the respective user interface element with a second color (e.g., blue). In some embodiments, while the user provides further input to move the first virtual object, the electronic device maintains the second appearance of the respective user interface element. In some embodiments, while the user provides further input to move the first virtual object, the electronic device displays the respective user interface element with the first appearance or a third appearance different from the first and second appearances.

The above-described manner of updating the appearance of the respective user interface element in response to the request to move the first virtual object provides an efficient way of indicating to the user that the first object is in a mode in which the electronic device is able to update the location of the first object, which additionally reduces power usage and improves battery life of the electronic device by enabling the user to use the electronic device more quickly and efficiently, while reducing errors in usage.

In some embodiments, such as in FIG. 11B, the one or more selectable options include a respective option (e.g., 1112a) that is selectable to cease display of the first virtual object (e.g., 1106a) (1216a). In some embodiments, in response to detecting selection of the respective option, the electronic device ceases display of the first virtual object and the respective user interface element. In some embodiments, the electronic device ceases display of the first virtual object and the respective user interface element without exiting an application associated with the first virtual object (e.g., continuing to display one or more additional virtual objects associated with the application associated with the first application). In some embodiments, the electronic device ceases display of the first virtual object and the respective user interface element and exits the application associated with the first virtual object (e.g., ceasing display of one or more other virtual objects associated with the application associated with the first virtual object). In some embodiments, the electronic device exits the application associated with the first virtual object if the first virtual object is the only virtual object associated with the application and does not exit the application and continues display of one or more additional virtual objects associated with the application if the first virtual object is not the only virtual object associated with application.

The above-described manner of including an option that is selectable to cease display of the first virtual object in the respective user interface element provides an efficient way of ceasing display of the first virtual object, which additionally reduces power usage and improves battery life of the electronic device by enabling the user to use the electronic device more quickly and efficiently, while reducing errors in usage.

In some embodiments, such as in FIG. 11B, the one or more selectable options include a respective option (e.g., 1112b) that is selectable to make the first virtual object (e.g., 1106a) accessible to another user (1218a). In some embodiments, in response to detecting selection of the respective option, the electronic device makes the first virtual object accessible to the other user. In some embodiments, making the first virtual object accessible to the other user includes displaying the first virtual object with an electronic device of the other user, presenting audio associated with the first virtual object with an electronic device of the other user, and/or enabling the other user to provide one or more inputs directed to the first virtual object. In some embodiments, the electronic device makes the first virtual object visible to another user present in the three-dimensional environment and/or enables the other user in the three-dimensional environment to provide inputs directed to the first virtual object. In some embodiments, the electronic device transmits the virtual object to another electronic device or user account, thus enabling the other user to view the first virtual object (or a copy of the first virtual object) asynchronously or synchronously without the other user being present in the three-dimensional environment.

The above-described manner of including an option to make the first virtual object available to another user in the respective user interface element provides an efficient way of sharing the first virtual object, which additionally reduces power usage and improves battery life of the electronic device by enabling the user to use the electronic device more quickly and efficiently, while reducing errors in usage.

In some embodiments, such as in FIG. 11A, the one or more selectable options include a respective option (e.g., 1112d) that is selectable to increase a display area with which the first virtual object (e.g., 1106a) is displayed via the display generation component (1220a). In some embodiments, in response to detecting selection of the respective option, the electronic device presents the first virtual object in a full-screen or full-immersion mode. For example, the first virtual object is a user interface of an application that is displayed concurrently with one or more other virtual objects (and/or representations of physical objects in the physical environment of the electronic device) prior to detecting selection of the respective option. In this example, in response to detecting selection of the respective option, the electronic device increases the display area of the user interface of the application to occupy all or substantially all of (e.g., 80%, 90% or the entire user interface other than one or more small system user interface elements such as a status region, a navigation region, or the like) the user interface displayed via the display generation component and ceases display of the one or more other virtual objects (and/or representations of physical objects in the physical environment of the electronic device). In some embodiments, in response to detecting selection of the respective option, the electronic device increases the level of immersion of the user interface with which the one or more selectable options are associated.

The above-described manner of including the option to increase the display area of the first virtual object in the respective user interface element provides an efficient way of increasing the display area of the first virtual object, which additionally reduces power usage and improves battery life of the electronic device by enabling the user to use the electronic device more quickly and efficiently, while reducing errors in usage.

In some embodiments, such as in FIG. 11B, the one or more selectable options include a respective option (e.g., 1112e) that is selectable to group a plurality of virtual objects (e.g., a plurality of virtual objects associated with the same application with which the first virtual object is associated), including the first virtual object (e.g., 1106a) (1222a). In some embodiments, prior to detecting selection of the respective option, one or more of the plurality of virtual objects are spaced apart from one another by more than a threshold distance (e.g., 0.01, 0.05, 0.1, 0.2, 0.3, 0.5, 0.7, 1, etc. meters) and in response to detecting selection of the respective selectable option, the electronic device updates the locations of one or more of the plurality of virtual objects such that all of the objects of the plurality of objects are within the threshold distance of each other. In some embodiments, prior to detecting selection of the respective option, one or more of the plurality of virtual objects are non-overlapping with one another (e.g., from the viewpoint of the user in the three-dimensional environment) and in response to detecting selection of the respective selectable option, the electronic device updates the locations of one or more of the plurality of virtual objects such that all (or all but one) of the objects of the plurality of objects are overlapping at least one other object in the plurality of objects. In some embodiments, the respective option is only displayed if the electronic device is displaying multiple objects associated with the application with which the first virtual object is associated.

The above-described manner of including the option to group the plurality of objects in the respective user interface element provides an efficient way of concurrently viewing all of the objects in the plurality of objects, which additionally reduces power usage and improves battery life of the electronic device by enabling the user to use the electronic device more quickly and efficiently, while reducing errors in usage.

In some embodiments, the one or more selectable options (e.g., 1112a-e) in FIG. 11B include a respective option that is selectable to initiate a process to edit the first virtual object (e.g., 1106a) (1224a). In some embodiments, in response to detecting selection of the respective option, the electronic device displays one or more editing tools (e.g., copy, paste, cut, markup (e.g., add handwritten drawings to the object), add text, crop, rotate, color settings (e.g., brightness, contrast, saturation). In some embodiments, the electronic device only displays the respective option if the first virtual object is an editable object. For example, the electronic device displays the respective option if the first virtual object is an image and does not display the respective option if the first virtual object is a user interface of an application that does not support editing (e.g., a web browser, an email application, a video streaming application, a music playback application, an E-book, etc.).

The above-described manner of displaying the option to edit the virtual object in the respective user interface element provides an efficient way of causing the device to display editing tools, which additionally reduces power usage and improves battery life of the electronic device by enabling the user to use the electronic device more quickly and efficiently, while reducing errors in usage.

In some embodiments, such as in FIG. 11B, the user interface includes a three-dimensional environment 1102 (e.g., a computer-generated reality (CGR) environment such as a virtual reality (VR) environment, a mixed reality (MR) environment, or an augmented reality (AR) environment, etc.), and moving the first virtual object (e.g., 1106c) and the respective user interface element (e.g., 1180c) in the user interface in accordance with the first user input includes (1226a), while moving the first virtual object (e.g., 1106c), displaying, via the display generation component, a visual indication 1114, separate from the first virtual object (e.g., 1106c) (and separate from the respective user interface element), of a portion of the three-dimensional environment 1102 that will be occupied by the first virtual object (e.g., 1106c) when movement of the first virtual object (e.g., 1106c) is complete, such as in FIG. 11B (1226b). In some embodiments, the electronic device identifies surfaces in the physical environment of the electronic device (e.g., floors, tables, walls) or virtual surfaces in the three-dimensional environment and, in response to an input corresponding to a request to move an object within a threshold distance (e.g., 5, 10, 15, 20, 25, 30, etc. centimeters) of the surface, displays the virtual object as though it is resting on (e.g., for a horizontal surface) or hanging from (e.g., for a vertical surface) the surface. In some embodiments, while the electronic device is detecting an input to move the first object, in accordance with a determination that the current position of the first object while it is being moved is within a threshold distance of a surface, the electronic device displays an indication of the outline of the surface of the object that will be aligned with (e.g., displayed as though it is touching) the surface in response to termination of the input to move the object. For example, while moving a virtual object, the electronic device displays the outline of the bottom surface of the object on the floor of the three-dimensional environment (e.g., optionally a representation of the floor of the physical environment of the electronic device) at the location at which the virtual object would be displayed if the electronic device detected termination of the input to move the object while the object is not currently displayed at the location of the visual indication. Thus, in some embodiments, while the user moves the virtual object, the electronic device displays an indication of the placement of the object corresponding to the movement input.

The above-described manner of displaying the indication of the placement of the object corresponding to the movement input while the user is moving the object efficiently provides a preview of the updated position of the object while it is being moved, which additionally reduces power usage and improves battery life of the electronic device by enabling the user to use the electronic device more quickly and efficiently, while reducing errors in usage.

In some embodiments, such as in FIG. 11A, in accordance with a determination that the first virtual object (e.g., 1106a) is a two-dimensional object, the respective user interface element (e.g., 1180*a*) is displayed at an edge of the first virtual object (e.g., 1106*a*) (1228*a*). In some embodiments, the edge at which the respective user interface element is displayed at a predetermined edge of the first virtual object (e.g., the bottom edge). In some embodiments, the electronic device displays a plurality of virtual objects each with an associated respective user interface element displayed along the same edge of the plurality of virtual objects. For example, the electronic device displays the first virtual object with the respective user interface element along the bottom edge and displays a second virtual object with a second respective user interface element along the bottom edge. In some embodiments, the electronic device displays the respective user interface element at the same edge of the first virtual object irrespective of the user's position relative to the object. In some embodiments, such as in FIG. 11A, in accordance with a determination that the first virtual object (e.g., 1106*c*) is a three-dimensional object, the respective user interface element (e.g., 1180*c*) is displayed at an edge of the first virtual object (e.g., 1106*c*) that is closest to a location corresponding to a user of the electronic device (1228*b*). For example, the electronic device displays the respective user interface element along the bottom edge that is closest to the user's viewpoint in the three-dimensional environment in which the first virtual object is displayed. In some embodiments, if the user's position relative to the first virtual object changes, the electronic device updates the edge of the first virtual object at which the respective user interface element is displayed. For example, while the user's location in the three-dimensional environment is closest to a first edge of the object, the electronic device displays the respective user interface element along the first edge of the object and while the user's location in the three-dimensional environment is closest to a second edge of the object, the electronic device displays the respective user interface element along the second edge of the object.

The above-described manner of displaying the respective user interface element at a predetermined edge of a two-dimensional object and at the edge of a three-dimensional object that is closest to the user provides an efficient way of ensuring the respective user interface element of a three-dimensional environment is visible to the user and displaying the respective user interface element of a two-dimensional object at a location that is predictable and familiar to the user, which additionally reduces power usage and improves battery life of the electronic device by enabling the user to use the electronic device more quickly and efficiently, while reducing errors in usage.

In some embodiments, the electronic device (e.g., 101) concurrently displays (1230*a*), in the user interface, the first virtual object (e.g., 1106*a*) and the corresponding respective user interface element (e.g., 1180*a*) (1230*b*), separate from the first virtual object (e.g., 1106*a*), that is displayed in association with (e.g., proximate to, along an edge of, etc.) the first virtual object (e.g., 1106*a*) and a second virtual object (e.g., 1106*b*) and a corresponding respective user interface element (e.g., 1180*b*), separate from the second virtual object (e.g., 1106*b*), that is displayed in association with (e.g., proximate to, along an edge of, etc.) the second virtual object (e.g., 1106*b*) (1230*c*). In some embodiments, the corresponding respective user interface element of the first virtual object and the corresponding respective user interface element have the same appearance. In some embodiments, the respective user interface elements have different sizes based on the size and/or distance from the viewpoint of the user of the respective virtual object with which the respective user interface element is associated. In some embodiments, the respective user interface element corresponding to the second virtual object has the same functionality as the respective user interface element corresponding to the first virtual object. In some embodiments, in response to detecting, via the gaze tracking device, that the user's gaze is directed to the first virtual object, the electronic device displays the first virtual object with the respective user interface element corresponding to the first virtual object and displays the second virtual object without the respective user interface element corresponding to the second virtual object. In some embodiments, in response to detecting, via the gaze tracking device, that the user's gaze is directed to the second virtual object, the electronic device displays the second virtual object with the respective user interface element corresponding to the second virtual object and displays the first virtual object without the respective user interface element corresponding to the first virtual object.

The above-described manner of displaying respective user interface elements corresponding to each of the first and second virtual objects efficiently provides a consistent way of interacting with the virtual objects, which additionally reduces power usage and improves battery life of the electronic device by enabling the user to use the electronic device more quickly and efficiently, while reducing errors in usage.

In some embodiments, such as in FIG. 11B, moving the first virtual object (e.g., 1106*c*) and the respective user interface element (e.g., 1180*c*) in the user interface in accordance with the first user input includes (1232*a*), in accordance with a determination that one or more respective criteria are satisfied (1232*b*), displaying an animation of the first virtual object (e.g., 1106*c*) lifting from an initial position at a beginning of the movement of the first virtual object (e.g., 1106*c*) (1232*c*) (e.g., the one or more respective criteria are satisfied when the first virtual object is oriented along a surface (e.g., wall, floor, table, etc.) of the three-dimensional environment (e.g., a virtual surface or a representation of a surface in the physical environment of the electronic device (e.g., displaying a photorealistic representation of the surface or enabling the user to see the surface through a transparent portion of the display generation component)). In some embodiments, the one or more respective criteria include a criterion that is satisfied if the first virtual object is a three-dimensional object. For example, in some embodiments, the electronic device displays the virtual object as though it is placed on a floor or table or hanging on a wall in the three-dimensional environment (e.g., in a VR environment) or in the physical environment of the electronic device (e.g., in an AR or MR environment) (e.g., In response to an input that includes movement in a direction that does not correspond to lifting the first virtual object). For example, the electronic device displays an animation of moving the first virtual object up from a table in response to a horizontal or downward movement input and, after or while moving the object up, moves the object in a direction accordance with the direction of the movement input. As another example, the electronic device displays an animation of moving the first object horizontally away from a wall in response to a vertical movement input and, after or while moving the object horizontally away from the wall, moves the object in a direction in accordance with the direction of the movement input. In some embodiments, the electronic device detects a movement input that includes motion in the direction corresponding to lifting the first virtual object and the motion of the object in response to the input includes lifting the object. In some embodiments, such as in FIG. 11D, in accordance with a determination that one or more respective criteria are satisfied (1232b), displaying an animation of the first virtual object (e.g., 1106c) descending to a final position at an end of the movement of the first virtual object (e.g., 1106c) (1232d) (e.g., in response to movement that does not correspond to causing the object to descend). For example, the electronic device displays an animation of moving the first virtual object down towards the surface of a table in response to the end of a horizontal or upward movement input after or while moving the in a direction accordance with the direction of the movement input. As another example, the electronic device displays an animation of moving the first object horizontally towards a wall in response to a vertical movement input after or while moving the object in a direction in accordance with the direction of the movement input. In some embodiments, the electronic device detects a movement input that includes motion in the direction corresponding to causing the first virtual object to descend and the motion of the object in response to the input includes causing the object to descend. Thus, in some embodiments, prior to moving the object in accordance with the movement input, the electronic device moves the object away from a surface and, in response to detecting the end of the movement input, the electronic device moves the object to a location along the surface.

The above-described manner of moving the object away from the surface prior to moving the object in accordance with the movement input and moving the object towards the surface at the end of the movement input provides an efficient way of allowing the user to view the surface while moving the object around (e.g., by moving the object away from a location that obscures part of the surface) which additionally reduces power usage and improves battery life of the electronic device by enabling the user to use the electronic device more quickly and efficiently, while reducing errors in usage.

In some embodiments, such as in FIG. 11A, the one or more respective criteria include a criterion that is satisfied when the first virtual object (e.g., 1106c) was snapped to a surface at the initial position before the first user input for moving the first virtual object (e.g., 1106c) in the user interface was detected (1234a). In some embodiments, while the object is snapped to the surface, the electronic device displays the object as though it is resting on the surface (e.g., placed on a floor or table, hanging on a wall). In some embodiments, the surface is a virtual surface in the three-dimensional environment. In some embodiments, the surface is a real surface in the physical environment of the electronic device and the electronic device displays a photorealistic representation of the surface or enables the user to view the surface through a transparent portion of the display generation component. In some embodiments, the electronic device snaps the object to the surface in response to detecting the object being moved within a threshold distance (e.g., 1, 2, 3, 4, 5, 7, 10, 20, 30, etc. centimeters) of the surface. In some embodiments, the one or more criteria are not satisfied if the object is not snapped to a surface. In some embodiments, the one or more criteria are satisfied irrespective of whether or not the object is snapped to a surface. Thus, in some embodiments, in accordance with a determination that the object is snapped to a surface, prior to moving the object in accordance with the movement input, the electronic device moves the object away from a surface and, in response to detecting the end of the movement input, the electronic device moves the object to a location along the surface.

The above-described manner of moving the object away from the surface prior to moving the object in accordance with the movement input and moving the object towards the surface at the end of the movement input if the object is snapped to a surface provides an efficient way of allowing the user to view the surface while moving the object around (e.g., by moving the object away from a location that obscures part of the surface) which additionally reduces power usage and improves battery life of the electronic device by enabling the user to use the electronic device more quickly and efficiently, while reducing errors in usage.

In some embodiments, such as in FIG. 11A, the electronic device (e.g., 101) detects (1236a), via a hand tracking device in communication with the electronic device, (e.g., a predefined portion of) a hand (e.g., 1104a) of a user of the electronic device at a respective location with respect to the first virtual object (e.g., 1106b) (e.g., towards the left, right, top, or bottom surface of the first virtual object). In some embodiments, such as in FIG. 11A, in response to detecting the hand (e.g., 1104a) of the user at the respective location with respect to the first virtual object (e.g., 1106b), and in accordance with a determination that one or more respective criteria are satisfied (1236b) (e.g., detecting, via an eye tracking device, that the user's gaze is directed towards the first virtual object and/or the respective user interface element and/or detecting, via the hand tracking device that the user performs a predetermined gesture (e.g., touching a thumb to another finger (e.g., index, middle, ring, little finger) on the same hand as the thumb)), in accordance with a determination that the respective location corresponds to a first side of the first virtual object (e.g., 1106b), the electronic device (e.g., 101) displays (1236c), via the display generation component, the respective user interface element (e.g., 1180b) at the first side of the first virtual object (e.g., 1106b). In some embodiments, the electronic device updates the location of the respective user interface element from being displayed at a predetermined edge of the first virtual object to being displayed at the first side of the first virtual object. For example, in response to detecting the user's hand towards the right side of the first virtual object, the electronic device moves the respective user interface element from being displayed along the bottom of the first virtual object to being displayed along the right side of the first virtual object. In some embodiments, such as in FIG. 11A, in response to detecting the hand (e.g., 1104a) of the user at the respective location with respect to the first virtual object (e.g., 1106b), and in accordance with a determination that one or more respective criteria are satisfied (1236b), in accordance with a determination that the respective location corresponds to a second side, different from the first side, of the first virtual object (e.g., 1106b), the electronic device (e.g., 101) displays (1236d), via the display generation component, the respective user interface element (e.g., 1180b) at the second side of the first virtual object (e.g., 1106b). For example, in response to detecting the user's hand towards the left side of the first virtual object, the electronic device moves the respective user interface element from being displayed along the bottom of the first virtual object to being displayed along the left side of the first virtual object. As another example, in response to detecting the user's hand towards the left side of the first virtual object, the electronic device displays the respective user interface element on the left side of the first virtual object without initially displaying the respective user interface element at a different position. In some embodiments, while displaying the respective user interface element at the location in accordance with the position of the user's hand relative to the first virtual object, in response to detecting the user's other hand at a location corresponding to the first virtual object (e.g., on another side of the object), the electronic device displays a second respective user interface element at a location corresponding to the user's other hand.

The above-described manner of displaying the respective user interface element at a location corresponding to the location of the user's hand relative to the first virtual object provides an efficient way of enabling the user to interact with the respective user interface element with their hand (e.g., by moving the respective user interface element towards the user's hand) which additionally reduces power usage and improves battery life of the electronic device by enabling the user to use the electronic device more quickly and efficiently, while reducing errors in usage.

In some embodiments, such as in FIG. 11A, the one or more respective criteria include a criterion that is satisfied when the hand (e.g., 1104b) of the user has a first pose while at the respective location with respect to the first virtual object (e.g., 1106a) (1238a). In some embodiments, the pose is the user's thumb within a threshold distance (e.g., 0.5, 1, 2, etc. centimeters) of a finger (e.g., index finger, middle finger, ring finger, little finger) on the same hand as the thumb. In some embodiments, detecting the user touching a thumb to another finger (e.g., index, middle, ring, little finger) on the same hand as the thumb corresponds to a selection input and the pose corresponds to the beginning of the selection input.

The above-described manner of displaying the respective user interface element at a location corresponding to the location of the user's hand relative to the first virtual object in response to detecting the predetermined pose of the hand provides an efficient way of enabling the user to interact with the respective user interface element with their hand (e.g., by moving the respective user interface element towards the user's hand) which additionally reduces power usage and improves battery life of the electronic device by enabling the user to use the electronic device more quickly and efficiently, while reducing errors in usage.

In some embodiments, such as in FIG. 11A, the one or more criteria include a criterion that is satisfied when a hand (e.g., 1104b) of a user of the electronic device is at a respective location with respect to the first virtual object (e.g., 1106c) (e.g., within a threshold distance (e.g., 1, 2, 3, 5, 10, 15, 30, 50, etc. centimeters) of the first virtual object) and the hand (e.g., 1105b) of the user has a first pose (1240a) (e.g., one or more fingers extended in a "pointing" gesture). In some embodiments, the first pose is different from a second pose (e.g., touching a thumb to another finger (e.g., index, middle, ring, little finger) on the same hand as the thumb) that, if detected towards a respective side of the first virtual object, causes the electronic device to display the respective user interface element on the respective side of the first virtual object. In some embodiments, the first pose is different from a second pose (e.g., touching a thumb to another finger (e.g., index, middle, ring, little finger) on the same hand as the thumb) that, if detected and maintained while the user moves their hand (e.g., within a time threshold (e.g., 0.02, 0.05, 0.1, 0.2, 0.25, 0.3, 0.5, 1, etc. seconds) of detecting the user's gaze on the first virtual object), causes the electronic device to move the first virtual object in accordance with the movement of the user's hand. In some embodiments, in response to detecting, via the gaze tracking device, the user's gaze directed to a respective one of the selectable options while detecting, via the hand tracking device, that the user's hand is within a threshold distance of the respective one of the selectable options (e.g., 1, 2, 3, 5, 10, 15, 30, 50, etc. centimeters) while in the first pose (e.g., one or more fingers extended in a "pointing" gesture), the electronic device performs an operation associated with selection of the respective one of the selectable options.

The above-described manner of displaying the one or more selectable options in response to detecting the hand of the user with the first pose provides an efficient way of performing an action associated with one of the selectable options (e.g., by reducing the time it takes to display the selectable options) which additionally reduces power usage and improves battery life of the electronic device by enabling the user to use the electronic device more quickly and efficiently, while reducing errors in usage.

In some embodiments, such as in FIG. 11A, while a predefined portion (e.g., thumbs, fingers, etc.) of the hand (e.g., 1104a) of the user is at a respective location with respect to the first virtual object (e.g., 1106b), wherein the respective location is remote from a location of the respective user interface element (e.g., 1180b) (e.g., at least a threshold distance (e.g., 5, 10, 20, 30, 50, etc. centimeters) away from the respective user interface element), the electronic device (e.g., 101) detects (1242a), via the hand tracking device, a respective gesture (e.g., touching a thumb to another finger (e.g., index, middle, ring, little finger) on the same hand as the thumb) performed by the predefined portion of the hand (e.g., 1104a) of the user. In some embodiments, the electronic device also detects, via the eye tracking device, that the user's gaze is directed towards the first virtual object and/or the respective user interface element. In some embodiments, such as in FIG. 11A, in response to detecting the respective gesture performed by the predefined portion of the hand (e.g., 1104a) of the user, the electronic device (e.g., 101) moves (1242b) the respective user interface element (e.g., 1180b) to the respective location of the predefined portion of the hand (e.g., 1104a) of the user. In some embodiments, the electronic device displays the center of the respective user interface element at the location of the hand and/or at a location at which the user's thumb touches another finger or between the user's thumb and finger and displays the first virtual object at a predetermined location relative to the respective user interface element. For example, the electronic device displays the first object above and center aligned with the respective user interface element. Thus, in some embodiments, in response to detecting the gesture, the electronic device moves the respective user interface element (and the first virtual object) to the location at which the gesture was performed.

The above-described manner of moving the respective user interface element to the location at which the gesture was performed provides an efficient way of moving the respective user interface element (e.g., without dragging the user interface element to an updated location) which additionally reduces power usage and improves battery life of the electronic device by enabling the user to use the electronic device more quickly and efficiently, while reducing errors in usage.

In some embodiments, such as in FIG. 11A, while displaying the respective user interface element (e.g., 1180b) at the first side of the first virtual object (e.g., 1106b), the electronic device (e.g., 101) detects (1244a), via the hand tracking device, movement of the hand (e.g., 1104a) of the user to a location that corresponds to the second side of the first virtual object (e.g., 1106b) (e.g., the second side is different from the first side). In some embodiments, in response to detecting the movement of the hand (e.g., 1104a) of the user to the location that corresponds to the second side of the first virtual object (e.g., 1106b), the electronic device (e.g., 101) displays (1244*b*), via the display generation component, an animation of the respective user interface element (e.g., 1180*b*) moving from the first side of the first virtual object (e.g., 1106*b*) to the second side of the first virtual object (e.g., 1106*b*). In some embodiments, the electronic device animates updating the location of the respective user interface element from being displayed at a first edge (e.g., a predetermined edge, or an arbitrary edge) of the first virtual object to being displayed at the second side of the first virtual object, such as by displaying the respective user interface element moving from the first side to the second side of the virtual object. For example, in response to detecting the user's hand towards the right side of the first virtual object, the electronic device displays an animation of moving the respective user interface element from being displayed along the bottom of the first virtual object to being displayed along the right side of the first virtual object.

The above-described manner of displaying an animation moving the respective user interface element to a location corresponding to the location of the user's hand relative to the first virtual object provides an efficient way of enabling the user to interact with the respective user interface element with their hand (e.g., by moving the respective user interface element towards the user's hand) which additionally reduces power usage and improves battery life of the electronic device by enabling the user to use the electronic device more quickly and efficiently, while reducing errors in usage.

In some embodiments, such as in FIG. 11B, the first user input for moving the first virtual object (e.g., 1106*c*) in the user interface includes movement of a hand (e.g., 1104*d*) (e.g., and/or arm) of a user of the electronic device (1246*a*). In some embodiments, such as in FIG. 11B, prior to moving the first virtual object (e.g., 1106*c*), the first virtual object (e.g., 1106*c*) has a respective orientation relative to a predefined frame of reference of the user interface (1246*b*) (e.g., the first virtual object has an axis that is oriented in a respective orientation with respect to an "up" direction in the predefined frame of reference). In some embodiments, while moving the first virtual object (e.g., 1106*c*) and the respective user interface element (e.g., 1180*c*) in the user interface the electronic device (e.g., 101) detects (1246*c*) a change in orientation of the hand (e.g., 1104*d*) of the user. In some embodiments, in response to detecting the change in orientation of the hand (e.g., 1104*d*) of the user, the electronic device (e.g., 101) changes (1246*d*) an orientation of the first virtual object (e.g., 1106*c*) so that it no longer has the respective orientation relative to the predefined frame of reference (e.g., the axis is no longer oriented in the respective orientation with respect to the "up" direction in the predefined frame of reference). In some embodiments, while moving the first virtual object, the axis of the first virtual object is fixed in a respective orientation relative to a hand of the user (e.g., so that the axis is oriented in the respective orientation with respect to the "up" direction of the hand of the user). In some embodiments, such as in FIG. 11D, in response to detecting an end of the first user input, the electronic device (e.g., 101) displays (1248*e*) the virtual object (e.g., 1106*c*) with the respective orientation relative to the predefined frame of reference of the user interface (e.g., the virtual object has the respective orientation relative to the predefined frame of reference of the user interface without regard to whether the virtual object was in a first orientation or a second orientation different from the first orientation or a third orientation different from the first and second orientations when the end of the first user input was detected). In some embodiments, in response to the end of the first user input, the electronic device displays the first virtual object with the same orientation at which the first virtual object was displayed prior to detecting the first input. Thus, in some embodiments, the electronic device rotates the first virtual object in accordance with rotation of the user user's hand while moving the first virtual object in accordance with rotation of the user's hand, and displays the first virtual object with the respective orientation relative to the predefined frame of reference in response to the end of the movement input (e.g., the first virtual object snaps back to its original orientation and/or an orientation that is aligned with the predefined frame of reference).

The above-described manner of rotating the first virtual object in accordance with the rotation of the user's hand while moving the first virtual object in accordance with movement of the user's hand and displaying the first virtual object with the original orientation in response to the end of the movement input provides an efficient way of displaying the first object proximate to a predetermined portion of the user's hand while the electronic device moves the first virtual object in accordance with the hand movement without maintaining the rotation of the object after the end of the first input, which additionally reduces power usage and improves battery life of the electronic device by enabling the user to use the electronic device more quickly and efficiently, while reducing errors in usage.

In some embodiments, while moving the first virtual object (e.g., 1106*a*) and the respective user interface element (e.g., 1180*a*) in the user interface (e.g., in accordance with the first user input), the electronic device (e.g., 101) detects (1250*a*), via a hand tracking device, a hand of a user of the electronic device selecting a respective selectable option of the one or more selectable options (e.g., 1112*a-e*) in the respective user interface element (e.g., 1180*a*), such as in FIG. 11B. In some embodiments, the electronic device moves the first virtual object and the respective user interface element in accordance with movement of a first hand/arm of the user and the electronic device detects a selection input made with the other hand of the user. In some embodiments, the input selecting the respective selectable option includes detecting a predetermined pose or gesture of the other hand, such as the user extending one or more fingers of their other hand towards the respective selectable option (e.g., to "press" the option) and/or touching a thumb to another finger (e.g., index, middle, ring, little finger) on the same hand as the thumb. In some embodiments, detecting the selection input includes detecting, via an eye tracking device, that the user's gaze is directed towards the respective selectable option while detecting the predetermined pose or gesture of the other hand. In some embodiments, in response to detecting the hand of the user selecting the respective selectable option, the electronic device (e.g., 101) performs (1250*b*) a respective operation corresponding to the respective selectable option. In some embodiments, the electronic device performs the respective selectable option while continuing to move the first virtual object and the respective user interface element. In some embodiments, the electronic device ceases moving the first virtual object and respective user interface element and performs the respective action while displaying first virtual object and the respective user interface element at the location at which they were displayed when the selection of the respective selectable option was detected. In some embodiments, the respective selectable option is an option to cease display of the first virtual object and, in response to detecting selection of the respective selectable option, the electronic device ceases display of the first virtual object and the respective user interface element.

The above-described manner of accepting selection of the respective selectable option while moving the first virtual object and the respective user interface element provides an efficient way of performing actions associated with the selectable options without requiring termination of the movement of the first virtual object, which additionally reduces power usage and improves battery life of the electronic device by enabling the user to use the electronic device more quickly and efficiently, while reducing errors in usage.

In some embodiments, such as in FIG. 11C, while moving the first virtual object (e.g., 1106c) and the respective user interface element (e.g., 1180c) in the user interface (1252a), in accordance with a determination that one or more respective criteria are satisfied, including a criterion that is satisfied when a current location of the first virtual object (e.g., 1106c) in the user interface corresponds to (e.g., is within a threshold distance (e.g., 1, 2, 5, 10, 20, 30, etc. centimeters) of) a location of a physical object in an environment of the electronic device (e.g., the electronic device displays a photorealistic representation of the physical object in the three-dimensional environment or enables the user to view the physical object through a transparent portion of the display generation component), the electronic device (e.g., 101) snaps (1252b) the first virtual object (e.g., 1106c) to the location in the user interface that corresponds to the location of the physical object. In some embodiments, snapping the first virtual object to the location corresponding to the physical object includes displaying the first virtual object as though it is attached to or resting on the real object. For example, the electronic device displays the first virtual object as though it is resting on a table or floor or hanging on a wall. In some embodiments, the electronic device snaps the first virtual object to a hand of the user (e.g., the hand of the user that is not moving the virtual object) and updates the location of the virtual object in response to movement of the user's hand (e.g., displaying the first virtual object as though it is resting in or stuck to the user's hand). In some embodiments, in accordance with a determination that the one or more respective criteria are not satisfied, the electronic device forgoes snapping the first virtual object to the location corresponding to the location of the physical object (e.g., continues to display the virtual object at its respective location in the three-dimensional environment).

The above-described manner of snapping the first virtual object to the physical object provides an efficient way of automatically positioning the first virtual object in a way that reduces cognitive burden on the user, which additionally reduces power usage and improves battery life of the electronic device by enabling the user to use the electronic device more quickly and efficiently, while reducing errors in usage.

In some embodiments, such as in FIG. 11A, displaying the first virtual object (e.g., 1106a) (e.g., application, window of an application, a virtual object such as a virtual clock, etc.) and the corresponding respective user interface element (e.g., 1180a) includes (1250a), in accordance with a determination that the first virtual object (e.g., 1106a) is a representation (e.g., a user interface) of an application, the respective user interface element (e.g., 1180a) is displayed with a first appearance (1250b) (e.g., size, color, opacity, shape, etc.). In some embodiments, such as in FIG. 11A, displaying the first virtual object (e.g., 1106c) (e.g., application, window of an application, a virtual object such as a virtual clock, etc.) and the corresponding respective user interface element (e.g., 1180c) includes (1250a), in accordance with a determination that the first virtual object (e.g., 1106c) is a representation of content (e.g., video content, an image, an audio player, a document), other than an application, the respective user interface element (e.g., 1180c) is displayed with a second appearance (e.g., size, color, opacity, shape, etc.), different from the first appearance (1250c). For example, the electronic device displays the respective user interface element at a smaller size if the first virtual object is a representation of content than if the first virtual object is a representation of an application. In some embodiments, the representation of content is displayed in response to an input directed to the representation of the application. For example, the electronic device displays an item of content separate from a representation of an application in response to the user selecting (e.g., with a hand gesture (e.g., pinching, pointing, etc.)) the content and dragging it out of the representation of the application. In some embodiments, the electronic device displays the respective user interface element with the same appearance irrespective of whether the first virtual object is a representation of content or a representation of an application.

The above-described manner of displaying the respective user interface element with a different appearance depending on whether the first virtual object is a representation of content or of an application provides an efficient way of expanding functionality of the respective user interface element when needed and reducing the display area occupied by the respective user interface element when the increased functionality is not needed, which additionally reduces power usage and improves battery life of the electronic device by enabling the user to use the electronic device more quickly and efficiently, while reducing errors in usage.

In some embodiments, such as in FIG. 11B, in response to detecting the first user input directed to the respective user interface element (e.g., 1180a) (1252a), in accordance with the determination that the first user input satisfies the one or more criteria (1252b), in accordance with a determination that the first virtual object (e.g., 1106a) is a representation (e.g., a user interface) of an application, the respective user interface element (e.g., 1180a) includes a first set of one or more selectable options (e.g., 1112a-e) that are selectable to perform a first set of corresponding operations associated with the first virtual object (e.g., 1106a), and does not include a second set of one or more selectable options that are selectable to perform a second set of corresponding operations associated with the first virtual object (e.g., 1106a) (1252c). For example, the one or more options include an option to merge/collect all objects associated with the same application as the first virtual object and do not include an option to add markup to the first virtual object. In some embodiments, in response to detecting the first user input directed to the respective user interface element (e.g., 1180a) (1252a), in accordance with the determination that the first user input satisfies the one or more criteria (1252b), in accordance with a determination that the first virtual object (e.g., 1106c) is a representation of content (e.g., video content, an image, an audio player, a document), other than an application, the respective user interface element (e.g., 1180c) includes the second set of one or more selectable options, that is different from the first set of one or more selectable options (1252d). For example, the one or more options include an option to add markup to the first virtual object and do not include an option to merge/collect all objects associated with the same application. In some embodiments, the first virtual object includes one or more options irrespective of whether the object is a representation of an application or a representation of content. In some embodiments, representations of different applications include different options and representations of different content include different options. For example, a respective user interface element associated with a messaging application does not include an option to share the representation of the messaging application, but a respective user interface element associated with a word processing application includes an option to share the word processing application. As another example, a respective representation of an item of video content includes an option to view the video content in a full-screen mode, but a respective user interface element associated with representation of an audio player does not include the option to display the audio player in a full-screen mode. The above-described manner of presenting different options in the respective user interface element depending on whether the first virtual object is a representation of content or a representation of an application provides an efficient way of conserving display area by forgoing displaying options not relevant to the first virtual object, which additionally reduces power usage and improves battery life of the electronic device by enabling the user to use the electronic device more quickly and efficiently, while reducing errors in usage.

In some embodiments, such as in FIG. 11D, while displaying the first virtual object (e.g., 1106a) without displaying the respective user interface element, the electronic device (e.g., 101) detects (1254a), via an eye tracking device in communication with the electronic device, a gaze of a user of the electronic device directed to the first virtual object (e.g., 1106a). In some embodiments, in response to detecting the gaze of the user directed to the first virtual object (e.g., 1106a) (e.g., for a threshold period of time (e.g., 0.02, 0.05, 0.1, 0.2, 0.25, 0.3, 0.5, 1, etc. seconds) or immediately, irrespective of the duration of the user's gaze on the first virtual object), the electronic device (e.g., 101) displays (1254b), via the display generation component, the respective user interface element (e.g., 1180a) in association with (e.g., within a threshold distance (e.g., 0.5, 1, 2, 5, 10, etc. centimeters) and/or along an edge of) the first virtual object (e.g., 1106a), such as in FIG. 11A. In some embodiments, while displaying the first virtual object (e.g., 1106a) and the respective user interface element (e.g., 1180a) in association with the first virtual object, such as in FIG. 11A, the electronic device (e.g., 101) detects (1254c), via the eye tracking device, the gaze of the user not directed to the first virtual object (e.g., 1180a) (e.g., detecting the gaze of the user directed to a different object displayed by the display generation component, detecting the user closing their eyes for a predetermined time (e.g., 0.2, 0.3, 0.4, 0.5, 1, etc. seconds)). In some embodiments, in response to detecting the gaze of the user not directed to the first virtual object (e.g., 1106a), the electronic device (e.g., 101) ceases (1254d) display of the respective user interface element while maintaining display of the first virtual object (e.g., 1106a), such as in FIG. 11D. In some embodiments, the electronic device forgoes displaying the respective user interface element unless and until the electronic device detects the user's gaze directed to the first virtual object.

The above-described manner of forgoing displaying the respective user interface element unless and until the electronic device detects the user's gaze directed to the first virtual object provides an efficient way of reducing visual clutter and cognitive burden on the user, which additionally reduces power usage and improves battery life of the electronic device by enabling the user to use the electronic device more quickly and efficiently, while reducing errors in usage.

FIGS. 13A-13F illustrate examples of how an electronic device enhances interactions with selectable user interface elements in accordance with some embodiments.

Figure 13A:
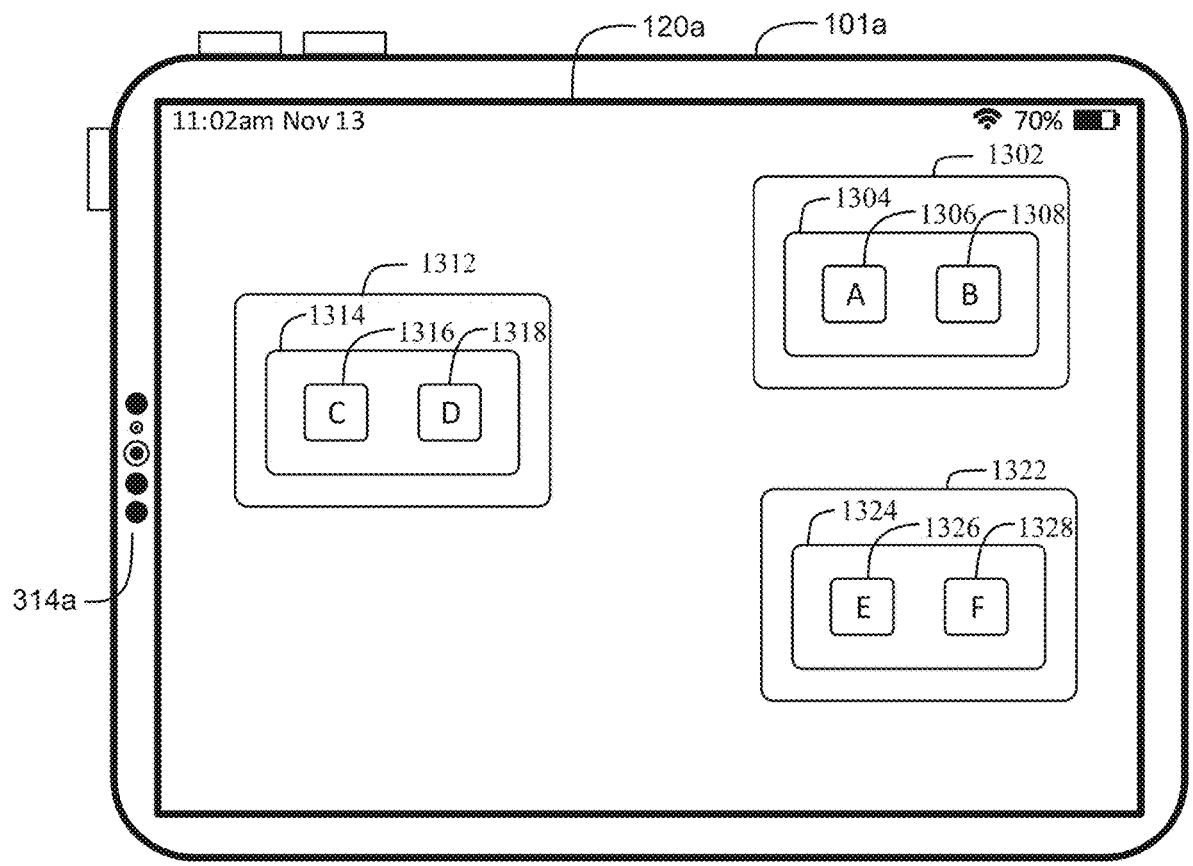
FIGS. 13A-13F illustrate examples of how an electronic device enhances interactions with selectable user interface elements in accordance with some embodiments.

FIG. 13A illustrates an electronic device 101a displaying, via a display generation component 120, a three-dimensional environment and/or a user interface. It should be understood that, in some embodiments, electronic device 101a utilizes one or more techniques described with reference to FIGS. 13A-13F in a two-dimensional environment without departing from the scope of the disclosure. As described above with reference to FIGS. 1-6, the electronic device 101a optionally includes a display generation component 120a (e.g., a touch screen) and a plurality of image sensors 314a. The image sensors optionally include one or more of a visible light camera, an infrared camera, a depth sensor, or any other sensor the electronic device 101a would be able to use to capture one or more images of a user or a part of the user while the user interacts with the electronic device 101a. In some embodiments, display generation component 120 is a touch screen that is able to detect gestures and movements of a user's hand. In some embodiments, the user interfaces shown and described could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

The three-dimensional environment shown in FIG. 13A includes a plurality of selectable options 1306, 1308, 1316, 1318, 1326, and 1328, each within multiple containers 1302, 1304, 1312, 1314, 1322, and 1324, for example. For example, options 1306 and 1308 are displayed within container 1304, which is displayed within container 1302; options 1316 and 1318 are displayed within container 1314, which is displayed within container 1312; and options 1326 and 1328 are displayed within container 1324, which is displayed within container 1322. In some embodiments, the electronic device 101a does not display all of these elements concurrently and one or more of the interactions described below are optionally performed separately and/or at different times. In some embodiments, the selectable options 1306, 1308, 1316, 1318, 1326, and 1328 are selectable to cause the electronic device 101a to perform an associated action, such as presenting an application or file, changing a setting of the electronic device 101a, initiating communication with another electronic device, or navigating the user interface. In some embodiments, the containers 1302, 1304, 1312, 1314, 1322, and 1324 are user interface elements such as windows, platters, backplanes, or other visually-defined regions of the three-dimensional environment.

As shown in FIG. 13A, while the electronic device 101a does not detect a ready state of one or more hands of the user of the electronic device 101a, the electronic device 101a displays the selectable options 1306, 1308, 1316, 1318, 1326, and 1328 and containers 1302, 1304, 1312, 1314, 1322, and 1324 without being visually separated. That is, options 1306 and 1308 and containers 1302 and 1304 are the same first distance from a viewpoint of the user in the three-dimensional environment, options 1316 and 1318 and containers 1312 and 1314 are the same second distance from the viewpoint of the user in the three-dimensional environment, and options 1326 and 1328 and containers 1322 and 1324 are the same third distance from the viewpoint of the user in the three-dimensional environment. In some embodiments, detecting the ready state of the one or more hands of the user of the electronic device 101a includes detecting a predetermined hand shape and/or hand pose indicating that the user is about to provide further input based on a shape, pose, or gesture provided by the hand(s), as will be described in more detail below with reference to FIG. 13B.

Figure 13B:
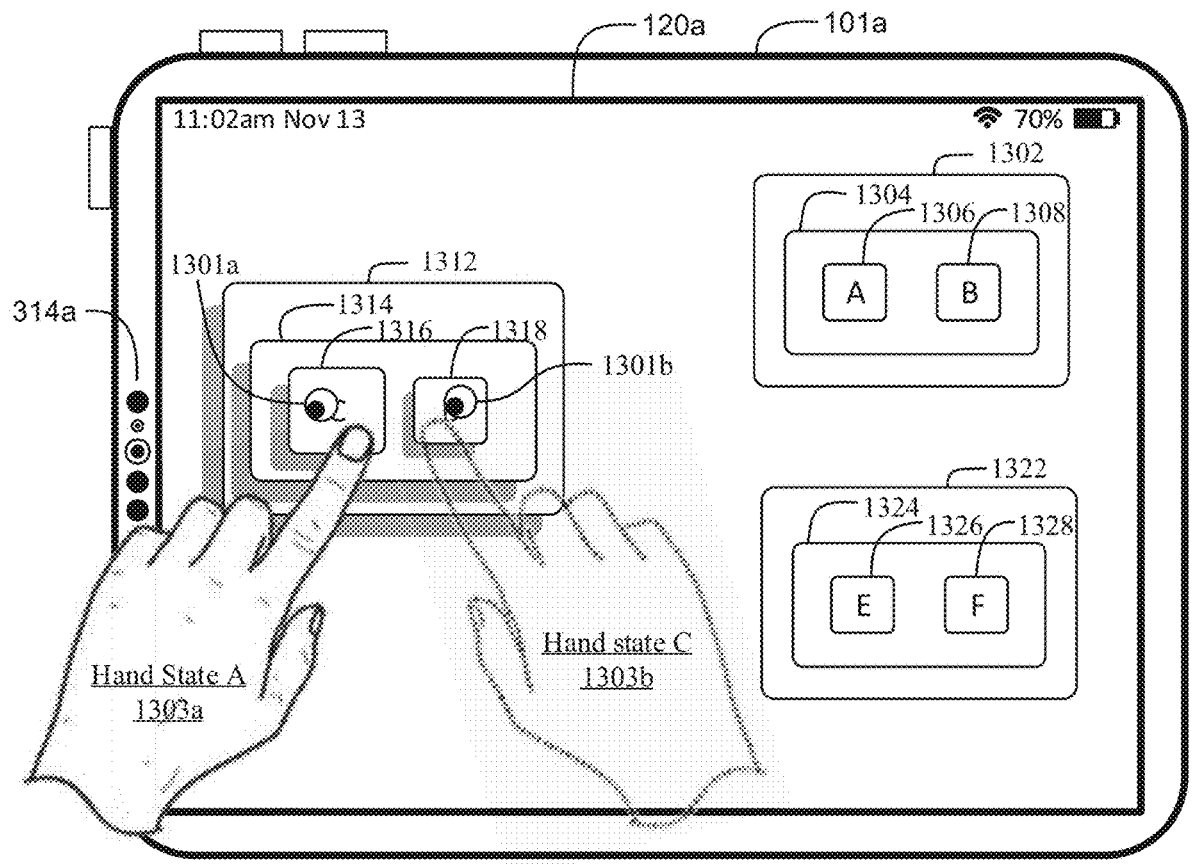

FIG. 13B illustrates the electronic device 101a updating display of selectable options 1316 and 1318 and containers 1312 and 1314 to include visual separation between the selectable options 1316 and 1318 and container 1312, between containers 1312 and 1314, and between container 1312 and the (e.g., background of the) three-dimensional environment in response to detecting a ready state of the user. Because the selection inputs from hands 1303a and/or 1303b are not directed to selectable options 1306 or 1308, the electronic device 101a does not display selectable options 1306 and 1308 with visual separation from container 1304 and does not display container 1304 with visual separation from container 1302. Because the selection inputs from hands 1303 and/or 1303b are not directed to selectable option 1326 or 1328, the electronic device 101a does not display selectable options 1326 and 1328 with visual separation from container 1324 and does not display container 1324 with visual separation from 1322 1302. In FIG. 13B, hand 1303a and gaze 1301a provide a first ready state and hand 1303b and gaze 1301b provide a second ready state. It should be understood that FIG. 13B shows multiple concurrent ready states with hands 1303a and 1303b and gazes 1301a and 1301b as a way of illustrating the differences in how the electronic device 101a responds to different types of inputs, for example. For example, in some embodiments, the ready state provided by hand 1303a and gaze 1301a and the ready state provided by hand 1303b and gaze 1301b are not concurrently detected, but are instead detected at different times.

In some embodiments, the electronic device 101a detects direct inputs that include the hand of the user performing an input gesture at a location corresponding to the user interface element to which the direct input is directed. In some embodiments, hand 1303a and gaze 1301a illustrate a direct input ready state of the user. For example, directing a direct ready state includes detecting the hand 1303a in a predefined hand shape while within a direct ready state threshold distance (e.g., 5, 10, 15, 20, 30, or 50 centimeters or 1, 2, 3, or 5 meters) of selectable option 1316. For example, the hand shape is a pointing hand shape in which one or more fingers of the hand 1303a are extended and one or more fingers are curled towards the palm of the hand 1303a. In some embodiments, detecting the direct ready state includes detecting the gaze 1301a of the user directed to selectable option 1316. In some embodiments, detecting the gaze 1301a of the user directed to selectable option 1316 is not necessary to detect a direct ready state.

In some embodiments, the electronic device 101a detects indirect inputs that include the hand of the user performing an input gesture at a location independent from the location of the user interface element to which the input is directed while the gaze of the user is directed to the user interface element to which the input is directed. In some embodiments, hand 1303b and gaze 1301b illustrate an indirect ready state of the user. Although FIG. 13B illustrates hand 1303b at a location corresponding to user interface element 1318 while providing the indirect ready state, it should be understood that, in some embodiments, an indirect ready state is detected while the hand 1303b is at a location independent from or more than the direct ready state threshold distance (e.g., 5, 10, 15, 20, 30, or 50 centimeters or 1, 2, 3, or 5 meters) from the selectable option 1318. In some embodiments, detecting an indirect ready state includes detecting the hand 1303b in a predefined hand shape while the gaze 1301b is directed to selectable option 1318. For example, the hand shape is a pre-pinching hand shape in which the thumb of the hand 1303b is within a threshold distance (e.g., 0.5, 1, 2, 3, or 5 centimeters) of, but not touching, another finger (e.g., index finger) of the hand 1303b while the gaze 1301b of the user is directed to the selectable option 1318.

In some embodiments, determining the selectable option to which an indirect ready state is directed is based on detecting the gaze of the user. In some embodiments, if the gaze 1301b of the user moves from selectable option 1318 to a different selectable option in the three-dimensional environment, the electronic device 101a reduces the visual separation between selectable option 1318 and container 1314 and increases the visual separation between the selectable option to which the gaze of the user is directed and the container adjacent to and/or including the selectable option. For example, if gaze 1301b were to move from option 1318 to option 1306, the electronic device 101a would decrease the amount of visual separation between option 1318 and container 1314 and increase the amount of visual separation between option 1306 and container 1304.

In some embodiments, the electronic device 101a is able to detect air gesture inputs in which the hand of the user performs an input gesture at a location corresponding to an air gesture user interface element different from the user interface element to which the input is directed while the gaze of the user is directed to the user interface element to which the input is directed, as will be described in more detail below with reference to FIG. 13C. In some embodiments, detecting an air gesture ready state includes detecting a predefined pose of the hand of the user, such as the pointing hand shape described above while the hand is greater than the direct ready state threshold distance (e.g., 5, 10, 15, 20, 30, or 50 centimeters, 1, 2, 3, or 5 meters) from interactive user interface elements in the three-dimensional environment and while the gaze of the user is directed to the interactive user interface elements in the three-dimensional environment.

In some embodiments, determining the selectable option to which an air gesture ready state is directed is based on detecting the gaze of the user. In some embodiments, if the gaze 1301b of the user moves from selectable option 1318 to a different selectable option in the three-dimensional environment while the electronic device 101a detects an air gesture ready state rather than an indirect input ready state, the electronic device 101a reduces the visual separation between selectable option 1318 and container 1314 and increases the visual separation between the selectable option to which the gaze of the user is directed and the container adjacent to and/or including the selectable option. For example, if gaze 1301b were to move from option 1318 to option 1306, the electronic device 101a would decrease the amount of visual separation between option 1318 and container 1314 and increase the amount of visual separation between option 1306 and container 1304.

In some embodiments, the electronic device 101a is able to detect inputs via tactile input devices, such as styluses, trackpads, mouses, and keyboards. In some embodiments, detecting a tactile input device ready state includes detecting the body (e.g., hand) of the user within a threshold distance of (e.g., 1, 2, 3, 5, or 10 centimeters) the input device without touching the input device. In some embodiments, detecting the tactile input device ready state includes detecting the gaze of the user directed to a respective interactive user interface element in the three-dimensional environment. In some embodiments, the electronic device detects the tactile input device ready state without detecting the gaze of the user directed to a respective interactive user interface element in the three-dimensional environment.

In FIG. 13B, in response to the direct ready state provided by hand 1303a (and gaze 1301a), the electronic device 101a displays containers 1312 and 1314 and selectable option 1316 with increased visual separation compared to the amount of separation of these elements prior to detecting the ready state in FIG. 13A. In response to the indirect ready state provided by hand 1303b and gaze 1301b, the electronic device 101a displays containers 1312 and 1314 and selectable option 1318 with increased visual separation compared to the amount of separation of these elements prior to detecting the ready state in FIG. 13A. In some embodiments, the electronic device adjusts visual separation of elements by adjusting the size, stereoscopic depth, or virtual shadows associated with one or more elements. For example, the sizes of selectable options 1316 and 1318 in FIG. 13B are larger than the sizes of selectable options 1316 and 1318 in FIG. 13A. In some embodiments, the angular sizes of the selectable options 1316 and 1318 in FIG. 13B are not larger than the angular sizes of selectable options 1316 and 1318 in FIG. 13A, but the selectable options 1316 and 1318 appear larger because they are closer to the viewpoint of the user in the three-dimensional environment.

In some embodiments, the amount of visual separation between a selectable option and a container in the three-dimensional environment depends on the type of the ready state directed to the selectable option. For example, the electronic device 101a increases the amount of visual separation of selectable option 1316 from container 1314 more than the increase in visual separation between selectable option 1318 and container 1314 because hand 1303a (and gaze 1301a) provide a direct ready state directed to selectable option 1316, and hand 1303b and gaze 1301b provide an indirect ready state directed to selectable option 1318, as represented by selectable option 1316 being larger than selectable option 1318. In some embodiments, the electronic device 101a increases visual separation between a selectable option and a container by a greater amount if the ready state directed to the selectable option is a direct, indirect, or air tap ready state (e.g., a ready state provided by detecting a shape, pose, or gesture of the user's hand without use of a tactile input device) than if the ready state is provided using a tactile input device. In some embodiments, in response to detecting a direct ready state, such as the direct ready state provided by hand 1303a (and gaze 1301a), the electronic device 101a moves the selectable option 1316 closer to the viewpoint of the user the closer the hand 1303a of the user is to the current or original location of the selectable option 1316. For example, if the user were to move hand 1303a closer to option 1316, the electronic device 101a would move option 1316 closer to the viewpoint of the user, and if the user were to move hand 1303a further from option 1316, the electronic device 101a would move selectable option 1316 further from the viewpoint of the user.

In some embodiments, in response to detecting the beginning of a selection input directed to a respective selectable option, the electronic device 101a decreases the visual separation between the respective selectable option and the container adjacent to and/or including the respective selectable option. FIG. 13C illustrates the electronic device 101a displaying selectable options 1316 and 1326 in response to the beginning of selection inputs provided by hands 1303c, 1303d, and 1303e and gazes 1301a and 1301b. For example, hand 1303c (and gaze 1301a) provide a direct input selecting selectable option 1316. As another example, hand 1303d, air gesture element 1310, and/or gaze 1301b provide an air gesture input selecting option 1326. As another example, hand 1303e and gaze 1301b provide an indirect input selecting option 1326. In some embodiments, it is possible for the electronic device 101a to detect selection inputs via tactile input devices, such as styluses, mouses, keyboards, trackpads, and the like. Because the selection inputs from hands 1303a and/or 1303b are not directed to selectable option 1306 or 1308, the electronic device 101a does not display selectable options 1306 and 1308 with visual separation from container 1304 and does not display container 1304 with visual separation from container 1302.

In some embodiments, detecting the beginning of the direct selection input provided by hand 1303c (and gaze 1301a) includes detecting the (e.g., index finger tip of) hand 1303c "push" the selectable option 1316 from the location at which it was displayed before the beginning of the input (e.g., the position illustrated in FIG. 13B) towards container 1314. As will be described in more detail below with reference to FIG. 3D, in some embodiments, selection of selectable option 1316 occurs when the "push" gesture corresponds to "pushing" the selectable option 1316 to the location of container 1314 illustrated in FIG. 13C. As shown in FIG. 13C, in response to detecting the beginning of the direct selection input provided by hand 1303c (and gaze 1301a), the electronic device 101a decreases the amount of visual separation between the selectable option 1316 and container 1314. In some embodiments, as the electronic device 101a updates the location of selectable option 1316 in the three-dimensional environment (e.g., when reducing the visual separation between selectable option 1316 and container 1314), the input region moves with the selectable option 1316, thereby requiring the user to continue to move their hand 1303c to the location of the selectable option 1316 to proceed with the selection input. In some embodiments, as the electronic device 101a updates the location of selectable option 1316 in the three-dimensional environment (e.g., when reducing the visual separation between selectable option 1316 and container 1314), the input region remains at the location at which selectable option 1316 was displayed prior to receiving the beginning of the selection input (e.g., the location of selectable option 1316 in FIG. 13B).

In some embodiments, detecting the beginning of the indirect selection input provided by hand 1303e and gaze 1301b includes detecting the hand 1303e in a pinch hand shape in which the thumb of the hand 1303e touches another finger (e.g., index finger) of the hand while the gaze 1301b is directed to selectable option 1301b. In some embodiments, while providing the indirect selection input the hand 1303e is at a location that does not correspond to the selectable option 1326. As will be described in more detail below with reference to FIG. 3D, in some embodiments, selection of selectable option 1326 occurs when the electronic device 101a detects that the pinch hand shape has been maintained for a predetermined time threshold (e.g., 0.1, 0.2, 0.3, 0.5, 1, 2, etc. seconds). As shown in FIG. 13C, in response to detecting the beginning of the direct selection input provided by hand 1303e and gaze 1301b (e.g., detecting the pinch hand shape for less than the time threshold while the user is looking at the selectable option 1326), the electronic device 101a decreases the amount of visual separation between the selectable option 1326 and container 1324. As will be described in more detail below with reference to FIG. 3D, the electronic device 101a continues to move the selectable option 1326 towards container 1324 as hand 1303e maintains the pinch gesture and the gaze 1301b remains on selectable option 1326 until the pinch gesture and gaze 1301b have been maintained long enough for the selectable option 1326 to reach container 1324. In some embodiments, if the user were to look away from selectable option 1326 and move gaze 1301b to a different selectable option 1306, 1308, 1316, 1318, or 1328 in the three-dimensional environment, the electronic device 101a would cancel the beginning of the input directed towards option 1326 and direct the beginning of the input towards the selectable option at which the user is looking. In some embodiments, in response to the user redirecting gaze 1310b, the electronic device 101a optionally displays the selectable option 1326 with reduced (e.g., zero) visual separation from container 1326 and optionally increases the visual separation between the selectable option at which the user is looking and the container adjacent to and/or including the selectable option at which the user is looking.

In some embodiments, detecting the beginning of the air gesture selection input provided by hand 1303d and gaze 1301b includes detecting the (e.g., index finger tip of the) hand 1303d "push" air gesture element 1310 while the gaze 1301b is directed to selectable option 1326. In some embodiments, while providing the air gesture selection input, the hand 1303d is at a location that does not correspond to the selectable option 1326. As will be described in more detail below with reference to FIG. 3D, in some embodiments, selection of selectable option 1326 occurs when the electronic device 101a detects that the (e.g., duration, distance, speed, etc. of the) push motion directed to element 1310 corresponds to moving option 1326 to the location of container 1324. As shown in FIG. 13C, in response to detecting the beginning of the air gesture input provided by hand 1303d and gaze 1301b (e.g., detecting the push gesture by an amount greater than zero, but less than the amount required for selection of option 1326, while the user is looking at the selectable option 1326), the electronic device 101a decreases the amount of visual separation between the selectable option 1326 and container 1324. For example, the electronic device 101a moves the selectable option 1326 away from the viewpoint of the user by an amount corresponding to the amount by which the hand 1303d pushes user interface element 1310 away from the viewpoint of the user. As will be described in more detail below with reference to FIG. 3D, the electronic device 101a continues to move the selectable option 1326 towards container 1324 as (e.g., the index finger tip of) hand 1303d continues to push air gesture element 1310 while the gaze 1301b remains on selectable option 1326. In some embodiments, if the user were to look away from selectable option 1326 and move gaze 1301b to a different selectable option 1306, 1308, 1316, 1318, or 1328 in the three-dimensional environment, the electronic device 101a would cancel the beginning of the input directed towards option 1326 and direct the beginning of the input towards the selectable option at which the user is looking. In some embodiments, in response to the user redirecting gaze 1301b, the electronic device 101a displays the selectable option 1326 with reduced (e.g., zero) visual separation from container 1326 and increases the visual separation between the selectable option at which the user is looking and the container adjacent to and/or including the selectable option at which the user is looking. In some embodiments, as the electronic device 101a updates the location of selectable option 1326 (e.g., when reducing the visual separation between selectable option 1326 and container 1324) and air gesture element 1310 in the three-dimensional environment in accordance with the push gesture, the input region moves with the air gesture element 1310, thereby requiring the user to continue to move their hand 1303d to the location of the air gesture element 1310 to proceed with the selection input. In some embodiments, as the electronic device 101a updates the location of selectable option 1326 (e.g., when reducing the visual separation between selectable option 1326 and container 1324) and air gesture element 1310 in the three-dimensional environment, the input region remains at the location at which air gesture element 1310 was displayed prior to receiving the beginning of the selection input.

In some embodiments, if the user ceases to provide the selection input via hand 1303c, 1303d, or 1303e and gaze 1301a or 1301b prior to providing a complete selection input, the electronic device 101a forgoes selection of the selectable option to which the beginning of the selection input is directed and forgoes performance of the operation associated with the selectable option. In some embodiments, as will be described in more detail below with reference to FIG. 3D, in response to a complete selection input that causes the selectable option to reach the container adjacent to and/or including it, the electronic device 101a performs the action associated with the selectable option.

FIG. 3D illustrates continuation of the selection inputs described above with reference to FIG. 13C. Hand 1303c (and gaze 1301a) provide a selection input to selectable option 1316. Hand 1303d and gaze 1301b provide a selection input to selectable option 1326. Hand 1303e and gaze 1301b provide a selection input to selectable option 1326. It should be understood that these selection inputs are shown in one figure for the sake of brevity and, in some embodiments, are not detected simultaneously. Because the selection inputs provided by hand(s) 1303c, 1303d, and/or 1303e are not directed to selectable option 1306 or 1308, the electronic device 101a does not display selectable options 1306 and 1308 with visual separation from container 1304 and does not display container 1304 with visual separation from container 1302.

In some embodiments, detecting the direct selection input provided by hand 1303c (and gaze 1301a) includes detecting the hand 1303c "push" the selectable option 1316 from the location at which it was displayed before the beginning of the input (e.g., the position illustrated in FIG. 13B) past the location of container 1314. The input corresponds to selection of selectable option 1316 because the amount of movement of hand 1303c while in the pointing hand shape corresponds to at least the distance between the selectable option 1316 and container 1314. As shown in FIG. 3D, in response to detecting the direct selection input provided by hand 1303c (and gaze 1301a), the electronic device 101a updates the color of the selectable option 1316 and/or reduces the visual separation between containers 1314 and 1312. In some embodiments, the electronic device 101a also performs an action associated with selectable option 1316 when selectable option 1316 reaches container 1314 or after the selection input is complete (e.g., the electronic device ceases to detect the hand 1303c in the pointing hand shape or the hand moves away from selectable option 1316). In some embodiments, the electronic device 101a performs the same operation regardless of the amount, if any, by which the movement of the hand 1303c exceeds the requirement for selection. In some embodiments, the distance by which the electronic device 101a moves container 1314 towards container 1312 corresponds to an amount of movement of hand 1303*c* past the location of container 1314 prior to the selection input (e.g., the location of container 1314 in FIG. 13C).

In some embodiments, as the electronic device 101*a* updates the location of selectable option 1316 in the three-dimensional environment (e.g., when reducing the visual separation between selectable option 1316 and container 1314), the input region moves with the selectable option 1316, thereby requiring the user to continue to move their hand 1303*c* to the location of the selectable option 1316 to proceed with the selection input. In some embodiments, as the electronic device 101*a* updates the location of selectable option 1316 in the three-dimensional environment (e.g., when reducing the visual separation between selectable option 1316 and container 1314), the input region remains at the location at which selectable option 1316 was displayed prior to receiving the beginning of the selection input (e.g., the location of selectable option 1316 in FIG. 13B).

In some embodiments, detecting the indirect selection input provided by hand 1303*e* and gaze 1301*b* includes detecting the hand 1303*e* in a pinch hand shape in which the thumb of the hand 1303*e* touches another finger (e.g., index finger) of the hand while the gaze 1301*b* is directed to selectable option 1326. In some embodiments, while providing the indirect selection input the hand 1303*e* is at a location that does not correspond to the selectable option 1326. As described above with reference to FIG. 13C, in some embodiments, the electronic device 101*a* decreases the amount of visual separation between the selectable option 1326 and container 1324 while the hand 1303*e* maintains the pinch gesture and gaze 1301*b* is directed to option 1326. In some embodiments, selection of selectable option 1326 occurs when the electronic device 101*a* detects that the pinch hand shape has been maintained for a predetermined time threshold (e.g., 0.1, 0.2, 0.3, 0.5, 1, or 2 seconds) that corresponds to moving selectable option 1326 to the location of container 1324. As shown in FIG. 3D, in response to detecting the (e.g., complete) selection input, the electronic device 101*a* updates the color of selectable option 1326 and/or moves container 1324 closer to container 1322 in the three-dimensional environment because the duration of input exceeds the predetermined time threshold. In some embodiments, the distance by which the electronic device 101*a* moves the container 1324 closer to container 1322 corresponds to the amount of time the input is maintained that exceeds the predetermined threshold. In some embodiments, in response to the selection input, the electronic device 101*a* performs an operation associated with option 1326. In some embodiments, the electronic device 101*a* performs the same operation regardless of the amount, if any, by which the time of the gesture of hand 1303*e* exceeds the requirement for selection.

In some embodiments, detecting the air gesture selection input provided by hand 1303*d* and gaze 1301*b* includes detecting the hand 1303*d* "push" air gesture element 1310 by an amount corresponding to at least the distance between selectable option 1326 and container 1324 while the gaze 1301*b* is directed to selectable option 1326. In some embodiments, while providing the air gesture selection input, the hand 1303*d* is at a location that does not correspond to the selectable option 1326. In some embodiments, selection of selectable option 1326 occurs when the electronic device 101*a* detects that the (e.g., duration, distance, speed, etc. of the) push motion directed to element 1310 corresponds to moving option 1326 to the location of container 1324. As shown in FIG. 3D, in response to detecting selection of option 1326, the electronic device 101*a* updates the color of selectable option 1326 and/or moves container 1324 closer to container 1322 because the movement and/or duration of hand 1303*d* providing the air gesture exceeds the predetermined threshold. In some embodiments, the distance by which the electronic device 101*a* moves container 1324 towards container 1322 corresponds to the duration and/or movement by which the gesture of hand 1303*d* exceeds the requirement for selection. In some embodiments, in response to the selection input, the electronic device 101*a* performs an operation associated with option 1326. In some embodiments, the electronic device 101*a* performs the same operation regardless of the amount, if any, by which the time and/or movement of the gesture of hand 1303*d* exceeds the requirement for selection.

In some embodiments, the user continues to provide the selection input after selection of a respective option has occurred and after the container adjacent to the selectable option reaches another container. In some embodiments, in response to the continuation of the selection input past the container of the selectable option, the electronic device 101*a* updates the location of both containers to move the containers away from the viewpoint of the user in the three-dimensional environment.

Figure 13C:
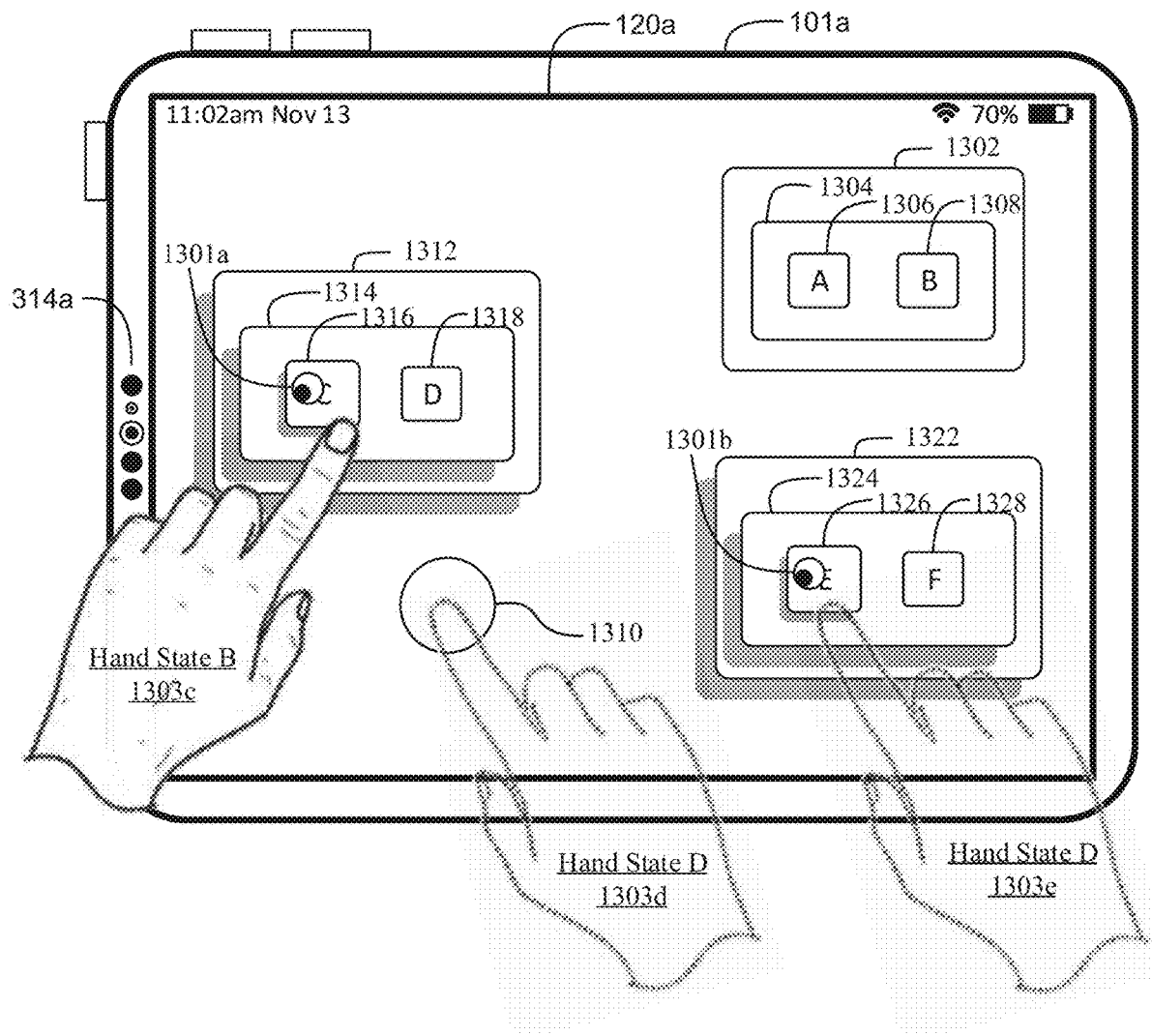
Figure 13D:
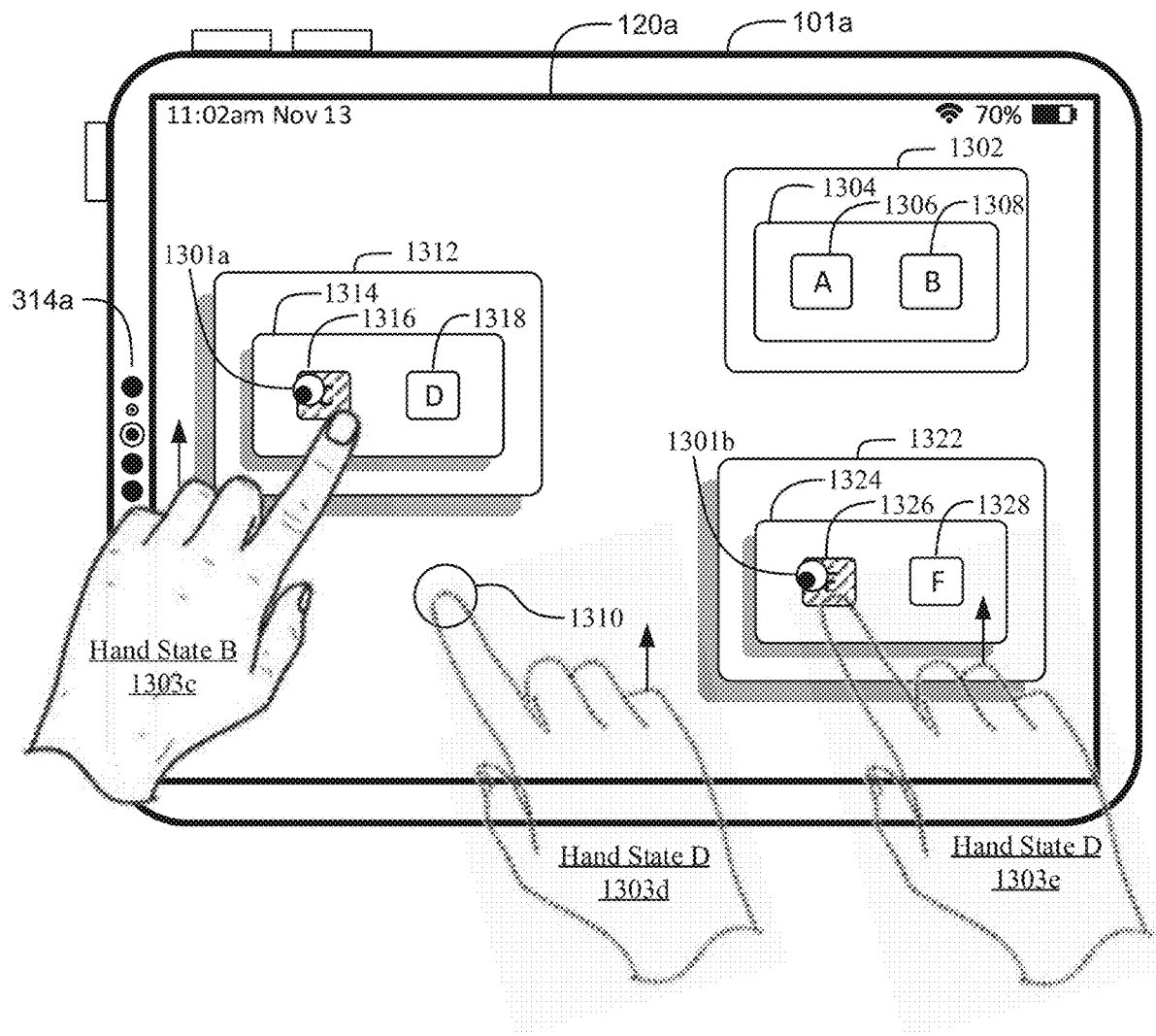
Figure 13E:
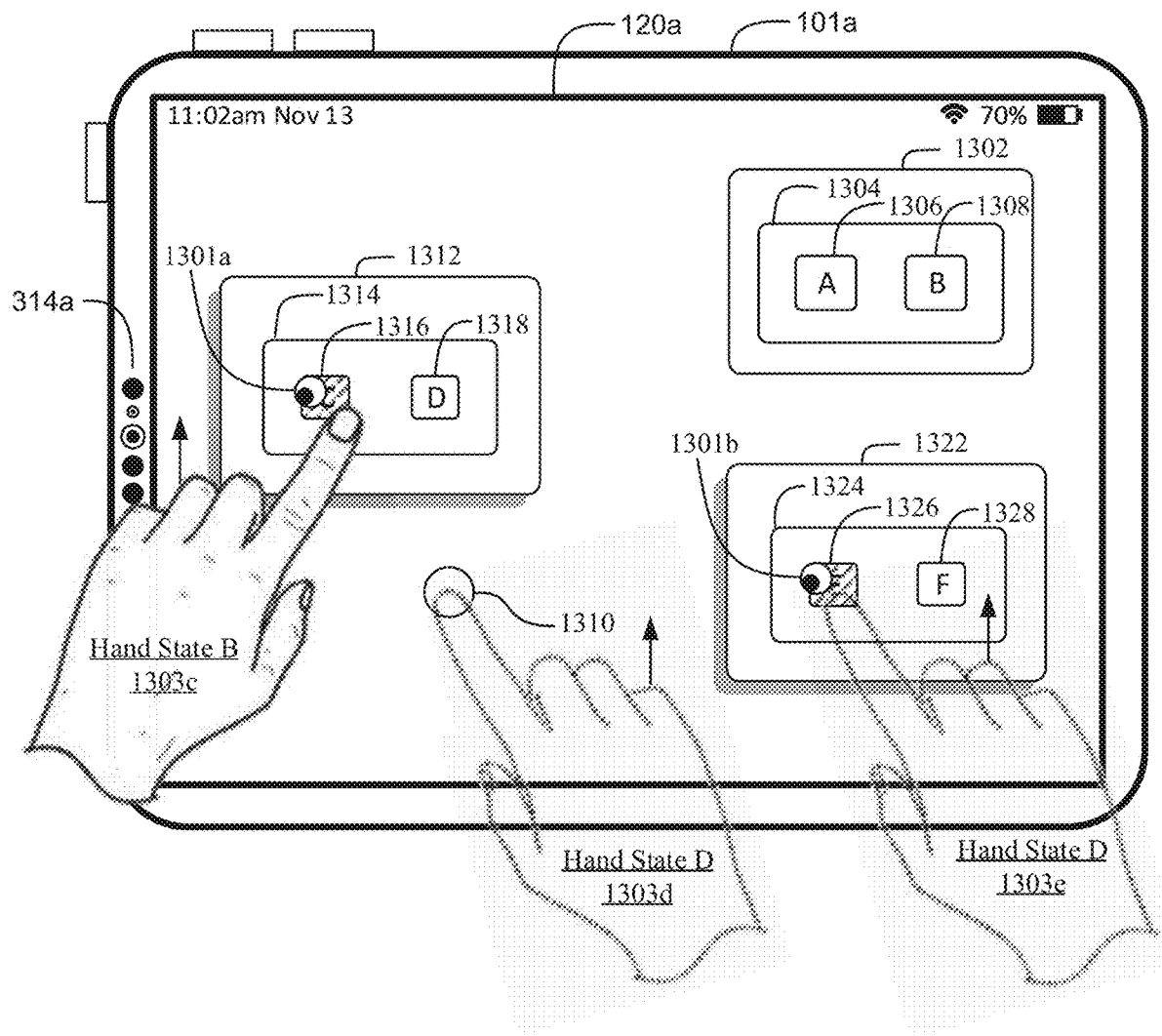

For example, FIG. 13E illustrates continuation of selection inputs that correspond to updating the position of multiple containers behind a selectable option. In some embodiments, in response to a selection input that corresponds to updating the position of multiple containers behind the selectable option, the electronic device 101*a* performs the same action associated with the selectable option that would have been performed if the input corresponded to selection without moving multiple containers away from the viewpoint of the user.

In FIG. 13E, hand 1303*c* and optionally gaze 1301*a* provide a direct input that corresponds to selection of element 1316 and movement of containers 1314 and 1312 away from the viewpoint of the user. In some embodiments, the distance by which container 1312 moves away from the viewpoint of the user corresponds to the distance by which the movement of hand 1303*c* exceeds a distance corresponding to container 1314 reaching container 1312. In some embodiments, the electronic device 101*a* represents the movement of container 1312 by reducing the size of its virtual shadow and/or updating the stereoscopic depth with which the container 1312 is displayed via the display generation component 120. In some embodiments, in response to detecting the end of the input provided by hand 1303*c*, the electronic device 101*a* performs the action associated with selectable option 1316. For example, the end of a direct selection input includes detecting the user move the hand (e.g., hand 1303*c* or 1303*e*) more than the direct selection input threshold distance (e.g., 1, 5, 10, 15, 30, or 50 centimeters or 1, 2, or 3 meters) and/or cease making the pointing hand shape. In some embodiments, the electronic device 101*a* forgoes updating the positions of other selectable options 1306, 1308, 1326, and 1328 and containers 1302, 1304, 1322, and 1324 in response to the input because the input is directed to option 1316.

In FIG. 13E, hand 1303*d* and gaze 1301*b* provide an air gesture input that corresponds to selection of element 1326 and movement of containers 1324 and 1322 away from the viewpoint of the user. In some embodiments, the distance by which container 1322 moves away from the viewpoint of the user corresponds to the distance by which the movement of hand 1303*d* exceeds a distance corresponding to container 1324 reaching container 1322. In some embodiments, the electronic device 101*a* represents the movement of container 1322 by reducing the size of its virtual shadow and/or updating the stereoscopic depth with which the container 1322 is displayed via the display generation component 120. In some embodiments, in response to detecting the end of the input provided by hand 1303d and gaze 1301b, the electronic device 101a performs the action associated with selectable option 1326. For example, the end of an air gesture selection input includes detecting the hand 1303d move more than a threshold distance (e.g., 1, 5, 10, 15, 30, or 50 centimeters or 1, 2, or 3 meters) away from air gesture element 1310 and/or ceasing to make the pointing hand shape. In some embodiments, the electronic device 101a forgoes updating the positions of other selectable options 1306, 1308, 1316, 1318, and 1328 and containers 1302, 1304, 1312, and 1314 in response to the input because the input is directed to option 1326.

In FIG. 13E, hand 1303e and gaze 1301b provide an indirect input that corresponds to selection of element 1326 and movement of containers 1324 and 1322 away from the viewpoint of the user. In some embodiments, the distance by which container 1322 moves corresponds to the duration for which hand 1303e maintains the pinch gesture that exceeds a duration threshold corresponding to container 1324 reaching container 1322. In some embodiments, the electronic device 101a represents the movement of container 1322 by reducing the size of its virtual shadow and/or updating the stereoscopic depth with which the container 1322 is displayed via the display generation component 120. In some embodiments, in response to detecting the end of the input provided by hand 1303e and gaze 1301b, the electronic device 101a performs the action associated with selectable option 1326. For example, the end of an indirect selection input includes detecting the user complete a pinch gesture with their hand (e.g., hand 1303c or 1303e) by moving the thumb away from the finger it touched to make the pinch hand shape as part of the pinch gesture. In some embodiments, the electronic device 101a forgoes updating the positions of other selectable options 1306, 1308, 1316, 1318, and 1328 and containers 1302, 1304, 1312, and 1314 in response to the input because the input is directed to option 1326.

Figure 13F:
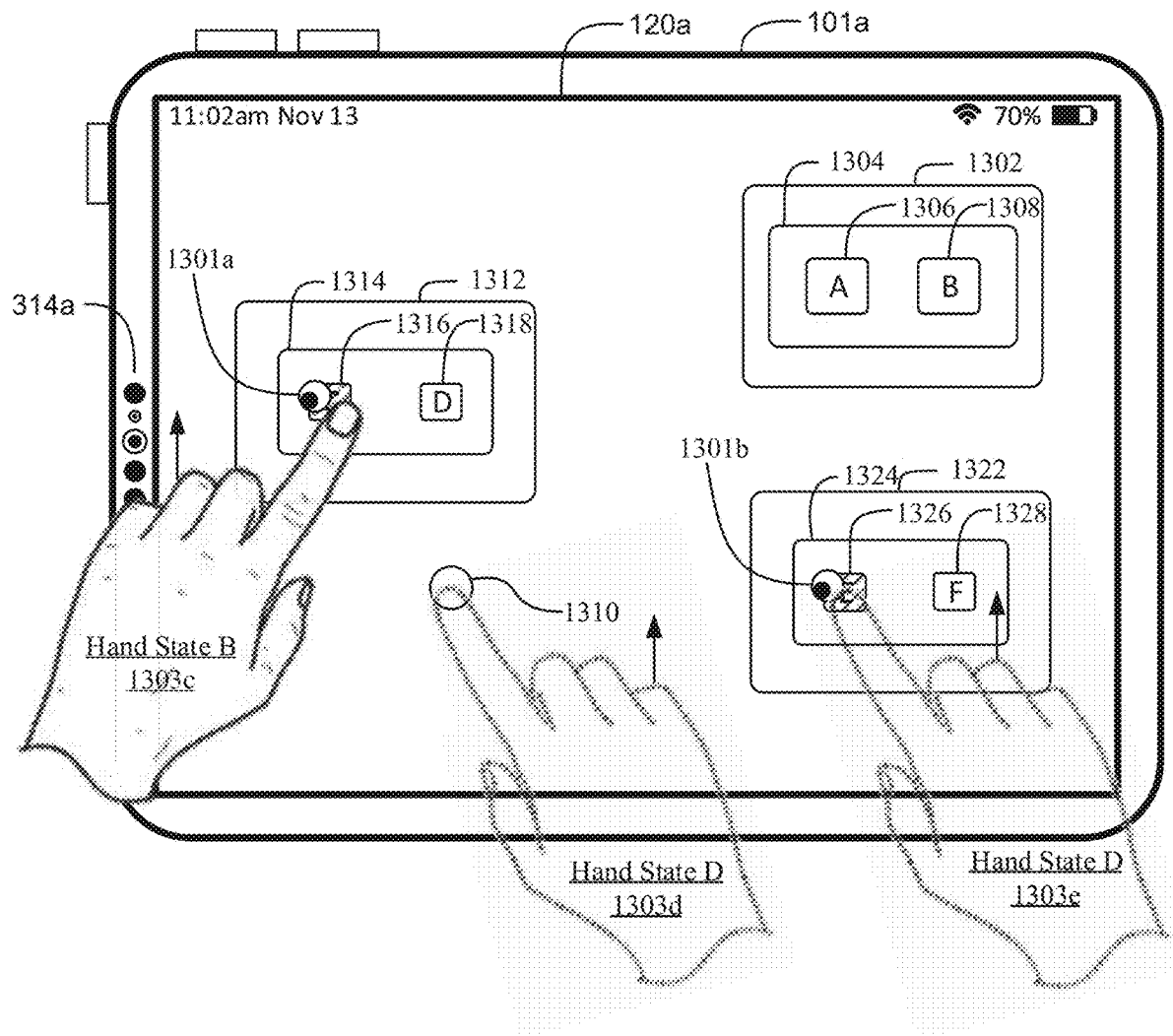
Figure 14A:
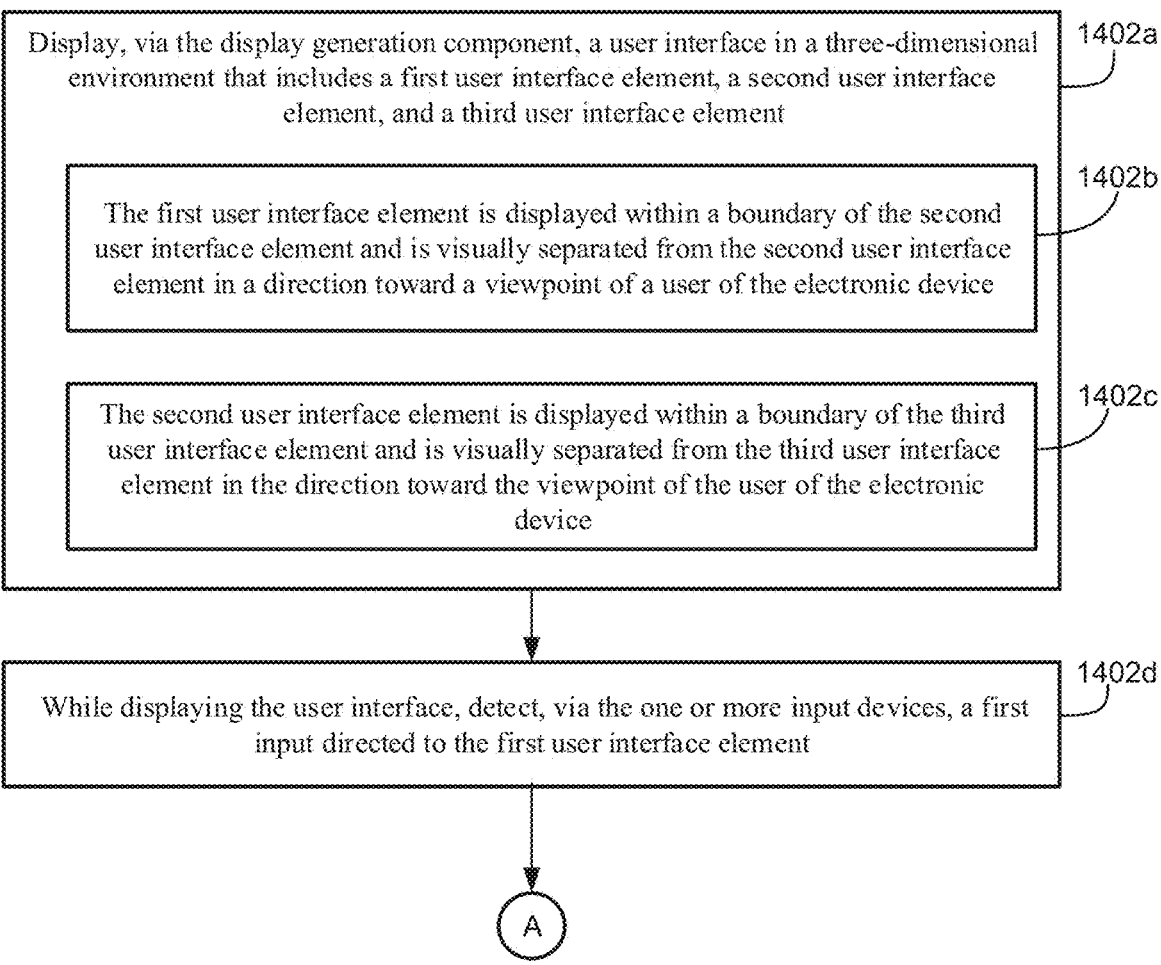
Figure 14C:
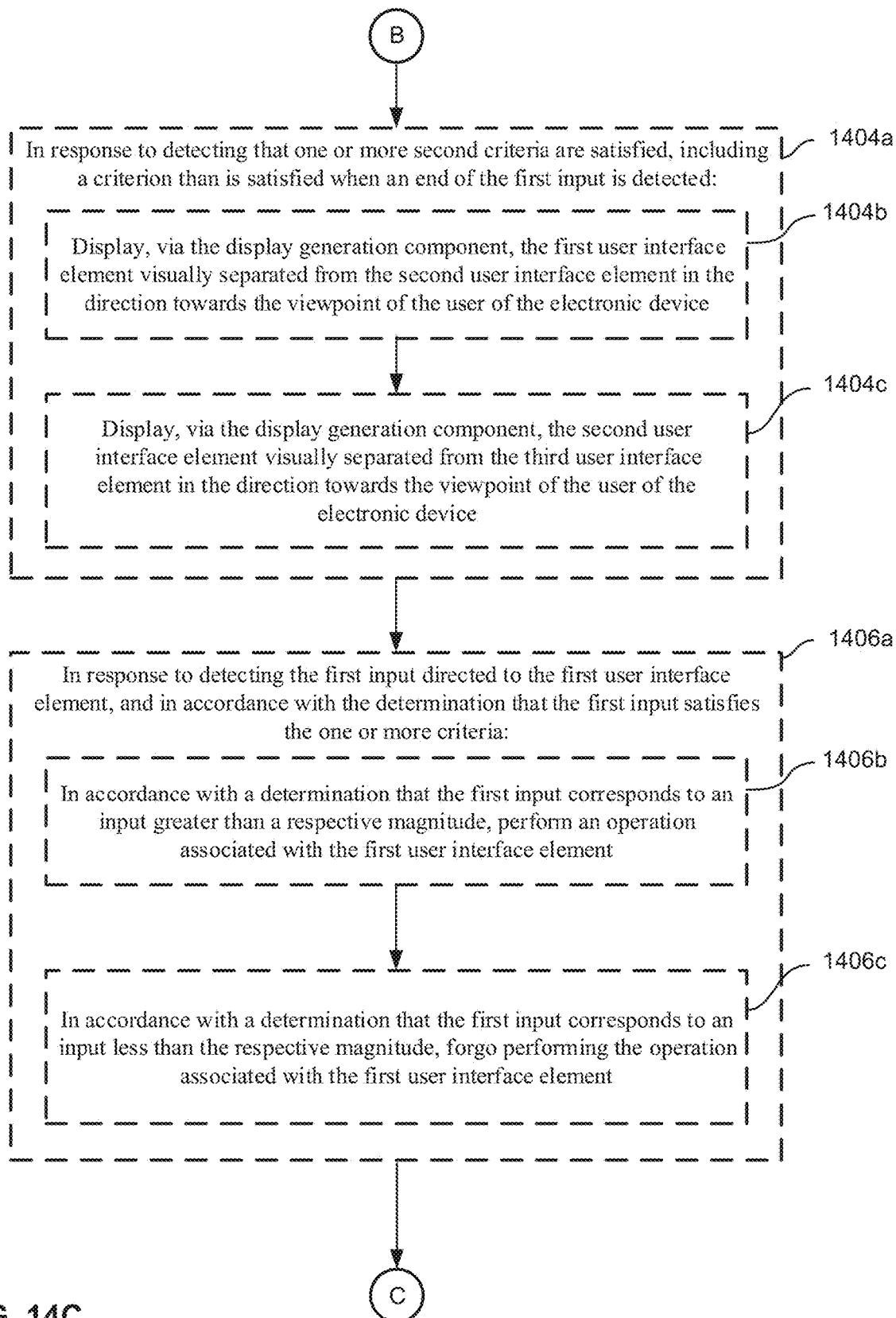
Figure 14D:
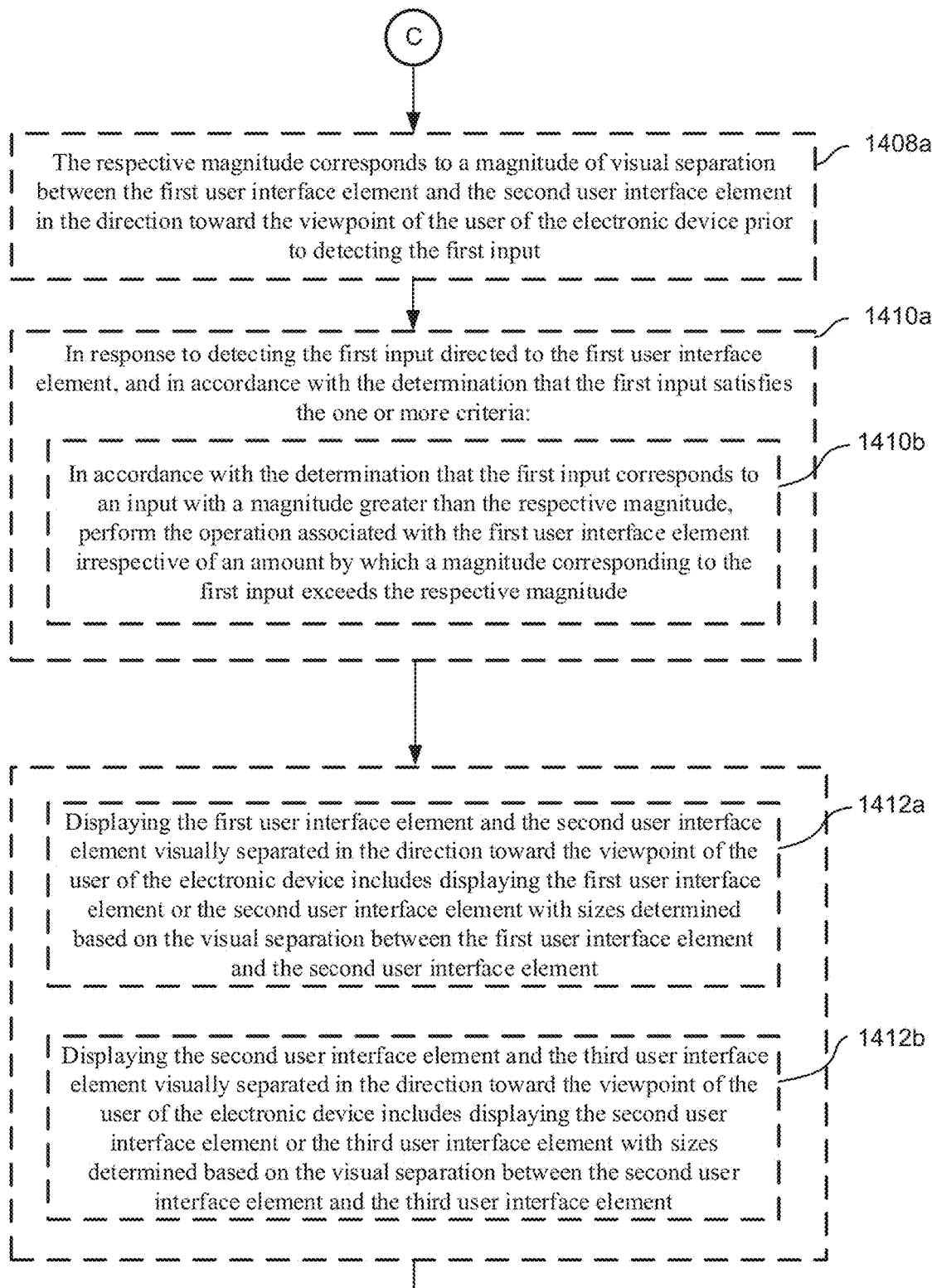
Figure 14E:
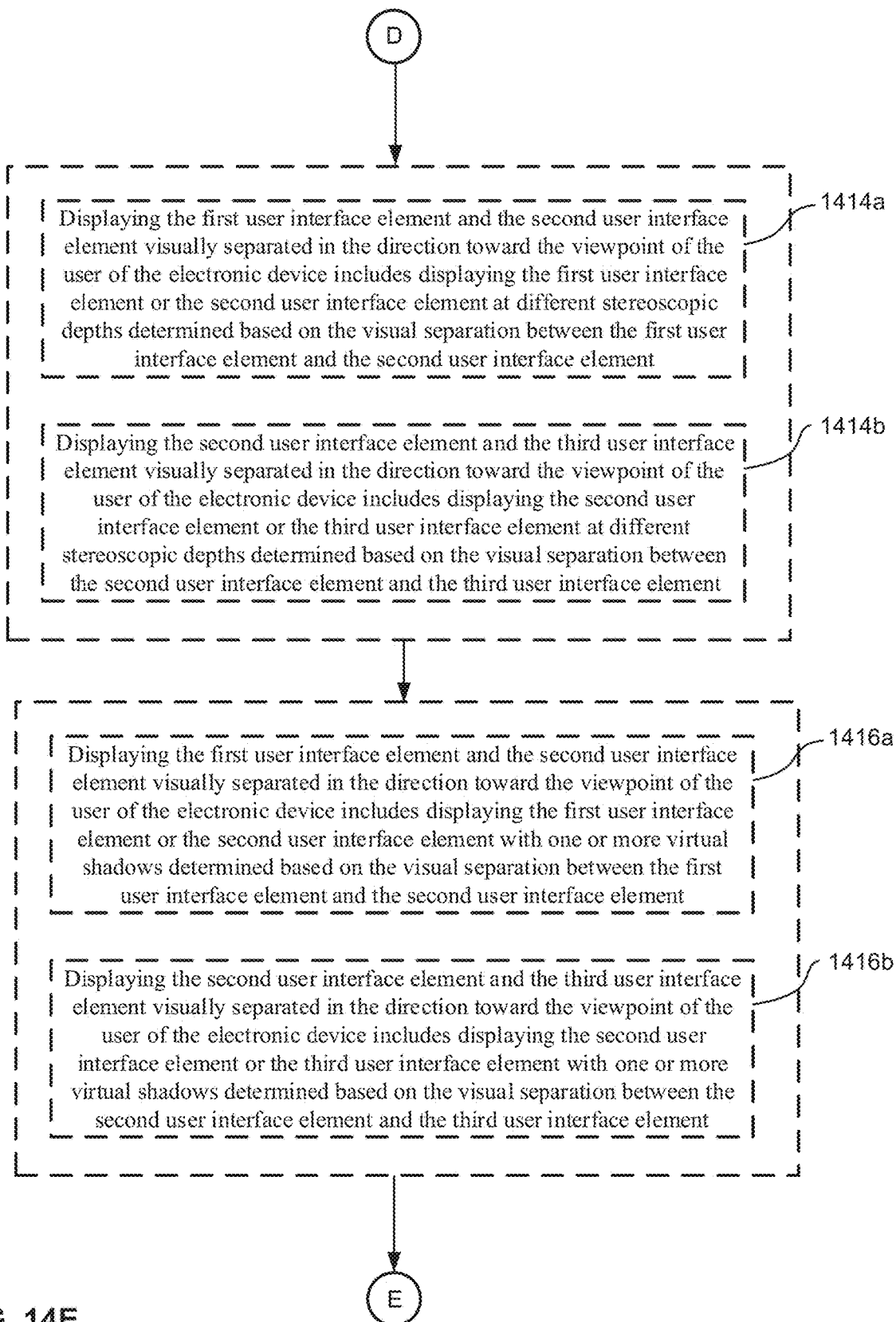
Figure 14F:
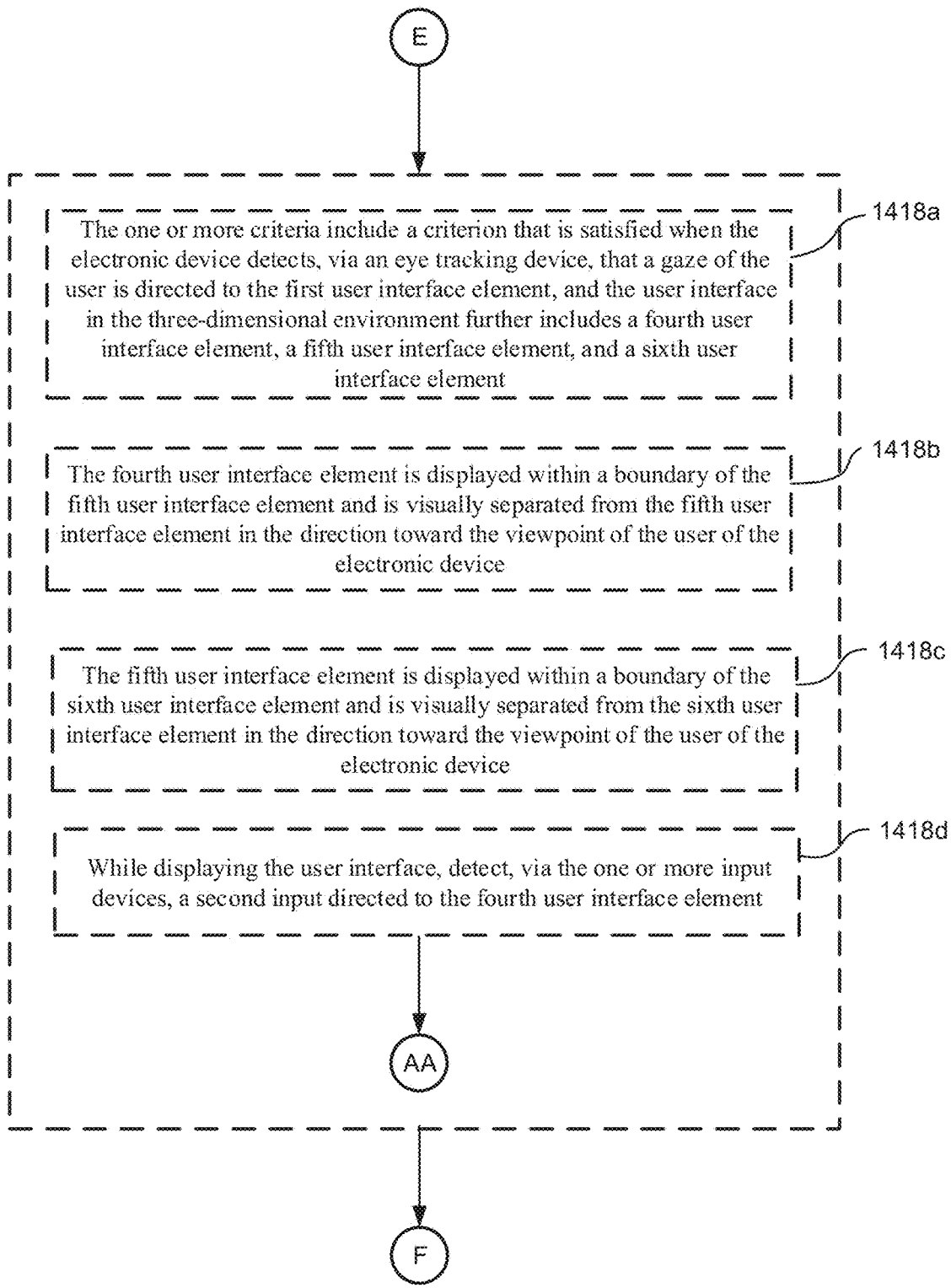
Figure 14G:
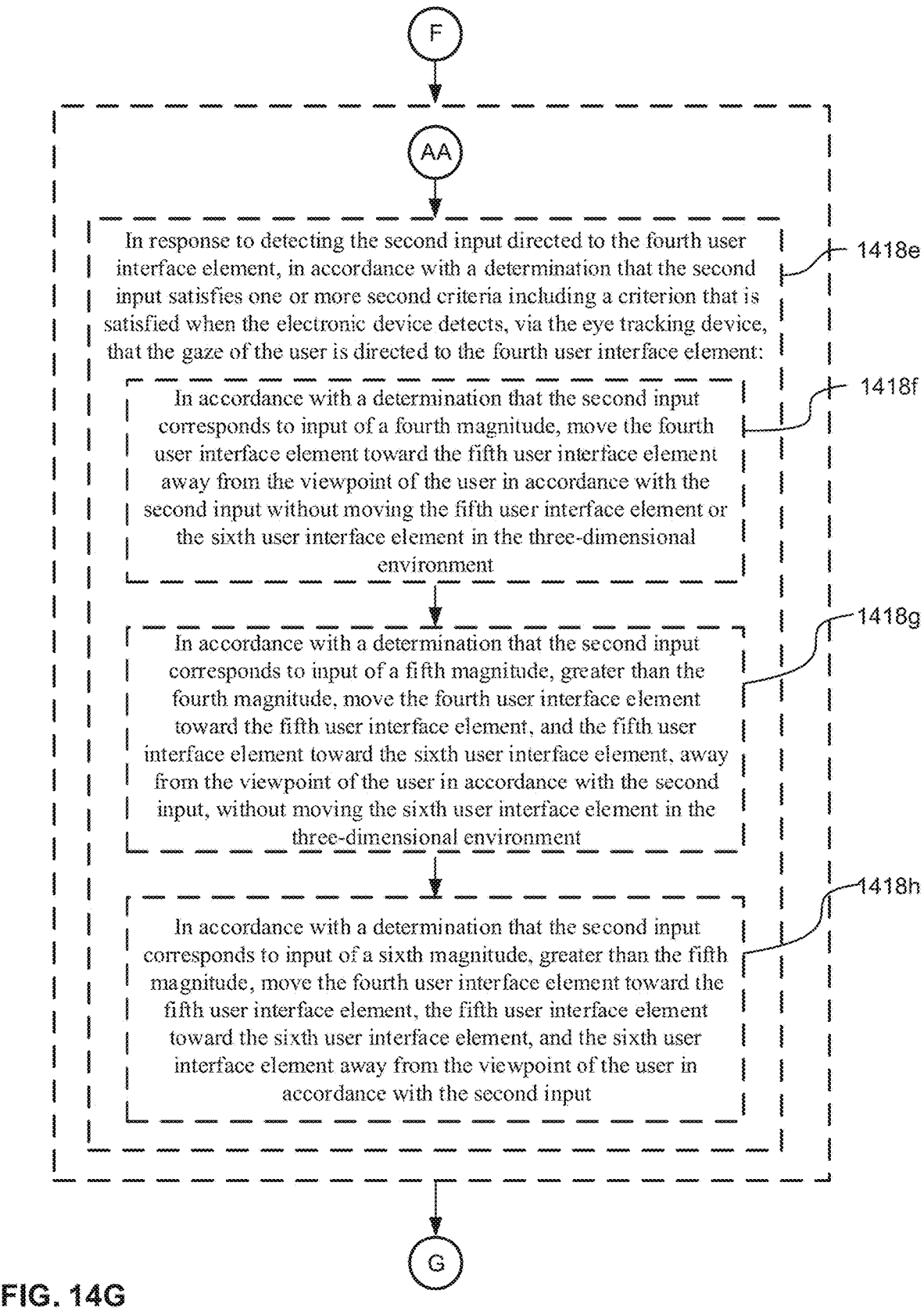
Figure 14H:
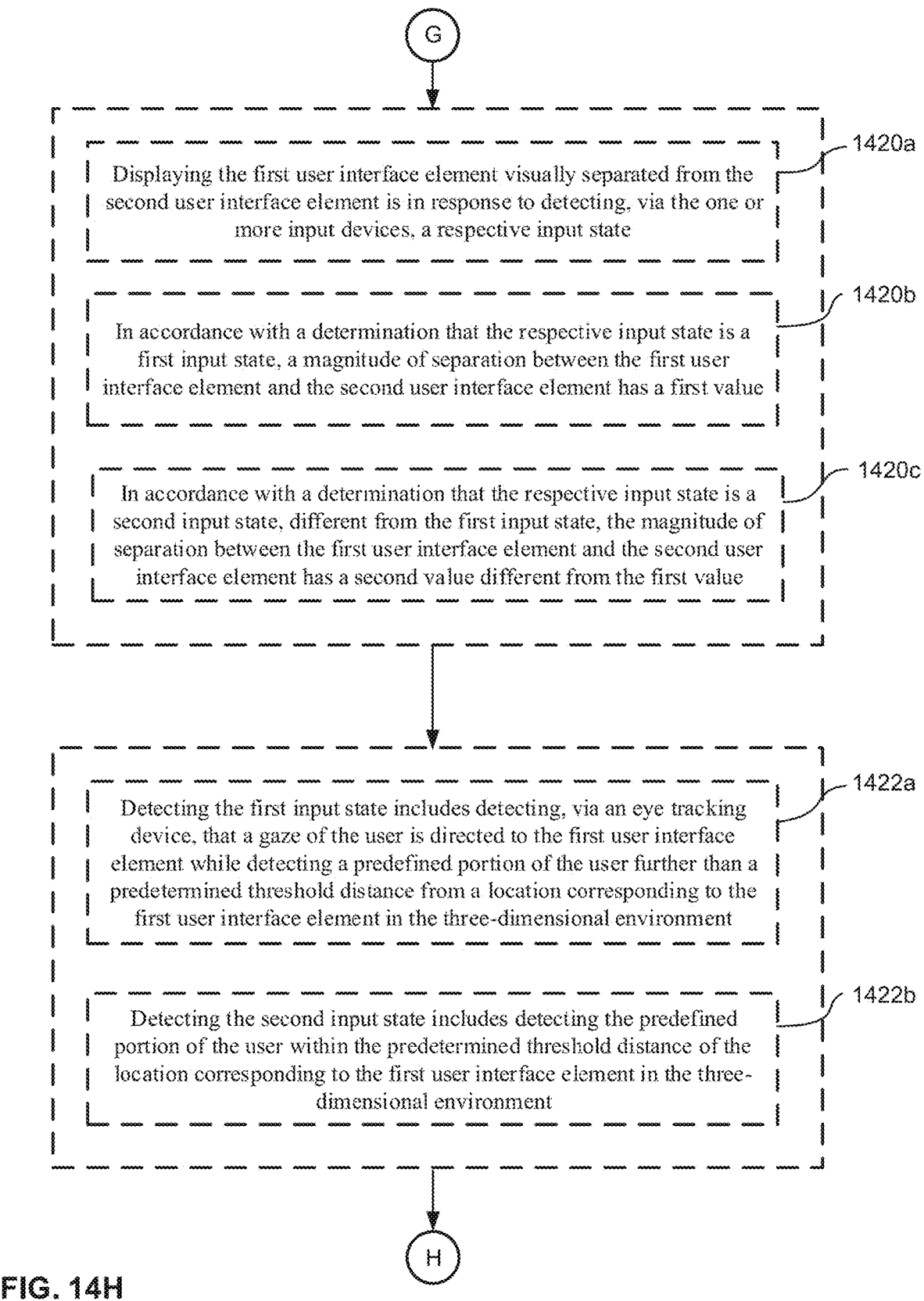
Figure 14I:
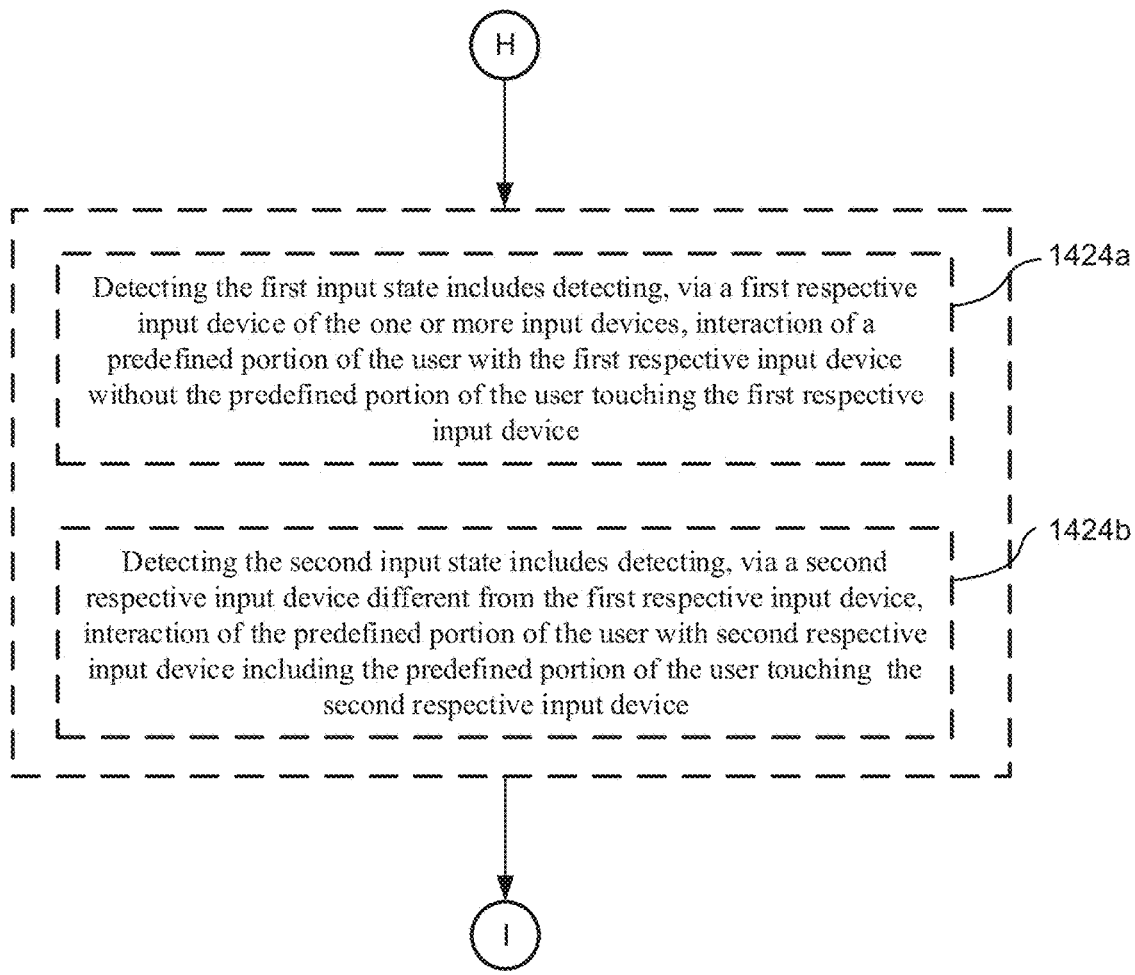
Figure 14J:
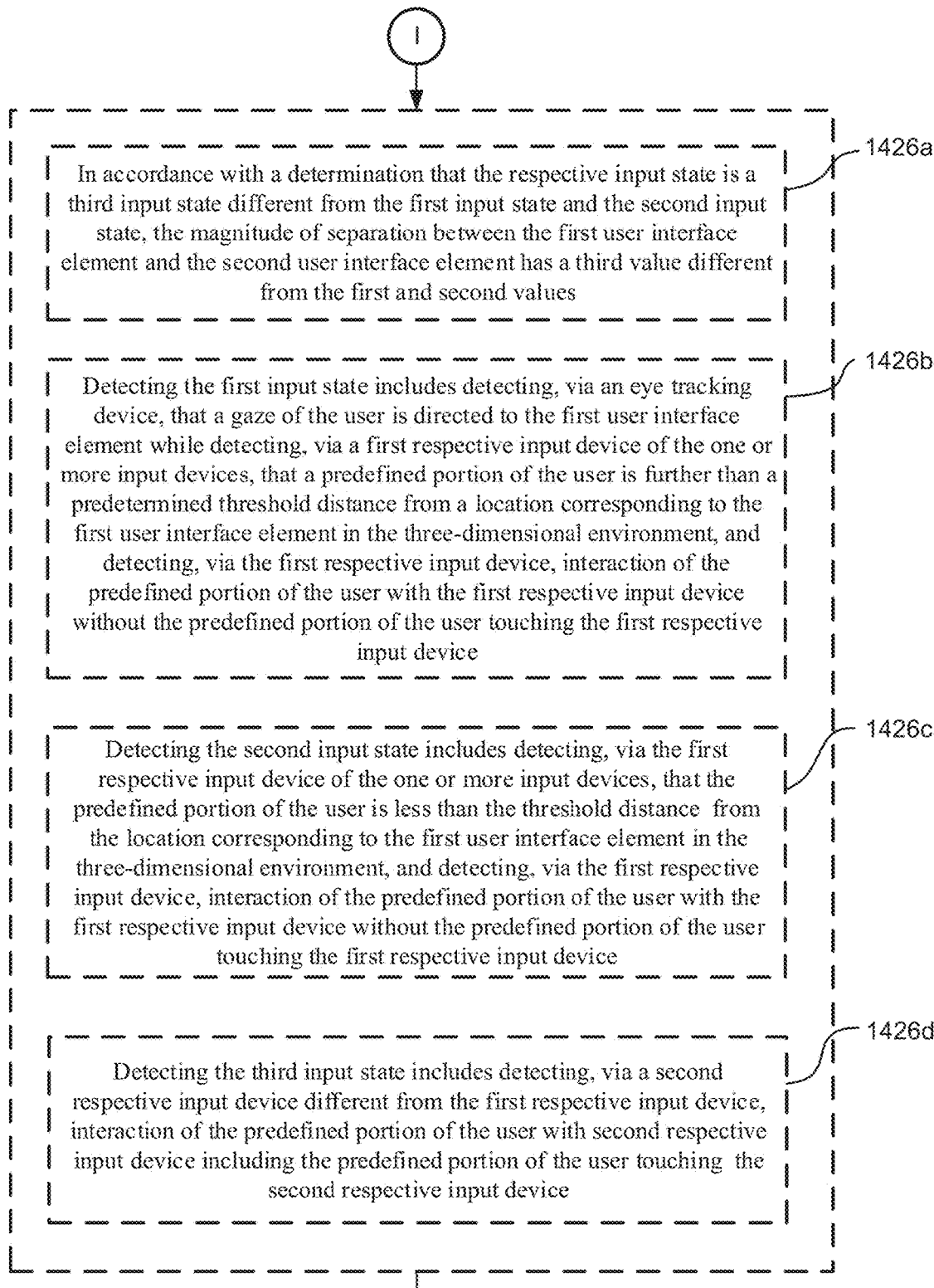
Figure 14K:
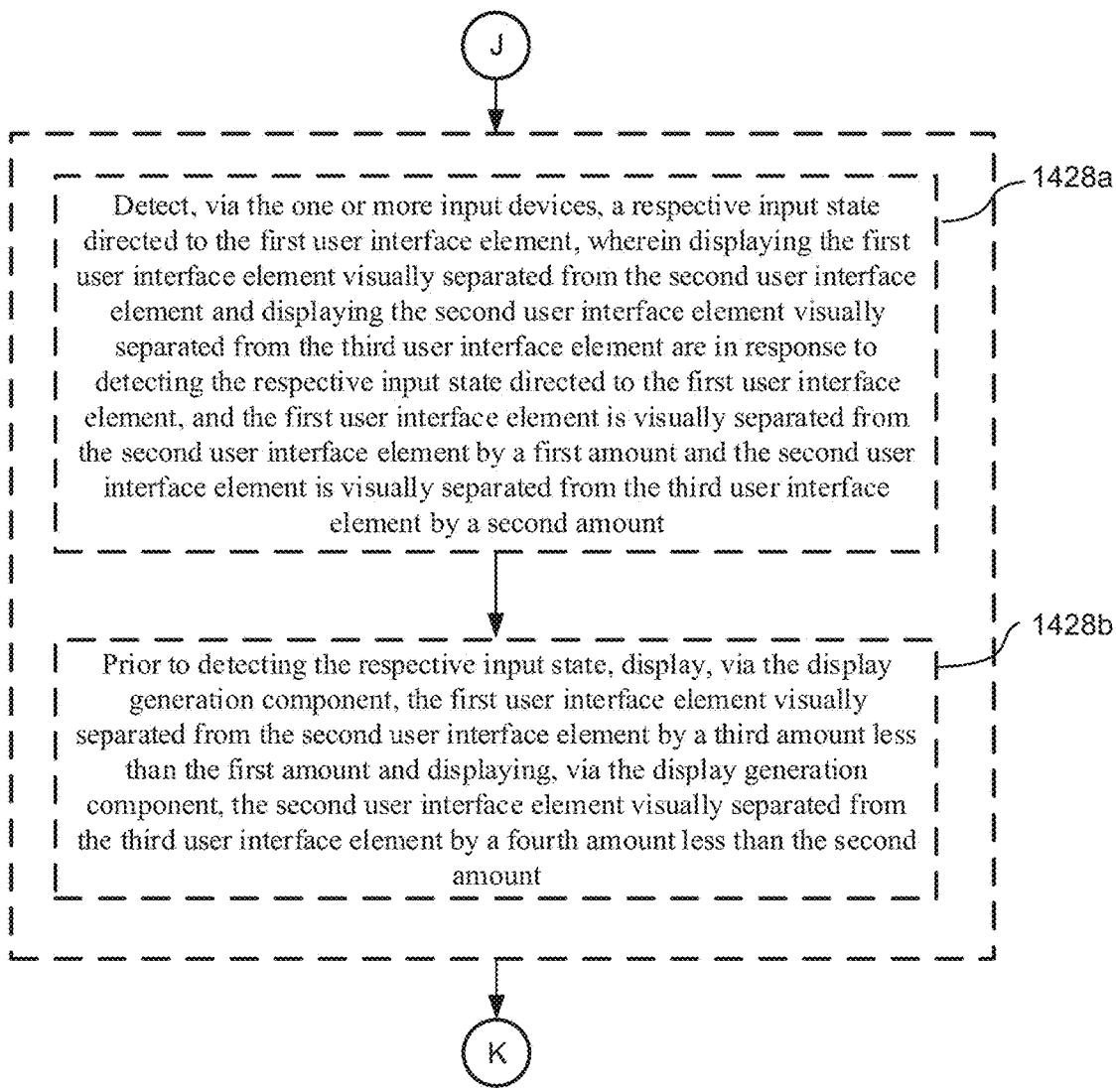
Figure 14L:
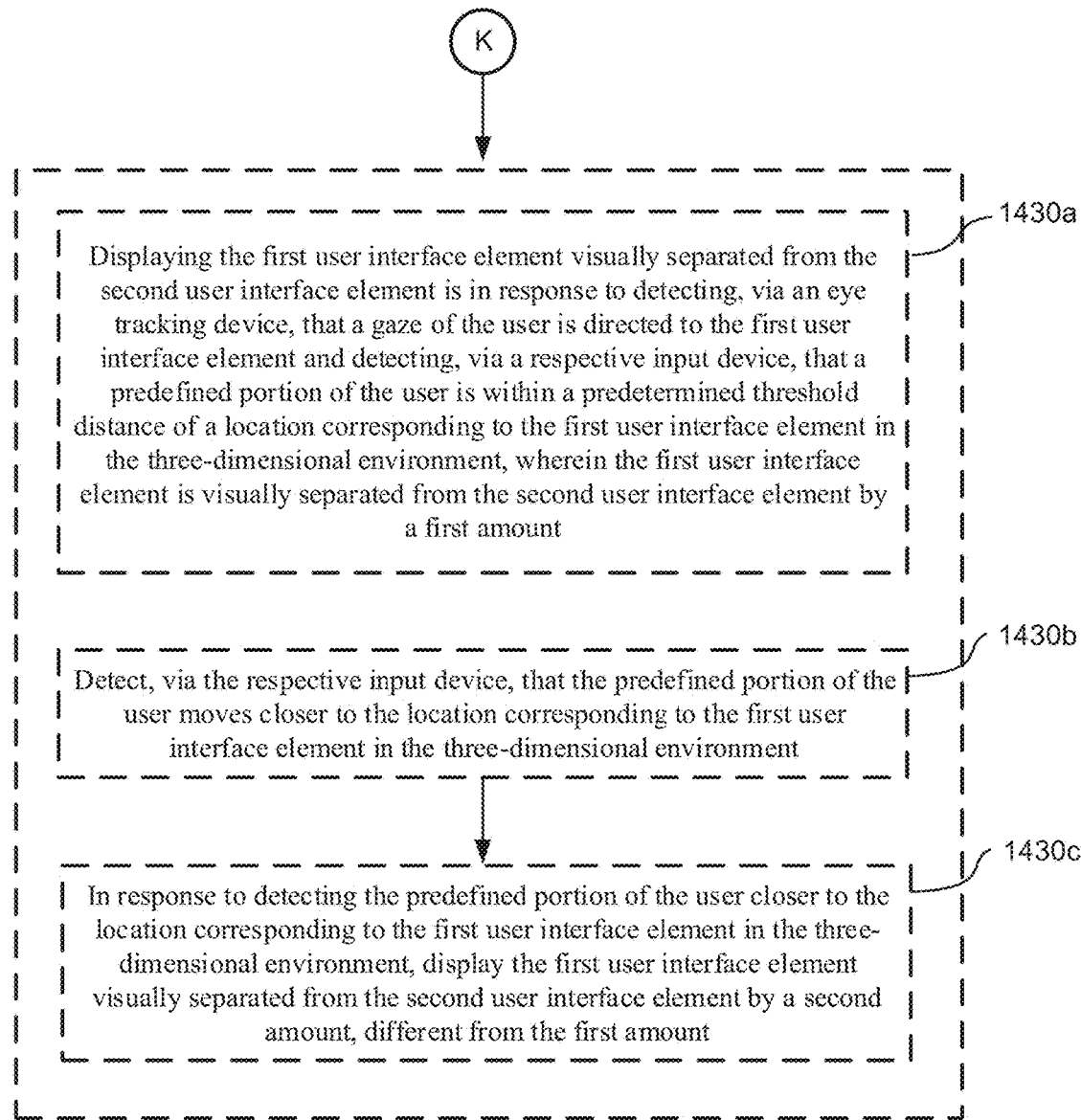

In FIG. 13F, the electronic device 101a continues to detect the inputs described above with reference to FIGS. 13A-E and, in response, the electronic device 101a updates the positions of containers 1312 and 1322 to continue to move away from the viewpoint of the user. In FIG. 13F, container 1312 moves back past the point corresponding to display of its virtual shadow. In FIG. 13F, the electronic device 101a makes container 1312, container 1314, and selectable options 1316 and 1318 smaller, as shown in FIG. 13F, and, in some embodiments, displays these elements with increased stereoscopic depth from the viewpoint of the user to represent continued movement of these elements. In some embodiments, container 1312, container 1314, and selectable options 1316 and 1318 have the same angular size as in previous Figures and are not actually smaller in FIG. 13F, but appear smaller because they are further from the viewpoint of the user. In some embodiments, the movement of containers 1312 and 1314 and selectable options 1316 and 1318 is in response to continuing to detect movement of the direct input provided by hand 1303c and optionally gaze 1301a. In FIG. 13F, container 1322 moves back past the point corresponding to display of its virtual shadow. In FIG. 13F, the electronic device 101a makes container 1322, container 1324, and selectable options 1326 and 1328 smaller, as shown in FIG. 13F, and, in some embodiments, displays these elements with increased stereoscopic depth from the viewpoint of the user to represent continued movement of these elements. In some embodiments, the movement of containers 1322 and 1324 and selectable options 1326 and 1328 is in response to continuing to detect movement of the air gesture input provided by hand 1303d and gaze 1301b. In some embodiments, container 1322, container 1324, and selectable options 1326 and 1328 have the same angular size as in previous Figures and are not actually smaller in FIG. 13F, but appear smaller because they are further from the viewpoint of the user. In some embodiments, the movement of containers 1322 and 1324 and selectable options 1326 and 1328 is in response to continuing to detect continued duration of the indirect input provided by hand 1303e and gaze 1301b.

In some embodiments, if movement of container 1312 and/or 1322 causes one of these elements to move to and/or collide with another element displayed by the electronic device, the electronic device 101a also starts moving that element away from the viewpoint of the user or moves that element laterally. In some embodiments, in response to detecting the end of the direct input, indirect input, or air gesture in any of the states illustrated in FIGS. 13C-13F, the electronic device 101a displays the elements to which the input was directed with visual separation, such as the visual separation of options 1316 and 1318 and containers 1314 and 1312 in FIG. 13B. In some embodiments, the electronic device displays the elements with the visual separation after the input ends in response to detecting the user's gaze and/or a ready state directed to the elements.

In some embodiments, one or more of the examples described above with reference to FIGS. 13A-13F apply to user interfaces including a different number of containers behind selectable user interface elements (e.g., one container, more than two containers), including user interfaces according to methods 800, 1000, and 1200 described above. In some embodiments, the manner in which the electronic device updates the positions of containers is different depending on the type of containers and/or the number of containers behind a selectable user interface element. For example, the electronic device 101a displays a soft keyboard including virtual keys visually separated from a backplane of the virtual keyboard. In some embodiments, the input location of the virtual keys is fixed and does not update as the keys are displaced in response to selection of the keys, but the input location of other selectable options updates as the location of the selectable options update in response to at least part of a selection input. In some embodiments, in response to detecting selection of one or more keys of a virtual keyboard, the electronic device 101a reduces the amount of visual separation between the selected key and the backplane of the keyboard and updates the location of the entire keyboard in response to an input that corresponds to moving the selected key further than the distance of the visual separation between the key and the backplane of the keyboard before selection of the key is detected.

FIGS. 14A-14L is a flowchart illustrating a method of enhancing interactions with selectable user interface elements in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In some embodiments, such as in FIG. 13A, method 1400 is performed at an electronic device (e.g., 101) in communication with a display generation component (e.g., 120) and one or more input devices (e.g., 314) (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 13A, the electronic device (e.g., 101a) displays (1402a), via the display generation component (e.g., 120a), a user interface in a three-dimensional environment (e.g., a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.) that includes a first user interface element (e.g., 1316), a second user interface element (e.g., 1314), and a third user interface element (e.g., 1312). In some embodiments, the first user interface element is an interactive user interface element, such as a selectable option. In some embodiments, in response to detecting selection of the first user interface element, the electronic device performs an action such as launching an application, presenting an item of content, modifying playback of an item of content presented by the electronic device, navigating to a user interface, initiating communication with a second electronic device, or navigating to a user interface. In some embodiments, other actions are possible.

In some embodiments, such as in FIG. 13B, the first user interface element (e.g., 1316) is displayed within a boundary of the second user interface element (e.g., 1314) and is visually separated from the second user interface element in a direction toward a viewpoint of a user of the electronic device (1402b). In some embodiments, the second user interface element is a container, such as a backplane, menu, or application window that includes one or more user interface elements (e.g., other containers, selectable options, content, etc.), including the first user interface element. For example, the second user interface element is a menu that includes a plurality of selectable options including the first user interface element. In some embodiments, the first, second, and third user interface elements are displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.). In some embodiments, the electronic device displays the three-dimensional environment from a viewpoint of the user that is associated with a respective location within the three-dimensional environment. In some embodiments, movement of the electronic device in the physical environment of the electronic device causes corresponding movement of the viewpoint of the user within the three-dimensional environment. In some embodiments, the first user interface element is displayed at a location in the three-dimensional environment that is between the second user interface element and the viewpoint of the user, and is separated from the second user interface element by a respective non-zero distance (e.g., 1, 2, 3, 5, 10, 15, 20, 30, or 50 centimeters). In some embodiments, the location of the first user interface element is separated from a location within the boundaries of the second user interface element. In some embodiments, the first user interface element appears to the user as though it is hovering in front of the second user interface element. In some embodiments, the electronic device initially displays the first user interface element without being separated from the second user interface element (e.g., the first and second user interface elements are the same distance from the viewpoint of the user) and separates the first user interface element from the second user interface element in response to detecting one or more of the gaze of the user directed to the first, second, or third user interface element and detecting the hand of the user within a threshold distance (e.g., 1, 2, 3, 5, 10, 15, or 30 centimeters) from the first, second, or third user interface element while in a predetermined shape (e.g., a pointing hand shape in which one or more fingers are extended and one or more fingers are curled towards the palm or a pinch hand shape in which the thumb touches another finger on the hand of the thumb)).

In some embodiments, such as in FIG. 13B, the second user interface element (e.g., 1314) is displayed within a boundary of the third user interface element (e.g., 1312) and is visually separated from the third user interface element (e.g., 1312) in the direction toward the viewpoint of the user of the electronic device (1402c). In some embodiments, the third user interface element is a container, such as a backplane, menu, or application window that includes one or more user interface elements (e.g., other containers, selectable options, content, etc.), including the second user interface element. For example, the third user interface element is an application window that includes one or more containers including the second user interface element and/or one or more selectable options and/or other user interface elements. In some embodiments, the second user interface element is displayed at a location in the three-dimensional environment that is between the third user interface element and the viewpoint of the user, and is separated from the third user interface element by a respective non-zero distance (e.g., 1, 2, 3, 5, 10, 15, 20, 30, or 50 centimeters). In some embodiments, the location of the second user interface element is separated from a location within the boundaries of the third user interface element. In some embodiments, the second user interface element appears to the user as though it is hovering in front of the third user interface element. In some embodiments, the electronic device initially displays the second user interface element without being separated from the third user interface element (e.g., the second and third user interface elements are the same distance from the viewpoint of the user) and separates the second user interface element from the third user interface element in response to detecting one or more of the gaze of the user directed to the first, second, or third user interface element and detecting the hand of the user within a threshold distance (e.g., 1, 2, 3, 5, 10, 15, or 30 centimeters) from the first, second, or third user interface element while in a predetermined shape (e.g., a pointing hand shape in which one or more fingers are extended and one or more fingers are curled towards the palm or a pinch hand shape in which the thumb touches another finger on the hand of the thumb)).

In some embodiments, such as in FIG. 13C, while displaying the user interface, the electronic device (e.g., 101a) detects (1402d), via the one or more input devices, a first input directed to the first user interface element (e.g., 1316). In some embodiments, the first input is an input to select the first user interface element. In some embodiments, detecting the first input includes detecting, via an eye tracking device, the gaze of the user directed to the first user interface element while detecting, via a hand tracking device, the user make a pinch gesture with their hand in which the user touches their thumb to another finger on the same hand. In some embodiments, detecting the first input includes detecting, via a hand tracking device, the user "push" the first user interface element towards the second and third user interface elements using an extended finger of their hand while the hand is in a pointing hand shape in which one or more fingers of the hand are extended towards the first user interface element and one or more fingers of the hand are curled towards the palm of the hand. In some embodiments, detecting the first input includes detecting, via a hand tracking device, the user "push" the first user interface element towards the second and third user interface elements while the hand is in a pinch hand shape in which the thumb touches another finger on the same hand. In some embodiments, detecting the first input includes detecting, via a hand tracking device, the user make a pinch hand shape while the hand is within a threshold distance (e.g., 0.5, 1, 2, 3, 5, 10, or 30 centimeters) of the first user interface element. In some embodiments, other inputs that cause movement of the first user interface element towards the second (e.g., and third) user interface element are possible.

In some embodiments, such as in FIG. 13C, in response to detecting the first input directed to the first user interface element (e.g., 1316), and in accordance with a determination that the first input satisfies one or more criteria (1402e), in accordance with a determination that the first input corresponds to input of a first magnitude (e.g., a magnitude that is less than or equal to the (e.g., non-zero) distance between the first user interface element and the second user interface element prior to detecting the first input), the electronic device (e.g., 101a) moves (1402f) the first user interface element (e.g., 1316) toward the second user interface element (e.g., 1314) away from the viewpoint of the user in accordance with the first input without moving the second user interface element (e.g., 1314) or the third user interface element (e.g., 1312) in the three-dimensional environment. In some embodiments, if the first input moves the first user interface element towards the second user interface element without extending beyond the second user interface element, the electronic device does not move the second or third user interface elements. In some embodiments, the one or more criteria include a criterion that is satisfied when the first input causes movement of the first user interface element towards the second and third user interface elements. In some embodiments, in response to detecting a selection input directed to the first user interface element, the electronic device moves the first user interface element towards the second and third user interface elements. For example, in response to detecting the gaze of the user directed to the first user interface element while the user makes the pinch gesture as described above, the electronic device moves the first user interface element towards the second user interface element at a predetermined speed (e.g., a constant speed or a speed that changes over time) while the finger and thumb are in contact with each other and selects the first user interface element when the first user interface element reaches the second user interface element. As another example, in response to detecting the user making the pinch gesture while the hand is within the threshold distance of the first user interface element as described above, the electronic device moves the first user interface element towards the second user interface element at a predetermined speed (e.g., a constant speed or a speed that changes over time) while the finger and thumb are in contact with each other and selects the first user interface element when the first user interface element reaches the second user interface element. As another example, in response to detecting the user "push" the first user interface element towards the second and third user interface elements (e.g., while the hand is in a pointing hand shape or a pinch hand shape), the electronic device moves the first user interface element towards the second and third user interface elements by a distance corresponding to the distance of the movement of the user's hand/finger "pushing" the first user interface element and selects the first user interface element when the first user interface element reaches the second user interface element.

In some embodiments, such as in FIG. 3D, in response to detecting the first input directed to the first user interface element (e.g., 1316), and in accordance with a determination that the first input satisfies one or more criteria (1402e), in accordance with a determination that the first input corresponds to input of a second magnitude (e.g., a magnitude that is greater than the (e.g., non-zero) distance between the first user interface element and the second user interface element prior to detecting the first input, but less than or equal to the distance between the first user interface element and the third user interface element prior to detecting the first input), greater than the first magnitude, the electronic device (e.g., 101a) moves (1402g) the first user interface element (e.g., 1316) toward the second user interface element (e.g., 1314), and the second user interface element (e.g., 1314) toward the third user interface element (e.g., 1312), away from the viewpoint of the user in accordance with the first input, without moving the third user interface (e.g., 1312) in the three-dimensional environment. In some embodiments, if the first input moves the first user interface element past (or through) the location of the second user interface element without extending beyond the third user interface element, the first input moves the first user interface element to the second user interface element, and then continues to move the first user interface element while also moving the second user interface element in accordance with the first input.

In some embodiments, such as in FIG. 13F, in response to detecting the first input directed to the first user interface element (e.g., 1316), and in accordance with a determination that the first input satisfies one or more criteria (1402e), in accordance with a determination that the first input corresponds to input of a third magnitude (e.g., a magnitude that is greater than the distance between the first user interface element and the third user interface element prior to detecting the first input), greater than the second magnitude, the electronic device (e.g., 101a) moves (1402h) the first user interface element (e.g., 1316) toward the second user interface element (e.g., 1314), the second user interface element (e.g., 1314) toward the third user interface element (e.g., 1312), and the third user interface element (e.g., 1312) away from the viewpoint of the user in accordance with the first input. In some embodiments, if the first input moves the first user interface element past (or through) the locations of the second and third user interface elements, the first input moves the first user interface element to reach the second user interface element, then moves the second user interface element while continuing to move the first user interface element to reach the third user interface element, and then moves the third user interface element while continuing to move the first and second user interface elements in accordance with the first input.

Moving the first user interface element, second user interface element, and/or third user interface element in response to the first input in accordance with the magnitude of the first input provides enhanced visual feedback to the user while providing an input directed to the first user interface element, which reduces user errors and the time and inputs needed to correct user errors.

In some embodiments, such as in FIG. 13B, in response to detecting that one or more second criteria are satisfied, including a criterion than is satisfied when an end of the first input is detected (1404a), the electronic device (e.g., 101a) displays (1404b), via the display generation component, the first user interface element (e.g., 1316) visually separated from the second user interface element (e.g., 1314) in the direction towards the viewpoint of the user of the electronic device. In some embodiments, the one or more second criteria include a criterion that is satisfied when the gaze of the user is directed to first user interface element. In some embodiments, the one or more second criteria include a criterion that is satisfied when the electronic device detects a ready state of a predefined portion of the user (e.g., a hand of the user) that includes detecting the predefined portion (e.g., hand) of the user within a threshold distance (e.g., 1, 2, 3, 5, 10, 15, or 30 centimeters) from the first, second, or third user interface element while in a predetermined shape (e.g., a pointing hand shape in which one or more fingers are extended and one or more fingers are curled towards the palm or a pinch hand shape in which the thumb touches another finger on the hand of the thumb)). In some embodiments, detecting the end of the first input includes detecting a predefined portion of the user (e.g., the hand of the user) in a hand shape that does not satisfy one or more criteria for detecting an input. For example, detecting the first input includes detecting the hand of the user in pinch hand shape and detecting the end of the input includes detecting the hand of the user no longer in the pinch hand shape. As another example, detecting the end of the input includes no longer detecting the predefined portion (e.g., hand) of the user via the input device (e.g., hand tracking device) that detected the first input (e.g., because the user moved the predefined portion of the user out of range of the input device). In some embodiments, detecting the end of the input includes detecting a predefined movement of the predefined portion (e.g., hand) of the user. For example, detecting the first input includes detecting the user "push" the first user interface element away from the viewpoint of the user in the three-dimensional environment and detecting the end of the first input includes detecting motion of the hand of the user towards the viewpoint of the user in the three-dimensional environment. In some embodiments, the amount of separation between the first user interface element and the second user interface element in response to detecting that the one or more second criteria are satisfied is the same as the amount of separation between the first user interface element and the second user interface element prior to detecting the first input. In some embodiments, the amount of separation between the first user interface element and the second user interface element in response to detecting that the one or more second criteria are satisfied and amount of separation between the first user interface element and the second user interface element prior to detecting the first input are different.

In some embodiments, such as in FIG. 13B, in response to detecting that one or more second criteria are satisfied, including a criterion than is satisfied when an end of the first input is detected (1404a), the electronic device (e.g., 101a) displays (1404c), via the display generation component (e.g., 120a), the second user interface element (e.g., 1314) visually separated from the third user interface element (e.g., 1312) in the direction towards the viewpoint of the user of the electronic device (e.g., 101). In some embodiments, the amount of separation between the second user interface element and the third user interface element in response to detecting that the one or more second criteria are satisfied is the same as the amount of separation between the second user interface element and the third user interface element prior to detecting the first input. In some embodiments, the amount of separation between the second user interface element and the third user interface element in response to detecting that the one or more second criteria are satisfied and amount of separation between the second user interface element and the third user interface element prior to detecting the first input are different. Displaying the first, second, and third user interface elements with visual separation in response to detecting the one or more second criteria are satisfied provides a user with improved visual feedback that the first input was detected, thereby improving the visual feedback provided to the user.

In some embodiments, such as in FIG. 3D, in response to detecting the first input directed to the first user interface element (e.g., 1316), and in accordance with the determination that the first input satisfies the one or more criteria (1406a), in accordance with a determination that the first input corresponds to an input greater than a respective magnitude, the electronic device (e.g., 101a) performs (1406b) an operation associated with the first user interface element (e.g., 1316). In some embodiments, the magnitude of the input is the distance the first user interface element moves in the three-dimensional environment in response to a movement component of the input based on duration, distance, and/or speed of a movement component of the input. For example, if the input includes selection of a directional option (e.g., an arrow key on a keyboard or virtual keyboard), the magnitude of the input is based on the duration for which the directional option is selected, clicked, or held. As another example, if the input includes movement of a predefined portion of the user (e.g., the hand of the user), the magnitude of the input is based on the distance, speed, or duration of movement of the predefined portion of the user. In some embodiments, the respective magnitude is greater than or equal to the first magnitude and less than the second magnitude. In some embodiments, the respective magnitude is the first magnitude. In some embodiments, the respective magnitude is the second magnitude. In some embodiments, the respective magnitude corresponds to the distance of separation between the first user interface element and the second user interface element. For example, if the magnitude of the first input is sufficient to "push" the first user interface element to meet the second user interface element, the electronic device performs the operation associated with the first user interface element.

In some embodiments, such as in FIG. 13C, in response to detecting the first input directed to the first user interface element (e.g., 1316), and in accordance with the determination that the first input satisfies the one or more criteria (1406a), in accordance with a determination that the first input corresponds to an input less than the respective magnitude, the electronic device (e.g., 101) forgoes (1406c) performing the operation associated with the first user interface element (e.g., 1316). In some embodiments, the respective magnitude corresponds to the distance of separation between the first user interface element and the second user interface element. For example, if the magnitude of the first input is not sufficient to "push" the first user interface element to meet the second user interface element, the electronic device forgoes performing the operation associated with the first user interface element. Performing or not performing the operation associated with the first user interface element based on the magnitude of the first input provides a user with the ability to cancel an input to perform the operation corresponding to the first user interface element by ceasing the input before the magnitude of the first input reaches the respective magnitude, thereby reducing user error and reducing the number of inputs needed to correct user error.

In some embodiments, such as in FIG. 13B, the respective magnitude corresponds to a magnitude of visual separation between the first user interface element (e.g., 1316) and the second user interface element (e.g., 1314) in the direction toward the viewpoint of the user of the electronic device (e.g., 101) prior to detecting the first input (1408a). In some embodiments, the respective magnitude corresponds to the magnitude of visual separation between the first user interface element and the second user interface element when, in response to the input, the electronic device moves the first user interface element in the three-dimensional environment by a distance equal to the amount of visual separation between the first and second user interface elements. In some embodiments, in response to an input having a magnitude (e.g., of movement) that causes the electronic device to move the first user interface element to a location of the second user interface element (e.g., bringing the first user interface element in contact with the second user interface element), the electronic device performs an operation associated with the first user interface element. Performing the operation associated with the first user interface element in accordance with the respective magnitude of the first input corresponding to the magnitude of visual separation between the first and second user interface elements provides a user with enhanced visual feedback of a degree of magnitude to include in the first input in order to perform the operation associated with the first user interface element, thereby providing efficient and improved visual feedback to the user.

In some embodiments, such as in FIG. 13E, in response to detecting the first input directed to the first user interface element (e.g., 1316), and in accordance with the determination that the first input satisfies the one or more criteria (1410a), in accordance with the determination that the first input corresponds to an input with a magnitude greater than the respective magnitude, the electronic device (e.g., 101a) performs (1410b) the operation associated with the first user interface element (e.g., 1316) irrespective of an amount by which a magnitude corresponding to the first input exceeds the respective magnitude. In some embodiments, as long as the magnitude of the first input is equal to or greater than the respective magnitude, the electronic device performs the operation associated with the first user interface element. In some embodiments, the respective magnitude is greater than the second magnitude. In some embodiments, the respective magnitude is greater than the third magnitude. In some embodiments, in response to an input that exceeds the respective magnitude, the distance by which the first and/or second and/or third user interface elements move away from the viewpoint of the user in the three-dimensional environment is greater than the distance by which the first and/or second and/or third user interface elements move away from the viewpoint of the user in the three-dimensional environment in response to an input of a respective magnitude. In some embodiments, the operation performed by the electronic device in response to detecting the input corresponding to the respective magnitude is the same as the operation performed by the electronic device in response to detecting an input corresponding to a magnitude greater than the respective magnitude. In some embodiments, the electronic device presents a first respective user interface element displayed within a boundary of a second respective user interface element (e.g., without the second respective user interface element being displayed within a boundary of an additional user interface element) such as according to one or more steps of method 800. In some embodiments, in response to an input corresponding to a request to "push" the first respective user interface element to the second respective user interface element, the electronic device performs a respective action. In some embodiments, in response to an input corresponding to a request to "push" the first respective user interface element a distance greater than the visual separation between the first respective user interface element and the second respective user interface element, the electronic device performs the same respective action. Performing the operation associated with the first user interface element irrespective of the amount by which the magnitude corresponding to the first input exceeds the respective magnitude provides a user with simplified user input criteria, thereby reducing user errors and reducing the user inputs needed to correct user errors.

In some embodiments, such as in FIG. 13B, displaying the first user interface element (e.g., 1316) and the second user interface element (e.g., 1314) visually separated in the direction toward the viewpoint of the user of the electronic device (e.g., 101) includes displaying the first user interface element (e.g., 1316) or the second user interface element (e.g., 1314) with sizes determined based on the visual separation between the first user interface element (e.g., 1316) and the second user interface element (e.g., 1316) (1412a). In some embodiments, the first user interface element and second user interface element are displayed at sizes corresponding to the visual separation between the first user interface element and the second user interface element. For example, for a relatively large amount of visual separation, the first user interface element is displayed at a relatively large size (e.g., compared to the size of the first user interface element while displayed with less visual separation from the second user interface element) and/or the second user interface element is displayed at a relatively small size (e.g., compared to the size of the second user interface element while displayed with less visual separation from the first user interface element). As another example, for a relatively small amount of visual separation, the first user interface element is displayed at a relatively small size (e.g., compared to the size of the first user interface element while displayed with more visual separation from the second user interface element) and/or the second user interface element is displayed at a relatively large size (e.g., compared to the size of the second user interface element while displayed with more visual separation from the first user interface element). In some embodiments, as the amount of visual separation between the first and second user interface elements changes (e.g., in response to user input), the electronic device changes the size(s) of the first and/or second user interface elements.

In some embodiments, such as in FIG. 13B, displaying the second user interface element (e.g., 1314) and the third user interface element (e.g., 1312) visually separated in the direction toward the viewpoint of the user of the electronic device includes displaying the second user interface element (e.g., 1314) or the third user interface element (e.g., 1312) with sizes determined based on the visual separation between the second user interface element (e.g., 1314) and the third user interface element (e.g., 1312) (1412b). In some embodiments, the second user interface element and third user interface element are displayed at sizes corresponding to the visual separation between the second user interface element and the third user interface element. For example, for a relatively large amount of visual separation, the second user interface element is displayed at a relatively large size (e.g., compared to the size of the second user interface element while displayed with less visual separation from the third user interface element) and/or the third user interface element is displayed at a relatively small size (e.g., compared to the size of the third user interface element while displayed with less visual separation from the second user interface element). As another example, for a relatively small amount of visual separation, the second user interface element is displayed at a relatively small size (e.g., compared to the size of the second user interface element while displayed with more visual separation from the third user interface element) and/or the third user interface element is displayed at a relatively large size (e.g., compared to the size of the third user interface element while displayed with more visual separation from the second user interface element). In some embodiments, as the amount of visual separation between the second and third user interface elements changes (e.g., in response to user input), the electronic device changes the size(s) of the second and/or third user interface elements. In some embodiments, the electronic device presents a first respective user interface element displayed within a boundary of a second respective user interface element (e.g., without the second respective user interface element being displayed within a boundary of an additional user interface element) such as according to one or more steps of method 800. In some embodiments, the electronic device displays the first respective user interface element and the second respective user interface element with visual separation represented by the size(s) of the first respective user interface element and/or second user interface element. Representing the visual separation between user interface elements, such as visual separation between the first and second user interface elements and the visual separation between the second and third user interface elements, using the sizes of the user interface elements provides a user with improved visual feedback of the separation between various user interface elements, thereby enhancing visual feedback when the user provides user inputs to the system, which reduces user error.

In some embodiments, such as in FIG. 13B, displaying the first user interface element (e.g., 1316) and the second user interface element (e.g., 1314) visually separated in the direction toward the viewpoint of the user of the electronic device includes displaying the first user interface element (e.g., 1316) or the second user interface element (e.g., 1314) at different stereoscopic depths determined based on the visual separation between the first user interface element (e.g., 1316) and the second user interface element (e.g., 1314) (1414a). In some embodiments, the first user interface element and second user interface element are displayed with stereoscopic depths corresponding to the visual separation between the first user interface element and the second user interface element. For example, for a relatively large amount of visual separation, the stereoscopic depth between the first user interface element and the second user interface element is greater than the difference in stereoscopic depth between the first user interface element and the second user interface element for a relatively low amount of visual separation. In some embodiments, as the amount of visual separation between the first and second user interface elements changes (e.g., in response to user input), the electronic device changes the stereoscopic depth between and/or the stereoscopic depths of the first and/or second user interface elements.

In some embodiments, such as in FIG. 13B, displaying the second user interface element (e.g., 1314) and the third user interface element (e.g., 1312) visually separated in the direction toward the viewpoint of the user of the electronic device includes displaying the second user interface element (e.g., 1314) or the third user interface element (e.g., 1312) at different stereoscopic depths determined based on the visual separation between the second user interface element (e.g., 1314) and the third user interface element (e.g., 1312) (1414b). In some embodiments, the second user interface element and third user interface element are displayed with stereoscopic depths corresponding to the visual separation between the second user interface element and the third user interface element. For example, for a relatively large amount of visual separation, the stereoscopic depths between the second user interface element and the third user interface element is greater than the difference in stereoscopic depths between the second user interface element and the third user interface element for a relatively low amount of visual separation. In some embodiments, as the amount of visual separation between the second and third user interface elements changes (e.g., in response to user input), the electronic device changes the stereoscopic depth between and/or the stereoscopic depths of the second and/or third user interface elements. In some embodiments, the electronic device presents a first respective user interface element displayed within a boundary of a second respective user interface element (e.g., without the second respective user interface element being displayed within a boundary of an additional user interface element) such as according to one or more steps of method 800. In some embodiments, the electronic device displays the first respective user interface element and the second respective user interface element with visual separation represented by the stereoscopic depth(s) with which the electronic device displays the first respective user interface element and/or second user interface element. Representing the visual separation between user interface elements, such as visual separation between the first and second user interface elements and the visual separation between the second and third user interface elements, using stereoscopic depths between user interface elements provides a user with improved visual feedback of the separation between various user interface elements, thereby enhancing visual feedback when the user provides user inputs to the system, which reduces user error.

In some embodiments, such as in FIG. 13B, displaying the first user interface element (e.g., 1316) and the second user interface element (e.g., 1314) visually separated in the direction toward the viewpoint of the user of the electronic device includes displaying the first user interface element (e.g., 1316) or the second user interface element (e.g., 1314) with one or more virtual shadows determined based on the visual separation between the first user interface element (e.g., 1316) and the second user interface element (e.g., 1314) (1416a). In some embodiments, the first user interface element and/or second user interface element are displayed with virtual shadows corresponding to the visual separation between the first user interface element and the second user interface element. For example, the electronic device displays a virtual shadow of the first user interface element overlaid on (e.g., a portion of) the second user interface element with a size and/or position based on the amount of visual separation between the first user interface element and the second user interface element. For example, for a relatively large amount of visual separation, the first user interface element is displayed with a virtual shadow on the second user interface element that is a relatively large distance from the first user interface element compared to the distance of the virtual shadow from the first user interface element for a relatively small amount of visual separation between the first and second user interface elements. In some embodiments, the virtual shadow is displayed away from the first user interface element in a direction including a lateral component (e.g., towards the left or right in the three-dimensional environment). In some embodiments, as the amount of visual separation between the first and second user interface elements changes (e.g., in response to user input), the electronic device changes the size(s) and/or position(s) of the virtual shadows cast by the first and/or second user interface elements. In some embodiments, the electronic device displays virtual drop shadows of the first and second user interface elements on (e.g., virtual, real) surfaces of the three-dimensional environment (e.g., floors, walls) at distances from each other that correspond to the amount of visual separation between the first and second user interface elements.

In some embodiments, such as in FIG. 13B, displaying the second user interface element (e.g., 1314) and the third user interface element (e.g., 1312) visually separated in the direction toward the viewpoint of the user of the electronic device includes displaying the second user interface element (e.g., 1314) or the third user interface element (e.g., 1312) with one or more virtual shadows determined based on the visual separation between the second user interface element (e.g., 1314) and the third user interface element (e.g., 1312) (1416b). In some embodiments, the second user interface element and/or third user interface element are displayed with virtual shadows corresponding to the visual separation between the second user interface element and the third user interface element. For example, the electronic device displays a virtual shadow of the second user interface element overlaid on (e.g., a portion of) the third user interface element with a size and/or position based on the amount of visual separation between the second user interface element and the third user interface element. For example, for a relatively large amount of visual separation, the second user interface element is displayed with a virtual shadow on the third user interface element that is a relatively large distance from the second user interface element compared to the distance of the virtual shadow from the second user interface element for a relatively small amount of visual separation between the second and third user interface elements. In some embodiments, the virtual shadow of the second user interface element is displayed away from the second user interface element in a direction including a lateral component (e.g., towards the left or right in the three-dimensional environment). In some embodiments, as the amount of visual separation between the second and third user interface elements changes (e.g., in response to user input), the electronic device changes the size(s) and/or position(s) of the virtual shadows cast by the second and/or third user interface elements. In some embodiments, the electronic device displays virtual drop shadows of the second and third user interface elements on (e.g., virtual, real) surfaces of the three-dimensional environment (e.g., floors, walls) at distances from each other that correspond to the amount of visual separation between the second and third user interface elements. In some embodiments, the electronic device presents a first respective user interface element displayed within a boundary of a second respective user interface element (e.g., without the second respective user interface element being displayed within a boundary of an additional user interface element) such as according to one or more steps of method 800. In some embodiments, the electronic device displays the first respective user interface element and the second respective user interface element with visual separation represented by the virtual shadow(s) of the first respective user interface element and/or second user interface element. Representing the visual separation between user interface elements, such as visual separation between the first and second user interface elements and the visual separation between the second and third user interface elements, using virtual shadows provides a user with improved visual feedback of the separation between various user interface elements, thereby enhancing visual feedback when the user provides user inputs to the system, which reduces user error.

In some embodiments, such as in FIG. 13C, the one or more criteria include a criterion that is satisfied when the electronic device (e.g., 101) detects, via an eye tracking device (e.g., 314), that a gaze (e.g., 1301a) of the user is directed to the first user interface element (e.g., 1316), and the user interface in the three-dimensional environment further includes a fourth user interface element (e.g., 1326), a fifth user interface element (e.g., 1324), and a sixth user interface element (e.g., 1322) (1418a). In some embodiments, detecting the gaze of the user directed to the first user interface element causes the electronic device to direct the first user input to the first user interface element. In some embodiments, in response to detecting the gaze of the user directed to a different user interface element while receiving a user input, the electronic device directs the user input to the other user interface element.

In some embodiments, such as in FIG. 13C, the fourth user interface element (e.g., 1326) is displayed within a boundary of the fifth user interface element (e.g., 1324) and is visually separated from the fifth user interface element (e.g., 1324) in the direction toward the viewpoint of the user of the electronic device (e.g., 101) (1418b). In some embodiments, the fifth user interface element is a container, such as a backplane, menu, or application window that includes one or more user interface elements (e.g., other containers, selectable options, content, etc.), including the fourth user interface element. For example, the fourth user interface element is a menu that includes a plurality of selectable options including the fourth user interface element. In some embodiments, the fourth user interface element is displayed at a location in the three-dimensional environment that is between the fifth user interface element and the viewpoint of the user, and is separated from the fifth user interface element by a respective non-zero distance (e.g., 1, 2, 3, 5, 10, 15, 20, 30, or 50 centimeters). In some embodiments, the location of the fourth user interface element is separated from a location within the boundaries of the fifth user interface element. In some embodiments, the fourth user interface element appears to the user as though it is hovering in front of the fifth user interface element.

In some embodiments, such as in FIG. 13C, the fifth user interface element (e.g., 1324) is displayed within a boundary of the sixth user interface element (e.g., 1322) and is visually separated from the sixth user interface element (e.g., 1322) in the direction toward the viewpoint of the user of the electronic device (1418*c*). In some embodiments, the sixth user interface element is a container, such as a backplane, menu, or application window that includes one or more user interface elements (e.g., other containers, selectable options, content, etc.), including the fifth user interface element. For example, the sixth user interface element is an application window that includes one or more containers including the fifth user interface element and/or one or more selectable options and/or other user interface elements. In some embodiments, the fifth user interface element is displayed at a location in the three-dimensional environment that is between the sixth user interface element and the viewpoint of the user, and is separated from the sixth user interface element by a respective non-zero distance (e.g., 1, 2, 3, 5, 10, 15, 20, 30, or 50 centimeters). In some embodiments, the location of the fifth user interface element is separated from a location within the boundaries of the sixth user interface element. In some embodiments, the fifth user interface element appears to the user as though it is hovering in front of the sixth user interface element.

In some embodiments, such as in FIG. 13C, while displaying the user interface, the electronic device (e.g., 101*a*) detects (1418*d*), via the one or more input devices, a second input directed to the fourth user interface element (e.g., 1326). In some embodiments, the second input is an input to select the fourth user interface element. In some embodiments, detecting the second input includes detecting, via an eye tracking device, the gaze of the user directed to the fourth user interface element while detecting, via a hand tracking device, the user makes a pinch gesture with their hand in which the user touches their thumb to another finger on the same hand. In some embodiments, detecting the second input includes detecting, via a hand tracking device, the user "push" the fourth user interface element towards the fifth and sixth user interface elements using an extended finger of their hand while the hand is in a pointing hand shape in which one or more fingers of the hand are extended towards the fourth user interface element and one or more fingers of the hand are curled towards the palm of the hand. In some embodiments, detecting the second input includes detecting, via a hand tracking device, the user "push" the fourth user interface element towards the fifth and sixth user interface elements while the hand is in a pinch hand shape in which the thumb touches another finger on the same hand. In some embodiments, detecting the second input includes detecting, via a hand tracking device, the user makes a pinch hand shape while the hand is within a threshold distance (e.g., 0.5, 1, 2, 3, 5, 10, or 30 centimeters) of the fourth user interface element. In some embodiments, other inputs that cause movement of the fourth user interface element towards the fifth (e.g., and sixth) user interface element are possible.

In some embodiments, such as in FIG. 13C, in response to detecting the second input directed to the fourth user interface element (e.g., 1326), in accordance with a determination that the second input satisfies one or more second criteria including a criterion that is satisfied when the electronic device (e.g., 101) detects, via the eye tracking device (e.g., 314), that the gaze of the user is directed to the fourth user interface element (e.g., 1326) (1418*e*), in accordance with a determination that the second input corresponds to input of a fourth magnitude (e.g., a magnitude that is less than or equal to the (e.g., non-zero) distance between the fourth user interface element and the fifth user interface element prior to detecting the second input), the electronic device (e.g., 101*a*) moves (1418*f*) the fourth user interface element (e.g., 1326) toward the fifth user interface element (e.g., 1324) away from the viewpoint of the user in accordance with the second input without moving the fifth user interface element (e.g., 1324) or the sixth user interface element (e.g., 1326) in the three-dimensional environment. In some embodiments, if the second input moves the fourth user interface element towards the fifth user interface element without extending beyond the fifth user interface element, the electronic device does not move the fifth or sixth user interface elements. In some embodiments, the one or more criteria include a criterion that is satisfied when the second input causes movement of the fourth user interface element towards the fifth and sixth user interface elements. In some embodiments, in response to detecting a selection input directed to the fourth user interface element, the electronic device moves the fourth user interface element towards the fifth and sixth user interface elements. For example, in response to detecting the gaze of the user directed to the fourth user interface element while the user makes the pinch gesture as described above, the electronic device moves the fourth user interface element towards the fifth user interface element at a predetermined speed (e.g., a constant speed or a speed that changes over time) while the finger and thumb are in contact with each other and selects the fourth user interface element when the fourth user interface element reaches the fifth user interface element. As another example, in response to detecting the user making the pinch gesture while the hand is within the threshold distance of the fourth user interface element as described above, the electronic device moves the fourth user interface element towards the fifth user interface element at a predetermined speed (e.g., a constant speed or a speed that changes over time) while the finger and thumb are in contact with each other and selects the fourth user interface element when the fourth user interface element reaches the fifth user interface element. As another example, in response to detecting the user "push" the fourth user interface element towards the fifth and sixth user interface elements (e.g., while the hand is in a pointing hand shape or a pinch hand shape), the electronic device moves the fourth user interface element towards the fifth and sixth user interface elements by a distance corresponding to the distance of the movement of the user's hand/finger "pushing" the fourth user interface element and selects the fourth user interface element when the fourth user interface element reaches the fifth user interface element.

In some embodiments, such as in FIG. 3D, in response to detecting the second input directed to the fourth user interface element (e.g., 1326), in accordance with a determination that the second input satisfies one or more second criteria including a criterion that is satisfied when the electronic device (e.g., 101) detects, via the eye tracking device (e.g., 314), that the gaze (e.g., 1301*b*) of the user is directed to the fourth user interface element (e.g., 1326) (1418*e*), in accordance with a determination that the second input corresponds to input of a fifth magnitude (e.g., a magnitude that is greater than the (e.g., non-zero) distance between the fourth user interface element and the fifth user interface element prior to detecting the second input, but less than or equal to the distance between the fourth user interface element and the sixth user interface element prior to detecting the first input), greater than the fourth magnitude, the electronic device (e.g., 101*a*) moves (1418*g*) the fourth user interface element (e.g., 1326) toward the fifth user interface element (e.g., 1324), and the fifth user interface element (e.g., 1324) toward the sixth user interface element (e.g., 1322), away from the viewpoint of the user in accordance with the second input, without moving the sixth user interface element (e.g., 1322) in the three-dimensional environment. In some embodiments, if the second input moves the fourth user interface element past (or through) the location of the fifth user interface element without extending beyond the sixth user interface element, the second input moves the fourth user interface element to the fifth user interface element, and then continues to move the fourth user interface element while also moving the fifth user interface element in accordance with the first input.

In some embodiments, such as in FIG. 13E, in response to detecting the second input directed to the fourth user interface element (e.g., 1326), in accordance with a determination that the second input satisfies one or more second criteria including a criterion that is satisfied when the electronic device (e.g., 101) detects, via the eye tracking device (e.g., 314), that the gaze (e.g., 1301*b*) of the user is directed to the fourth user interface element (1418*e*), in accordance with a determination that the second input corresponds to input of a sixth magnitude, greater than the fifth magnitude (e.g., a magnitude that is greater than the distance between the fourth user interface element and the sixth user interface element prior to detecting the second input), the electronic device (e.g., 101*a*) moves (1418*h*) the fourth user interface element (e.g., 1326) toward the fifth user interface element (e.g., 1324), the fifth user interface element (e.g., 1324) toward the sixth user interface element (e.g., 1322), and the sixth user interface element (e.g., 1322) away from the viewpoint of the user in accordance with the second input. In some embodiments, if the second input moves the fourth user interface element past (or through) the locations of the fifth and sixth user interface elements, the second input moves the fourth user interface element to reach the fifth user interface element, then moves the fifth user interface element while continuing to move the fourth user interface element to reach the sixth user interface element, and then moves the sixth user interface element while continuing to move the fourth and fifth user interface elements in accordance with the second input. In some embodiments, the electronic device moves and/or selects the first user interface element or fourth user interface element based on detecting the gaze of the user directed to the first or fourth user interface element and/or detecting a predefined portion (e.g., hand) of the user within a predetermined threshold distance (e.g., 1, 2, 3, 4, 5, or 10 centimeters) of the first or fourth user interface element. Moving the fourth, fifth, and/or sixth user interface elements away from the viewpoint of the user in the three-dimensional environment in accordance with the magnitude of the second user input directed to the fourth user interface element provides a user with enhanced visual feedback while providing the second user input, thereby reducing errors in usage and reducing the time and inputs needed to correct user errors.

In some embodiments, such as in FIG. 13B, displaying the first user interface element (e.g., 1316) visually separated from the second user interface element (e.g., 1314) is in response to detecting, via the one or more input devices (e.g., 314), a respective input state (1420*a*) (e.g., a ready state that precedes an input directed to the first user interface element, such as the first input). In some embodiments, displaying the second user interface element visually separated from the third user interface element is in response to detecting the respective input state. In some embodiments, prior to detecting the respective input state, the electronic device displays the first user interface element within the boundary of the second user interface element without displaying the visual separation between the first and second user interface elements (e.g., the first and second user interface elements are displayed on the same plane and/or touching each other, with no visual separation between the two). In some embodiments, prior to detecting the respective input state, the electronic device displays the second user interface element within the boundary of the third user interface element without displaying the visual separation between the second and third user interface elements (e.g., the second and third user interface elements are displayed on the same plane and/or touching each other, with no visual separation between the two). In some embodiments, the electronic device presents a first respective user interface element displayed within a boundary of a second respective user interface element (e.g., without the second respective user interface element being displayed within a boundary of an additional user interface element) such as according to one or more steps of method 800. In some embodiments, the electronic device displays the first respective user interface element visually separated from the second respective user interface element in response to detecting the respective input state.

In some embodiments, such as in FIG. 13B, in accordance with a determination that the respective input state is a first input state (e.g., an indirect input ready state), a magnitude of separation between the first user interface element (e.g., 1318) and the second user interface element (e.g., 1314) has a first value (1420*b*). In some embodiments, detecting the first input state includes detecting, via the eye tracking device, that the gaze of the user is directed to the first user interface element while detecting a predefined portion of the user in a predetermined shape, such as detecting, via a hand tracking device, that the hand of the user is in a predefined hand shape (e.g., a pre-pinch hand shape in which the thumb of the hand is within a threshold distance (e.g., 0.5, 1, 2, 3, 4, or 5 centimeters) of a finger of the hand). In some embodiments, the first input state is an indirect ready state that is detected prior to detecting an indirect input. In some embodiments, detecting indirect inputs include detecting the indirect input ready state followed by detecting that the gaze of the user is directed to a respective user interface element while detecting performance of a predetermined gesture, such as a pinch gesture in which the thumb of the hand of the user touches a finger of the hand while the hand is greater than a threshold distance (e.g., 1, 2, 3, 4, 5, 10, 15, 20, or 30 centimeters) from the respective user interface element. In some embodiments, the electronic device presents a first respective user interface element displayed within a boundary of a second respective user interface element (e.g., without the second respective user interface element being displayed within a boundary of an additional user interface element) such as according to one or more steps of method 800. In some embodiments, the electronic device displays the first respective user interface element visually separated from the second respective user interface element with a first value in response to detecting the first input state.

In some embodiments, such as in FIG. 13B, in accordance with a determination that the respective input state is a second input state (e.g., a direct input ready state), different from the first input state, the magnitude of separation between the first user interface element (e.g., 1316) and the second user interface element (e.g., 1314) has a second value different from (e.g., greater than or smaller than) the first value (1420*c*). In some embodiments, detecting the second input state includes detecting, via the eye tracking device, that a predefined portion of the user in a predetermined shape within a threshold distance (e.g., 0.5, 1, 2, 3, 4, 5, 10, 15, or 30 centimeters) of a respective user interface element in the three-dimensional environment, such as detecting, via a hand tracking device, that the hand of the user is in a predefined hand shape (e.g., a pre-pinch hand shape in which the thumb of the hand is within a threshold distance (e.g., 0.5, 1, 2, 3, 4, or 5 centimeters) of a finger of the hand, or a pointing hand shape in which one or more fingers are extended and one or more fingers are curled towards the palm of the hand). In some embodiments, the second input state is a direct input ready state that is detected prior to detecting a direct input. In some embodiments, detecting direct inputs include detecting the direct input ready state followed by detecting performance of a predetermined gesture, such as a pinch gesture in which the thumb of the hand of the user touches a finger of the hand or a push gesture in which the user "pushes" a user interface element away from the viewpoint of the user with the tip of the index finger while the hand is in a pointing or pinched hand shape while the hand is within a threshold distance (e.g., 1, 2, 3, 4, 5, 10, 15, 20, or 30 centimeters) from the respective user interface element. In some embodiments, the electronic device presents a first respective user interface element displayed within a boundary of a second respective user interface element (e.g., without the second respective user interface element being displayed within a boundary of an additional user interface element) such as according to one or more steps of method 800. In some embodiments, the electronic device displays the first respective user interface element visually separated from the second respective user interface element with a second value in response to detecting the second input state. Modifying the amount of visual separation between the first and second user interface elements in accordance with a determination of which respective input state is detected provides a user with enhanced visual feedback of user inputs being provided to the electronic device, thereby reducing user errors and reducing the time and number of inputs needed to correct user errors.

In some embodiments, such as in FIG. 13B, detecting the first input state (e.g., indirect ready state) includes detecting, via an eye tracking device (e.g., 314), that a gaze (e.g., 1301*b*) of the user is directed to the first user interface element (e.g., 1318) while detecting a predefined portion (e.g., hand) of the user (e.g., 1303*b*) further than a predetermined threshold distance (e.g., 1, 2, 3, 5, 10, 15, 20, 30, or 50 centimeters) from a location corresponding to the first user interface element (e.g., 1318) in the three-dimensional environment (1422*a*). In some embodiments, detecting the first input state includes detecting the predefined portion of the user in a predetermined shape, such as detecting, via a hand tracking device, that the hand of the user is in a predefined hand shape (e.g., a pre-pinch hand shape in which the thumb of the hand is within a threshold distance (e.g., 0.5, 1, 2, 3, 4, or 5 centimeters) of, but not touching, a finger of the hand) while detecting the predefined portion of the user within the threshold distance of the location corresponding to the first user interface element.

In some embodiments, such as in FIG. 13B, detecting the second input state (e.g., direct ready state) includes detecting the predefined portion (e.g., hand) of the user (e.g., 1303*a*) within the predetermined threshold distance of the location corresponding to the first user interface element (e.g., 1316) in the three-dimensional environment (e.g., while detecting, via the eye tracking device, that the gaze of the user is directed to the first user interface element) (1422*b*). In some embodiments, detecting the second input state includes detecting the predefined portion of the user in a predefined shape, such as a pre-pinch or pointing hand shape while the predefined portion of the user is within the predetermined threshold distance of the location corresponding to the first user interface element. In some embodiments, the magnitude of separation between the first and second user interface elements is larger in response to detecting the second input state than the magnitude of separation between the first and second user interface elements in response to detecting the first input state. Displaying the first and second user interface elements with different amounts of visual separation depending on the distance between the predefined portion of the user and the location corresponding to the first user interface element associated with the detected input state provides a user with improved visual feedback while providing inputs, thereby reducing user errors and the time and inputs needed to correct user errors.

In some embodiments, such as in FIG. 13B, detecting the first input state (e.g., direct or indirect ready state or other air gesture (e.g., virtual input device interaction) ready state) includes detecting, via a first respective input device (e.g., 314) of the one or more input devices (e.g., an eye tracking device, hand tracking device, other image or range sensor, a head tracking device, other accelerometers and/or gyroscopes, or microphone), interaction of a predefined portion of the user (e.g., 1303*a*) with the first respective input device (e.g., 314) without the predefined portion of the user (e.g., 1303*a*) touching the first respective input device (e.g., 314) (and/or while the predefined portion of the user remains further than a threshold distance, such as 0.3, 0.5, 1, 2, 3, 5, or 10 centimeters, from the first respective input device) (1424*a*). In some embodiments, the first respective input device is a hand tracking device that tracks movement, position, and shape of a user's hand to detect user inputs. In some embodiments, the electronic device is in communication with the first respective input device, such as an eye tracking device, head tracking device, hand tracking device, and microphone without being in communication with a second respective input device, such as a trackpad, mouse, keyboard, stylus, remote controller, or other tactile input device not integrated with the housing of the electronic device while detecting the first input state. In some embodiments, detecting the first input state includes detecting, via a hand tracking device, the user make a predefined hand shape with their hand, such as a pre-pinch hand shape or a pointing hand shape.

In some embodiments, detecting the second input state (e.g., tactile input device ready state) includes detecting, via a second respective input device (e.g., a trackpad, mouse, keyboard, stylus, touch screen, etc.) different from the first respective input device, interaction of the predefined portion of the user (e.g., one of the user's hands 1303*a* or 1303*b* illustrated in FIG. 13B) with a second respective input device including the predefined portion of the user touching (and/or within a threshold distance, such as 0.3, 0.5, 1, 2, 3, 5, or 10 centimeters, of) the second respective input device (and/or a touch-sensitive surface of the second respective input device) (1424*b*). In some embodiments, the second respective input device is a tactile input device that detects inputs based on the user touching the input device, such as pressing physical buttons, touching a touch-sensitive surface, or picking up and moving an input device such as a stylus or mouse. In some embodiments, a tactile input device ready state includes detecting the user touching the input device without providing an input to cause the device to perform an action, such as touching a keyboard, mouse, or trackpad without pressing buttons or keys or applying a threshold amount of pressure or providing a motion input (such as motion of a contact across a touch-sensitive surface) to provide an input to cause the electronic device to perform an action, for example. As another example, a ready state of a stylus includes detecting the user holding a stylus without performing a gesture with the stylus corresponding to an input to cause the electronic device to perform an operation. In some embodiments, the amount of visual separation between the first and second user interface elements is greater in response to detecting a direct or indirect ready state or other air gesture ready state than the amount of visual separation between the first and user interface element in response to detecting a tactile input device ready state. Displaying the first and second user interface elements with different amounts of visual separation depending on whether the input state was detected with the predefined portion of the user touching or not touching a respective input device provides a user with enhance the visual feedback while providing a user input, thereby reducing user errors and reducing the inputs and time needed to correct user errors.

In some embodiments, in accordance with a determination that the respective input state is a third input state (e.g., tactile input device ready state) different from the first input state (e.g., indirect input ready state) and the second input state (e.g., direct input ready state), the magnitude of separation between the first user interface element and the second user interface element has a third value different from the first and second values (1426*a*). For example, FIG. 13B illustrates a direct ready state directed to option 1316 and an indirect ready state directed to option 1310*b* and, if a third input state were detected, the amount of visual separation would be different from the amounts of visual separation of options 1316 and 1318 from element 1314. In some embodiments, the third value is less than the first and second values. In some embodiments, the first value is less than the second value. In some embodiments, detecting the first input state or the second input state includes detecting interaction with a first respective input device (e.g., an eye tracking device, a hand tracking device)—and not interaction with a second respective input device—without the user touching the first respective input device (or the second respective input device), and detecting the third input state includes detecting interaction with the second respective input device (e.g., a trackpad, a keyboard, a mouse, a stylus, etc.) while the user touches the second respective input device. In some embodiments, the electronic device presents a first respective user interface element displayed within a boundary of a second respective user interface element (e.g., without the second respective user interface element being displayed within a boundary of an additional user interface element) such as according to one or more steps of method 800. In some embodiments, the electronic device displays the first respective user interface element visually separated from the second respective user interface element with a third value in response to detecting the third input state.

In some embodiments, such as in FIG. 13B, detecting the first input state (e.g., indirect input ready state) includes detecting, via an eye tracking device (e.g., 314), that a gaze (e.g., 1301*b*) of the user is directed to the first user interface element (e.g., 1318) while detecting, via a first respective input device (e.g., 314) of the one or more input devices (e.g., a hand tracking device, other image or range sensor, a head tracking device, other accelerometers and/or gyroscopes, or microphone), that a predefined portion (e.g., 1303*b*) of the user is further than a predetermined threshold distance (e.g., 0.5, 1, 2, 3, 5, 10, 15, 20, 30, or 50 centimeters) from a location corresponding to the first user interface element (e.g., 1318) in the three-dimensional environment, and detecting, via the first respective input device (e.g., 314), interaction of the predefined portion of the user (e.g., 1303*b*) with the first respective input device (e.g., 314) without the predefined portion of the user (e.g., 1303*b*) touching the first respective input device (e.g., 314) (e.g., and/or while the predefined portion of the user remains further than a threshold distance, such as 0.3, 0.5, 1, 2, 3, 5, or 10 centimeters from the first respective input device) (1426*b*). In some embodiments, detecting the first input state includes detecting the predefined portion of the user in a predetermined shape, such as detecting, via a hand tracking device, that the hand of the user is in a predefined hand shape (e.g., a pre-pinch hand shape in which the thumb of the hand is within a threshold distance (e.g., 0.5, 1, 2, 3, 4, or 5 centimeters) of (e.g., but not touching) a finger of the hand) while detecting the predefined portion of the user within the threshold distance of the location corresponding to the first user interface element. In some embodiments, the first respective input device is a hand tracking device that tracks movement, position, and shape of a user's hand to detect user inputs. In some embodiments, the electronic device is in communication with the first respective input device, such as an eye tracking device, head tracking device, hand tracking device, and microphone without being in communication with a second respective input device, such as a trackpad, mouse, keyboard, stylus, remote controller, or other tactile input device not integrated with the housing of the electronic device while detecting the first input state.

In some embodiments, such as in FIG. 13B, detecting the second input state (e.g., direct input ready state) includes detecting, via the first respective input device (e.g., 314) of the one or more input devices (e.g., a hand tracking device, other image or range sensor, a head tracking device, other accelerometers and/or gyroscopes, or microphone), that the predefined portion of the user (e.g., 1303*a*) is less than the threshold distance (e.g., 0.5, 1, 2, 3, 5, 10, 15, 20, 30, or 50 centimeters) from the location corresponding to the first user interface element (e.g., 1316) in the three-dimensional environment, and detecting, via the first respective input device (e.g., 314), interaction of the predefined portion of the user (e.g., 1303*a*) with the first respective input device (e.g., 314) without the predefined portion of the user (e.g., 1303*a*) touching the first respective input device (e.g., 314) (e.g., and/or while the predefined portion of the user remains further than a threshold distance, such as 0.3, 0.5, 1, 2, 3, 5, or 10 centimeters from the first respective input device) (1426*c*). In some embodiments, detecting the second input state includes detecting the predefined portion of the user in a predefined shape, such as a pre-pinch or pointing hand shape while the predefined portion of the user is within the predetermined threshold distance of the location corresponding to the first user interface element.

In some embodiments, detecting the third input state (e.g., tactile input ready state) includes detecting, via a second respective input device (e.g., a trackpad, mouse, keyboard, stylus, touch screen, etc.) different from the first respective input device, interaction of the predefined portion of the user (e.g., such as one of hands 1303*a* and 1303*b* in FIG. 13B) with second respective input device including the predefined portion of the user touching (and/or within a threshold distance, such as 0.3, 0.5, 1, 2, 3, 5, or 10 centimeters, of) the second respective input device (and/or a touch-sensitive surface of the second respective input device) (1426*d*). In some embodiments, the second respective input device is a tactile input device that detects inputs based on the user touching the input device, such as pressing physical buttons, touching a touch-sensitive surface, or picking up and moving an input device such as a stylus or mouse. In some embodiments, a tactile input device ready state includes detecting the user touching the input device without providing an input to cause the device to perform an action, such as touching a keyboard, mouse, or trackpad without pressing buttons or keys or applying a threshold amount of pressure or providing a motion input (such as motion of a contact across a touch-sensitive surface) to provide an input to cause the electronic device to perform an action, for example. As another example, a ready state of a stylus includes detecting the user holding a stylus without performing a gesture with the stylus corresponding to an input to cause the electronic device to perform an operation. In some embodiments, the amount of visual separation between the first and second user interface elements is greatest in response to detecting the first input state (e.g., indirect input ready state) and least in response to detecting the third input state (e.g., tactile input ready state).

Displaying the first and second user interface elements with different amounts of visual separation depending on the input state detected provides a user with enhanced visual feedback of the current input state while providing user inputs, thereby reducing user error and decreasing the amount of time and inputs needed to correct user error.

In some embodiments, such as in FIG. 13B, the electronic device (e.g., 101*a*) detects (1428*a*), via the one or more input devices (e.g., 314), a respective input state directed to the first user interface element (e.g., 1316), wherein displaying the first user interface element (e.g., 1316) visually separated from the second user interface element (e.g., 1314) and displaying the second user interface element (e.g., 1314) visually separated from the third user interface element (e.g., 1312) are in response to detecting the respective input state directed to the first user interface element (e.g., 1316), and the first user interface element (e.g., 1316) is visually separated from the second user interface element (e.g., 1314) by a first amount and the second user interface element (e.g., 1314) is visually separated from the third user interface element (e.g., 1312) by a second amount. In some embodiments, the respective input state is one of a direct input ready state, an indirect input ready state, or a tactile input ready state. In some embodiments, detecting the direct input ready state includes detecting (e.g., via a hand tracking device) that a predefined portion (e.g., hand) of the user is within a predefined threshold (e.g., 0.5, 1, 2, 3, 4, 5, 10, 15, 20, 30, or 50 centimeters) distance of a location corresponding to the first user interface element. In some embodiments, detecting the indirect input ready state includes detecting, via an eye tracking device, that the gaze of the user is directed to the first user interface element while detecting (e.g., via a hand tracking device) that a predefined portion (e.g., hand) of the user is greater than a predefined threshold (e.g., 0.5, 1, 2, 3, 4, 5, 10, 15, 20, 30, or 50 centimeters) distance of a location corresponding to the first user interface element. In some embodiments, detecting the tactile input ready state includes detecting that the user is touching an input device (e.g., a keyboard, trackpad, mouse, stylus, touch screen, etc.) without providing an input to cause the electronic device to perform an operation while the input focus is directed to the first user interface element. Additional or alternative details of the direct, indirect and/or tactile ready states are optionally as described previously. In some embodiments, the electronic device presents a first respective user interface element displayed within a boundary of a second respective user interface element (e.g., without the second respective user interface element being displayed within a boundary of an additional user interface element) such as according to one or more steps of method 800. In some embodiments, the electronic device displays the first respective user interface element visually separated from the second respective user interface element in response to detecting the respective input state directed to the first respective input state.

In some embodiments, such as in FIG. 13A, prior to detecting the respective input state, the electronic device (e.g., 101*a*) displays (1428*b*), via the display generation component (e.g., 120), the first user interface element (e.g., 1316) visually separated from the second user interface element (e.g., 1314) by a third amount less than the first amount and displaying, via the display generation component (e.g., 120), the second user interface element (e.g., 1314) visually separated from the third user interface element (e.g., 1312) by a fourth amount less than the second amount. In some embodiments, the third amount is zero. In some embodiments, the third amount is greater than zero and less than the first amount. In some embodiments, the fourth amount is zero. In some embodiments, the fourth amount is greater than zero and less than the second amount. In some embodiments, in response to detecting the respective input state directed to the first user interface element, the electronic device increases the amount of visual separation between the first and second user interface elements and/or increases the amount of visual separation between the second and third user interface elements. In some embodiments, the electronic device presents a first respective user interface element displayed within a boundary of a second respective user interface element (e.g., without the second respective user interface element being displayed within a boundary of an additional user interface element) such as according to one or more steps of method 800. In some embodiments, the electronic device displays the first respective user interface element visually separated from the second respective user interface element by a smaller amount while not detecting the respective input state than the amount of visual separation with which the electronic device displays the respective user interface elements in response to detecting the respective input state directed to the first respective input state. Increasing the amount of visual separation between the first user interface element and second user interface element and/or increasing the amount of visual separation between the second user interface element and the third user interface element in response to detecting the respective input state provides a user with enhanced visual feedback of the current input state while providing user inputs, thereby improving visual feedback.

In some embodiments, such as in FIG. 13B, displaying the first user interface element (e.g., 1318) visually separated from the second user interface element (e.g., 1312) is in response to detecting, via an eye tracking device (e.g., 314), that a gaze (e.g., 1301*b*) of the user is directed to the first user interface element (e.g., 1318) and detecting, via a respective input device (e.g., 314) (e.g., a hand tracking device), that a predefined portion of the user (e.g., 1303*b*) is within a predetermined threshold distance (e.g., 0.5, 1, 2, 3, 4, 5, 10, 15, 20, 30, or 50 centimeters) of a location corresponding to the first user interface element (e.g., 1318) in the three-dimensional environment (e.g., detecting an indirect or direct ready state), wherein the first user interface element (e.g., 1318) is visually separated from the second user interface element (e.g., 1314) by a first amount (1430*a*). In some embodiments, the electronic device displays the first user interface element visually separated from the second user interface element in response to detecting the predefined portion of the user within the predetermined threshold distance of the first user interface element (e.g., direct ready state).

In some embodiments, the electronic device (e.g., 101*a*) detects (1430*b*), via the respective input device, that the predefined portion of the user (e.g., hand 1303*b* in FIG. 13B) moves closer to the location corresponding to the first user interface element (e.g., 1318 in FIG. 13B) in the three-dimensional environment.

In some embodiments, such as in FIG. 13B, in response to detecting the predefined portion of the user (e.g., 1303*a*) closer to the location corresponding to the first user interface element (e.g., 1316) in the three-dimensional environment (e.g., but without yet reaching the location corresponding to the first user interface element), the electronic device (e.g., 101*a*) displays (1430*c*) the first user interface element (e.g., 1316) visually separated from the second user interface element (e.g., 1314) by a second amount, different from (e.g., greater than) the first amount. In some embodiments, the amount of visual separation between the first user interface element and the second user interface element increases in response to detecting the predefined portion of the user moving closer to the location corresponding to the first user interface element in the three-dimensional environment. In some embodiments, in response to detecting the predefined portion of the user moving closer to the location corresponding to the first user interface element in the three-dimensional environment, the electronic device moves the first user interface element closer to the predefined portion of user. In some embodiments, in response to detecting the predefined portion of the user move further from the location corresponding to the first user interface element in the three-dimensional environment, the electronic device decreases the amount of visual separation between the first user interface element and the second user interface element. In some embodiments, in response to detecting the predefined portion of the user move further from the location corresponding to the first user interface element in the three-dimensional environment, the electronic device moves the first user interface element further from the predefined portion of the user. In some embodiments, the electronic device presents a first respective user interface element displayed within a boundary of a second respective user interface element (e.g., without the second respective user interface element being displayed within a boundary of an additional user interface element) such as according to one or more steps of method 800. In some embodiments, the electronic device displays the first respective user interface element visually separated from the second respective user interface element by a different amount in response to detecting the predefined portion of the user closer to the location corresponding to the first respective user interface element. Modifying the amount of visual separation between the first and second user interface elements in accordance with the distance between the predefined portion of the user and the location corresponding to the first user interface element provides a user with enhanced visual feedback of the current input state while providing inputs, thereby reducing user error and reducing the time and inputs needed to correct user error.

In some embodiments, aspects/operations of methods 800, 1000, 1200, and 1400 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display generation component and one or more input devices:

displaying, via the display generation component, a user interface that includes a respective user interface element having a first appearance, wherein selection of the respective user interface element causes the electronic device to perform a respective operation;

while displaying the respective user interface element having the first appearance, detecting, via the one or more input devices, based on a pose of a physical feature of a user, a first user input including attention of the user of the electronic device is directed to the respective user interface element;

in response to detecting that the attention of the user of the electronic device is directed to the respective user interface element, in accordance with a determination that one or more first criteria are satisfied, updating the respective user interface element to visually separate the respective user interface element in a depth direction from a portion of the user interface that has a predetermined spatial relationship to the respective user interface element to have a second appearance, different from the first appearance, wherein updating the respective user interface element includes moving the respective user interface element toward a location corresponding to the user and away from the portion of the user interface by decreasing a distance between the respective user interface element and the location corresponding to the user and increasing a distance between the respective user interface element and the portion of the user interface;

while the respective user interface element has the second appearance, detecting, via the one or more input devices, based on a pose of a physical feature of the user, a second user input that corresponds to activation of the respective user interface element; and in response to detecting the second user input directed to the respective user interface element:

in accordance with a determination that the second user input satisfies one or more second criteria that indicate that the second user input corresponds to selection of the respective user interface element:
  performing the respective operation corresponding to the selection of the respective user interface element; and
  updating the respective user interface element by reducing an amount of separation between the respective user interface element and the portion of the user interface that has the predetermined spatial relationship to the respective user interface element in the depth direction, wherein updating the respective user interface element includes moving the respective user interface element away from the location corresponding to the user and toward the portion of the user interface by increasing the distance between the respective user interface element and the location corresponding to the user and decreasing the distance between the respective user interface element and the portion of the user interface; and
  in accordance with a determination that the second user input does not satisfy the one or more second criteria while the attention of the user is still determined to be directed to the respective user interface element, forgoing performing the respective operation corresponding to the selection of the respective user interface element without reducing the amount of separation between the respective user interface element and the portion of the user interface that has the predetermined spatial relationship to the respective user interface element in the depth direction.

2. The method of claim 1, further comprising:
while the respective user interface element has the second appearance, detecting, via the one or more input devices, based on the pose of the physical feature of the user, that the attention of the user of the electronic device is not directed to the respective user interface element; and
in response to detecting that the attention of the user of the electronic device is not directed to the respective user interface element, updating the respective user interface element by reducing the amount of separation between the respective user interface element and the portion of the user interface that has the predetermined spatial relationship to the respective user interface element.

3. The method of claim 1, wherein the second user input satisfies the one or more second criteria, the method further comprising:
while detecting the second user input directed to the respective user interface element and before the second user input satisfies the one or more second criteria, updating the respective user interface element by reducing the amount of separation between the respective user interface element and the portion of the user interface in the depth direction that has the predetermined spatial relationship to the respective user interface element in accordance with progress of the second user input towards satisfying the one or more second criteria.

4. The method of claim 1, wherein while displaying the respective user interface element having the first appearance, detecting, based on the pose of the physical feature of the user, the first user input including the attention of the user of the electronic device directed to the respective user interface element includes detecting, via an eye tracking device in communication with the electronic device, that a gaze of the user is directed to the respective user interface element.

5. The method of claim 1, wherein while displaying the respective user interface element having the first appearance, detecting, based on the pose of the physical feature of the user, the first user input including the attention of the user of the electronic device directed to the respective user interface element includes detecting, via an eye tracking device and a hand tracking device in communication with the electronic device, that a gaze of the user is directed to the respective user interface element and a hand of the user is in a predetermined pose.

6. The method of claim 1, wherein while displaying the respective user interface element having the second appearance, detecting, based on the pose of the physical feature of the user, the second user input that corresponds to the activation of the respective user interface element includes detecting, via a hand tracking device in communication with the electronic device, a portion of a hand of the user of the electronic device at a location corresponding to the respective user interface element.

7. The method of claim 1, wherein while displaying the respective user interface element having the second appearance, detecting, based on the pose of the physical feature of the user, the second user input that corresponds to the activation of the respective user interface element includes detecting, via an eye tracking device and a hand tracking device in communication with the electronic device, a respective gesture performed by a hand of the user of the electronic device while a gaze of the user of the electronic device directed to the respective user interface element.

8. The method of claim 1, wherein:
before detecting the second user input directed to the respective user interface element, the respective user interface element is displayed with a respective visual characteristic having a first value while the respective user interface element is visually separated from the portion of the user interface, and
updating the respective user interface element includes displaying the respective user interface element with the respective visual characteristic having a second value, different from the first value, while the amount of separation between the respective user interface element and the portion of the user interface is reduced.

9. The method of claim 1, wherein the second user input satisfies the one or more second criteria when the second user input includes a gaze of the user of the electronic device directed to the respective user interface element for longer than a time threshold.

10. The method of claim 1, further comprising:
while the respective user interface element has the second appearance, detecting, via a hand tracking device in communication with the electronic device, that a hand of the user of the electronic device is at a respective location that corresponds to a location for interacting with the respective user interface element; and
in response to detecting that the hand of the user of the electronic device is at the respective location, updating the respective user interface element to further visually separate the respective user interface element from the portion of the user interface that has the predetermined spatial relationship to the respective user interface element.

11. The method of claim 1, wherein:
the respective user interface element having the second appearance is associated with a first hierarchical level in the user interface, and the portion of the user interface that has the predetermined spatial relationship to the respective user interface element is associated with a second hierarchical level, different from the first hierarchical level.

12. The method of claim 11, wherein the first hierarchical level in the user interface of the respective user interface element having the second appearance is a first z-height in a three-dimensional environment, and the second hierarchical level in the user interface of the portion of the user interface that has the predetermined spatial relationship to the respective user interface element is a second z-height in the three-dimensional environment, different from the second z-height.

13. The method of claim 1, wherein:
   detecting the second user input includes detecting, via a hand tracking device in communication with the electronic device, hand input from the user of the electronic device corresponding to movement of the respective user interface element back towards the portion of the user interface, the method further comprising:
   in response to detecting the second user input, updating the respective user interface element to reduce the amount of separation between the respective user interface element and the portion of the user interface,
   wherein the second user input satisfies the one or more second criteria when the hand input corresponds to movement of the respective user interface element to within a threshold distance from the portion of the user interface.

14. The method of claim 13, further comprising:
   after the second user input satisfies the one or more second criteria and while the respective user interface element is within the threshold distance from the portion of the user interface, detecting, via the hand tracking device, further hand input from the user of the electronic device corresponding to the movement of the respective user interface element back towards the portion of the user interface; and
   in response to detecting the further hand input, moving the respective user interface element and the portion of the user interface in accordance with the further hand input.

15. The method of claim 13, further comprising:
   in response to detecting the second user input:
      in accordance with a determination that the hand input corresponds to movement of the respective user interface element back towards the portion of the user interface that is less than a threshold amount of movement, moving the respective user interface element back towards the portion of the user interface in accordance with the hand input without moving the portion of the user interface, to reduce the amount of separation between the respective user interface element and the portion of the user interface; and
      in accordance with a determination that the hand input corresponds to movement of the respective user interface element back towards the portion of the user interface that is greater than the threshold amount of movement, moving the respective user interface element and moving the portion of the user interface in accordance with the hand input.

16. The method of claim 1, wherein updating the respective user interface element by reducing the amount of separation between the respective user interface element and the portion of the user interface includes moving the respective user interface element and the portion of the user interface with inertia in accordance with a movement component of the second user input, the method further comprising:
   detecting a termination of the second user input directed to the respective user interface element; and
   in response to detecting the termination of the second user input directed to the respective user interface element, moving the respective user interface element and the portion of the user interface in a direction opposite to the movement of the respective user interface element and the portion of the user interface that was in response to the second user input.

17. The method of claim 16, wherein detecting the second user input includes detecting a portion of a hand of the user of the electronic device at a location corresponding to the respective user interface element, the method further comprising:
   while the respective user interface element has the second appearance, detecting, via a hand tracking device in communication with the electronic device, a respective input including a respective gesture performed by the hand of the user while the hand of the user is at a location that does not correspond to the respective user interface element;
   in response to detecting the respective input:
      in accordance with a determination based on the respective gesture performed by the hand of the user while the hand of the user is at the location that does not correspond to the respective user interface element, that the respective input satisfies one or more third criteria, updating the respective user interface element by reducing the amount of separation between the respective user interface element and the portion of the user interface, including moving the respective user interface element and the portion of the user interface with inertia;
   detecting a termination of the respective input; and
   in response to detecting the termination of the respective input, moving the respective user interface element and the portion of the user interface in a direction opposite to the movement of the respective user interface element and the portion of the user interface that was in response to the respective input.

18. The method of claim 16, wherein detecting the second user input includes detecting a portion of a hand of the user of the electronic device at a location corresponding to the respective user interface element, the method further comprising:
   while the respective user interface element has the second appearance, detecting, via an eye tracking device in communication with the electronic device, a respective input including a gaze of the user directed to the respective user interface element;
   in response to detecting the respective input:
      in accordance with a determination based on the gaze of the user directed to the respective user interface element that the respective input satisfies one or more third criteria, updating the respective user interface element by reducing the amount of separation between the respective user interface element and the portion of the user interface, including moving the respective user interface element and the portion of the user interface with inertia;
   detecting a termination of the respective input; and
   in response to detecting the termination of the respective input, moving the respective user interface element and the portion of the user interface in a direction opposite to the movement of the respective user interface element and the portion of the user interface that was in response to the respective input.

19. The method of claim 1, wherein the user interface is displayed in a three-dimensional environment, and the depth direction is a direction towards a viewpoint of a user of the electronic device in the three-dimensional environment.

20. An electronic device, comprising:
one or more processors;
memory; and
one or more programs, wherein the one or more programs are stored in the memory and configured to be executed by the one or more processors, the one or more programs including instructions for:
displaying, via a display generation component, a user interface that includes a respective user interface element having a first appearance, wherein selection of the respective user interface element causes the electronic device to perform a respective operation;
while displaying the respective user interface element having the first appearance, detecting, via one or more input devices, based on a pose of a physical feature of a user, a first user input including attention of the user of the electronic device is directed to the respective user interface element;
in response to detecting that the attention of the user of the electronic device is directed to the respective user interface element, in accordance with a determination that one or more first criteria are satisfied, updating the respective user interface element in a depth direction to visually separate the respective user interface element from a portion of the user interface that has a predetermined spatial relationship to the respective user interface element to have a second appearance, different from the first appearance, wherein updating the respective user interface element includes moving the respective user interface element toward a location corresponding to the user and away from the portion of the user interface by decreasing a distance between the respective user interface element and the location corresponding to the user and increasing a distance between the respective user interface element and the portion of the user interface;
while the respective user interface element has the second appearance, detecting, via the one or more input devices, based on a pose of a physical feature of the user, a second user input that corresponds to activation of the respective user interface element; and
in response to detecting the second user input directed to the respective user interface element:
in accordance with a determination that the second user input satisfies one or more second criteria indicate that the second user input corresponds to selection of the respective user interface element;
performing the respective operation corresponding to the selection of the respective user interface element; and
updating the respective user interface element by reducing an amount of separation between the respective user interface element and the portion of the user interface that has the predetermined spatial relationship to the respective user interface element in the depth direction, wherein updating the respective user interface element includes moving the respective user interface element away from the location corresponding to the user and toward the portion of the user interface by increasing the distance between the respective user interface element and the location corresponding to the user and decreasing the distance between the respective user interface element and the portion of the user interface; and
in accordance with a determination that the second user input does not satisfy the one or more second criteria while the attention of the user is still determined to be directed to the respective user interface element, forgoing performing the respective operation corresponding to the selection of the respective user interface element without reducing the amount of separation between the respective user interface element and the portion of the user interface that has the predetermined spatial relationship to the respective user interface element in the depth direction.

21. The electronic device of claim 20, the one or more programs including instructions for:
while the respective user interface element has the second appearance, detecting, via the one or more input devices, based on the pose of the physical feature of the user, that the attention of the user of the electronic device is not directed to the respective user interface element; and
in response to detecting that the attention of the user of the electronic device is not directed to the respective user interface element, updating the respective user interface element by reducing the amount of separation between the respective user interface element and the portion of the user interface that has the predetermined spatial relationship to the respective user interface element.

22. The electronic device of claim 20, wherein the second user input satisfies the one or more second criteria, the one or more programs including instructions for:
while detecting the second user input directed to the respective user interface element and before the second user input satisfies the one or more second criteria, updating the respective user interface element by reducing the amount of separation between the respective user interface element and the portion of the user interface in the depth direction that has the predetermined spatial relationship to the respective user interface element in accordance with progress of the second user input towards satisfying the one or more second criteria.

23. The electronic device of claim 20, wherein while displaying the respective user interface element having the first appearance, detecting, based on the pose of the physical feature of the user, the first user input including the attention of the user of the electronic device directed to the respective user interface element includes detecting, via an eye tracking device in communication with the electronic device, that a gaze of the user is directed to the respective user interface element.

24. The electronic device of claim 20, wherein while displaying the respective user interface element having the first appearance, detecting, based on the pose of the physical feature of the user, the first user input including the attention of the user of the electronic device directed to the respective user interface element includes detecting, via an eye tracking device and a hand tracking device in communication with the electronic device, that a gaze of the user is directed to the respective user interface element and a hand of the user is in a predetermined pose.

25. The electronic device of claim 20, wherein while displaying the respective user interface element having the second appearance, detecting, based on the pose of the physical feature of the user, the second user input that corresponds to the activation of the respective user interface element includes detecting, via a hand tracking device in communication with the electronic device, a portion of a hand of the user of the electronic device at a location corresponding to the respective user interface element.

26. The electronic device of claim 20, wherein while displaying the respective user interface element having the second appearance, detecting, based on the pose of the physical feature of the user, the second user input that corresponds to the activation of the respective user interface element includes detecting, via an eye tracking device and a hand tracking device in communication with the electronic device, a respective gesture performed by a hand of the user of the electronic device while a gaze of the user of the electronic device directed to the respective user interface element.

27. The electronic device of claim 20, wherein:
before detecting the second user input directed to the respective user interface element, the respective user interface element is displayed with a respective visual characteristic having a first value while the respective user interface element is visually separated from the portion of the user interface, and
updating the respective user interface element includes displaying the respective user interface element with the respective visual characteristic having a second value, different from the first value, while the amount of separation between the respective user interface element and the portion of the user interface is reduced.

28. The electronic device of claim 20, wherein the second user input satisfies the one or more second criteria when the second user input includes a gaze of the user of the electronic device directed to the respective user interface element for longer than a time threshold.

29. The electronic device of claim 20, the one or more programs including instructions for:
while the respective user interface element has the second appearance, detecting, via a hand tracking device in communication with the electronic device, that a hand of the user of the electronic device is at a respective location that corresponds to a location for interacting with the respective user interface element; and
in response to detecting that the hand of the user of the electronic device is at the respective location, updating the respective user interface element to further visually separate the respective user interface element from the portion of the user interface that has the predetermined spatial relationship to the respective user interface element.

30. The electronic device of claim 20, wherein:
the respective user interface element having the second appearance is associated with a first hierarchical level in the user interface, and the portion of the user interface that has the predetermined spatial relationship to the respective user interface element is associated with a second hierarchical level, different from the first hierarchical level.

31. The electronic device of claim 30, wherein the first hierarchical level in the user interface of the respective user interface element having the second appearance is a first z-height in a three-dimensional environment, and the second hierarchical level in the user interface of the portion of the user interface that has the predetermined spatial relationship to the respective user interface element is a second z-height in the three-dimensional environment, different from the second z-height.

32. The electronic device of claim 20, wherein:
detecting the second user input includes detecting, via a hand tracking device in communication with the electronic device, hand input from the user of the electronic device corresponding to movement of the respective user interface element back towards the portion of the user interface, the one or more programs including instructions for:
in response to detecting the second user input, updating the respective user interface element to reduce the amount of separation between the respective user interface element and the portion of the user interface,
wherein the second user input satisfies the one or more second criteria when the hand input corresponds to movement of the respective user interface element to within a threshold distance from the portion of the user interface.

33. The electronic device of claim 32, the one or more programs including instructions for:
after the second user input satisfies the one or more second criteria and while the respective user interface element is within the threshold distance from the portion of the user interface, detecting, via the hand tracking device, further hand input from the user of the electronic device corresponding to the movement of the respective user interface element back towards the portion of the user interface; and
in response to detecting the further hand input, moving the respective user interface element and the portion of the user interface in accordance with the further hand input.

34. The electronic device of claim 32, the one or more programs including instructions for:
in response to detecting the second user input:
in accordance with a determination that the hand input corresponds to movement of the respective user interface element back towards the portion of the user interface that is less than a threshold amount of movement, moving the respective user interface element back towards the portion of the user interface in accordance with the hand input without moving the portion of the user interface, to reduce the amount of separation between the respective user interface element and the portion of the user interface; and
in accordance with a determination that the hand input corresponds to movement of the respective user interface element back towards the portion of the user interface that is greater than the threshold amount of movement, moving the respective user interface element and moving the portion of the user interface in accordance with the hand input.

35. The electronic device of claim 20, wherein updating the respective user interface element by reducing the amount of separation between the respective user interface element and the portion of the user interface includes moving the respective user interface element and the portion of the user interface with inertia in accordance with a movement component of the second user input, the one or more programs including instructions for:
detecting a termination of the second user input directed to the respective user interface element; and
in response to detecting the termination of the second user input directed to the respective user interface element, moving the respective user interface element and the portion of the user interface in a direction opposite to the movement of the respective user interface element and the portion of the user interface that was in response to the second user input.

36. The electronic device of claim 35, wherein detecting the second user input includes detecting a portion of a hand of the user of the electronic device at a location corresponding to the respective user interface element, the one or more programs including instructions for:
while the respective user interface element has the second appearance, detecting, via a hand tracking device in communication with the electronic device, a respective input including a respective gesture performed by the hand of the user while the hand of the user is at a location that does not correspond to the respective user interface element;
in response to detecting the respective input:
in accordance with a determination based on the respective gesture performed by the hand of the user while the hand of the user is at the location that does not correspond to the respective user interface element, that the respective input satisfies one or more third criteria, updating the respective user interface element by reducing the amount of separation between the respective user interface element and the portion of the user interface, including moving the respective user interface element and the portion of the user interface with inertia;
detecting a termination of the respective input; and
in response to detecting the termination of the respective input, moving the respective user interface element and the portion of the user interface in a direction opposite to the movement of the respective user interface element and the portion of the user interface that was in response to the respective input.

37. The electronic device of claim 35, wherein detecting the second user input includes detecting a portion of a hand of the user of the electronic device at a location corresponding to the respective user interface element, the one or more programs including instructions for:
while the respective user interface element has the second appearance, detecting, via an eye tracking device in communication with the electronic device, a respective input including a gaze of the user directed to the respective user interface element;
in response to detecting the respective input:
in accordance with a determination based on the gaze of the user directed to the respective user interface element that the respective input satisfies one or more third criteria, updating the respective user interface element by reducing the amount of separation between the respective user interface element and the portion of the user interface, including moving the respective user interface element and the portion of the user interface with inertia;
detecting a termination of the respective input; and
in response to detecting the termination of the respective input, moving the respective user interface element and the portion of the user interface in a direction opposite to the movement of the respective user interface element and the portion of the user interface that was in response to the respective input.

38. The electronic device of claim 20, wherein the user interface is displayed in a three-dimensional environment, and the depth direction is a direction towards a viewpoint of a user of the electronic device in the three-dimensional environment.

39. A non-transitory computer readable storage medium storing one or more programs, the one or more programs comprising instructions, which when executed by one or more processors of an electronic device, cause the electronic device to:
display, via a display generation component, a user interface that includes a respective user interface element having a first appearance, wherein selection of the respective user interface element causes the electronic device to perform a respective operation;
while displaying the respective user interface element having the first appearance, detect, via one or more input devices, based on a pose of a physical feature of a user, a first user input including attention of the user of the electronic device is directed to the respective user interface element;
in response to detecting that the attention of the user of the electronic device is directed to the respective user interface element, in accordance with a determination that one or more first criteria are satisfied, update the respective user interface element in a depth direction to visually separate the respective user interface element from a portion of the user interface that has a predetermined spatial relationship to the respective user interface element to have a second appearance, different from the first appearance, wherein updating the respective user interface element includes moving the respective user interface element toward a location corresponding to the user and away from the portion of the user interface by decreasing a distance between the respective user interface element and the location corresponding to the user and increasing a distance between the respective user interface element and the portion of the user interface;
while the respective user interface element has the second appearance, detecting, via the one or more input devices, based on a pose of a physical feature of the user, a second user input that corresponds to activation of the respective user interface element; and
in response to detecting the second user input directed to the respective user interface element:
in accordance with a determination that the second user input satisfies one or more second criteria indicate that the second user input corresponds to selection of the respective user interface element:
performing the respective operation corresponding to the selection of the respective user interface element; and
updating the respective user interface element by reducing an amount of separation between the respective user interface element and the portion of the user interface that has the predetermined spatial relationship to the respective user interface element in the depth direction, wherein updating the respective user interface element includes moving the respective user interface element away from the location corresponding to the user and toward the portion of the user interface by increasing the distance between the respective user interface element and the location corresponding to the user and decreasing the distance between the respective user interface element and the portion of the user interface; and
in accordance with a determination that the second user input does not satisfy the one or more second criteria while the attention of the user is still determined to be directed to the respective user interface element, forgo performing the respective operation corresponding to the selection of the respective user interface element without reducing the amount of separation between the respective user interface element and the portion of the user interface that has the predetermined spatial relationship to the respective user interface element in the depth direction.

40. The non-transitory computer readable storage medium of claim 39, wherein the instructions cause the electronic device to:
while the respective user interface element has the second appearance, detect, via the one or more input devices, based on the pose of the physical feature of the user, that the attention of the user of the electronic device is not directed to the respective user interface element; and
in response to detecting that the attention of the user of the electronic device is not directed to the respective user interface element, update the respective user interface element by reducing the amount of separation between the respective user interface element and the portion of the user interface that has the predetermined spatial relationship to the respective user interface element.

41. The non-transitory computer readable storage medium of claim 39, wherein the second user input satisfies the one or more second criteria, wherein the instructions cause the electronic device to:
while detecting the second user input directed to the respective user interface element and before the second user input satisfies the one or more second criteria, update the respective user interface element by reducing the amount of separation between the respective user interface element and the portion of the user interface in the depth direction that has the predetermined spatial relationship to the respective user interface element in accordance with progress of the second user input towards satisfying the one or more second criteria.

42. The non-transitory computer readable storage medium of claim 39, wherein while displaying the respective user interface element having the first appearance, detecting, based on the pose of the physical feature of the user, the first user input including the attention of the user of the electronic device directed to the respective user interface element includes detecting, via an eye tracking device in communication with the electronic device, that a gaze of the user is directed to the respective user interface element.

43. The non-transitory computer readable storage medium of claim 39, wherein while displaying the respective user interface element having the first appearance, detecting, based on the pose of the physical feature of the user, the first user input including the attention of the user of the electronic device directed to the respective user interface element includes detecting, via an eye tracking device and a hand tracking device in communication with the electronic device, that a gaze of the user is directed to the respective user interface element and a hand of the user is in a predetermined pose.

44. The non-transitory computer readable storage medium of claim 39, wherein while displaying the respective user interface element having the second appearance, detecting, based on the pose of the physical feature of the user, the second user input that corresponds to the activation of the respective user interface element includes detecting, via a hand tracking device in communication with the electronic device, a portion of a hand of the user of the electronic device at a location corresponding to the respective user interface element.

45. The non-transitory computer readable storage medium of claim 39, wherein while displaying the respective user interface element having the second appearance, detecting, based on the pose of the physical feature of the user, the second user input that corresponds to the activation of the respective user interface element includes detecting, via an eye tracking device and a hand tracking device in communication with the electronic device, a respective gesture performed by a hand of the user of the electronic device while a gaze of the user of the electronic device directed to the respective user interface element.

46. The non-transitory computer readable storage medium of claim 39, wherein:
before detecting the second user input directed to the respective user interface element, the respective user interface element is displayed with a respective visual characteristic having a first value while the respective user interface element is visually separated from the portion of the user interface, and
updating the respective user interface element includes displaying the respective user interface element with the respective visual characteristic having a second value, different from the first value, while the amount of separation between the respective user interface element and the portion of the user interface is reduced.

47. The non-transitory computer readable storage medium of claim 39, wherein the second user input satisfies the one or more second criteria when the second user input includes a gaze of the user of the electronic device directed to the respective user interface element for longer than a time threshold.

48. The non-transitory computer readable storage medium of claim 39, wherein the instructions cause the electronic device to:
while the respective user interface element has the second appearance, detect, via a hand tracking device in communication with the electronic device, that a hand of the user of the electronic device is at a respective location that corresponds to a location for interacting with the respective user interface element; and
in response to detecting that the hand of the user of the electronic device is at the respective location, update the respective user interface element to further visually separate the respective user interface element from the portion of the user interface that has the predetermined spatial relationship to the respective user interface element.

49. The non-transitory computer readable storage medium of claim 39, wherein:
the respective user interface element having the second appearance is associated with a first hierarchical level in the user interface, and the portion of the user interface that has the predetermined spatial relationship to the respective user interface element is associated with a second hierarchical level, different from the first hierarchical level.

50. The non-transitory computer readable storage medium of claim 49, wherein the first hierarchical level in the user interface of the respective user interface element having the second appearance is a first z-height in a three-dimensional environment, and the second hierarchical level in the user interface of the portion of the user interface that has the predetermined spatial relationship to the respective user interface element is a second z-height in the three-dimensional environment, different from the second z-height.

51. The non-transitory computer readable storage medium of claim 39, wherein:
  detecting the second user input includes detecting, via a hand tracking device in communication with the electronic device, hand input from the user of the electronic device corresponding to movement of the respective user interface element back towards the portion of the user interface, the wherein the instructions cause the electronic device to:
  in response to detecting the second user input, update the respective user interface element to reduce the amount of separation between the respective user interface element and the portion of the user interface,
  wherein the second user input satisfies the one or more second criteria when the hand input corresponds to movement of the respective user interface element to within a threshold distance from the portion of the user interface.

52. The non-transitory computer readable storage medium of claim 51, wherein the instructions cause the electronic device to:
  after the second user input satisfies the one or more second criteria and while the respective user interface element is within the threshold distance from the portion of the user interface, detect, via the hand tracking device, further hand input from the user of the electronic device corresponding to the movement of the respective user interface element back towards the portion of the user interface; and
  in response to detecting the further hand input, move the respective user interface element and the portion of the user interface in accordance with the further hand input.

53. The non-transitory computer readable storage medium of claim 51, wherein the instructions cause the electronic device to:
  in response to detecting the second user input:
    in accordance with a determination that the hand input corresponds to movement of the respective user interface element back towards the portion of the user interface that is less than a threshold amount of movement, move the respective user interface element back towards the portion of the user interface in accordance with the hand input without moving the portion of the user interface, to reduce the amount of separation between the respective user interface element and the portion of the user interface; and
    in accordance with a determination that the hand input corresponds to movement of the respective user interface element back towards the portion of the user interface that is greater than the threshold amount of movement, move the respective user interface element and moving the portion of the user interface in accordance with the hand input.

54. The non-transitory computer readable storage medium of claim 39, wherein updating the respective user interface element by reducing the amount of separation between the respective user interface element and the portion of the user interface includes moving the respective user interface element and the portion of the user interface with inertia in accordance with a movement component of the second user input, the wherein the instructions cause the electronic device to:
  detect a termination of the second user input directed to the respective user interface element; and
  in response to detecting the termination of the second user input directed to the respective user interface element, move the respective user interface element and the portion of the user interface in a direction opposite to the movement of the respective user interface element and the portion of the user interface that was in response to the second user input.

55. The non-transitory computer readable storage medium of claim 54, wherein detecting the second user input includes detecting a portion of a hand of the user of the electronic device at a location corresponding to the respective user interface element, wherein the instructions cause the electronic device to:
  while the respective user interface element has the second appearance, detect, via a hand tracking device in communication with the electronic device, a respective input including a respective gesture performed by the hand of the user while the hand of the user is at a location that does not correspond to the respective user interface element;
  in response to detecting the respective input:
    in accordance with a determination based on the respective gesture performed by the hand of the user while the hand of the user is at the location that does not correspond to the respective user interface element, that the respective input satisfies one or more third criteria, update the respective user interface element by reducing the amount of separation between the respective user interface element and the portion of the user interface, including moving the respective user interface element and the portion of the user interface with inertia;
  detect a termination of the respective input; and
  in response to detecting the termination of the respective input, move the respective user interface element and the portion of the user interface in a direction opposite to the movement of the respective user interface element and the portion of the user interface that was in response to the respective input.

56. The non-transitory computer readable storage medium of claim 54, wherein detecting the second user input includes detecting a portion of a hand of the user of the electronic device at a location corresponding to the respective user interface element, wherein the instructions cause the electronic device to:
  while the respective user interface element has the second appearance, detect, via an eye tracking device in communication with the electronic device, a respective input including a gaze of the user directed to the respective user interface element;
  in response to detecting the respective input:
    in accordance with a determination based on the gaze of the user directed to the respective user interface element that the respective input satisfies one or more third criteria, update the respective user interface element by reducing the amount of separation between the respective user interface element and the portion of the user interface, including moving the respective user interface element and the portion of the user interface with inertia;
  detect a termination of the respective input; and
  in response to detecting the termination of the respective input, move the respective user interface element and the portion of the user interface in a direction opposite to the movement of the respective user interface element and the portion of the user interface that was in response to the respective input.

57. The non-transitory computer readable storage medium of claim 39, wherein the user interface is displayed in a three-dimensional environment, and the depth direction is a direction towards a viewpoint of a user of the electronic device in the three-dimensional environment.

\* \* \* \* \*